(12) United States Patent
Schwegler et al.

(10) Patent No.: US 11,131,474 B2
(45) Date of Patent: Sep. 28, 2021

(54) THERMOSTAT WITH USER INTERFACE FEATURES

(71) Applicant: Johnson Controls Technology Company, Auburn Hills, MI (US)

(72) Inventors: Alan S. Schwegler, Shorewood, WI (US); Joseph R. Ribbich, Waukesha, WI (US); Corey A. Poquette, Milwaukee, WI (US); Michael F. Kornacki, Oak Creek, WI (US); Brent T. Ellis, Reedsville, WI (US); Benjamin W. Hapka, Germantown, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 7 days.

(21) Appl. No.: 16/292,020

(22) Filed: Mar. 4, 2019

(65) Prior Publication Data

US 2019/0277530 A1 Sep. 12, 2019

Related U.S. Application Data

(60) Provisional application No. 62/640,654, filed on Mar. 9, 2018.

(51) Int. Cl.
*F24F 11/49* (2018.01)
*F24F 11/52* (2018.01)
(Continued)

(52) U.S. Cl.
CPC .......... *F24F 11/49* (2018.01); *F24F 11/0008* (2013.01); *F24F 11/52* (2018.01);
(Continued)

(58) Field of Classification Search
CPC ........ F24F 11/0008; F24F 11/49; F24F 11/52; F24F 11/56; F24F 11/63; F24F 2110/10;
(Continued)

(56) References Cited

U.S. PATENT DOCUMENTS 5,065,813 A * 11/1991 Berkeley ............ G05D 23/1917
236/94
5,082,173 A 1/1992 Poehlman et al.
(Continued)

FOREIGN PATENT DOCUMENTS

CA 2466854 C 4/2008
CA 2633200 C 1/2011
(Continued)

OTHER PUBLICATIONS

U.S. Appl. No. 15/146,202, filed May 4, 2016, Johnson Controls Technology Company.
(Continued)

*Primary Examiner* — Kidest Bahta
(74) *Attorney, Agent, or Firm* — Foley & Lardner LLP

(57) ABSTRACT

A controller for controlling an environmental condition of a building via building equipment includes a user interface configured to present information to a user, an air quality sensor configured to sense indoor air quality conditions, a communications interface configured to communicate with a server system and receive outdoor air quality data from the server system, and a processing circuit. The processing circuit is configured to generate indoor air quality data based on the sensed indoor air quality data conditions sensed by the air quality sensor, receive, via the communications interface, the outdoor air quality data from the server system, and generate one or more interfaces indicating the indoor air quality conditions and the outdoor air quality conditions based on the indoor air quality data and the
(Continued)

outdoor air quality data and cause the user interface to display the one or more interfaces.

7 Claims, 74 Drawing Sheets

(51) Int. Cl.

| | |
|---|---|
| *F24F 11/00* | (2018.01) |
| *F24F 11/56* | (2018.01) |
| *F24F 11/63* | (2018.01) |
| *F25B 30/00* | (2006.01) |
| *G05B 15/02* | (2006.01) |
| *F24F 110/52* | (2018.01) |
| *F24F 110/10* | (2018.01) |
| *F24F 110/20* | (2018.01) |
| *F24F 110/50* | (2018.01) |
| *F24F 110/66* | (2018.01) |
| *F24F 110/70* | (2018.01) |
| *F25B 13/00* | (2006.01) |

(52) U.S. Cl.
CPC .............. *F24F 11/56* (2018.01); *F24F 11/63* (2018.01); *F25B 30/00* (2013.01); *G05B 15/02* (2013.01); *F24F 2110/10* (2018.01); *F24F 2110/20* (2018.01); *F24F 2110/50* (2018.01); *F24F 2110/52* (2018.01); *F24F 2110/66* (2018.01); *F24F 2110/70* (2018.01); *F25B 13/00* (2013.01); *F25B 2313/0293* (2013.01); *F25B 2313/0294* (2013.01); *F25B 2313/0312* (2013.01); *F25B 2313/0314* (2013.01); *F25B 2313/0315* (2013.01); *F25B 2600/0253* (2013.01); *F25B 2700/1931* (2013.01); *F25B 2700/1933* (2013.01); *F25B 2700/2104* (2013.01); *F25B 2700/2106* (2013.01)

(58) Field of Classification Search
CPC .............. F24F 2110/20; F24F 2110/50; F24F 2110/52; F24F 2110/66; F24F 2110/70; F25B 13/00; F25B 2313/0293; F25B 2313/0294; F25B 2313/0312; F25B 2313/0314; F25B 2313/0315; F25B 2600/0253; F25B 2700/1931
See application file for complete search history.

(56) References Cited

U.S. PATENT DOCUMENTS

| | | | |
|---|---|---|---|
| 5,161,606 A | 11/1992 | Berkeley et al. | |
| 5,232,152 A | 8/1993 | Tsang | |
| 5,364,026 A | 11/1994 | Kundert | |
| 5,381,950 A | 1/1995 | Aldridge | |
| 5,433,377 A | 7/1995 | Sodo et al. | |
| 5,482,210 A | 1/1996 | Carey et al. | |
| 5,547,107 A | 8/1996 | Boiardi | |
| 5,902,183 A | 5/1999 | D'Souza | |
| 5,950,709 A | 9/1999 | Krueger et al. | |
| 6,119,680 A | 9/2000 | Barritt | |
| 6,161,764 A | 12/2000 | Jatnieks | |
| 6,164,374 A | 12/2000 | Rhodes et al. | |
| 6,169,937 B1 | 1/2001 | Peterson | |
| 6,318,639 B1 | 11/2001 | Toth | |
| 6,351,693 B1 | 2/2002 | Monie et al. | |
| 6,398,118 B1 | 6/2002 | Rosen et al. | |
| 6,431,268 B1 | 8/2002 | Rudd | |
| 6,435,418 B1 | 8/2002 | Toth et al. | |
| 6,467,695 B1 | 10/2002 | Riley et al. | |
| 6,514,138 B2 | 2/2003 | Estepp | |
| 6,557,771 B2 | 5/2003 | Shah | |
| 6,641,054 B2 | 11/2003 | Morey | |
| 6,726,112 B1 | 4/2004 | Ho | |
| 6,726,113 B2 | 4/2004 | Guo | |
| 6,810,307 B1 | 10/2004 | Addy | |
| 6,824,069 B2 | 11/2004 | Rosen | |
| 6,888,441 B2 | 5/2005 | Carey | |
| 6,920,874 B1 | 7/2005 | Siegel | |
| 6,935,570 B2 | 8/2005 | Acker, Jr. | |
| 6,941,193 B2 | 9/2005 | Frecska et al. | |
| 6,988,671 B2 | 1/2006 | Deluca | |
| 6,995,518 B2 | 2/2006 | Havlik et al. | |
| 7,028,912 B1 | 4/2006 | Rosen | |
| 7,044,397 B2 | 5/2006 | Bartlett et al. | |
| 7,083,109 B2 | 8/2006 | Pouchak | |
| 7,113,086 B2 | 9/2006 | Shorrock | |
| 7,140,551 B2 | 11/2006 | De Pauw et al. | |
| 7,146,253 B2 | 12/2006 | Hoog et al. | |
| 7,152,806 B1 | 12/2006 | Rosen | |
| 7,156,317 B1 | 1/2007 | Moore | |
| 7,156,318 B1 | 1/2007 | Rosen | |
| 7,159,789 B2 | 1/2007 | Schwendinger et al. | |
| 7,159,790 B2 | 1/2007 | Schwendinger et al. | |
| 7,167,079 B2 | 1/2007 | Smyth et al. | |
| 7,188,002 B2 | 3/2007 | Chapman et al. | |
| 7,212,887 B2 | 5/2007 | Shah et al. | |
| 7,222,494 B2 | 5/2007 | Peterson et al. | |
| 7,226,496 B2 | 6/2007 | Ehlers | |
| 7,232,075 B1 | 6/2007 | Rosen | |
| 7,261,243 B2 | 8/2007 | Butler et al. | |
| 7,274,972 B2 | 9/2007 | Amundson et al. | |
| 7,287,709 B2 | 10/2007 | Proffitt et al. | |
| 7,296,426 B2 | 11/2007 | Butler et al. | |
| 7,299,996 B2 | 11/2007 | Garrett et al. | |
| 7,306,165 B2 | 12/2007 | Shah | |
| 7,308,384 B2 | 12/2007 | Shah et al. | |
| 7,317,970 B2 | 1/2008 | Pienta et al. | |
| 7,320,110 B2 | 1/2008 | Shah | |
| 7,325,748 B2 | 2/2008 | Acker, Jr. | |
| 7,331,187 B2 | 2/2008 | Kates | |
| 7,343,751 B2 | 3/2008 | Kates | |
| 7,402,780 B2 | 7/2008 | Mueller et al. | |
| 7,434,413 B2 | 10/2008 | Wruck | |
| 7,434,744 B2 | 10/2008 | Garozzo et al. | |
| 7,475,558 B2 | 1/2009 | Perry | |
| 7,475,828 B2 | 1/2009 | Bartlett et al. | |
| 7,556,207 B2 | 7/2009 | Mueller et al. | |
| 7,565,813 B2 | 7/2009 | Pouchak | |
| 7,575,179 B2 | 8/2009 | Morrow et al. | |
| 7,584,897 B2 | 9/2009 | Schultz et al. | |
| 7,614,567 B2 | 11/2009 | Chapman et al. | |
| 7,624,397 B1 * | 11/2009 | Washburn | G06F 9/547 709/203 |
| 7,624,931 B2 | 12/2009 | Chapman et al. | |
| 7,633,743 B2 | 12/2009 | Barton et al. | |
| 7,636,604 B2 | 12/2009 | Bergman et al. | |
| 7,638,739 B2 | 12/2009 | Rhodes et al. | |
| 7,641,126 B2 | 1/2010 | Schultz et al. | |
| 7,645,158 B2 | 1/2010 | Mulhouse et al. | |
| 7,667,163 B2 | 2/2010 | Ashworth et al. | |
| 7,726,581 B2 | 6/2010 | Naujok et al. | |
| 7,731,096 B2 | 6/2010 | Lorenz et al. | |
| 7,731,098 B2 | 6/2010 | Butler et al. | |
| 7,740,184 B2 | 6/2010 | Schnell et al. | |
| 7,748,225 B2 | 7/2010 | Butler et al. | |
| 7,748,639 B2 | 7/2010 | Perry | |
| 7,748,640 B2 | 7/2010 | Roher et al. | |
| 7,755,220 B2 | 7/2010 | Sorg et al. | |
| 7,758,408 B2 | 7/2010 | Hagentoft | |
| 7,765,826 B2 | 8/2010 | Nichols | |
| 7,784,291 B2 | 8/2010 | Butler et al. | |
| 7,784,704 B2 | 8/2010 | Harter | |
| 7,788,936 B2 | 9/2010 | Peterson et al. | |
| 7,793,510 B2 | 9/2010 | Perry et al. | |
| 7,798,418 B1 | 9/2010 | Rudd | |
| 7,802,618 B2 | 9/2010 | Simon et al. | |
| 7,832,652 B2 | 11/2010 | Barton et al. | |
| 7,845,576 B2 | 12/2010 | Siddaramanna et al. | |
| 7,861,941 B2 | 1/2011 | Schultz et al. | |
| 7,867,646 B2 | 1/2011 | Rhodes | |
| 7,908,116 B2 | 3/2011 | Steinberg et al. | |
| 7,908,117 B2 | 3/2011 | Steinberg et al. | |

(56) References Cited

U.S. PATENT DOCUMENTS

| | | |
|---|---|---|
| 7,918,406 B2 | 4/2011 | Rosen |
| 7,938,336 B2 | 5/2011 | Rhodes et al. |
| 7,941,294 B2 | 5/2011 | Shahi et al. |
| 7,954,726 B2 | 6/2011 | Siddaramanna et al. |
| 7,963,454 B2 | 6/2011 | Sullivan et al. |
| 7,979,164 B2 | 7/2011 | Garozzo et al. |
| 8,010,237 B2 | 8/2011 | Cheung et al. |
| 8,032,254 B2 | 10/2011 | Amundson et al. |
| 8,082,065 B2 | 12/2011 | Imes et al. |
| 8,083,154 B2 | 12/2011 | Schultz et al. |
| 8,089,032 B2 | 1/2012 | Beland et al. |
| 8,091,794 B2 | 1/2012 | Siddaramanna et al. |
| 8,091,796 B2 | 1/2012 | Amundson et al. |
| 8,099,195 B2 | 1/2012 | Imes et al. |
| 8,100,746 B2 | 1/2012 | Heidel et al. |
| 8,108,076 B2 | 1/2012 | Imes et al. |
| 8,131,506 B2 | 3/2012 | Steinberg et al. |
| 8,141,373 B2 | 3/2012 | Peterson et al. |
| 8,141,791 B2 | 3/2012 | Rosen |
| 8,165,721 B2 | 4/2012 | Petit |
| 8,167,216 B2 | 5/2012 | Schultz et al. |
| 8,180,492 B2 | 5/2012 | Steinberg |
| 8,185,244 B2 | 5/2012 | Wolfson |
| 8,190,296 B2 | 5/2012 | Alhilo |
| 8,190,367 B2 | 5/2012 | Bassa |
| 8,195,313 B1 | 6/2012 | Fadell et al. |
| 8,196,185 B2 | 6/2012 | Geadelmann et al. |
| 8,209,059 B2 | 6/2012 | Stockton |
| 8,214,085 B2 | 7/2012 | Boudreau et al. |
| 8,219,249 B2 | 7/2012 | Harrod et al. |
| 8,239,066 B2 | 8/2012 | Jennings et al. |
| 8,276,829 B2 | 10/2012 | Stoner et al. |
| 8,280,536 B1 | 10/2012 | Fadell et al. |
| 8,289,182 B2 | 10/2012 | Vogel et al. |
| 8,289,226 B2 | 10/2012 | Takach et al. |
| 8,299,919 B2 | 10/2012 | Dayton et al. |
| 8,321,058 B2 | 11/2012 | Zhou et al. |
| 8,346,396 B2 | 1/2013 | Amundson et al. |
| 8,387,891 B1 | 3/2013 | Simon et al. |
| 8,393,550 B2 | 3/2013 | Simon et al. |
| 8,412,488 B2 | 4/2013 | Steinberg et al. |
| 8,429,566 B2 | 4/2013 | Koushik et al. |
| 8,463,344 B2 | 6/2013 | Williams |
| 8,473,109 B1 | 6/2013 | Imes et al. |
| 8,476,964 B1 | 7/2013 | Atri |
| 8,489,243 B2 | 7/2013 | Fadell et al. |
| 8,504,180 B2 | 8/2013 | Imes et al. |
| 8,510,255 B2 | 8/2013 | Fadell et al. |
| 8,511,576 B2 | 8/2013 | Warren et al. |
| 8,511,577 B2 | 8/2013 | Warren et al. |
| 8,511,578 B2 | 8/2013 | Has |
| 8,517,088 B2 | 8/2013 | Moore et al. |
| 8,523,083 B2 | 9/2013 | Warren et al. |
| 8,523,084 B2 | 9/2013 | Siddaramanna et al. |
| 8,523,803 B1 | 9/2013 | Favreau |
| 8,527,096 B2 | 9/2013 | Pavlak et al. |
| 8,532,827 B2 | 9/2013 | Stefanski et al. |
| 8,543,244 B2 | 9/2013 | Keeling et al. |
| 8,544,285 B2 | 10/2013 | Stefanski et al. |
| 8,549,658 B2 | 10/2013 | Kolavennu et al. |
| 8,550,368 B2 | 10/2013 | Butler et al. |
| 8,554,374 B2 | 10/2013 | Lunacek et al. |
| 8,555,662 B2 | 10/2013 | Peterson et al. |
| 8,558,179 B2 | 10/2013 | Filson et al. |
| 8,560,127 B2 | 10/2013 | Leen et al. |
| 8,560,128 B2 | 10/2013 | Ruff et al. |
| 8,571,518 B2 | 10/2013 | Imes et al. |
| 8,596,550 B2 | 12/2013 | Steinberg et al. |
| 8,600,564 B2 | 12/2013 | Imes et al. |
| 8,606,409 B2 | 12/2013 | Amundson et al. |
| 8,613,792 B2 | 12/2013 | Ragland et al. |
| 8,622,314 B2 | 1/2014 | Fisher et al. |
| 8,626,344 B2 | 1/2014 | Imes et al. |
| 8,630,741 B1 | 1/2014 | Matsuoka et al. |
| 8,630,742 B1 | 1/2014 | Stefanski et al. |
| 8,640,970 B2 | 2/2014 | Dorendorf |
| 8,644,009 B2 | 2/2014 | Rylski et al. |
| 8,659,302 B1 | 2/2014 | Warren et al. |
| 8,671,702 B1 | 3/2014 | Shotey et al. |
| 8,689,572 B2 | 4/2014 | Evans et al. |
| 8,694,164 B2 | 4/2014 | Grohman et al. |
| 8,695,887 B2 | 4/2014 | Helt et al. |
| 8,706,270 B2 | 4/2014 | Fadell et al. |
| 8,708,242 B2 | 4/2014 | Conner et al. |
| 8,712,590 B2 | 4/2014 | Steinberg |
| 8,718,826 B2 | 5/2014 | Ramachandran et al. |
| 8,727,611 B2 | 5/2014 | Huppi et al. |
| 8,738,327 B2 | 5/2014 | Steinberg et al. |
| 8,746,583 B2 | 6/2014 | Simon et al. |
| 8,752,771 B2 | 6/2014 | Warren et al. |
| 8,754,780 B2 | 6/2014 | Petite et al. |
| 8,757,507 B2 | 6/2014 | Fadell et al. |
| 8,766,194 B2 | 7/2014 | Filson et al. |
| 8,768,521 B2 | 7/2014 | Amundson et al. |
| 8,770,490 B2 | 7/2014 | Drew |
| 8,770,491 B2 | 7/2014 | Warren et al. |
| 8,788,103 B2 | 7/2014 | Warren et al. |
| 8,802,981 B2 | 8/2014 | Wallaert et al. |
| 8,838,282 B1 | 9/2014 | Ratliff et al. |
| 8,843,239 B2 | 9/2014 | Mighdoll et al. |
| 8,855,830 B2 | 10/2014 | Imes et al. |
| 8,868,219 B2 | 10/2014 | Fadell et al. |
| 8,870,086 B2 | 10/2014 | Tessier et al. |
| 8,870,087 B2 | 10/2014 | Pienta et al. |
| 8,874,497 B2 | 10/2014 | Raestik et al. |
| 8,880,047 B2 | 11/2014 | Konicek et al. |
| 8,893,032 B2 | 11/2014 | Bruck et al. |
| 8,903,552 B2 | 12/2014 | Amundson et al. |
| 8,918,219 B2 | 12/2014 | Sloo et al. |
| 8,924,026 B2 | 12/2014 | Federspiel et al. |
| 8,939,827 B2 | 1/2015 | Boudreau et al. |
| 8,942,853 B2 | 1/2015 | Stefanski et al. |
| 8,944,338 B2 | 2/2015 | Warren et al. |
| 8,950,686 B2 | 2/2015 | Matsuoka et al. |
| 8,950,687 B2 | 2/2015 | Bergman et al. |
| 8,961,005 B2 | 2/2015 | Huppi et al. |
| 8,978,994 B2 | 3/2015 | Moore et al. |
| 8,998,102 B2 | 4/2015 | Fadell et al. |
| 9,014,686 B2 | 4/2015 | Ramachandran et al. |
| 9,014,860 B2 | 4/2015 | Moore et al. |
| 9,026,232 B2 | 5/2015 | Fadell et al. |
| 9,033,255 B2 | 5/2015 | Tessier et al. |
| RE45,574 E | 6/2015 | Harter |
| 9,056,539 B2 | 6/2015 | Mirza et al. |
| 9,074,784 B2 | 7/2015 | Sullivan et al. |
| 9,075,419 B2 | 7/2015 | Sloo et al. |
| 9,080,782 B1 | 7/2015 | Sheikh |
| 9,080,784 B2 | 7/2015 | Dean-Hendricks et al. |
| 9,081,393 B2 | 7/2015 | Lunacek et al. |
| 9,086,703 B2 | 7/2015 | Warren et al. |
| 9,088,306 B1 | 7/2015 | Ramachandran et al. |
| 9,092,039 B2 | 7/2015 | Fadell et al. |
| 9,098,279 B2 | 8/2015 | Mucignat et al. |
| 9,116,529 B2 | 8/2015 | Warren et al. |
| 9,121,623 B2 | 9/2015 | Filson et al. |
| 9,122,283 B2 | 9/2015 | Rylski et al. |
| 9,125,049 B2 | 9/2015 | Huang et al. |
| 9,127,853 B2 | 9/2015 | Filson et al. |
| 9,134,710 B2 | 9/2015 | Cheung et al. |
| 9,134,715 B2 | 9/2015 | Geadelmann et al. |
| 9,146,041 B2 | 9/2015 | Novotny et al. |
| 9,151,510 B2 | 10/2015 | Leen |
| 9,154,001 B2 | 10/2015 | Dharwada et al. |
| 9,157,764 B2 | 10/2015 | Shetty et al. |
| 9,164,524 B2 | 10/2015 | Imes et al. |
| 9,175,868 B2 | 11/2015 | Fadell et al. |
| 9,175,871 B2 | 11/2015 | Gourlay et al. |
| 9,182,141 B2 | 11/2015 | Sullivan et al. |
| 9,189,751 B2 | 11/2015 | Matsuoka et al. |
| 9,191,277 B2 | 11/2015 | Rezvani et al. |
| 9,191,909 B2 | 11/2015 | Rezvani et al. |
| 9,194,597 B2 | 11/2015 | Steinberg et al. |
| 9,194,598 B2 | 11/2015 | Fadell et al. |
| 9,194,600 B2 | 11/2015 | Kates |

(56) References Cited

U.S. PATENT DOCUMENTS

| | | |
|---|---|---|
| 9,207,817 B2 | 12/2015 | Tu |
| 9,213,342 B2 | 12/2015 | Drake et al. |
| 9,215,281 B2 | 12/2015 | Iggulden et al. |
| 9,222,693 B2 | 12/2015 | Gourlay et al. |
| 9,223,323 B2 | 12/2015 | Matas et al. |
| 9,234,669 B2 | 1/2016 | Filson et al. |
| 9,244,445 B2 | 1/2016 | Finch et al. |
| 9,244,470 B2 | 1/2016 | Steinberg |
| 9,261,287 B2 | 2/2016 | Warren et al. |
| 9,268,344 B2 | 2/2016 | Warren et al. |
| 9,279,595 B2 | 3/2016 | Mighdoll et al. |
| 9,282,590 B2 | 3/2016 | Donlan |
| 9,285,134 B2 | 3/2016 | Bray et al. |
| 9,286,781 B2 | 3/2016 | Filson et al. |
| 9,291,358 B2 | 3/2016 | Federspiel et al. |
| 9,291,359 B2 | 3/2016 | Fadell et al. |
| 9,292,022 B2 | 3/2016 | Ramachandran et al. |
| 9,298,196 B2 | 3/2016 | Matsuoka et al. |
| 9,298,197 B2 | 3/2016 | Matsuoka et al. |
| 9,332,322 B2 | 5/2016 | Niemeyer et al. |
| D763,707 S | 8/2016 | Sinha et al. |
| 9,471,069 B2 | 10/2016 | Amundson et al. |
| 9,494,337 B2 | 11/2016 | Ragg |
| 9,506,665 B2 | 11/2016 | Dorendorf et al. |
| 9,506,668 B2 | 11/2016 | Sinur et al. |
| 9,594,384 B2 | 3/2017 | Bergman et al. |
| 9,618,224 B2 | 4/2017 | Emmons et al. |
| 9,638,429 B2 | 5/2017 | O'Hayer |
| 9,671,125 B2 | 6/2017 | Mowris et al. |
| 9,677,772 B2 | 6/2017 | Siegel et al. |
| 9,683,753 B2 | 6/2017 | Lorenz et al. |
| 9,684,317 B2 | 6/2017 | Fadell et al. |
| 9,696,052 B2 | 7/2017 | Malchiondo et al. |
| 9,810,441 B2 | 11/2017 | Dean-Hendricks et al. |
| 2001/0015281 A1 | 8/2001 | Schiedegger et al. |
| 2003/0034897 A1 | 2/2003 | Shamoon et al. |
| 2003/0034898 A1 | 2/2003 | Shamoon et al. |
| 2003/0177012 A1 | 9/2003 | Drennan |
| 2004/0041564 A1 | 3/2004 | Brown |
| 2004/0074978 A1 | 4/2004 | Rosen |
| 2004/0262410 A1 | 12/2004 | Hull |
| 2005/0040943 A1 | 2/2005 | Winick |
| 2005/0083168 A1 | 4/2005 | Breitenbach |
| 2005/0194456 A1 | 9/2005 | Tessier et al. |
| 2005/0195757 A1 | 9/2005 | Kidder et al. |
| 2005/0224069 A1 | 10/2005 | Patil et al. |
| 2005/0270151 A1 | 12/2005 | Winick |
| 2006/0004492 A1 | 1/2006 | Terlson et al. |
| 2006/0038025 A1 | 2/2006 | Lee |
| 2006/0113398 A1 | 6/2006 | Ashworth |
| 2006/0192022 A1 | 8/2006 | Barton et al. |
| 2006/0213000 A1 | 9/2006 | Kimble et al. |
| 2006/0260334 A1 | 11/2006 | Carey et al. |
| 2006/0265489 A1 | 11/2006 | Moore |
| 2007/0045431 A1 | 3/2007 | Chapman et al. |
| 2007/0045441 A1 | 3/2007 | Ashworth et al. |
| 2007/0050732 A1 | 3/2007 | Chapman et al. |
| 2007/0057079 A1 | 3/2007 | Stark et al. |
| 2007/0062513 A1 | 3/2007 | Gagas |
| 2007/0114295 A1 | 5/2007 | Jenkins |
| 2007/0198099 A9 | 8/2007 | Shah |
| 2007/0221741 A1 | 9/2007 | Wagner et al. |
| 2007/0228182 A1 | 10/2007 | Wagner et al. |
| 2007/0228183 A1 | 10/2007 | Kennedy et al. |
| 2007/0241203 A1 | 10/2007 | Wagner et al. |
| 2007/0244576 A1 | 10/2007 | Potucek et al. |
| 2007/0264927 A1 | 11/2007 | Choi et al. |
| 2007/0294002 A1* | 12/2007 | Underdal ............... G07C 5/08 701/29.1 |
| 2008/0011863 A1 | 1/2008 | Roux et al. |
| 2008/0048046 A1 | 2/2008 | Wagner et al. |
| 2008/0054084 A1 | 3/2008 | Olson |
| 2008/0099568 A1 | 5/2008 | Nicodem et al. |
| 2008/0102744 A1 | 5/2008 | Moore et al. |
| 2008/0120446 A1 | 5/2008 | Butler et al. |
| 2008/0161978 A1 | 7/2008 | Shah |
| 2008/0216495 A1 | 9/2008 | Kates |
| 2008/0223051 A1 | 9/2008 | Kates |
| 2008/0290183 A1 | 11/2008 | Laberge et al. |
| 2008/0294274 A1 | 11/2008 | Laberge et al. |
| 2008/0295030 A1 | 11/2008 | Laberge et al. |
| 2009/0001179 A1 | 1/2009 | Dempsey |
| 2009/0140065 A1 | 6/2009 | Juntunen et al. |
| 2009/0143880 A1 | 6/2009 | Amundson et al. |
| 2009/0143918 A1 | 6/2009 | Amundson et al. |
| 2009/0251422 A1 | 10/2009 | Wu et al. |
| 2009/0276096 A1 | 11/2009 | Proffitt et al. |
| 2010/0070089 A1 | 3/2010 | Harrod et al. |
| 2010/0070092 A1 | 3/2010 | Winter et al. |
| 2010/0084482 A1 | 4/2010 | Kennedy et al. |
| 2010/0107076 A1* | 4/2010 | Grohman ............... F24F 11/30 715/709 |
| 2010/0131884 A1 | 5/2010 | Shah |
| 2010/0163633 A1 | 7/2010 | Barrett et al. |
| 2010/0163635 A1 | 7/2010 | Ye |
| 2010/0171889 A1 | 7/2010 | Pantel et al. |
| 2010/0182743 A1 | 7/2010 | Roher |
| 2010/0204834 A1 | 8/2010 | Comerford et al. |
| 2010/0212879 A1 | 8/2010 | Schnell et al. |
| 2011/0006887 A1 | 1/2011 | Shaull et al. |
| 2011/0007017 A1 | 1/2011 | Wallaert |
| 2011/0010652 A1 | 1/2011 | Wallaert |
| 2011/0010653 A1 | 1/2011 | Wallaert et al. |
| 2011/0067851 A1 | 3/2011 | Terlson et al. |
| 2011/0088416 A1 | 4/2011 | Koethler |
| 2011/0132991 A1 | 6/2011 | Moody et al. |
| 2011/0181412 A1 | 7/2011 | Alexander et al. |
| 2011/0223850 A1 | 9/2011 | Narayanamurthy et al. |
| 2011/0264279 A1 | 10/2011 | Poth |
| 2012/0001873 A1 | 1/2012 | Wu et al. |
| 2012/0007555 A1 | 1/2012 | Bukow |
| 2012/0023428 A1 | 1/2012 | Kennard et al. |
| 2012/0048955 A1 | 3/2012 | Lin et al. |
| 2012/0061480 A1 | 3/2012 | Deligiannis et al. |
| 2012/0093141 A1 | 4/2012 | Imes et al. |
| 2012/0095601 A1 | 4/2012 | Abraham et al. |
| 2012/0101637 A1 | 4/2012 | Imes et al. |
| 2012/0126020 A1 | 5/2012 | Filson et al. |
| 2012/0126021 A1* | 5/2012 | Warren ................. G05D 23/19 236/1 C |
| 2012/0130547 A1 | 5/2012 | Fadell et al. |
| 2012/0130679 A1* | 5/2012 | Fadell ............... G05D 23/1917 702/183 |
| 2012/0131504 A1 | 5/2012 | Fadell et al. |
| 2012/0165993 A1 | 6/2012 | Whitehouse |
| 2012/0181010 A1 | 7/2012 | Schultz et al. |
| 2012/0190294 A1 | 7/2012 | Heidel et al. |
| 2012/0191257 A1 | 7/2012 | Corcoran et al. |
| 2012/0193437 A1 | 8/2012 | Henry et al. |
| 2012/0229521 A1 | 9/2012 | Hales et al. |
| 2012/0230661 A1 | 9/2012 | Alhilo |
| 2012/0239207 A1 | 9/2012 | Fadell et al. |
| 2012/0245740 A1 | 9/2012 | Raestik et al. |
| 2012/0252345 A1 | 10/2012 | Wolfson |
| 2012/0298763 A1 | 11/2012 | Young |
| 2012/0303828 A1 | 11/2012 | Young et al. |
| 2012/0310418 A1 | 12/2012 | Harrod et al. |
| 2013/0002447 A1 | 1/2013 | Vogel et al. |
| 2013/0040550 A1 | 2/2013 | Pfister et al. |
| 2013/0054758 A1 | 2/2013 | Imes et al. |
| 2013/0057381 A1 | 3/2013 | Kandhasamy |
| 2013/0060385 A1* | 3/2013 | Leen ..................... F24F 11/30 700/276 |
| 2013/0090767 A1 | 4/2013 | Bruck et al. |
| 2013/0099008 A1 | 4/2013 | Aljabari et al. |
| 2013/0099009 A1 | 4/2013 | Filson et al. |
| 2013/0099010 A1 | 4/2013 | Filson et al. |
| 2013/0123991 A1 | 5/2013 | Richmond |
| 2013/0138250 A1 | 5/2013 | Mowery et al. |
| 2013/0144443 A1 | 6/2013 | Casson et al. |
| 2013/0151016 A1 | 6/2013 | Bias et al. |
| 2013/0151018 A1 | 6/2013 | Bias et al. |
| 2013/0158716 A1* | 6/2013 | Barton ................... F24F 11/30 700/276 |

(56) References Cited

U.S. PATENT DOCUMENTS

| | | |
|---|---|---|
| 2013/0180700 A1 | 7/2013 | Aycock |
| 2013/0190932 A1 | 7/2013 | Schuman |
| 2013/0204408 A1 | 8/2013 | Thiruvengada et al. |
| 2013/0204440 A1* | 8/2013 | Fadell .................. G05B 15/02 700/276 |
| 2013/0204441 A1 | 8/2013 | Sloo et al. |
| 2013/0204442 A1 | 8/2013 | Modi et al. |
| 2013/0211600 A1 | 8/2013 | Dean-Hendricks et al. |
| 2013/0221117 A1 | 8/2013 | Warren et al. |
| 2013/0226352 A1 | 8/2013 | Dean-Hendricks et al. |
| 2013/0228633 A1 | 9/2013 | Toth et al. |
| 2013/0238142 A1 | 9/2013 | Nichols et al. |
| 2013/0245838 A1 | 9/2013 | Zywicki et al. |
| 2013/0261803 A1 | 10/2013 | Kolavennu |
| 2013/0261807 A1 | 10/2013 | Zywicki et al. |
| 2013/0268129 A1 | 10/2013 | Fadell et al. |
| 2013/0292481 A1 | 11/2013 | Filson et al. |
| 2013/0297078 A1 | 11/2013 | Kolavennu |
| 2013/0318217 A1 | 11/2013 | Imes et al. |
| 2013/0318444 A1 | 11/2013 | Imes et al. |
| 2013/0325190 A1 | 12/2013 | Imes et al. |
| 2013/0338837 A1 | 12/2013 | Hublou et al. |
| 2013/0338839 A1 | 12/2013 | Rogers et al. |
| 2013/0340993 A1 | 12/2013 | Siddaramanna et al. |
| 2013/0345882 A1 | 12/2013 | Dushane et al. |
| 2014/0000861 A1 | 1/2014 | Barrett et al. |
| 2014/0002461 A1 | 1/2014 | Wang |
| 2014/0031989 A1 | 1/2014 | Bergman et al. |
| 2014/0034284 A1 | 2/2014 | Butler et al. |
| 2014/0039692 A1 | 2/2014 | Leen et al. |
| 2014/0041846 A1 | 2/2014 | Leen et al. |
| 2014/0048608 A1 | 2/2014 | Frank |
| 2014/0052300 A1 | 2/2014 | Matsuoka et al. |
| 2014/0058806 A1 | 2/2014 | Guenette et al. |
| 2014/0081466 A1 | 3/2014 | Huapeng et al. |
| 2014/0099872 A1 | 4/2014 | Matsumoto et al. |
| 2014/0112331 A1 | 4/2014 | Rosen |
| 2014/0117103 A1 | 5/2014 | Rossi et al. |
| 2014/0118285 A1 | 5/2014 | Poplawski |
| 2014/0129034 A1 | 5/2014 | Stefanski et al. |
| 2014/0130574 A1 | 5/2014 | Happ et al. |
| 2014/0149270 A1 | 5/2014 | Lombard et al. |
| 2014/0151456 A1 | 6/2014 | McCurnin et al. |
| 2014/0152631 A1 | 6/2014 | Moore et al. |
| 2014/0156087 A1 | 6/2014 | Amundson |
| 2014/0158338 A1 | 6/2014 | Kates |
| 2014/0175181 A1 | 6/2014 | Warren et al. |
| 2014/0188287 A1 | 7/2014 | Sabata |
| 2014/0188288 A1 | 7/2014 | Fisher et al. |
| 2014/0191848 A1 | 7/2014 | Imes et al. |
| 2014/0202449 A1 | 7/2014 | Snyder |
| 2014/0207291 A1 | 7/2014 | Golden et al. |
| 2014/0207292 A1 | 7/2014 | Ramagem et al. |
| 2014/0214212 A1 | 7/2014 | Leen et al. |
| 2014/0216078 A1 | 8/2014 | Ladd |
| 2014/0217185 A1 | 8/2014 | Bicknell |
| 2014/0217186 A1 | 8/2014 | Kramer et al. |
| 2014/0228983 A1 | 8/2014 | Groskreutz et al. |
| 2014/0231530 A1 | 8/2014 | Warren et al. |
| 2014/0244047 A1 | 8/2014 | Oh et al. |
| 2014/0250399 A1 | 9/2014 | Gaherwar |
| 2014/0262196 A1 | 9/2014 | Frank et al. |
| 2014/0262484 A1 | 9/2014 | Khoury et al. |
| 2014/0263679 A1 | 9/2014 | Conner et al. |
| 2014/0267008 A1 | 9/2014 | Jain et al. |
| 2014/0277762 A1 | 9/2014 | Drew |
| 2014/0277769 A1 | 9/2014 | Matsuoka et al. |
| 2014/0277770 A1 | 9/2014 | Aljabari et al. |
| 2014/0299670 A1 | 10/2014 | Ramachandran et al. |
| 2014/0309792 A1 | 10/2014 | Drew |
| 2014/0312129 A1 | 10/2014 | Zikes et al. |
| 2014/0312131 A1 | 10/2014 | Tousignant et al. |
| 2014/0312694 A1 | 10/2014 | Tu et al. |
| 2014/0316585 A1 | 10/2014 | Boesveld et al. |
| 2014/0316586 A1 | 10/2014 | Boesveld et al. |
| 2014/0316587 A1 | 10/2014 | Imes et al. |
| 2014/0317029 A1 | 10/2014 | Matsuoka et al. |
| 2014/0319231 A1 | 10/2014 | Matsuoka et al. |
| 2014/0319236 A1 | 10/2014 | Novotny et al. |
| 2014/0321011 A1 | 10/2014 | Bisson et al. |
| 2014/0324232 A1 | 10/2014 | Modi et al. |
| 2014/0330435 A1 | 11/2014 | Stoner et al. |
| 2014/0346239 A1* | 11/2014 | Fadell ................ B01D 46/0086 236/51 |
| 2014/0358295 A1 | 12/2014 | Warren et al. |
| 2014/0367475 A1 | 12/2014 | Fadell et al. |
| 2014/0376530 A1 | 12/2014 | Erickson et al. |
| 2015/0001361 A1 | 1/2015 | Gagne et al. |
| 2015/0002165 A1 | 1/2015 | Juntunen et al. |
| 2015/0016443 A1 | 1/2015 | Erickson et al. |
| 2015/0025693 A1 | 1/2015 | Wu et al. |
| 2015/0032264 A1 | 1/2015 | Emmons et al. |
| 2015/0037992 A1 | 2/2015 | Perez, Jr. |
| 2015/0039137 A1 | 2/2015 | Perry et al. |
| 2015/0041551 A1 | 2/2015 | Tessier et al. |
| 2015/0043615 A1 | 2/2015 | Steinberg et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0058779 A1 | 2/2015 | Bruck et al. |
| 2015/0066215 A1 | 3/2015 | Buduri |
| 2015/0066216 A1 | 3/2015 | Ramachandran |
| 2015/0066220 A1 | 3/2015 | Sloo et al. |
| 2015/0081106 A1 | 3/2015 | Buduri |
| 2015/0081109 A1 | 3/2015 | Fadell et al. |
| 2015/0088272 A1 | 3/2015 | Drew |
| 2015/0088318 A1 | 3/2015 | Amundson et al. |
| 2015/0100166 A1 | 4/2015 | Baynes et al. |
| 2015/0100167 A1 | 4/2015 | Sloo et al. |
| 2015/0115045 A1 | 4/2015 | Tu et al. |
| 2015/0115046 A1 | 4/2015 | Warren et al. |
| 2015/0124853 A1 | 5/2015 | Huppi et al. |
| 2015/0127176 A1 | 5/2015 | Bergman et al. |
| 2015/0140994 A1 | 5/2015 | Partheesh et al. |
| 2015/0142180 A1 | 5/2015 | Matsuoka et al. |
| 2015/0144705 A1 | 5/2015 | Thiruvengada et al. |
| 2015/0144706 A1 | 5/2015 | Robideau et al. |
| 2015/0148963 A1 | 5/2015 | Klein et al. |
| 2015/0153057 A1 | 6/2015 | Matsuoka et al. |
| 2015/0153060 A1 | 6/2015 | Stefanski et al. |
| 2015/0156631 A1 | 6/2015 | Ramachandran |
| 2015/0159893 A1 | 6/2015 | Daubman et al. |
| 2015/0159895 A1 | 6/2015 | Quam et al. |
| 2015/0159899 A1 | 6/2015 | Bergman et al. |
| 2015/0159902 A1 | 6/2015 | Quam et al. |
| 2015/0159903 A1 | 6/2015 | Marak et al. |
| 2015/0159904 A1 | 6/2015 | Barton |
| 2015/0160691 A1 | 6/2015 | Kadah et al. |
| 2015/0163945 A1 | 6/2015 | Barton et al. |
| 2015/0167995 A1 | 6/2015 | Fadell et al. |
| 2015/0168002 A1 | 6/2015 | Plitkins et al. |
| 2015/0168003 A1 | 6/2015 | Stefanski et al. |
| 2015/0168933 A1 | 6/2015 | Klein et al. |
| 2015/0176854 A1 | 6/2015 | Butler et al. |
| 2015/0176855 A1 | 6/2015 | Geadelmann et al. |
| 2015/0198346 A1 | 7/2015 | Vedpathak |
| 2015/0198347 A1 | 7/2015 | Tessier et al. |
| 2015/0204558 A1 | 7/2015 | Sartain et al. |
| 2015/0204561 A1 | 7/2015 | Sadwick et al. |
| 2015/0204563 A1 | 7/2015 | Imes et al. |
| 2015/0204564 A1 | 7/2015 | Shah |
| 2015/0204565 A1 | 7/2015 | Amundson et al. |
| 2015/0204569 A1 | 7/2015 | Lorenz et al. |
| 2015/0204570 A1 | 7/2015 | Adamik et al. |
| 2015/0205310 A1 | 7/2015 | Amundson et al. |
| 2015/0219357 A1 | 8/2015 | Stefanski et al. |
| 2015/0233595 A1 | 8/2015 | Fadell et al. |
| 2015/0233596 A1 | 8/2015 | Warren et al. |
| 2015/0234369 A1 | 8/2015 | Wen et al. |
| 2015/0241078 A1 | 8/2015 | Matsuoka et al. |
| 2015/0249605 A1 | 9/2015 | Erickson et al. |
| 2015/0260424 A1 | 9/2015 | Fadell et al. |
| 2015/0267935 A1 | 9/2015 | Devenish et al. |
| 2015/0268652 A1 | 9/2015 | Lunacek et al. |

(56) References Cited

U.S. PATENT DOCUMENTS

| | | |
|---|---|---|
| 2015/0276237 A1 | 10/2015 | Daniels et al. |
| 2015/0276238 A1 | 10/2015 | Matsuoka et al. |
| 2015/0276239 A1 | 10/2015 | Fadell et al. |
| 2015/0276254 A1 | 10/2015 | Nemcek et al. |
| 2015/0276266 A1 | 10/2015 | Warren et al. |
| 2015/0277463 A1 | 10/2015 | Hazzard et al. |
| 2015/0280935 A1 | 10/2015 | Poplawski et al. |
| 2015/0292764 A1 | 10/2015 | Land et al. |
| 2015/0292765 A1 | 10/2015 | Matsuoka et al. |
| 2015/0293541 A1 | 10/2015 | Fadell et al. |
| 2015/0300672 A1 | 10/2015 | Fadell et al. |
| 2015/0312696 A1 | 10/2015 | Ribbich et al. |
| 2015/0316285 A1 | 11/2015 | Clifton et al. |
| 2015/0316286 A1 | 11/2015 | Roher |
| 2015/0316902 A1 | 11/2015 | Wenzel et al. |
| 2015/0323212 A1 | 11/2015 | Warren et al. |
| 2015/0327010 A1 | 11/2015 | Gottschalk et al. |
| 2015/0327084 A1 | 11/2015 | Ramachandran et al. |
| 2015/0327375 A1 | 11/2015 | Bick et al. |
| 2015/0330654 A1 | 11/2015 | Matsuoka |
| 2015/0330658 A1 | 11/2015 | Filson et al. |
| 2015/0330660 A1 | 11/2015 | Filson et al. |
| 2015/0332150 A1 | 11/2015 | Thompson |
| 2015/0345818 A1 | 12/2015 | Oh et al. |
| 2015/0345819 A1 | 12/2015 | Ostrovsky et al. |
| 2015/0348554 A1 | 12/2015 | Orr et al. |
| 2015/0354844 A1 | 12/2015 | Kates |
| 2015/0354846 A1 | 12/2015 | Hales et al. |
| 2015/0355371 A1 | 12/2015 | Ableitner et al. |
| 2015/0362208 A1 | 12/2015 | Novotny et al. |
| 2015/0362927 A1 | 12/2015 | Giorgi |
| 2015/0364135 A1 | 12/2015 | Kolavennu et al. |
| 2015/0369503 A1 | 12/2015 | Flaherty et al. |
| 2015/0369507 A1 | 12/2015 | Flaherty et al. |
| 2015/0370270 A1 | 12/2015 | Pan et al. |
| 2015/0370272 A1 | 12/2015 | Reddy et al. |
| 2015/0370615 A1 | 12/2015 | Pi-Sunyer |
| 2015/0370621 A1 | 12/2015 | Karp et al. |
| 2015/0372832 A1 | 12/2015 | Kortz et al. |
| 2015/0372834 A1 | 12/2015 | Karp et al. |
| 2015/0372999 A1 | 12/2015 | Pi-Sunyer |
| 2016/0006274 A1 | 1/2016 | Tu et al. |
| 2016/0006577 A1 | 1/2016 | Logan |
| 2016/0010880 A1 | 1/2016 | Bravard et al. |
| 2016/0018122 A1 | 1/2016 | Frank et al. |
| 2016/0018127 A1 | 1/2016 | Gourlay et al. |
| 2016/0020590 A1 | 1/2016 | Roosli et al. |
| 2016/0025366 A1 | 1/2016 | Snow et al. |
| 2016/0026194 A1 | 1/2016 | Mucignat et al. |
| 2016/0036227 A1 | 2/2016 | Schultz et al. |
| 2016/0040903 A1 | 2/2016 | Emmons et al. |
| 2016/0047569 A1 | 2/2016 | Fadell et al. |
| 2016/0054022 A1 | 2/2016 | Matas et al. |
| 2016/0061471 A1 | 3/2016 | Eicher et al. |
| 2016/0061474 A1 | 3/2016 | Cheung et al. |
| 2016/0069580 A1 | 3/2016 | Crisa' |
| 2016/0069582 A1 | 3/2016 | Buduri |
| 2016/0069583 A1 | 3/2016 | Fadell et al. |
| 2016/0077532 A1 | 3/2016 | Lagerstedt et al. |
| 2016/0088041 A1 | 3/2016 | Nichols |
| 2016/0116177 A1 | 4/2016 | Sikora et al. |
| 2016/0146769 A1 | 5/2016 | Zhang et al. |
| 2016/0178589 A1 | 6/2016 | Gulaguli et al. |
| 2016/0231014 A1 | 8/2016 | Ro et al. |
| 2016/0327298 A1 | 11/2016 | Sinha et al. |
| 2016/0327302 A1 | 11/2016 | Ribbich et al. |
| 2016/0327921 A1 | 11/2016 | Ribbich et al. |
| 2016/0377298 A1 | 12/2016 | Livchak et al. |
| 2016/0377306 A1 | 12/2016 | Drees et al. |
| 2017/0052545 A1 | 2/2017 | Cortez |
| 2017/0067239 A1 | 3/2017 | Dorendorf et al. |
| 2017/0130981 A1 | 5/2017 | Willette et al. |
| 2017/0136206 A1 | 5/2017 | Pillai et al. |
| 2017/0139386 A1 | 5/2017 | Pillai et al. |
| 2017/0159954 A1 | 6/2017 | Bergman et al. |
| 2017/0176030 A1 | 6/2017 | Emmons et al. |
| 2017/0176963 A1 | 6/2017 | Goli |

FOREIGN PATENT DOCUMENTS

| | | |
|---|---|---|
| CA | 2633121 C | 8/2011 |
| CA | 2818356 | 5/2012 |
| CA | 2818696 A1 | 5/2012 |
| CA | 2853041 | 4/2013 |
| CA | 2853081 A1 | 4/2013 |
| CA | 2812567 | 5/2014 |
| CA | 2886531 A1 | 9/2015 |
| CA | 2894359 A1 | 12/2015 |
| DE | 10 2004 005 962 | 8/2005 |
| EP | 2 283 279 A2 | 2/2011 |
| EP | 2 897 018 A1 | 7/2015 |
| EP | 2 988 188 A2 | 2/2016 |
| GB | 2 519 441 A | 4/2015 |
| WO | WO-95/28606 A1 | 10/1995 |
| WO | WO-00/22491 A1 | 4/2000 |
| WO | WO-2006/041599 A9 | 7/2006 |
| WO | WO-2009/006133 A1 | 1/2009 |
| WO | WO-2009/036764 A3 | 3/2009 |
| WO | WO-2009/058127 A1 | 5/2009 |
| WO | WO-2010/059143 A1 | 5/2010 |
| WO | WO-2010/078459 A1 | 7/2010 |
| WO | WO-2010/088663 A1 | 8/2010 |
| WO | WO-2017/031688 | 3/2012 |
| WO | WO-2012/042232 | 4/2012 |
| WO | WO-2012/047938 A2 | 4/2012 |
| WO | WO-2012/068436 A1 | 5/2012 |
| WO | WO-2012/068437 A3 | 5/2012 |
| WO | WO-2012/068459 A3 | 5/2012 |
| WO | WO-2012/068495 A1 | 5/2012 |
| WO | WO-2012/068503 A1 | 5/2012 |
| WO | WO-2012/068507 A3 | 5/2012 |
| WO | WO-2012/068517 A1 | 5/2012 |
| WO | WO-2012/068526 A1 | 5/2012 |
| WO | WO-2012/142477 A3 | 10/2012 |
| WO | WO-2013/033469 A1 | 3/2013 |
| WO | WO-2013/052389 A1 | 4/2013 |
| WO | WO-2013/052901 A3 | 4/2013 |
| WO | WO-2013/052905 A1 | 4/2013 |
| WO | WO-2013/058932 | 4/2013 |
| WO | WO-2013/058933 A1 | 4/2013 |
| WO | WO-2013/058934 | 4/2013 |
| WO | WO-2013/058968 A1 | 4/2013 |
| WO | WO-2013/058969 A1 | 4/2013 |
| WO | WO-2013/059684 A1 | 4/2013 |
| WO | WO-2013/153480 A3 | 10/2013 |
| WO | WO-2014/047501 A1 | 3/2014 |
| WO | WO-2014/051632 A1 | 4/2014 |
| WO | WO-2014/051635 A1 | 4/2014 |
| WO | WO-2014/055059 A1 | 4/2014 |
| WO | WO-2014/152301 A2 | 9/2014 |
| WO | WO-2014/152301 A3 | 9/2014 |
| WO | WO-2015/012449 A1 | 1/2015 |
| WO | WO-2015/039178 A1 | 3/2015 |
| WO | WO-2015/054272 A2 | 4/2015 |
| WO | WO-2015/057698 A1 | 4/2015 |
| WO | WO-2015/099721 A1 | 7/2015 |
| WO | WO-2015/127499 A1 | 9/2015 |
| WO | WO-2015/127566 A1 | 9/2015 |
| WO | WO-2015/134755 A3 | 9/2015 |
| WO | WO-2015/195772 A1 | 12/2015 |
| WO | WO-2016/038374 A1 | 3/2016 |

OTHER PUBLICATIONS

U.S. Appl. No. 15/146,649, filed May 4, 2016, Johnson Controls Technology Company.
U.S. Appl. No. 15/146,749, May 4, 2016, Johnson Controls Technology Company.
U.S. Appl. No. 15/247,777, filed Aug. 25, 2016, Johnson Controls Technology Company.
U.S. Appl. No. 15/247,784, filed Aug. 25, 2016, Johnson Controls Technology Company.

(56) References Cited

OTHER PUBLICATIONS

U.S. Appl. No. 15/247,788, filed Aug. 25, 2016, Johnson Controls Technology Company.
U.S. Appl. No. 15/247,793, filed Aug. 25, 2016, Johnson Controls Technology Company.
U.S. Appl. No. 15/247,844, filed Aug. 25, 2016, Johnson Controls Technology Company.
U.S. Appl. No. 15/247,869, filed Aug. 25, 2016, Johnson Controls Technology Company.
U.S. Appl. No. 15/247,872, filed Aug. 25, 2016, Johnson Controls Technology Company.
U.S. Appl. No. 15/247,873, filed Aug. 25, 2016, Johnson Controls Technology Company.
U.S. Appl. No. 15/247,875, filed Aug. 25, 2016, Johnson Controls Technology Company.
U.S. Appl. No. 15/247,879, filed Aug. 25, 2016, Johnson Controls Technology Company.
U.S. Appl. No. 15/247,880, filed Aug. 25, 2016, Johnson Controls Technology Company.
U.S. Appl. No. 15/247,883, filed Aug. 25, 2016, Johnson Controls Technology Company.
U.S. Appl. No. 15/247,885, filed Aug. 25, 2016, Johnson Controls Technology Company.
U.S. Appl. No. 15/247,886, filed Aug. 25, 2016, Johnson Controls Technology Company.
U.S. Appl. No. 15/338,215, filed Oct. 28, 2016, Johnson Controls Technology Company.
U.S. Appl. No. 15/338,221, filed Oct. 28, 2016, Johnson Controls Technology Company.
U.S. Appl. No. 29/548,334, filed Dec. 11, 2015, Johnson Controls Technology Company.
U.S. Appl. No. 29/563,447, filed May 4, 2016, Johnson Controls Technology Company.
U.S. Appl. No. 29/576,515, filed Sep. 2, 2016, Johnson Controls Technology Company.
U.S. Appl. No. 62/239,131, filed Oct. 8, 2015, Johnson Controls Technology Company.
U.S. Appl. No. 62/239,231, filed Oct. 8, 2015, Johnson Controls Technology Company.
U.S. Appl. No. 62/239,233, filed Oct. 8, 2015, Johnson Controls Technology Company.
U.S. Appl. No. 62/239,245, filed Oct. 8, 2015, Johnson Controls Technology Company.
U.S. Appl. No. 62/239,246, filed Oct. 8, 2015, Johnson Controls Technology Company.
U.S. Appl. No. 62/239,249, filed Oct. 8, 2015, Johnson Controls Technology Company.
International Search Report and Written Opinion for Application No. PCT/US2016/030291, dated Sep. 7, 2016, 11 pages.
International Search Report and Written Opinion for Application No. PCT/US2016/030827, dated Sep. 7, 2016, 13 pages.
International Search Report and Written Opinion for Application No. PCT/US2016/030829, dated Sep. 7, 2016, 15 pages.
International Search Report and Written Opinion for Application No. PCT/US2016/030835, dated Sep. 7, 2016, 13 pages.
International Search Report and Written Opinion for Application No. PCT/US2016/030836, dated Sep. 7, 2016, 11 pages.
International Search Report and Written Opinion for Application No. PCT/US2016/030837, dated Sep. 7, 2016, 13 pages.
International Search Report and Written Opinion on PCT/US2018/027324, dated Aug. 23, 2018, 6 pages.
Nest, How to Install and Set Up the Nest Learning Thermostat, https://www.youtube.com/watch?v=dHKD-9ul24l, retrieved on Mar. 29, 2017.
Nest, Installing the 3rd Generation Nest Learning Thermostat (Video), https://nest.com/support/article/Installing-the-3rd-generation-Nest-Learning-Thermostat-video, retrieved on Mar. 29, 2017.
Search Report for International Application No. PCT/US2018/024833, dated Aug. 31, 2018, 11 pages.
Unknown, National Semiconductor's Temperature Sensor Handbook, Nov. 1, 1997, retrieved from the Internet at http://shrubbery.net/~heas/willem/PDF/NSC/temphb.pdf on Aug. 11, 2016, pp. 1-40.

\* cited by examiner

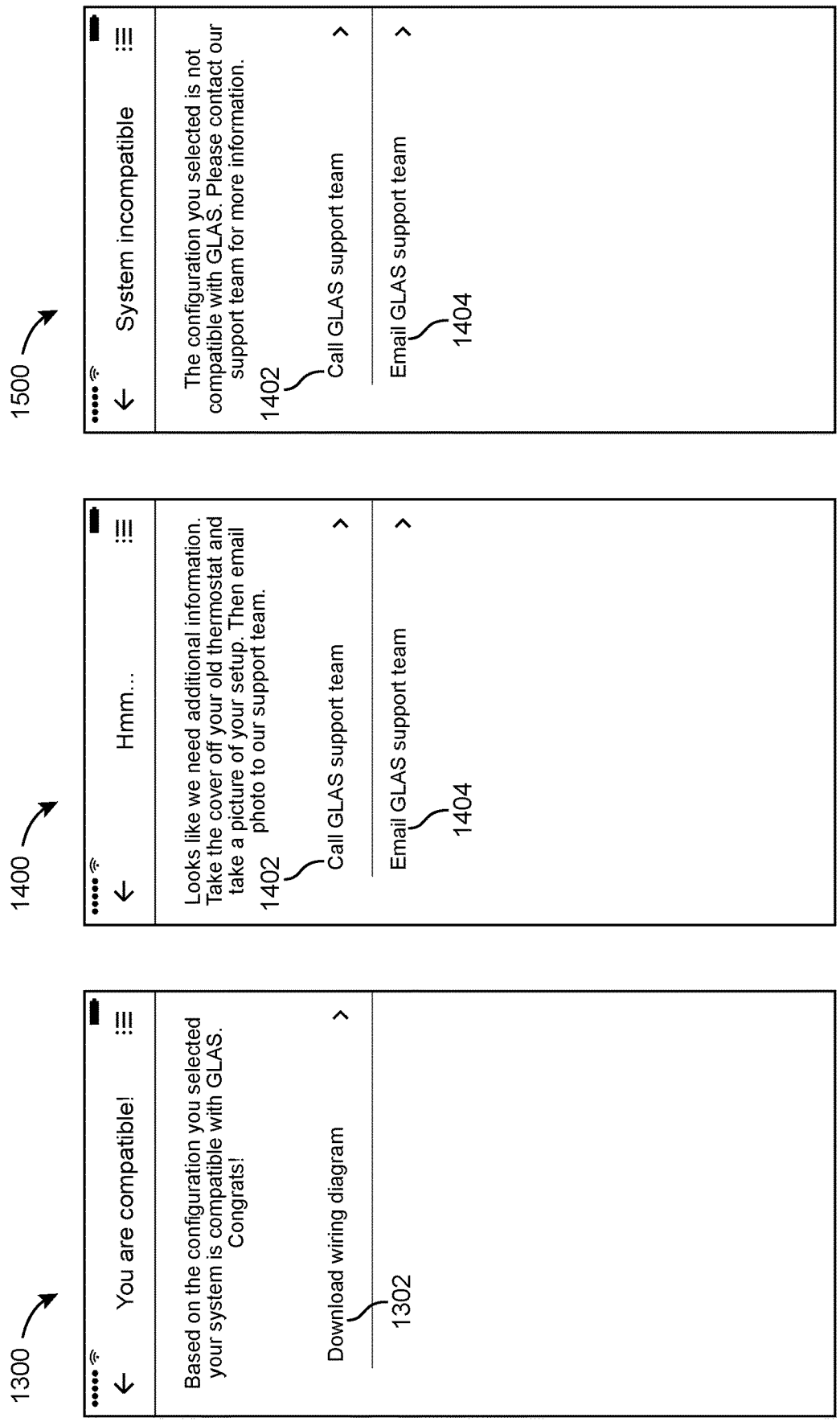

2600

← Select (aux) heating type  ⓘ

Natural gas

Electric

Propane

Oil

I don't know

[ Next ]

← Select (aux) heating method  ⓘ

Central

Baseboard

Radiator

[ Next ]

← AUX heating test

Is there hot air coming from your vent?
It may take a time for the air to become hot.

[ No ]   [ Yes ]

← Testing complete

| | |
|---|---|
| Fan test | PASSED |
| Cooling test | SKIPPED |
| Heating test | PASSED |

[ Next ]

FIG. 33M

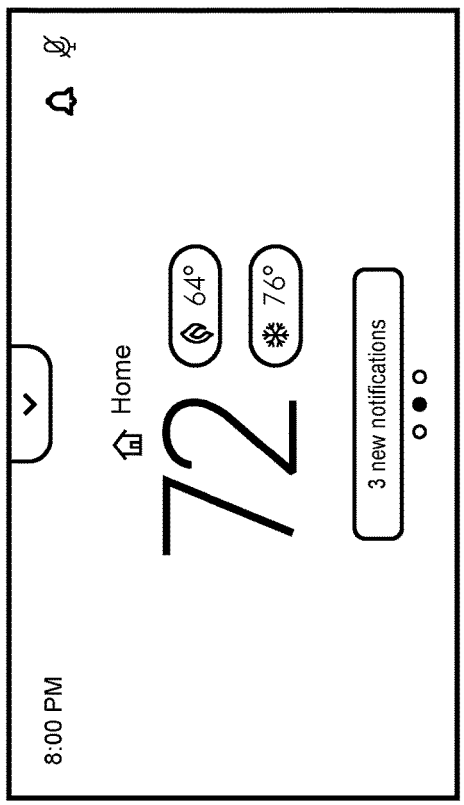
FIG. 34
FIG. 35
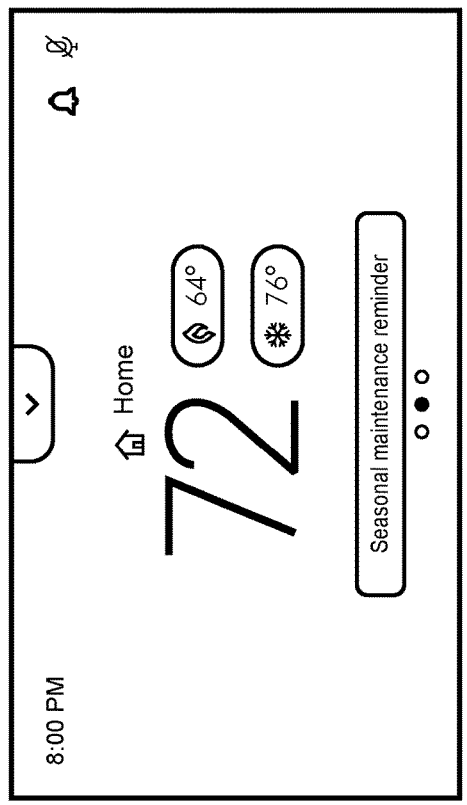
FIG. 36
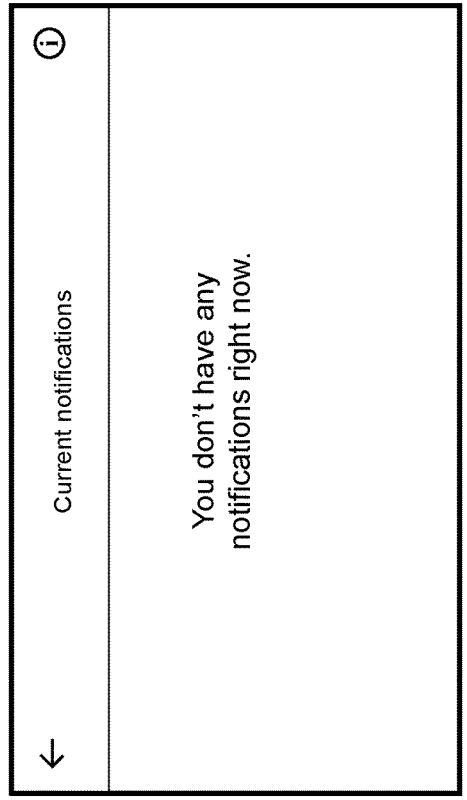
FIG. 37

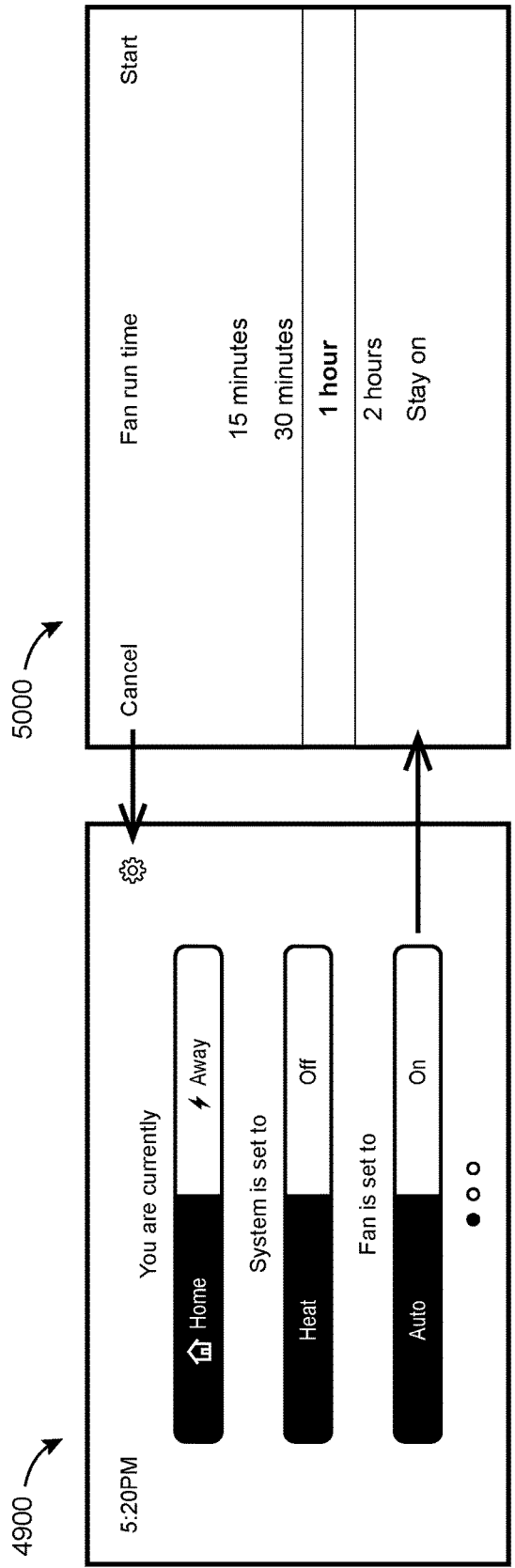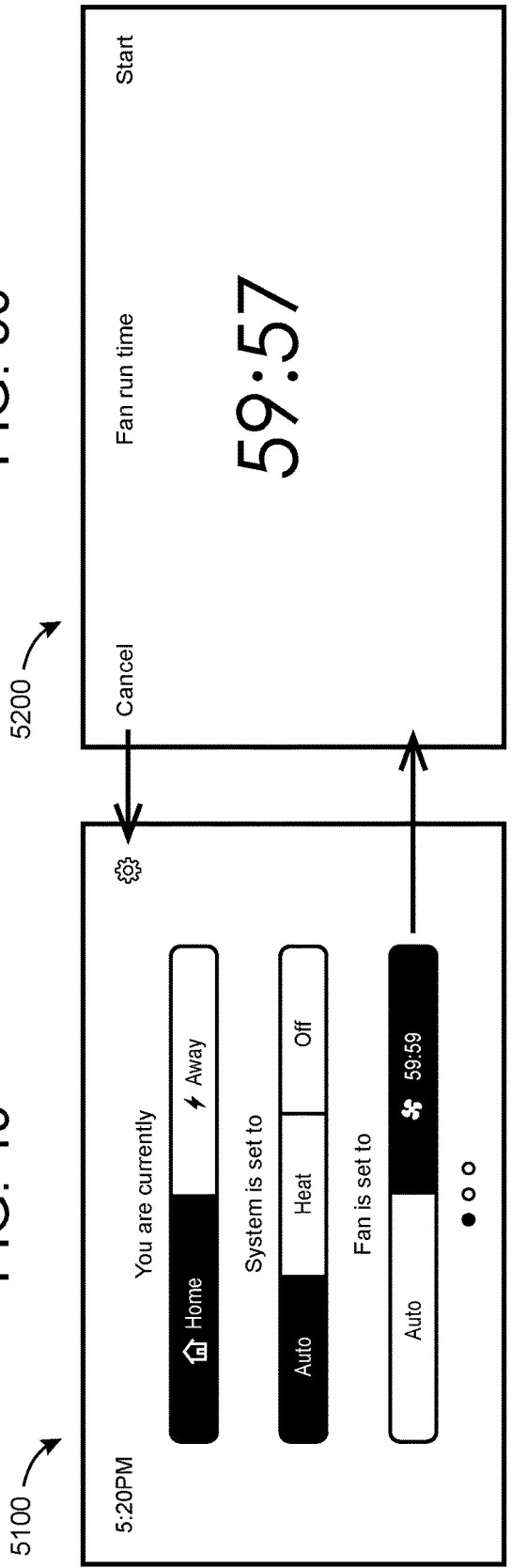

7300 ⬈

VOC, CO2, and Pollen Ranges

7400 ⬈

Humidity Range

\* Bubbles should float in visualitazion according to range above. If it hovers in the middle its normal. Hovers above or below it should be yellow.

| Cancel | | End time | | Done |
|---|---|---|---|---|
| | 4 | 45 | | |
| | 5 | 50 | | |
| | 6 | 55 | AM | |
| | 7 | 00 | PM | |
| | 8 | 05 | | |
| | 9 | 10 | | |
| | 10 | 15 | | |

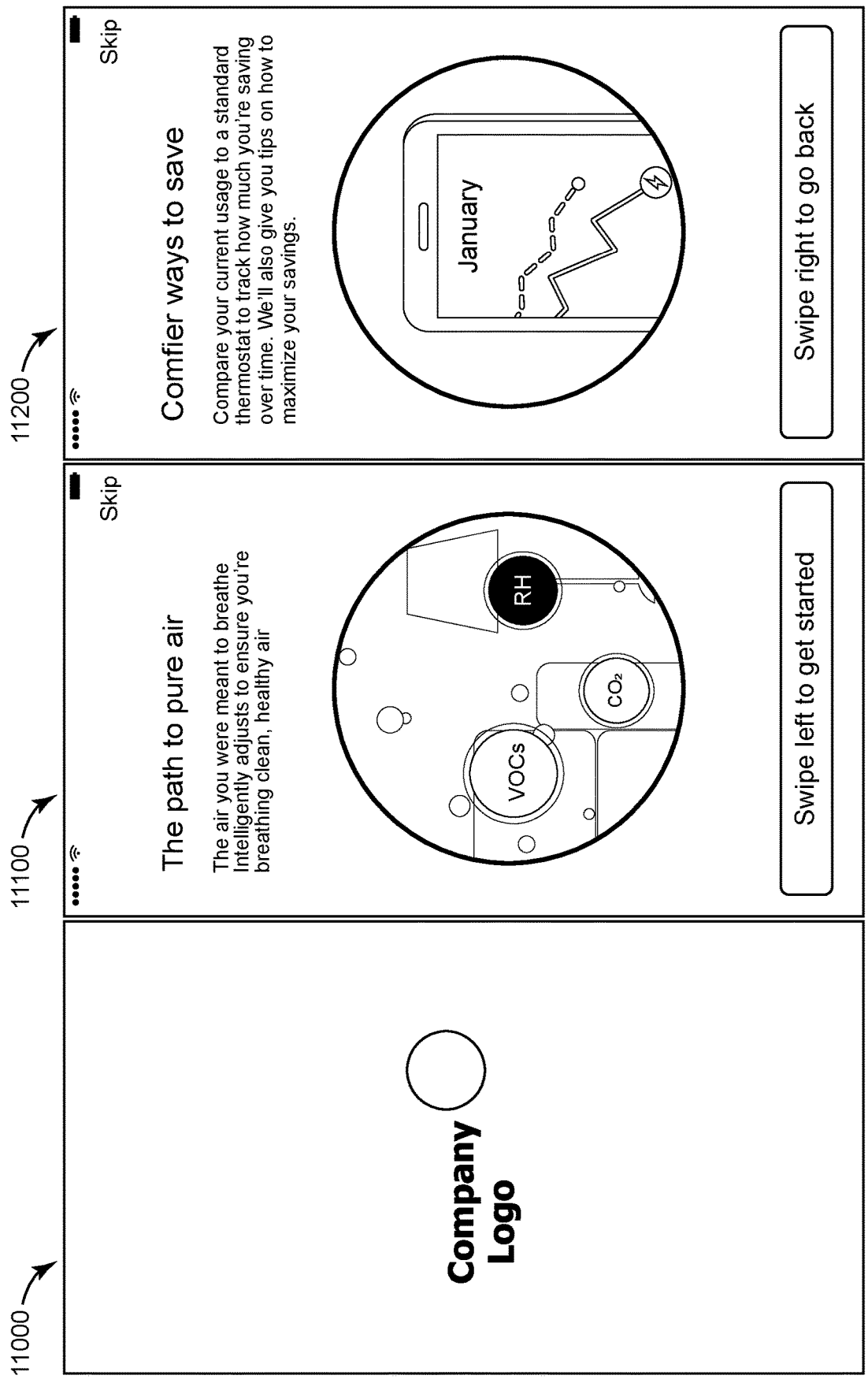

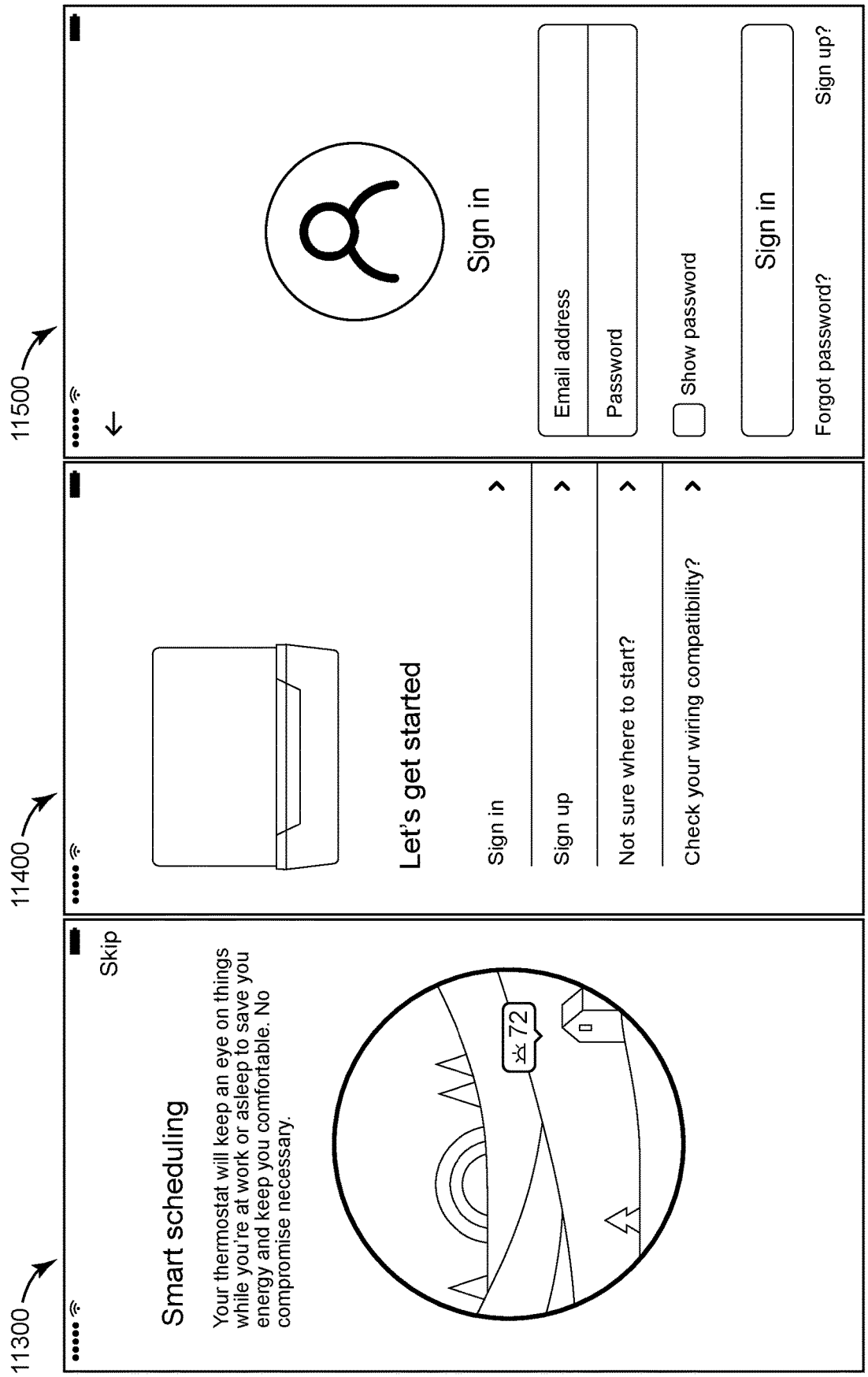

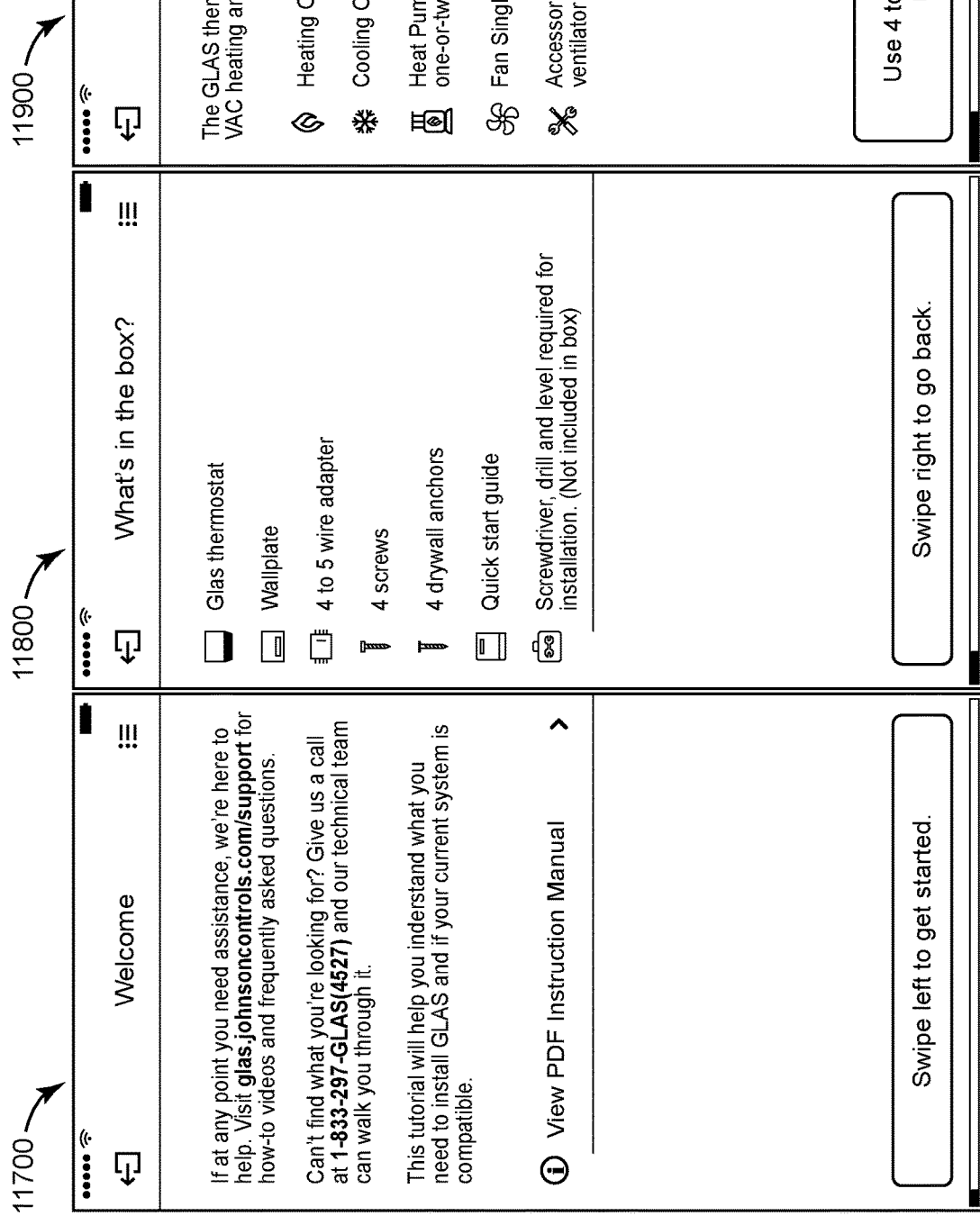

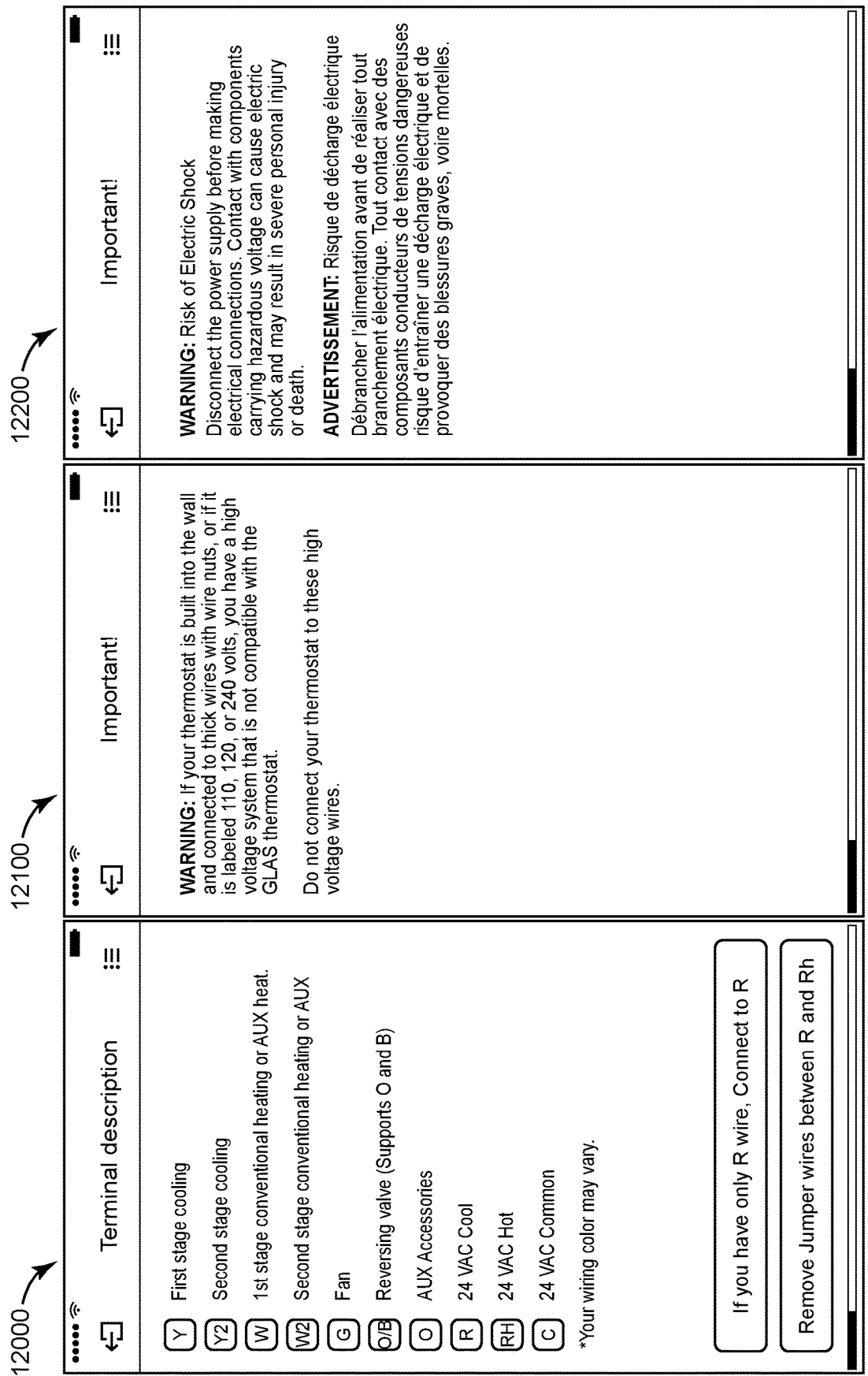

12600

← Connect 4 to 5 wire adapter

Note: If you have a C-wire, skip to step 8. If you do not have a C-wire to power your thermostat, use the included adapter to provide power.

Remove the cover of your HVAC equipment to access the control board.

In your HVAC equipment, disconnect any R,G,Y, or W wires that are currently connected to the control board.

[ I have a C-Wire ]

← Connect adapter

Connect the R,G,Y, or W wires to the corresponding terminal on the 4 to 5 wire adapter.

Connect the five included wires on the other side of the adapter to the open terminals on the control board.

Note: The adapter includes a magnet for easy mounting after installation.

← Disconnect old thermostat

Disconnect your old thermostat and remove the backplate.

Note: while disconnecting your old thermostat, use drywall - safe tape to secure the wires and keep them from falling back into the wall.

FIG. 128

12900 — Installing your GLAS

Remove the frontplate by pulling the top of the silver cover towards you.

Use a level to dry fit your GLAS and mark the wall where you plan to hang the thermostat then drill in the drywall anchors.

Pull all of the wires through the back of the thermostat.

FIG. 129

13000 — Attaching you GLAS

Loosely attach your GLAS to the wall using the included screws.

Use a level to straighten the thermostat and tighten the screws. Do not overtighten.

FIG. 130

13100 — Wiring the thermostat

Use the picture you took of your old wiring as a reference and connect the wires to terminals on your new GLAS. See pages 25-26 in the instruction mannual for wiring examples.

Note: If you have auxiliary devices, such as humidifier, dehumidifier, or ventilator, see pages 27-34 in the instruction manual for wiring examples.

You do not need to have a wire for every terminal.

Open picture gallery

FIG. 131

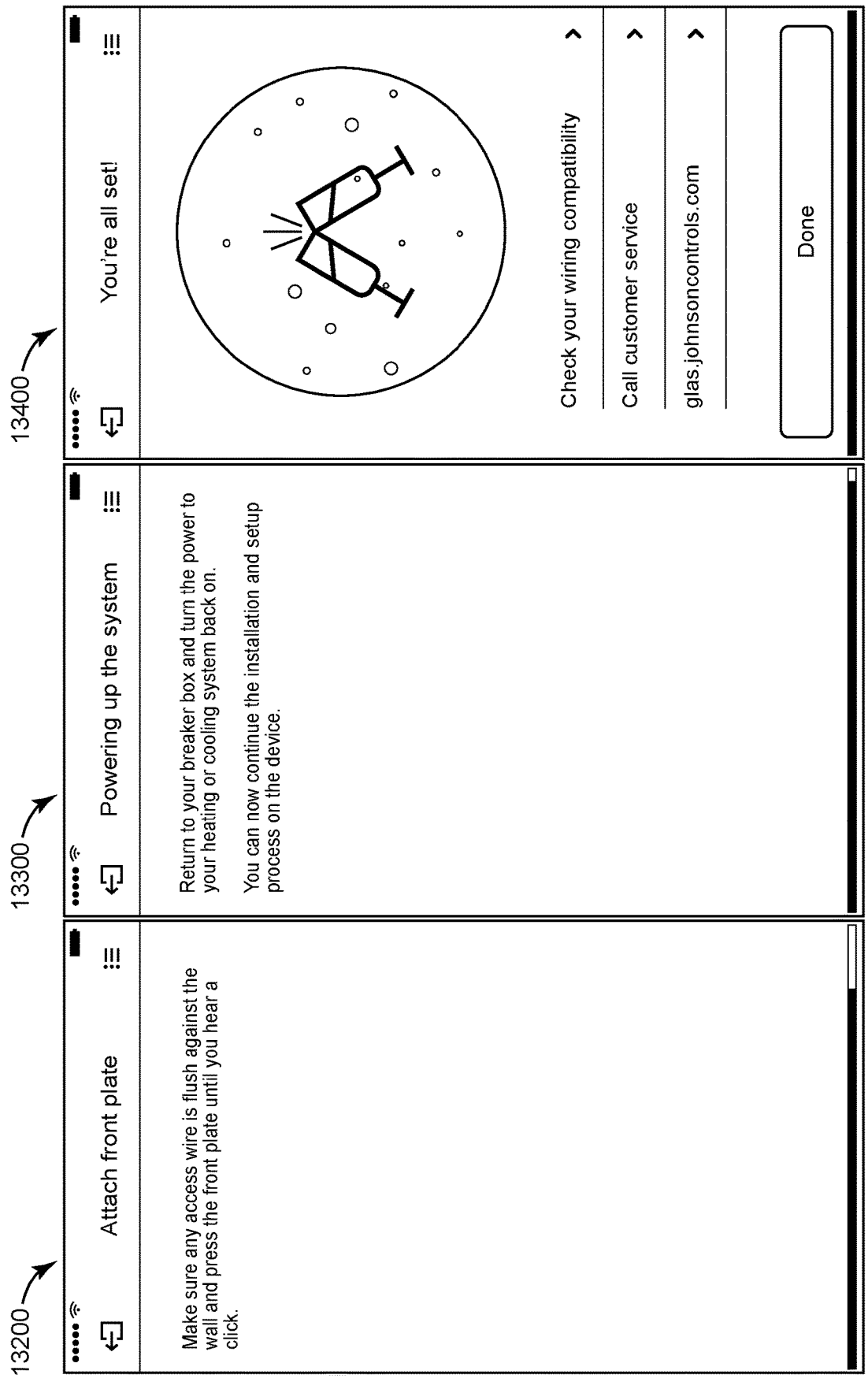

14500

| Cancel | New occupied event | Add |

M T W T F S S

| Start time | 10:00 AM > |
| End time | 7:00 PM > |

| Cancel | New custom event | Add |

M T W T F S S

| To | 10:00 AM > |
| From | 7:00 PM > |
| Heat to | ◊ 68° > |
| Cool to | ❄ 74° > |

FIG. 146

THERMOSTAT WITH USER INTERFACE FEATURES

CROSS-REFERENCE TO RELATED PATENT APPLICATION

This application claims the benefit of and priority to U.S. Provisional Patent Application No. 62/640,654 filed Mar. 9, 2018, the entirety of which is incorporated by reference herein.

BACKGROUND

The present disclosure relates generally to a thermostat of a building. More particularly, the present disclosure relates to systems and methods for user interaction with the thermostat via a user interface of the thermostat.

A thermostat can be configured to generate control decisions and operate, based on the control decisions, one or more pieces of building equipment to control an environmental condition of a building to a setpoint value. The thermostat can include a user interface by which a user interacts with the thermostat, i.e., receives information from the thermostat and controls the behavior of the thermostat by changing operational parameters of the thermostat. However, users of a thermostat are often not technicians and therefore, may have difficulty interacting with the thermostat since the information they receive from the thermostat may not be user friendly but more readily understood by a knowledgeable technician. Furthermore, many thermostats may not allow user intuitive control of parameters of the thermostat.

SUMMARY

One implementation of the present disclosure is a controller for a building, the controller including a user interface configured to present information to a user, an air quality sensor configured to sense indoor air quality conditions, a communications interface configured to communicate with a server system and receive outdoor air quality data from the server system, and a processing circuit. The processing circuit is configured to generate indoor air quality data based on the indoor air quality conditions sensed by the air quality sensor, receive, via the communications interface, the outdoor air quality data from the server system, and generate one or more interfaces indicating the indoor air quality conditions and outdoor air quality conditions based on the indoor air quality data and the outdoor air quality data and cause the user interface to display the one or more interfaces.

In some embodiments, the one or more interfaces include one or more bubble elements, wherein a position of each of the one or more bubble elements within the one or more interfaces is based on a value of at least one of the indoor air quality conditions or the outdoor air quality conditions.

In some embodiments, the indoor air quality data includes at least one of a value for indoor volatile organic compounds (VOCs) or a value for carbon diode ($CO_2$).

In some embodiments, the indoor air quality data further includes a value for relative humidity (RH).

In some embodiments, the one or more interfaces include an indoor air quality interface. In some embodiments, the processing circuit is configured to generate the indoor air quality interface based on the value of the VOCs, the value of the $CO_2$, and the value of the RH by generating an indication of the indoor air quality conditions based on the value of the VOCs, the value of the $CO_2$, and the value of the RH.

In some embodiments, the indication of the indoor air quality interface is a VOC bubble, a $CO_2$ bubble, and a RH bubble. In some embodiments, the processing circuit is configured to generate a VOC bubble vertical position of the VOC bubble based on the value of the VOC bubble, generate a $CO_2$ bubble vertical position of the $CO_2$ bubble based on the value of the VOC bubble, generate a RH bubble vertical position of the RH bubble based on the value of the VOC bubble, and cause the user interface to display the indoor air quality interface with the VOC bubble, the $CO_2$ bubble, and the RH bubble located in a particular location within the indoor air quality interface based on the VOC bubble vertical position, the $CO_2$ bubble vertical position, and the RH bubble vertical position.

In some embodiments, the processing circuit is configured to receive, via the user interface, an interaction with the VOC bubble, generate a VOC interface and cause the user interface to display the VOC interface in response to receiving the interaction with the VOC bubble, wherein the VOC interface indicates the value of the VOCs and indicates a plurality of VOC value ranges and a first air quality rating for each of the plurality of VOC value ranges, receive, via the user interface, an interaction with the $CO_2$ bubble, generate a $CO_2$ interface and cause the user interface to display the $CO_2$ interface in response to receiving the interaction with the $CO_2$ bubble, wherein the $CO_2$ interface indicates the value of the $CO_2$ and indicates a plurality of $CO_2$ value ranges and a second air quality rating for each of the plurality of $CO_2$ value ranges, receive, via the user interface, an interaction with the RH bubble, and generate a RH interface and cause the user interface to display the RH interface in response to receiving the interaction with the RH bubble, wherein the RH interface indicates the value of the RH and indicates a plurality of RH value ranges and third air quality rating for each of the plurality of RH value ranges.

In some embodiments, the outdoor air quality data includes one or more values for outdoor pollen, one or more values for outdoor pollution, and a value for outdoor ultraviolet (UV) conditions.

In some embodiments, the one or more values for the outdoor pollen comprises values for weed pollen, grass pollen, tree pollen, and mold pollen, wherein the one or more values for the outdoor pollution comprise a carbon monoxide (CO) value, an ozone ($O_3$) value, a nitrogen dioxide ($NO_2$) value, and a sulfur dioxide ($SO_2$) value.

In some embodiments, the one or more interfaces include an outdoor air quality interface comprising an indication of outdoor air quality. In some embodiments, the processing circuit is configured to generate the outdoor air quality interface based on the one or more values for the outdoor pollen, the one or more values for the outdoor pollution, and the value for outdoor ultraviolet (UV) conditions.

In some embodiments, the indication of the outdoor air quality interface is an outdoor pollen bubble for the outdoor pollen, an outdoor pollution bubble for the outdoor pollution, and an UV bubble for the UV conditions. In some embodiments, the processing circuit is configured to generate an outdoor pollen bubble vertical position of the outdoor pollen bubble based on the one or more values of the outdoor pollen, generate an outdoor pollution bubble vertical position of the outdoor pollution bubble based on the one or more values for the outdoor pollution, generate an UV bubble vertical position of the UV bubble based on the value of the UV conditions, and cause the user interface to display the outdoor air quality interface with the outdoor pollen bubble, the outdoor pollution bubble, and the UV bubble located in a particular location within the outdoor air quality interface based on the outdoor pollen bubble vertical position, the outdoor pollution bubble vertical position, and the UV bubble vertical position.

In some embodiments, the processing circuit is configured to receive, via the user interface, an interaction with the outdoor pollen bubble, generate an outdoor pollen interface and cause the user interface to display the outdoor pollen interface in response to receiving the interaction with the outdoor pollen bubble, wherein the outdoor pollen interface indicates the one or more values of the outdoor pollen, receive, via the user interface, an interaction with the outdoor pollution bubble, generate an outdoor pollution interface and cause the user interface to display the outdoor pollution interface in response to receiving the interaction with the outdoor pollution bubble, wherein the outdoor pollution interface indicates the one or more values of the outdoor pollution, receive, via the user interface, an interaction with the UV bubble, and generate a UV interface and cause the user interface to display the UV interface in response to receiving the interaction with the UV bubble, wherein the UV interface indicates the value of the UV and indicates a plurality of UV ranges and a rating for each of the UV ranges.

Another implementation of the present disclosure is a thermostat for a building, the thermostat including a user interface configured to present information to a user, an air quality sensor configured to sense indoor air quality conditions, and a processing circuit. The processing circuit is configured to generate indoor air quality data based on the indoor air quality conditions sensed by the air quality sensor, generate one or more interfaces indicating the indoor air quality conditions based on the indoor air quality data, wherein the one or more interfaces include one or more bubble elements, wherein a position of each of the one or more bubble elements within the one or more interfaces is based on a value of the indoor air quality conditions, and cause the user interface to display the one or more interfaces.

Another implementation of the present disclosure is a controller for controlling an environmental condition of a building. The controller includes a user interface configured to present information to a user and receive input from the user and a processing circuit. The processing circuit is configured to operate a plurality of system components to perform a plurality of system tests to determine whether the controller is installed correctly, receive, via the user interface, a plurality of indications of proper installation or improper installation from the user, wherein each of the plurality of system tests is associated with one of the plurality of indications, generate a system test summary page based on each of the plurality of indications, and cause the user interface to display the system test summary page.

In some embodiments, the controller further includes a plurality of wiring terminals and one or more detection circuits for the plurality of wiring terminals configured to determine whether a wire is connected to each of the plurality of wiring terminals. In some embodiments, the processing circuit is communicably coupled to the one or more detection circuits. In some embodiments, the processing circuit is configured to receive an indication of whether the wire is connected to each of the plurality of wiring terminals from the one or more detection circuits, generate a wiring user interface based on the indication of whether the wire is connected to each of the plurality of wiring terminals, wherein the wiring user interface comprises an indication of each of the plurality of wiring terminals and an indication of which of the plurality of wiring terminals the wire is connected to, and cause the user interface to display the wiring user interface.

In some embodiments, the processing circuit is configured to receive, via the user interface, a first terminal override command in response to the user taping a first indication of a first wiring terminal of the wiring user interface, update the wiring interface to display an indication that the wire is connected to the first wiring terminal based on the first terminal override command and in response to determining that the wire is not connected to the first wiring terminal, update the wiring interface to include an override indication indicating that the first wiring terminal has been overridden, and cause the user interface to display the updated wiring interface.

In some embodiments, the processing circuit is configured to receive, via the user interface, a first terminal override command in response to the user taping a first indication of a first wiring terminal of the wiring user interface, update the wiring interface to not display the indication that the wire is connected to the first wiring terminal based on the first terminal override command and in response to determining that the wire is connected to the first wiring terminal, update the wiring interface to comprise an override indication indicating that the first wiring terminal has been overridden, and cause the user interface to display the updated wiring interface.

In some embodiments, the processing circuit is configured to operate the plurality of system components to perform the plurality of different system tests to determine whether the controller is installed correctly by causing a fan to run in response to determining that the wire is connected to a fan terminal. In some embodiments, the processing circuit is configured to generate a fan operation interface comprising a question regarding whether the fan is circulating air and cause the user interface to display the fan operation interface. In some embodiments, receiving, via the user interface, the plurality of indications of proper installation or improper installation from the user comprises receiving, via the fan operation interface, an indication regarding whether the fan is circulating air.

In some embodiments, the plurality of system tests comprises a heating test, wherein the processing circuit is configured to perform the heating test by causing a heat pump to heat the building in response to determining that wires for the heat pump are connected to the plurality of wiring terminals, generating a heating test question interface comprising a question regarding whether hot air is exiting a vent of the building and causing the user interface to display the heating test question, receiving, via the user interface, an indication regarding whether the hot air is exiting the vent of the building, generating a reversing valve polarity question in response to receiving the indication indicating the hot air is not exiting the vent of the building, wherein the reversing valve polarity question asks the user whether cold air is exiting the vent of the building and causing the user interface to display the reversing valve polarity question, switching a polarity of a reversing valve command in response to receiving, via the user interface, an indication that cold is exiting the vent of the building, and performing the heating test a second time with the reversing valve command.

In some embodiments, the plurality of system tests include a cooling test, wherein the processing circuit is configured to perform the cooling test by causing an air conditioner to cool the building in response to determining that wires for the air conditioner are connected to the plurality of wiring terminals, generating a cooling test question interface comprising a question regarding whether cold air is exiting a vent of the building and causing the user interface to display the cooling test question, receiving, via the user interface, an indication regarding whether the cold air is exiting the vent of the building, generating a reversing valve polarity question in response to receiving the indication indicating that the cold air is not exiting the vent of the building, wherein the reversing valve polarity question asks the user whether hot air is exiting the vent of the building and causing the user interface to display the reversing valve polarity question, switching a polarity of a reversing valve command in response to receiving, via the user interface, an indication that hot is exiting the vent of the building, and performing the cooling test a second time with the reversing valve command.

Another implementation of the present disclosure is a thermostat for controlling an environmental condition of a building via building equipment. The thermostat includes a user interface configured to present information to a user and receive input from the user. The thermostat includes a processing circuit communicably coupled to the user interface. The processing circuit is configured to determine a predicted runtime length, wherein the predicted runtime length is a length of time that the thermostat would operate the building equipment without energy savings features of the thermostat, record an actual runtime length, wherein the actual runtime length is an actual length of time that the thermostat operates the building equipment with the energy savings features of the thermostat, generate an energy savings metric based on the predicted runtime length and the actual runtime length, and generate a user interface displaying the energy savings metric and cause the user interface to display the energy savings metric.

In some embodiments, the energy savings metric is a percentage value indicating a percentage of energy saved, wherein the processing circuit is configured to generate the percentage value by subtracting the actual runtime length divided by the predicted runtime length from the predicted runtime length.

In some embodiments, the user interface comprises an energy savings trend. In some embodiments, the processing circuit is configured to generate a plurality of energy savings metrics for each of a plurality of days, wherein each of the plurality of energy savings metrics is the energy savings metric for a particular day and generate the energy savings trend based on the plurality of energy savings metrics for each of the plurality of days.

In some embodiments, the user interface includes an information element. In some embodiments, the processing circuit is configured to receive, via the user interface, a user interaction with the information element, generate an information user interface comprising an indication of a calculation method for determining the energy savings metric, and causing the user interface to display the information user interface.

In some embodiments, the processing circuit is configured to record a plurality of actual runtimes, wherein each of the recorded plurality of actual runtimes is the actual runtime for a particular day, generate an aggregate runtime, wherein the aggregate runtime is the summation of the plurality of runtimes, and generate an actual runtime trend interface, wherein the actual runtime trend indicates the plurality of actual runtimes at the particular days and indicates the aggregate runtime.

In some embodiments, the processing circuit is configured to receive, via the user interface, a swipe left interaction on the user interface and cause the user interface to display the actual runtime trend interface in response to receiving the swipe left interaction.

Another implementation of the present disclosure is a thermostat for controlling an environmental condition of a building via building equipment. The thermostat includes a user interface configured to present information to a user and receive input from the user and a processing circuit. The processing circuit is configured to receive, via the user interface, a first schedule from the user interface, wherein the schedule indicates one or more first time periods and first temperature values associated with the one or more time periods for a first day, receive, via the user interface, a cloning command and a selection of a second day, update a second schedule for the second day based on the first schedule, wherein the generated second schedule comprises the one or more first time periods and the first temperature values, and control the building equipment to control the environmental condition of the building based on the first scheduled and the updated second schedule.

In some embodiments, the processing circuit is configured to receive, via the user interface, the second schedule from the user interface, wherein the second schedule indicates one or more second time periods and second temperature values associated with the one or more second periods for the second day.

In some embodiments, the processing circuit is configured to determine whether the one or more first time periods conflict with the one or more second time periods and generate a conflict user interface indicating that the one or more first times conflict with the one or more second times and cause the user interface to display the conflict user interface.

In some embodiments, the processing circuit is configured to receive, via the user interface, a proceed confirmation, delete one or more conflicting time periods of the second schedule in response to receiving the proceed confirmation, wherein the conflicting time periods are time periods of the one or more second time periods that overlap with time periods of the one or more first time periods, and add the one or more first time periods to the second schedule in response to receiving the proceed confirmation.

In some embodiments, the processing circuit is configured to cause the user interface to display one or more question interfaces prompting the user to enter a wake-up time, a sleep-time, a home temperature, and a sleep temperature, receive the wake-up time, the sleep-time, the home temperature, and the sleep temperature from the user via the user device, generate a general schedule based on the received wake-up time, the sleep-time, the home temperature, and the sleep temperature from the user via the user device, and control the building equipment to control the environmental condition of the building based on the general schedule, the first schedule, and the second schedule.

Another implementation of the present disclosure is a thermostat for controlling an environmental condition of a building via building equipment. The thermostat includes a user interface configured to present information to a user and receive input from the user and a processing circuit. The processing circuit is configured to generate a fan operation user interface, wherein the fan operation interface comprises an option for operating the fan in an automatic mode and an on mode and cause the user interface to display the fan operation user interface, generate a fan runtime selection interface comprising a fan runtime selector for selecting a fan runtime in response to a user selection of the on mode via the fan operation user interface and cause the user interface to display the fan runtime selection interface, receive, via the user interface, a selected fan runtime from the user selected via the fan runtime selector, and cause a fan to circulate air continuously for the selected fan runtime.

In some embodiments, the processing circuit is configured to generate a countdown timer, wherein the countdown timer counts down from the selected fan runtime to zero, update the fan operation user interface by replacing the on mode with a current value of the countdown timer, and cause the user interface to display the updated fan operation user interface.

In some embodiments, the processing circuit is configured receive, via the user interface, a selection of the current value of the countdown timer of the updated fan operation user interface, generate a countdown user interface, wherein the countdown user interface comprises an indication of the current value of the countdown timer and a stop element, receive, via the user interface, an interaction with the stop element, and cause the fan to stop circulating air continuously for the selected fan runtime.

Another implementation of the present disclosure is a thermostat for controlling an environmental condition of a building via building equipment. The thermostat includes a user interface configured to present information to a user and receive input from the user and a processing circuit. The processing circuit is configured to generate a home screen interface comprising an indication of a current temperature, an indication of a setpoint temperature, one or more adjustment elements for updating the setpoint temperature, and one or more temperature setpoint hold elements, cause the user interface to display the home screen interface, receive, via the user interface, a selection of the temperature setpoint hold elements, wherein the selection indicates a temperature setpoint hold time, and control the building equipment to achieve the setpoint temperature within the building and ignore energy saving features of the thermostat for the selected temperature setpoint hold time.

In some embodiments, the processing circuit is configured to cause the user interface to not display the one or more temperature setpoint hold elements, receive, via the user interface, an interaction with the one or more adjustment elements, cause the user interface to display the one or more temperature setpoint hold elements, cause the user interface to not display the one or more temperature setpoint hold elements in response to not receiving an interaction with the one or more temperature setpoint hold elements within a predefined amount of time, and cause the user interface to display the one or more temperature setpoint hold elements in response to receiving the interaction with the one or more temperature setpoint hold elements for a second predefined amount of time, wherein the second predefined amount of time is based on the interaction with the one or more temperature setpoint hold elements.

In some embodiments, the temperature setpoint hold elements include a first temperature setpoint hold element associated with a first temperature setpoint hold time, a second temperature setpoint hold element associated with a second temperature setpoint hold time, and a limitless temperature setpoint hold element associated with an limitless temperature setpoint hold time.

In some embodiments, the processing circuit is configured to receive, via the user interface, a selection of the limitless temperature setpoint hold element, control the building equipment to achieve the setpoint temperature within the building and ignore the energy saving features of the thermostat, receive, via the user interface, a cancellation of the limitless temperature setpoint hold element selection, and control the building equipment to achieve the setpoint temperature within the building based on the energy saving features of the thermostat.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 13 is a user interface confirming that building equipment of a user is compatible with the thermostat of FIG. 4, according to an exemplary embodiment.

FIG. 14 is a user interface indicating that additional information is required to confirm that building equipment of a user is compatible with the thermostat of FIG. 4, according to an exemplary embodiment.

FIG. 15 is a user interface indicating that building equipment of a user is not compatible with the thermostat of FIG. 4, according to an exemplary embodiment.

FIG. 26 is a user interface for identifying auxiliary heating type of auxiliary heating equipment connected to the thermostat of FIG. 4, according to an exemplary embodiment.

FIG. 27 is a user interface for identifying auxiliary heating method performed by the auxiliary heating equipment connected to the thermostat of FIG. 4, according to an exemplary embodiment.

FIG. 33L is a user interface that can be displayed in the process of FIG. 33A prompting a user to verify whether the auxiliary heating equipment connected to the thermostat of FIG. 4 is operating properly, according to an exemplary embodiment.

FIG. 33M is a user interface that can be displayed in the process of FIG. 33A prompting providing a user with a summary of the test for the equipment connected to the thermostat of FIG. 4, according to an exemplary embodiment.

FIG. 34 is a user interface displayed by the thermostat of FIG. 4 for indicating that there are new notifications for user review, according to an exemplary embodiment.

FIG. 35 is a user interface displayed by the thermostat of FIG. 4 including a list of notifications, according to an exemplary embodiment.

FIG. 36 is a user interface displayed by the thermostat of FIG. 4 providing a seasonal maintenance reminder for a user, according to an exemplary embodiment.

FIG. 37 is a user interface displayed by the thermostat of FIG. 4 indicating that there are no notifications for the thermostat of FIG. 4, according to an exemplary embodiment.

FIG. 49 is a user interface displayed by the thermostat of FIG. 4 for navigating to a tumbler user interface setting a fan runtime parameter, according to an exemplary embodiment.

FIG. 50 is the tumbler user interface for setting the fan runtime parameter, according to an exemplary embodiment.

FIG. 51 is a settings interface displayed by the thermostat of FIG. 4 including a countdown timer from a fan runtime selected via the interface of FIG. 50, according to an exemplary embodiment.

FIG. 52 is a countdown interface displayed by the thermostat of FIG. 4 including a countdown timer from the fan runtime selected via the interface of FIG. 50, according to an exemplary embodiment.

FIG. 95 is a user interface displayed by the thermostat of FIG. 4 including interface elements for defining an end time of an event of a schedule of the thermostat of FIG. 4, according to an exemplary embodiment.

Figures 101, 102, 103, 104:
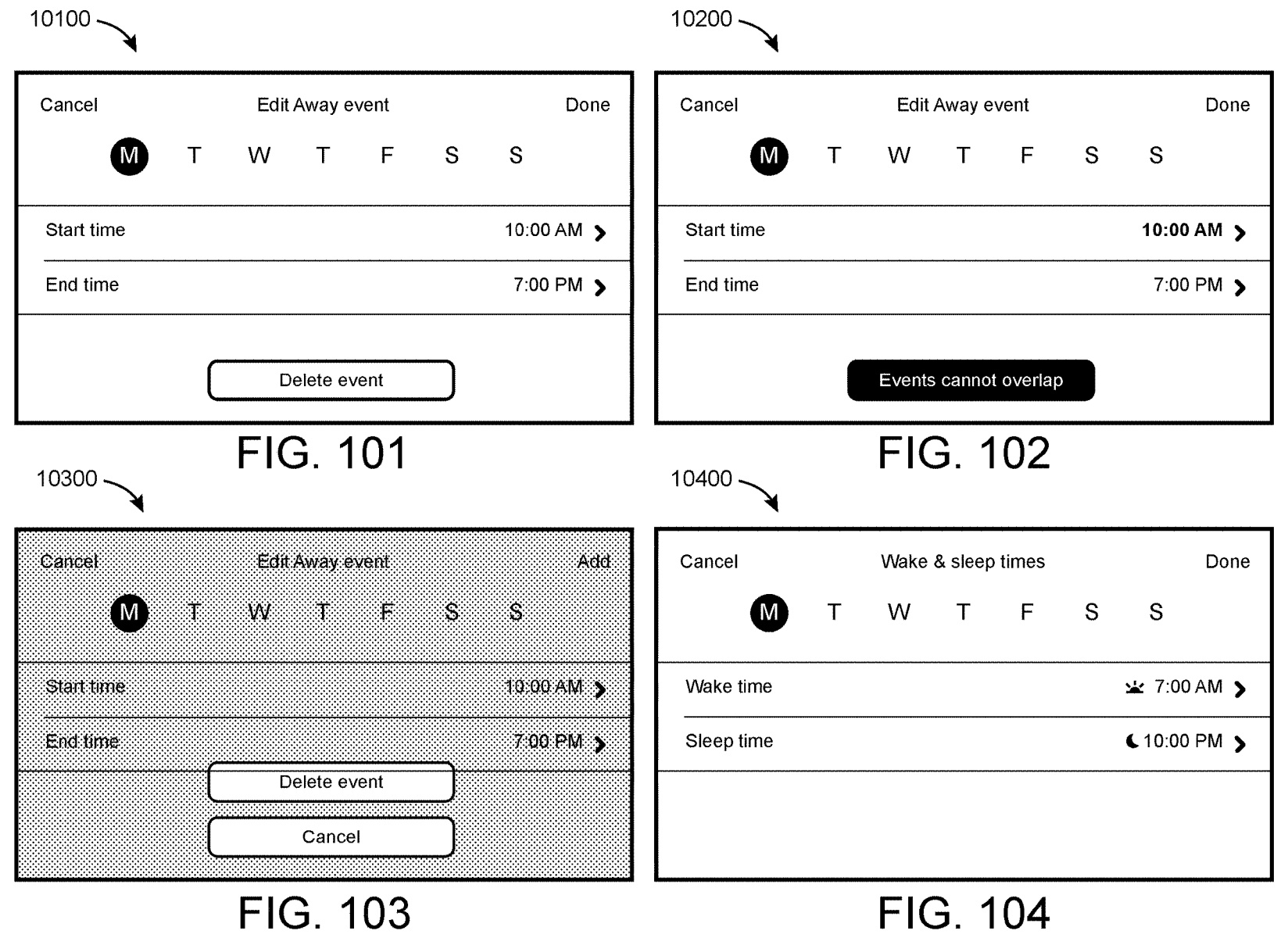

FIG. 101 is a user interface displayed by the thermostat of FIG. 4 including interface elements for editing a start time and an end time of an event, according to an exemplary embodiment.

FIG. 102 is a user interface displayed by the thermostat of FIG. 4 including interface elements for editing a start time and an end time of an event and including an indication that a start time overlaps with another event of a schedule of the thermostat of FIG. 4, according to an exemplary embodiment.

FIG. 103 is a user interface displayed by the thermostat of FIG. 4 including interface elements for confirming a deletion of an event of a schedule of the thermostat of FIG. 4, according to an exemplary embodiment.

FIG. 104 is a user interface displayed by the thermostat of FIG. 4 including interface elements for editing a wake up time and a sleep time a schedule of the thermostat of FIG. 4, according to an exemplary embodiment.

FIG. 105 is a user interface displayed by the thermostat of FIG. 4 including a selection of days to clone a schedule of a first day to and a direction indicator informing a user how to perform the clone, according to an exemplary embodiment.

FIG. 106 is a user interface displayed by the thermostat of FIG. 4 including a selection of days to clone a schedule of a first day to, according to an exemplary embodiment.

FIG. 107 is a user interface displayed by the thermostat of FIG. 4 including a confirmation message to clone a schedule of a first day to other days, according to an exemplary embodiment.

FIG. 108 is a user interface displayed by the thermostat of FIG. 4 including a schedule of the thermostat of FIG. 4 and a confirmation that a cloning action has been completed, according to an exemplary embodiment.

FIG. 109 is a user interface displayed by the thermostat of FIG. 4 indicating the size of different events of varying time periods, according to an exemplary embodiment.

FIG. 110 is introductory user interface displayed by the user device of FIG. 4 for guiding a user through installing the thermostat of FIG. 4, according to an exemplary embodiment.

FIG. 111 is user interface displayed by the user device of FIG. 4 for guiding a user through installing the thermostat of FIG. 4, the user interface including information regarding air quality, according to an exemplary embodiment.

FIG. 112 is user interface displayed by the user device of FIG. 4 for guiding a user through installing the thermostat of FIG. 4, the user interface including information regarding energy savings, according to an exemplary embodiment.

FIG. 113 is user interface displayed by the user device of FIG. 4 for guiding a user through installing the thermostat of FIG. 4, the user interface including information regarding scheduling, according to an exemplary embodiment.

FIG. 114 is user interface displayed by the user device of FIG. 4 for guiding a user through installing the thermostat of FIG. 4, the user interface including a menu, according to an exemplary embodiment.

Figure 4:
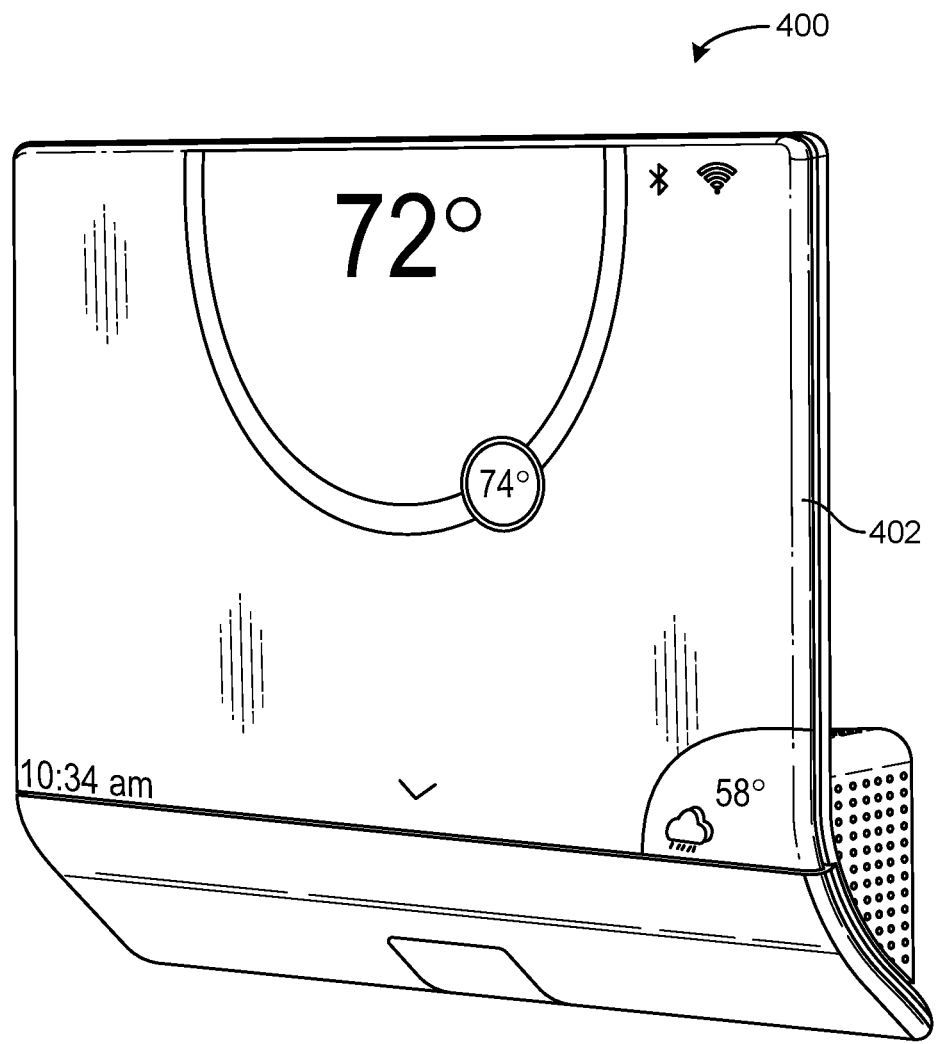
FIG. 4 is a drawing of a thermostat with a transparent display, according to an exemplary embodiment.

FIG. 115 is user interface displayed by the user device of FIG. 4 for guiding a user through installing the thermostat of FIG. 4, the user interface allowing a user to sign into an account, according to an exemplary embodiment.

Figure 116:
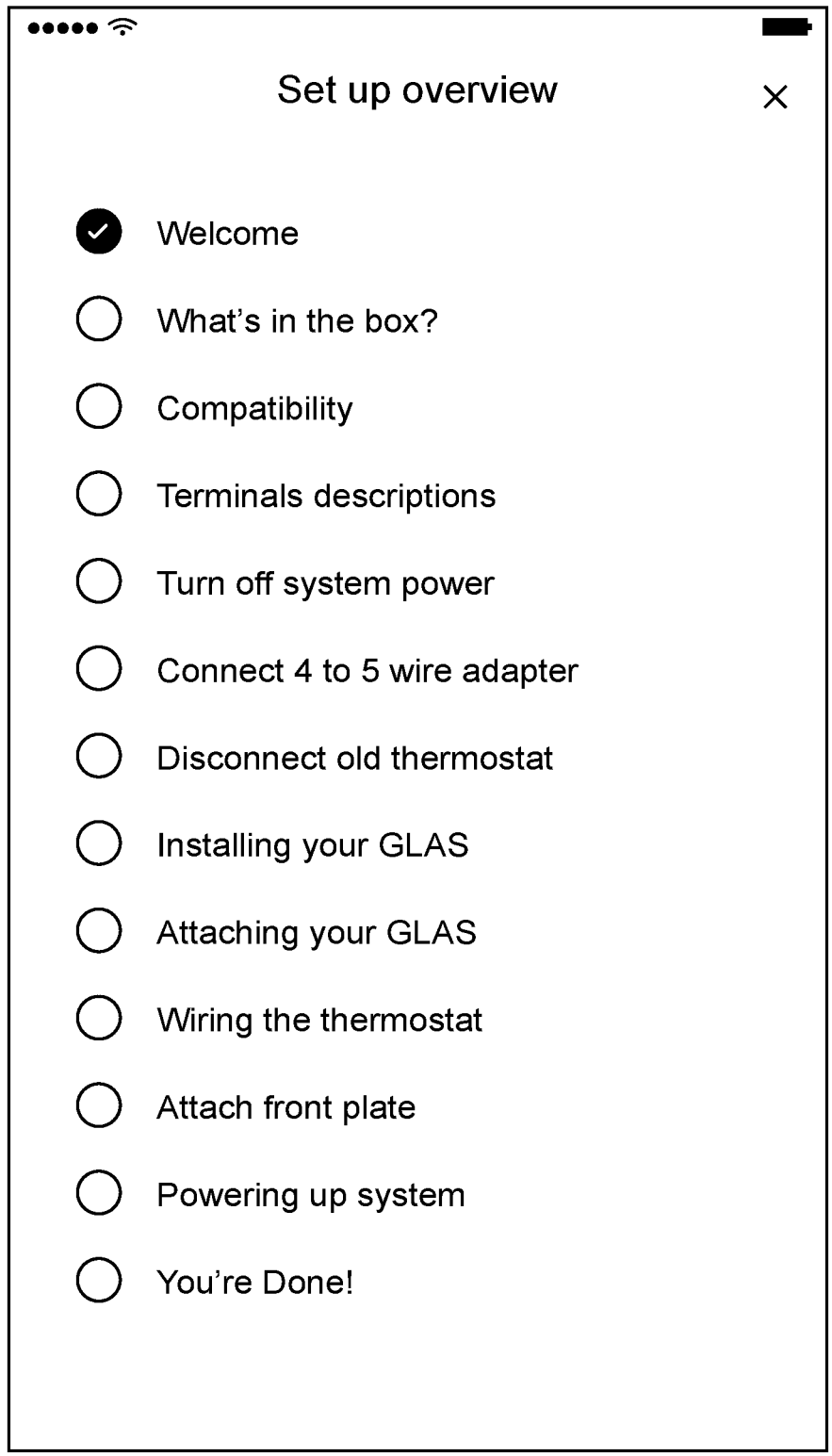

FIG. 116 is user interface displayed by the user device of FIG. 4 for guiding a user through installing the thermostat of FIG. 4, the user interface including an overview of steps for installing the thermostat of FIG. 4, according to an exemplary embodiment.

FIG. 117 is user interface displayed by the user device of FIG. 4 for guiding a user through installing the thermostat of FIG. 4, the user interface including assistance guides and contacts, according to an exemplary embodiment.

FIG. 118 is user interface displayed by the user device of FIG. 4 for guiding a user through installing the thermostat of FIG. 4, the user interface including an indication of equipment in a packaging box of the thermostat of FIG. 4, according to an exemplary embodiment.

FIG. 119 is user interface displayed by the user device of FIG. 4 for guiding a user through installing the thermostat of FIG. 4, the user interface including an indication of compatibility requirements of the thermostat of FIG. 4, according to an exemplary embodiment.

FIG. 120 is user interface displayed by the user device of FIG. 4 for guiding a user through installing the thermostat of FIG. 4, the user interface including of terminals of the thermostat of FIG. 4, according to an exemplary embodiment.

FIG. 121 is user interface displayed by the user device of FIG. 4 for guiding a user through installing the thermostat of FIG. 4, the user interface including instructions to determine whether a system of a user is a high voltage system, according to an exemplary embodiment.

FIG. 122 is user interface displayed by the user device of FIG. 4 for guiding a user through installing the thermostat of FIG. 4, the user interface an installation warning, according to an exemplary embodiment.

Figures 123, 124, 125:
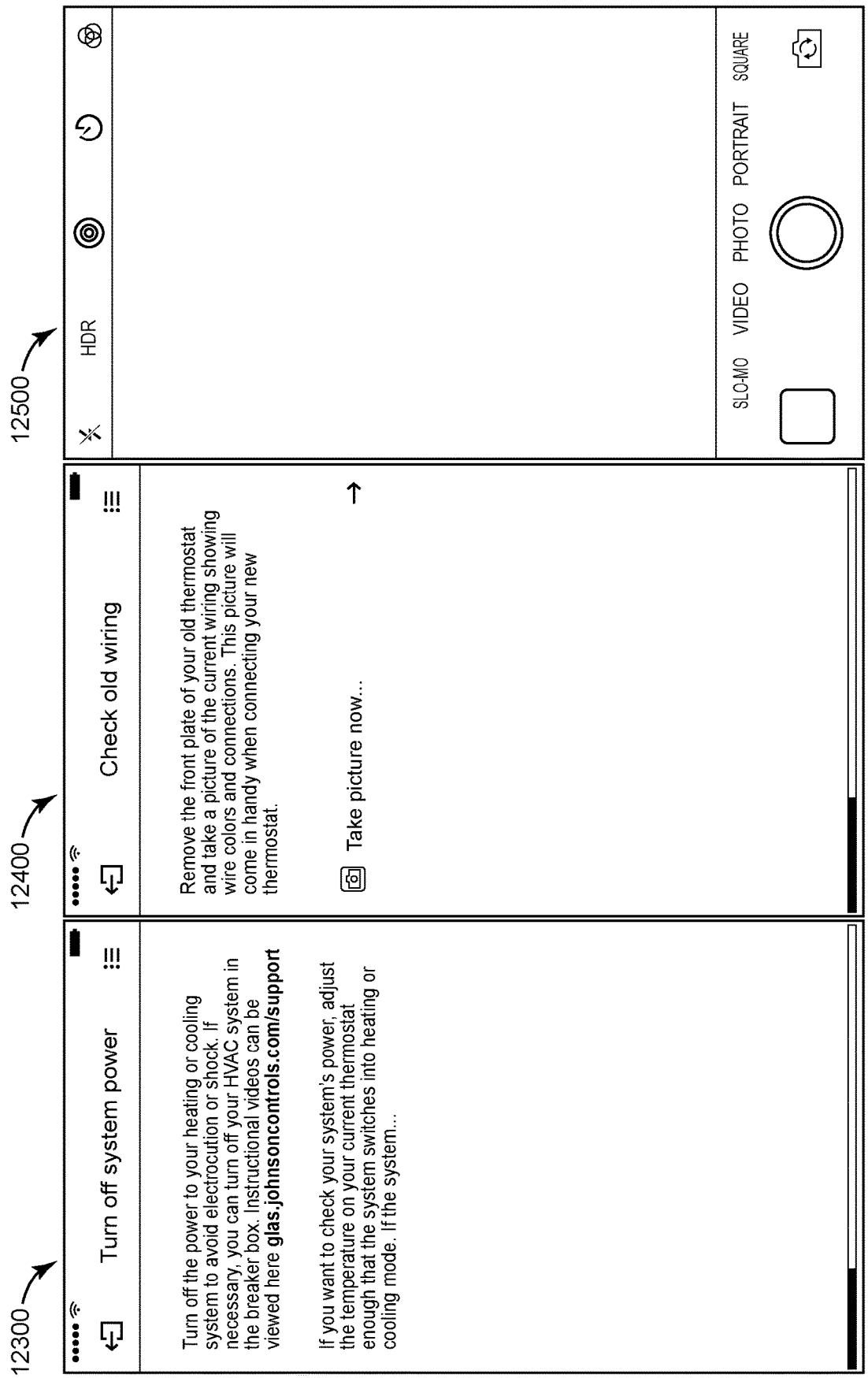

FIG. 123 is user interface displayed by the user device of FIG. 4 for guiding a user through installing the thermostat of FIG. 4, the user interface including instructions to power off a system, according to an exemplary embodiment.

FIG. 124 is user interface displayed by the user device of FIG. 4 for guiding a user through installing the thermostat of FIG. 4, the user interface including instructions review a wiring configuration of a previously installed thermostat and capture an image of the wiring configuration, according to an exemplary embodiment.

FIG. 125 is user interface displayed by the user device of FIG. 4 for guiding a user through installing the thermostat of FIG. 4, the user interface allowing a user to capture an image of a wiring configuration of a previously installed thermostat, according to an exemplary embodiment.

FIG. 126 is user interface displayed by the user device of FIG. 4 for guiding a user through installing the thermostat of FIG. 4, the user interface including instructions for installing a wire adapter, according to an exemplary embodiment.

FIG. 127 is user interface displayed by the user device of FIG. 4 for guiding a user through installing the thermostat of FIG. 4, the user interface including further instructions for installing a wire adapter, according to an exemplary embodiment.

FIG. 128 is user interface displayed by the user device of FIG. 4 for guiding a user through installing the thermostat of FIG. 4, the user interface including to remove a previously installed thermostat, according to an exemplary embodiment.

FIG. 129 is user interface displayed by the user device of FIG. 4 for guiding a user through installing the thermostat of FIG. 4, the user interface including instructions for installing the thermostat of FIG. 4 on a wall, according to an exemplary embodiment.

FIG. 130 is user interface displayed by the user device of FIG. 4 for guiding a user through installing the thermostat of FIG. 4, the user interface including further instructions for installing the thermostat of FIG. 4 on a wall, according to an exemplary embodiment.

FIG. 131 is user interface displayed by the user device of FIG. 4 for guiding a user through installing the thermostat of FIG. 4, the user interface including instructions for wiring the thermostat of FIG. 4, according to an exemplary embodiment.

FIG. 132 is user interface displayed by the user device of FIG. 4 for guiding a user through installing the thermostat of FIG. 4, the user interface including instructions for attaching a front plate of to the thermostat of FIG. 4, according to an exemplary embodiment.

FIG. 133 is user interface displayed by the user device of FIG. 4 for guiding a user through installing the thermostat of FIG. 4, the user interface including instructions for powering on a system connected to the thermostat of FIG. 4, according to an exemplary embodiment.

FIG. 134 is user interface displayed by the user device of FIG. 4 for guiding a user through installing the thermostat of FIG. 4, the user interface including a confirmation of installation of the thermostat of FIG. 4, according to an exemplary embodiment.

Figure 135:
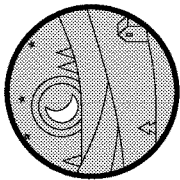

FIG. 135 is a user interface displayed by the thermostat of FIG. 4 prompting a user to enter a time at which tenants or employees arrive at a building, according to an exemplary embodiment.

Figure 136:
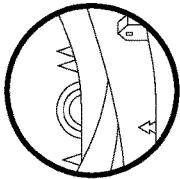

FIG. 136 is a user interface displayed by the thermostat of FIG. 4 prompting the user to enter a time at which tenants or employees depart from the building, according to an exemplary embodiment.

Figure 137:
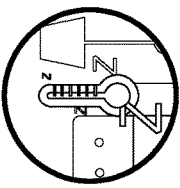

FIG. 137 is a user interface displayed by the thermostat of FIG. 4 prompting the user to enter a temperature range for when the building is occupied, according to an exemplary embodiment.

Figure 138:
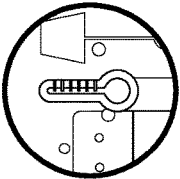

FIG. 138 is a user interface displayed by the thermostat of FIG. 4 prompting the user to enter a temperature range for when the building is unoccupied, according to an exemplary embodiment.

Figure 139:
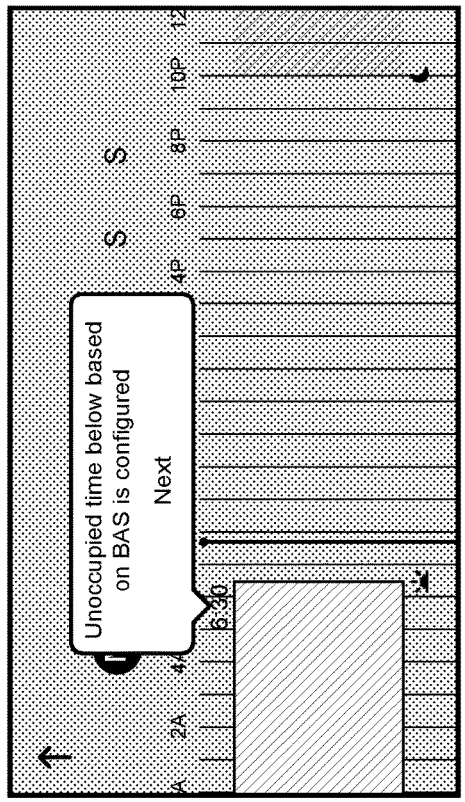

FIG. 139 is a user interface displayed by the thermostat of FIG. 4 including an unoccupied time period of a schedule of the thermostat of FIG. 4, according to an exemplary embodiment.

Figure 140:
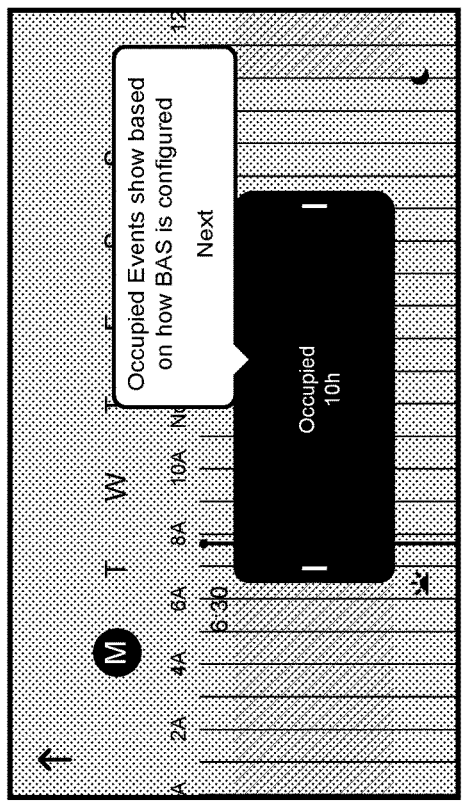

FIG. 140 is a user interface displayed by the thermostat of FIG. 4 including an unoccupied time period and an occupied time period of a schedule of the thermostat of FIG. 4, according to an exemplary embodiment.

Figure 141:
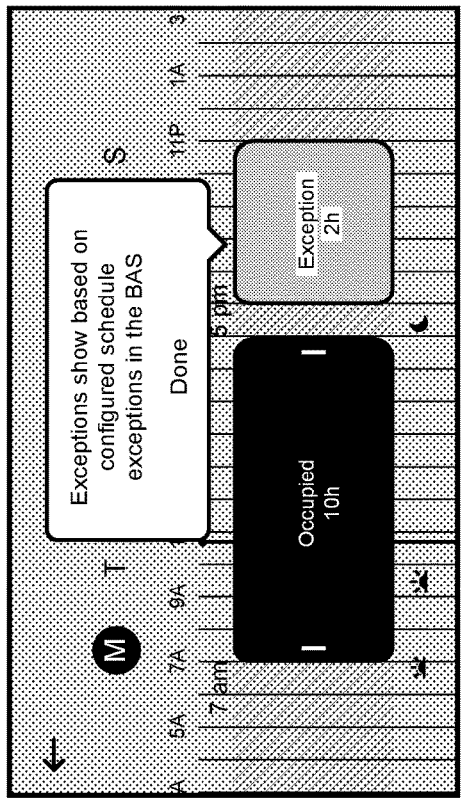

FIG. 141 is a user interface displayed by the thermostat of FIG. 4 including an unoccupied time period, an occupied time period, and an exception of a schedule of the thermostat of FIG. 4, according to an exemplary embodiment.

Figure 142:
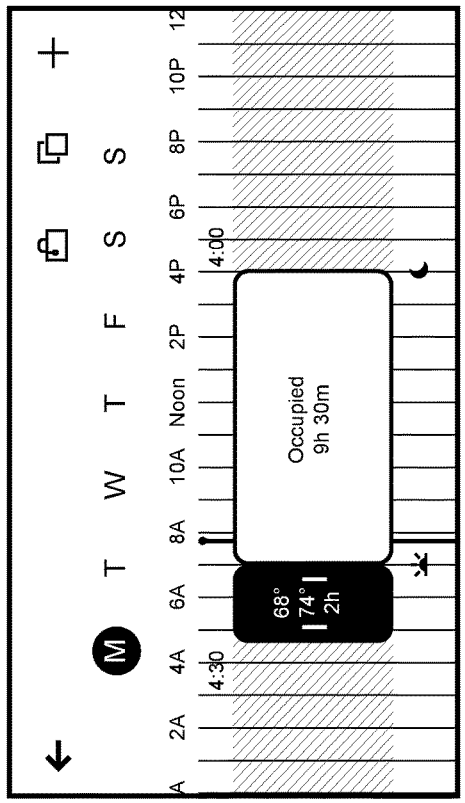

FIG. 142 is a user interface displayed by the thermostat of FIG. 4 including an unoccupied time period, a first occupied time period, and a second occupied time period with a custom temperature range of a schedule of the thermostat of FIG. 4, according to an exemplary embodiment.

Figure 143:
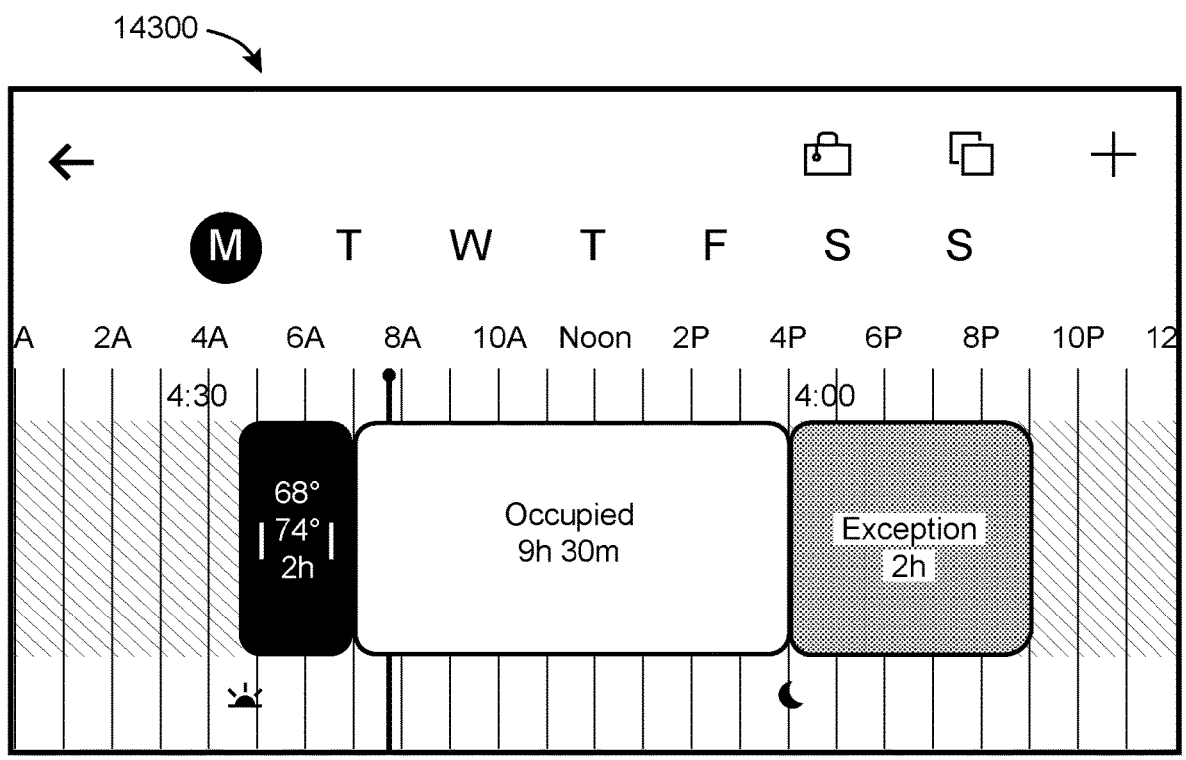

FIG. 143 is a user interface displayed by the thermostat of FIG. 4 including an unoccupied time period, a first occupied time period, a second occupied time period with a custom temperature range, and an exception time period of a schedule of the thermostat of FIG. 4, according to an exemplary embodiment.

Figure 144:
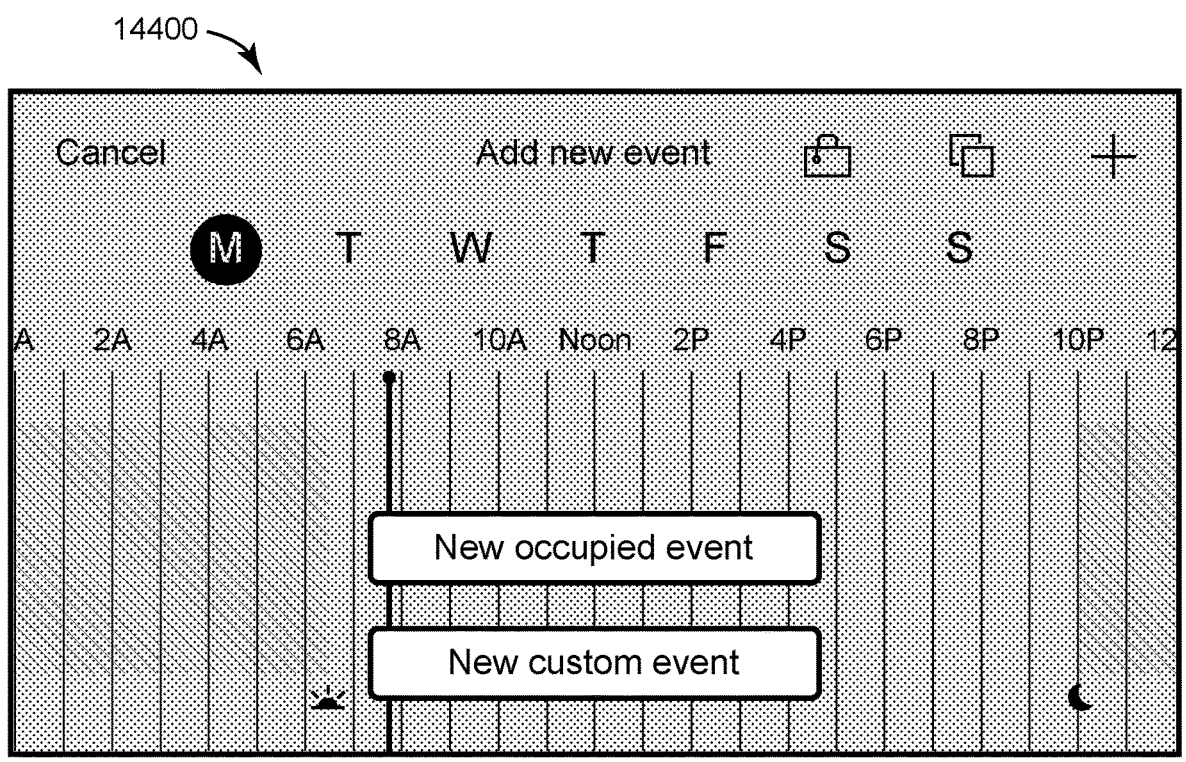

FIG. 144 is a user interface displayed by the thermostat of FIG. 4 including interface elements for adding new occupied events to a schedule of the thermostat of FIG. 4, according to an exemplary embodiment.

FIG. 145 is a user interface displayed by the thermostat of FIG. 4 including interface elements for setting a start time and an end time of a new occupied event, according to an exemplary embodiment.

FIG. 146 is a user interface displayed by the thermostat of FIG. 4 including interface elements for setting a start time, an end time, a heating temperature, and a cooling temperature of a new custom occupied event, according to an exemplary embodiment.

Figure 147:
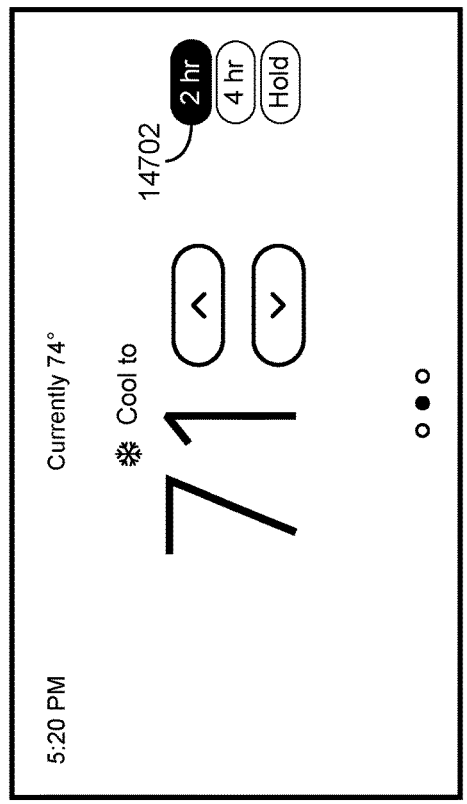

FIG. 147 is an interface displayed by the thermostat of FIG. 4 for performing a temperature hold function for a first time period, a second time period, or an indefinite time period, according to an exemplary embodiment.

Figure 148:
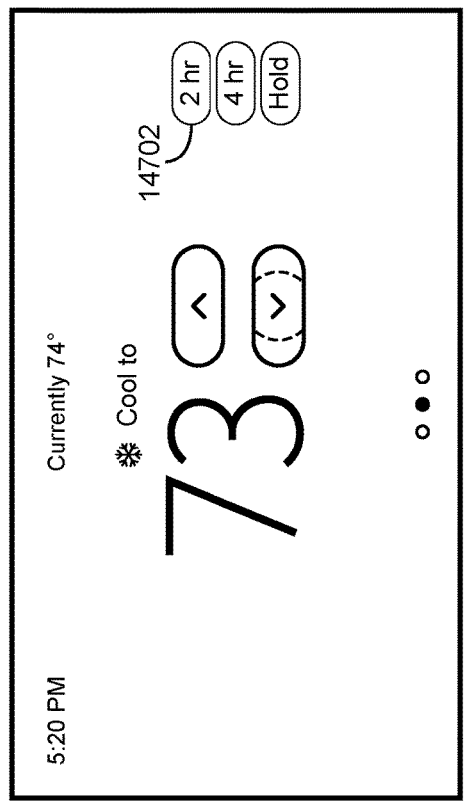

FIG. 148 is an interface displayed by the thermostat of FIG. 4 for performing a temperature hold function for a first time period, a second time period, or an indefinite time period where the first time period is selected by a user, according to an exemplary embodiment.

Figure 149:
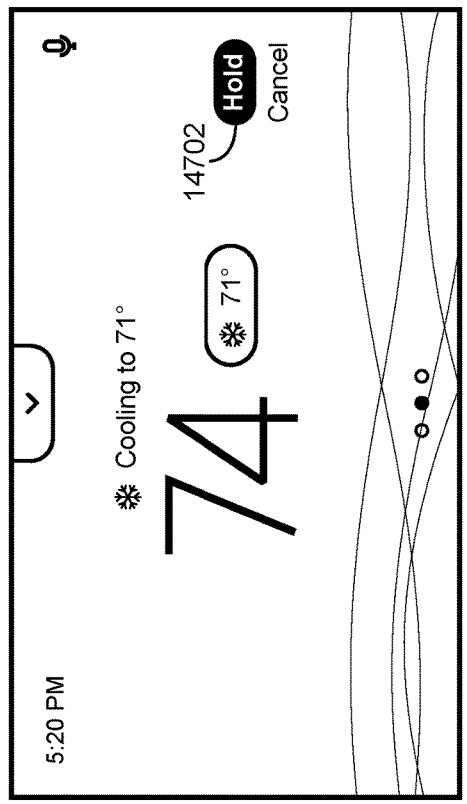

FIG. 149 is an interface displayed by the thermostat of FIG. 4 performing a temperature hold function for the first time period, according to an exemplary embodiment.

Figure 150:
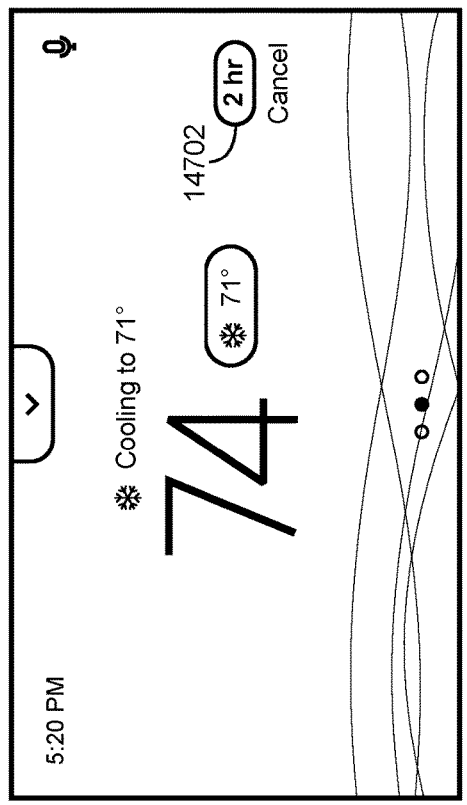

FIG. 150 is an interface displayed by the thermostat of FIG. 4 performing a temperature hold function for the indefinite time period, according to an exemplary embodiment.

Figure 151:
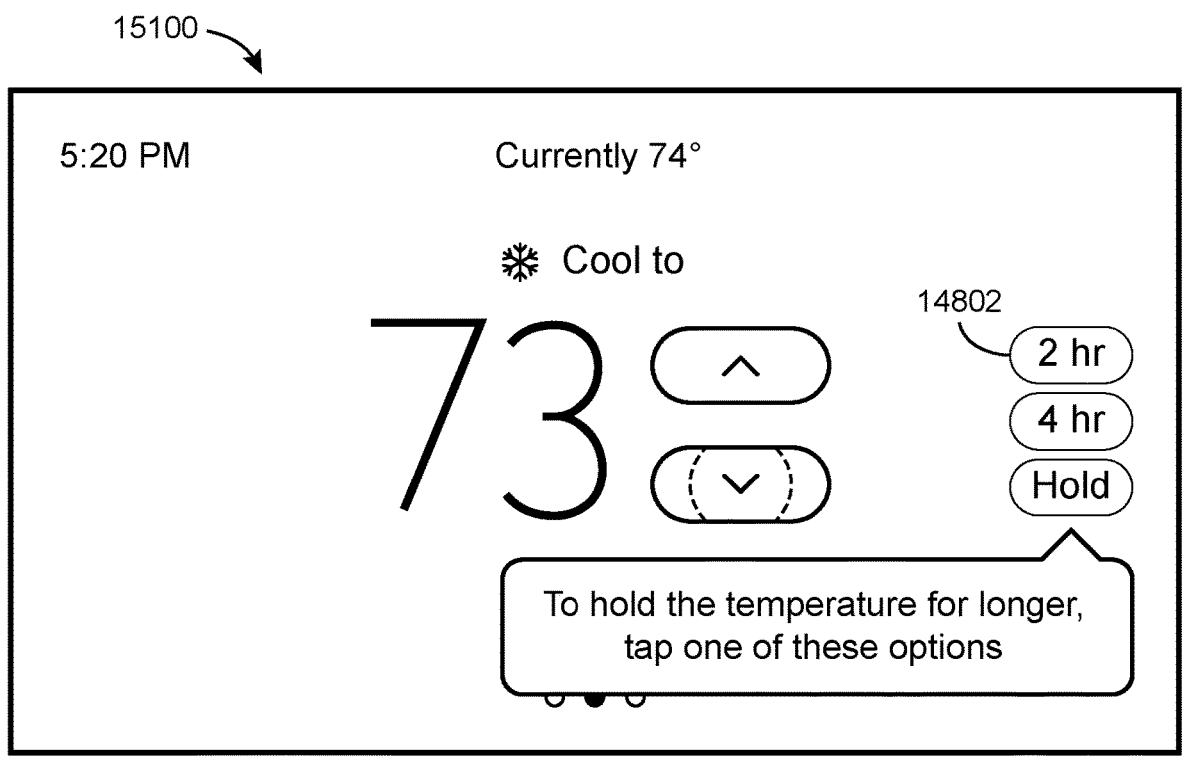

FIG. 151 is an interface displayed by the thermostat of FIG. 4 for performing a temperature hold function for a first time period, a second time period, or an indefinite time period, where the user interface includes directions to operate a temperature hold, according to an exemplary embodiment.

DETAILED DESCRIPTION

Overview

Referring generally to the FIGURES, systems and methods are shown for a thermostats with user interface features, according to various exemplary embodiments. The thermostat can include a user interface, e.g., a touchscreen user interface, configured to provide information to a user and receive input from the user. Since a user of the thermostat may not be a knowledgeable technician, the user interfaces of the thermostat may be intuitive such that the interactions with the user can be convenient for the user.

For example, the thermostat can be configured to generate and/or display information pertaining to the energy usage of a building of the thermostat. More specifically, the thermostat can be configured to generate and/or display interfaces indicative of the energy consumed by equipment operated by the thermostat. To provide an understandable indication of energy usage to a user, the thermostat can determine runtime, i.e., the length of time that the thermostat operates equipment connected to it. Based on energy savings configurations of the thermostat (e.g., scheduling, smart operations, etc.), the length of time that the system is run by the thermostat as compared to other thermostat models can be reduced. To provide a user with an indication of the energy savings, the thermostat can determine a normal length of time that the thermostat would have operated the equipment without the energy savings configurations, a baseline runtime. Based on the actual recorded runtime and the baseline runtime, the thermostat can be configured to generate and/or display user interfaces to a user such that the user can easily understand the performance and energy savings benefits of the thermostat.

In some embodiments, the thermostat can be configured to record air quality information for within a building and/or outside a building. Based on the recorded air quality information, the thermostat can be configured to generate air quality interfaces providing a user with information pertaining to the air quality of their building and neighborhood around their building. In some embodiments, the thermostat may include air quality sensors configured to measure indoor air quality data such as volatile organic compounds (VOCs), carbon dioxide, etc. Furthermore, in some embodiments, the thermostat may store a location indicator and retrieve, via a network (e.g., the Internet) outdoor air quality for the location indicator. The outdoor air quality may be ultraviolet (UV) levels, air quality index (AQI) values, allergen levels, etc. The thermostat can generate and/or display interfaces that provide the indoor and/or outdoor air quality information to a user. In some embodiments, the interfaces include elements that move along a vertical path, where the position of the elements indicates a level of the element (e.g., higher indicating worse air quality, lower indicating better air quality). Furthermore, based on the levels of the indoor and/or outdoor air quality values, the display screen can include elements of various colors, e.g., dark green, lighter green, orange, and red.

In some embodiments, the thermostat can generate and/or display scheduling interfaces. The scheduling interfaces can allow a user to generate and/or modify events of a schedule which control the operation of the thermostat. The scheduling interfaces can prompt a user for information in an intuitive manner, e.g., identifying day and night time periods by asking a user when they wake up and when the go to sleep. Furthermore, the thermostat can display interfaces which allow a user to clone a particular schedule for one day to multiple days such that a user only needs to manually define a single day and then cause other days to take on the same definition (e.g., same scheduled events) as the single day.

Furthermore, the thermostat can include interfaces that guide a user through installation of the thermostat. For example, the thermostat can be configured to electrically detect what wires have been connected to what terminals of the thermostat. Based one or multiple detections, the thermostat can be configured to provide an indication of the configuration to a user for their review. Furthermore, the thermostat can verify, based on the one or more detections that the user has appropriately connected their equipment to the thermostat. In some embodiments, the thermostat generates user interfaces that guide a user through testing their equipment, i.e., to verify that they have configured the thermostat properly and connected their equipment to the thermostat properly. The tests can be performed in stages, e.g., a first stage to test a fan of the thermostat, a second stage to test heating equipment of the thermostat, a third stage to test cooling equipment of the thermostat, a fourth stage to test auxiliary heating equipment of the thermostat, etc. After all tests are completed or skipped by a user, the thermostat can generate and/or display a summary interface indicating the result of each test.

In some embodiments, the thermostat is configured to operate a fan control operation and/or display interfaces for allowing the user to interact with the fan control operation. The thermostat can generate a user interface prompting the user to select a particular time period, based on the time period, the thermostat can operate the fan for the particular time period. The thermostat can manage countdown timers and cause the user interfaces to display indications of the remaining length of time that the fan will be operated. In some embodiments, other control decisions, e.g., heating, cooling, etc. are ignored and the thermostat operates the fan for the length of time regardless of other control operations.

In some embodiments, the thermostat is configured to implement a temperature hold operation and/or generate and/or display a user interface allowing a user to interact with the temperature hold operation. In some embodiments, the thermostat is configured to display predefined time periods, e.g., lengths of time that a user may want the thermostat to hold a particular temperature outside of a temperature setpoint and/or a schedule. In this regard, the user interface is configured to receive the temperature hold command and the thermostat is configured to operate building equipment to control a temperature to the held temperature setpoint for the length of time.

Building Management System and HVAC System

Figure 1:
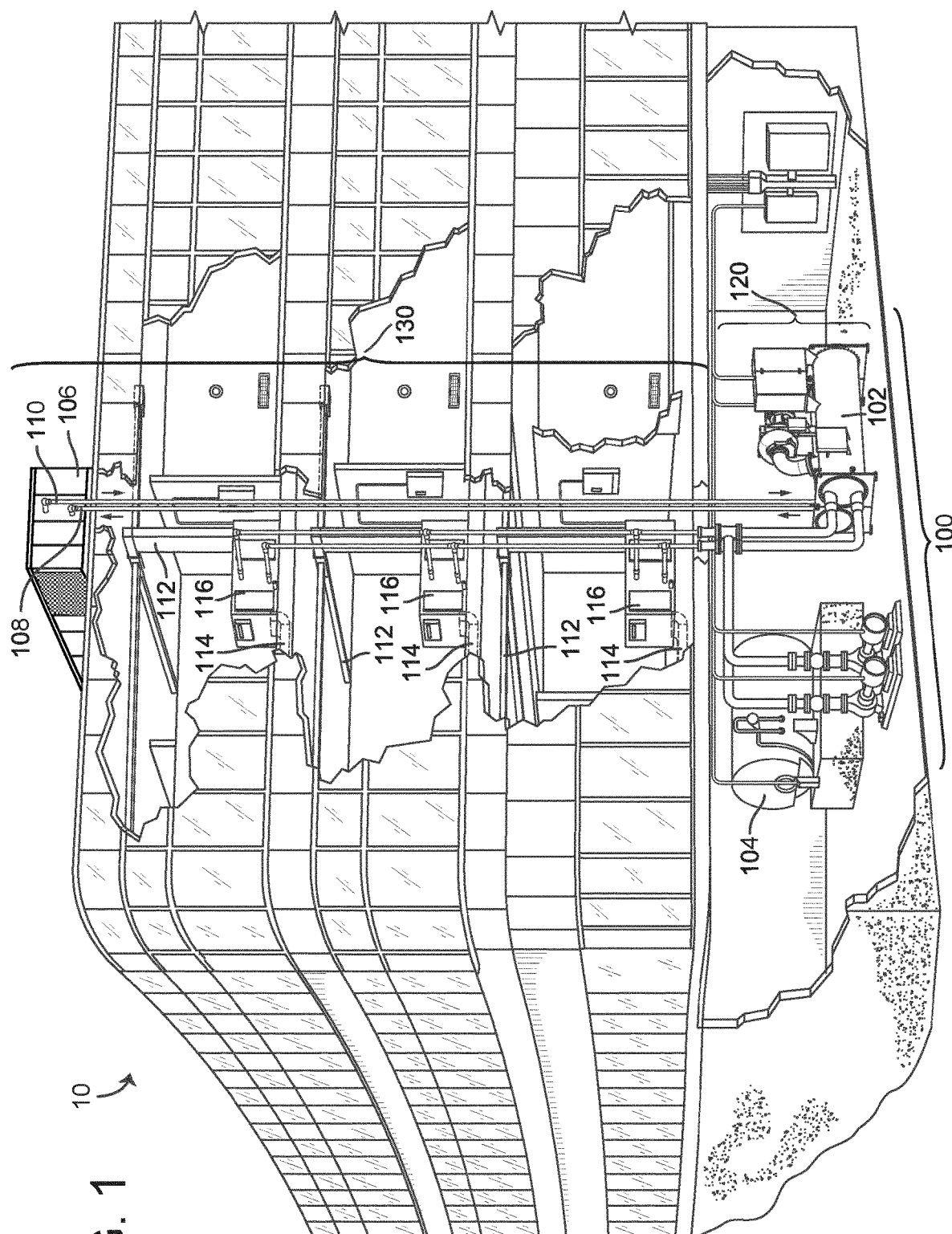
FIG. 1 is a drawing of a building equipped with a HVAC system, according to an exemplary embodiment.
Figure 2:
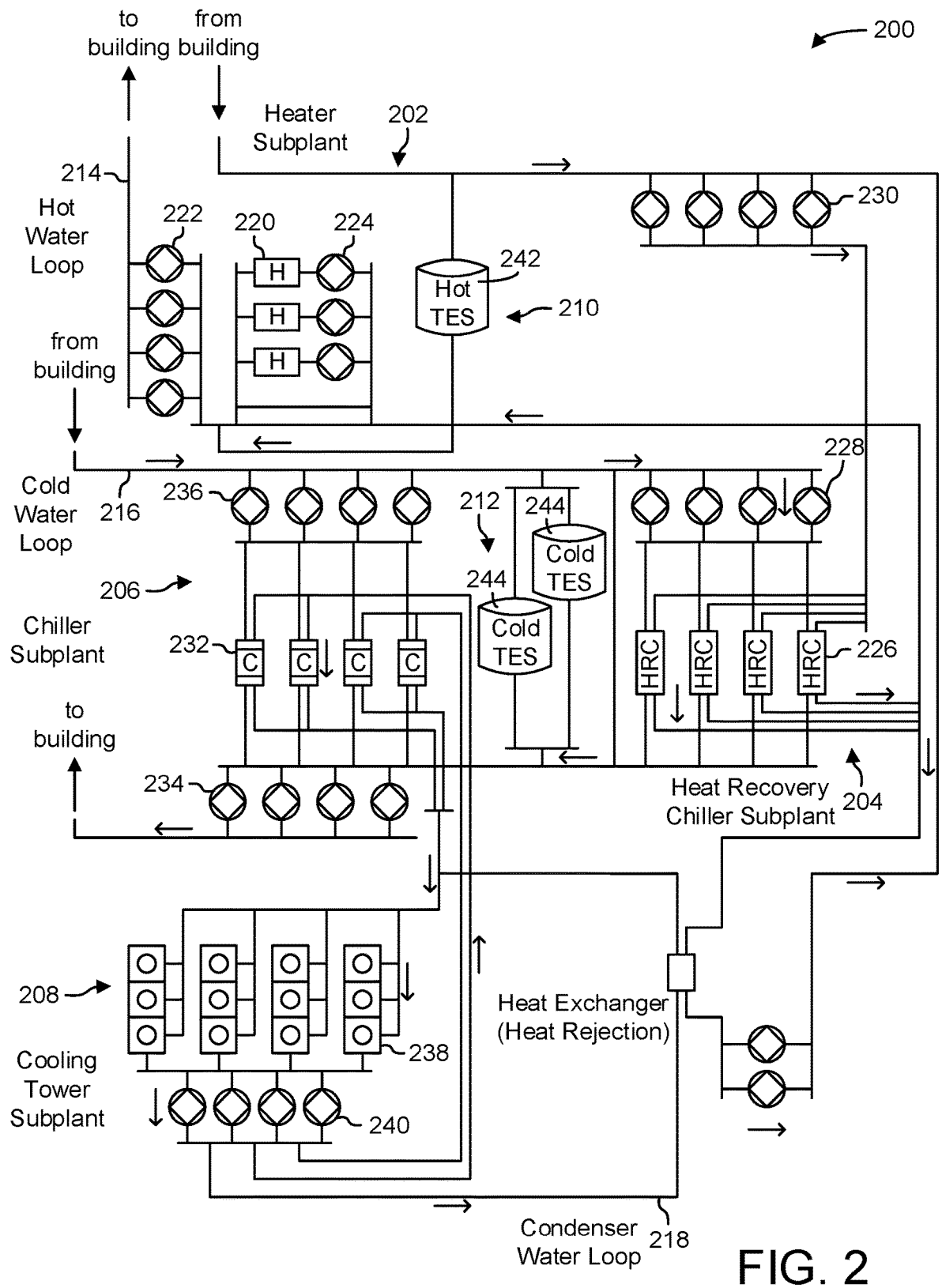
FIG. 2 is a block diagram of a waterside system that may be used in conjunction with the building of FIG. 1, according to an exemplary embodiment.
Figure 3:
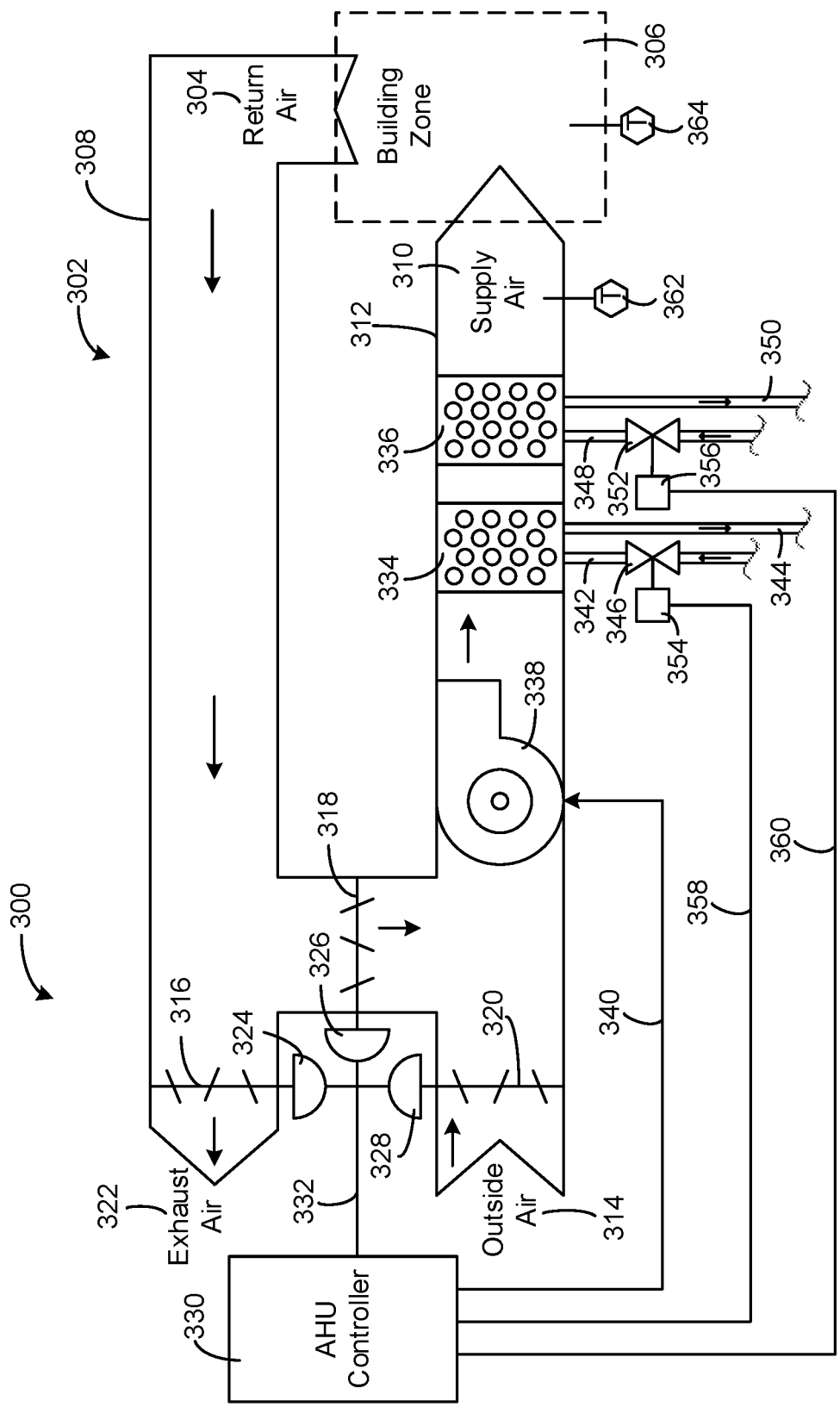
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Residential HVAC System

Referring now to FIG. 4, a drawing of a thermostat 400 for controlling building equipment is shown, according to an exemplary embodiment. The thermostat 400 is shown to include a display 402. The display 402 may be an interactive display that can display information to a user and receive input from the user. The display may be transparent such that a user can view information on the display and view the surface located behind the display. Thermostats with transparent and cantilevered displays are described in further detail in U.S. patent application Ser. No. 15/146,649 filed May 4, 2016, the entirety of which is incorporated by reference herein.

The display 402 can be a touchscreen or other type of electronic display configured to present information to a user in a visual format (e.g., as text, graphics, etc.) and receive input from a user (e.g., via a touch-sensitive panel). For example, the display 402 may include a touch-sensitive panel layered on top of an electronic visual display. A user can provide inputs through simple or multi-touch gestures by touching the display 402 with one or more fingers and/or with a stylus or pen. The display 402 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of display 402 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the display 402 is configured to present visual media (e.g., text, graphics, etc.) without requiring a backlight.

Figure 5:
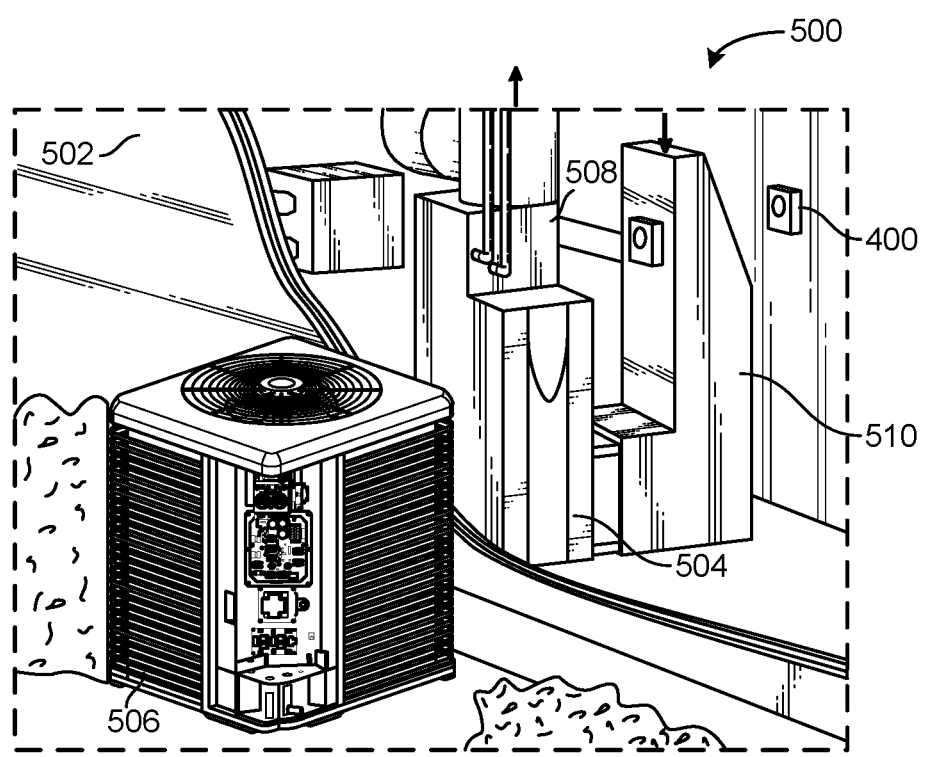
FIG. 5 is a schematic drawing of a building equipped with a residential heating and cooling system and the thermostat of FIG. 4, according to an exemplary embodiment.

Referring now to FIG. 5, a residential heating and cooling system 500 is shown, according to an exemplary embodiment. The residential heating and cooling system 500 may provide heated and cooled air to a residential structure. Although described as a residential heating and cooling system 500, embodiments of the systems and methods described herein can be utilized in a cooling unit or a heating unit in a variety of applications include commercial HVAC units (e.g., roof top units). In general, a residence 502 includes refrigerant conduits that operatively couple an indoor unit 506 to an outdoor unit 504. Indoor unit 28 may be positioned in a utility space, an attic, a basement, and so forth. Outdoor unit 504 is situated adjacent to a side of residence 502. Refrigerant conduits transfer refrigerant between indoor unit 506 and outdoor unit 504, typically transferring primarily liquid refrigerant in one direction and primarily vaporized refrigerant in an opposite direction.

When the system 500 shown in FIG. 5 is operating as an air conditioner, a coil in outdoor unit 504 serves as a condenser for recondensing vaporized refrigerant flowing from indoor unit 506 to outdoor unit 504 via one of the refrigerant conduits. In these applications, a coil of the indoor unit 506, designated by the reference numeral 508, serves as an evaporator coil. Evaporator coil 508 receives liquid refrigerant (which may be expanded by an expansion device, not shown) and evaporates the refrigerant before returning it to outdoor unit 504.

Outdoor unit 504 draws in environmental air through its sides, forces the air through the outer unit coil using a fan, and expels the air. When operating as an air conditioner, the air is heated by the condenser coil within the outdoor unit 504 and exits the top of the unit at a temperature higher than it entered the sides. Air is blown over indoor coil 504 and is then circulated through residence 502 by means of ductwork 510, as indicated by the arrows entering and exiting ductwork 510. The overall system 500 operates to maintain a desired temperature as set by thermostat 400. When the temperature sensed inside the residence 502 is higher than the set point on the thermostat 400 (with the addition of a relatively small tolerance), the air conditioner will become operative to refrigerate additional air for circulation through the residence 502. When the temperature reaches the set point (with the removal of a relatively small tolerance), the unit can stop the refrigeration cycle temporarily.

In some embodiments, the system 500 configured so that the outdoor unit 504 is controlled to achieve a more elegant control over temperature and humidity within the residence 502. The outdoor unit 504 is controlled to operate components within the outdoor unit 504, and the system 500, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Figure 6:
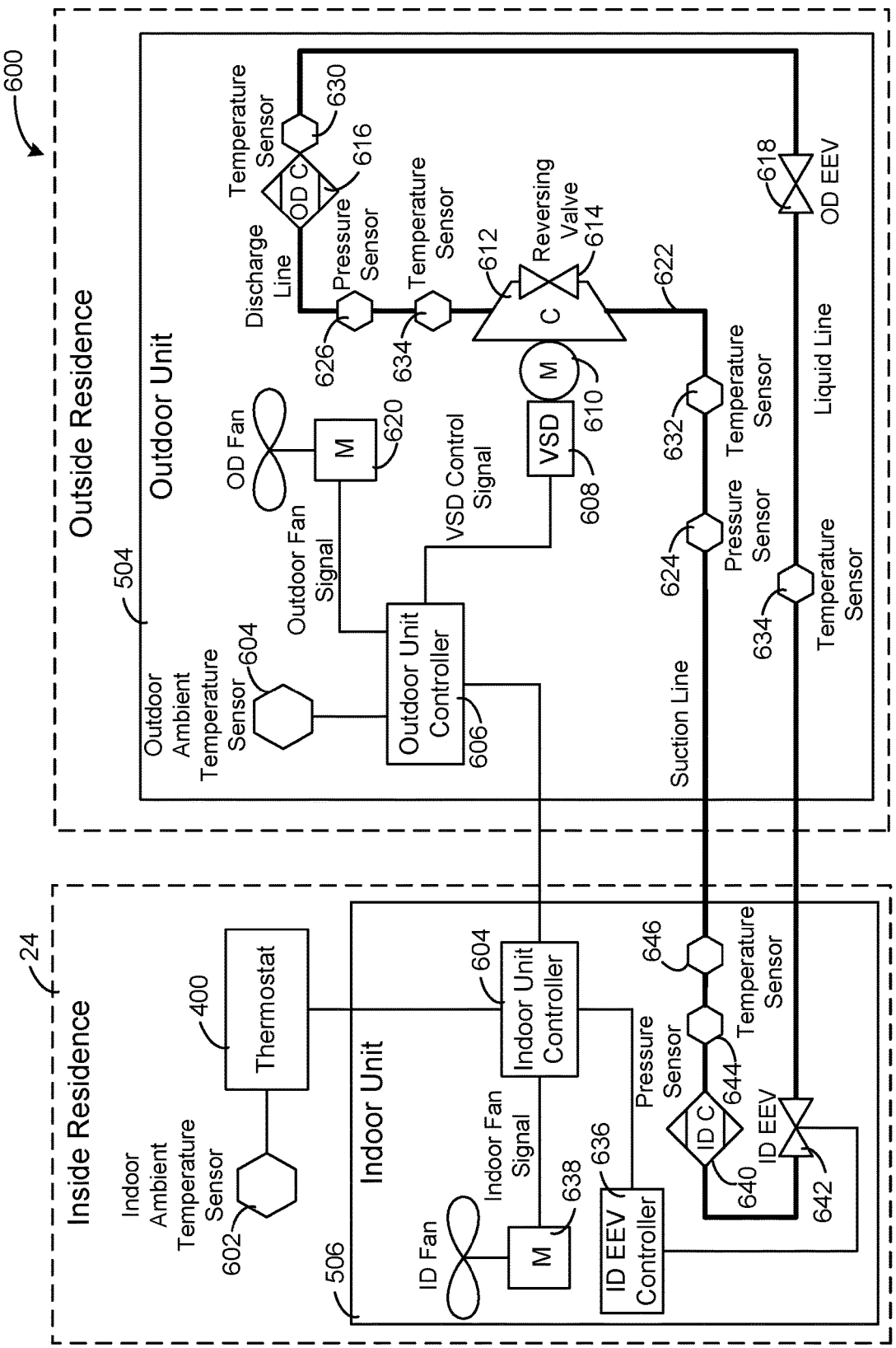
FIG. 6 is a schematic drawing of the thermostat of FIG. 4 and the residential heating and cooling system of FIG. 5, according to an exemplary embodiment.

Referring now to FIG. 6, an HVAC system 600 is shown according to an exemplary embodiment. Various components of system 600 are located inside residence 502 while other components are located outside residence 502. Outdoor unit 504, as described with reference to FIG. 5, is shown to be located outside residence 502 while indoor unit 506 and thermostat 400, as described with reference to FIG. 6, are shown to be located inside the residence 502. In various embodiments, the thermostat 400 can cause the indoor unit 506 and the outdoor unit 504 to heat residence 502. In some embodiments, the thermostat 400 can cause the indoor unit 506 and the outdoor unit 504 to cool the residence 502. In other embodiments, the thermostat 400 can command an airflow change within the residence 502 to adjust the humidity within the residence 502.

Thermostat 400 can be configured to generate control signals for indoor unit 506 and/or outdoor unit 504. The thermostat 400 is shown to be connected to an indoor ambient temperature sensor 602, and an outdoor unit controller 606 is shown to be connected to an outdoor ambient temperature sensor 602. The indoor ambient temperature sensor 602 and the outdoor ambient temperature sensor 604 may be any kind of temperature sensor (e.g., thermistor, thermocouple, etc.). The thermostat 400 may measure the temperature of residence 502 via the indoor ambient temperature sensor 602. Further, the thermostat 400 can be configured to receive the temperature outside residence 502 via communication with the outdoor unit controller 606. In various embodiments, the thermostat 10 generates control signals for the indoor unit 506 and the outdoor unit 504 based on the indoor ambient temperature (e.g., measured via indoor ambient temperature sensor 602), the outdoor temperature (e.g., measured via the outdoor ambient temperature sensor 604), and/or a temperature set point.

The indoor unit 28 and the outdoor unit 504 may be electrically connected. Further, indoor unit 28 and outdoor unit 504 may be coupled via conduits 210. The outdoor unit 504 can be configured to compress refrigerant inside conduits 210 to either heat or cool the building based on the operating mode of the indoor unit 28 and the outdoor unit 504 (e.g., heat pump operation or air conditioning operation). The refrigerant inside conduits 210 may be any fluid that absorbs and extracts heat. For example, the refrigerant may be hydro fluorocarbon (HFC) based R-410A, R-407C, and/or R-134a.

The outdoor unit 504 is shown to include the outdoor unit controller 606, a variable speed drive 608, a motor 610 and a compressor 612. The outdoor unit 504 can be configured to control the compressor 612 and to further cause the compressor 612 to compress the refrigerant inside conduits 210. In this regard, the compressor 612 may be driven by the variable speed drive 608 and the motor 610. For example, the outdoor unit controller 606 can generate control signals for the variable speed drive 608. The variable speed drive 608 (e.g., an inverter, a variable frequency drive, etc.) may be an AC-AC inverter, a DC-AC inverter, and/or any other type of inverter. The variable speed drive 608 can be configured to vary the torque and/or speed of the motor 610 which in turn drives the speed and/or torque of compressor 612. The compressor 612 may be any suitable compressor such as a screw compressor, a reciprocating compressor, a rotary compressor, a swing link compressor, a scroll compressor, or a turbine compressor, etc.

In some embodiments, the outdoor unit controller 606 is configured to process data received from the thermostat 400 to determine operating values for components of the system 600, such as the compressor 612. In one embodiment, the outdoor unit controller 606 is configured to provide the determined operating values for the compressor 612 to the variable speed drive 608, which controls a speed of the compressor 612. The outdoor unit controller 606 is controlled to operate components within the outdoor unit 504, and the indoor unit 506, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

In some embodiments, the outdoor unit controller 604 can control a reversing valve 614 to operate system 600 as a heat pump or an air conditioner. For example, the outdoor unit controller 606 may cause reversing valve 614 to direct compressed refrigerant to the indoor coil 508 while in heat pump mode and to an outdoor coil 616 while in air conditioner mode. In this regard, the indoor coil 508 and the outdoor coil 616 can both act as condensers and evaporators depending on the operating mode (i.e., heat pump or air conditioner) of system 600.

Further, in various embodiments, outdoor unit controller 504 can be configured to control and/or receive data from an outdoor electronic expansion valve (EEV) 518. The outdoor electronic expansion valve 518 may be an expansion valve controlled by a stepper motor. In this regard, the outdoor unit controller 504 can be configured to generate a step signal (e.g., a PWM signal) for the outdoor electronic expansion valve 518. Based on the step signal, the outdoor electronic expansion valve 518 can be held fully open, fully closed, partial open, etc. In various embodiments, the outdoor unit controller 606 can be configured to generate step signal for the outdoor electronic expansion valve 518 based on a subcool and/or superheat value calculated from various temperatures and pressures measured in system 600. In one embodiment, the outdoor unit controller 606 is configured to control the position of the outdoor electronic expansion valve 518 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit controller 606 can be configured to control and/or power outdoor fan 620. The outdoor fan 620 can be configured to blow air over the outdoor coil 616. In this regard, the outdoor unit controller 606 can control the amount of air blowing over the outdoor coil 616 by generating control signals to control the speed and/or torque of outdoor fan 620. In some embodiments, the control signals are pulse wave modulated signals (PWM), analog voltage signals (i.e., varying the amplitude of a DC or AC signal), and/or any other type of signal. In one embodiment, the outdoor unit controller 606 can control an operating value of the outdoor fan 620, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit 504 may include one or more temperature sensors and one or more pressure sensors. The temperature sensors and pressure sensors may be electrical connected (i.e., via wires, via wireless communication, etc.) to the outdoor unit controller 606. In this regard, the outdoor unit controller 606 can be configured to measure and store the temperatures and pressures of the refrigerant at various locations of the conduits 622. The pressure sensors may be any kind of transducer that can be configured to sense the pressure of the refrigerant in the conduits 622. The outdoor unit 504 is shown to include pressure sensor 624. The pressure sensor 624 may measure the pressure of the refrigerant in conduit 622 in the suction line (i.e., a predefined distance from the inlet of compressor 612). Further, the outdoor unit 504 is shown to include pressure sensor 626. The pressure sensor 626 may be configured to measure the pressure of the refrigerant in conduits 622 on the discharge line (e.g., a predefined distance from the outlet of compressor 612).

The temperature sensors of outdoor unit 504 may include thermistors, thermocouples, and/or any other temperature sensing device. The outdoor unit 504 is shown to include temperature sensor 630, temperature sensor 632, temperature sensor 634, and temperature sensor 636. The temperature sensors (i.e., temperature sensor 630, temperature sensor 632, temperature sensor 634, and/or temperature sensor 636) can be configured to measure the temperature of the refrigerant at various locations inside conduits 622.

Referring now to the indoor unit 506, the indoor unit 506 is shown to include indoor unit controller 604, indoor electronic expansion valve controller 636, an indoor fan 638, an indoor coil 640, an indoor electronic expansion valve 642, a pressure sensor 644, and a temperature sensor 646. The indoor unit controller 604 can be configured to generate control signals for indoor electronic expansion valve controller 642. The signals may be set points (e.g., temperature set point, pressure set point, superheat set point, subcool set point, step value set point, etc.). In this regard, indoor electronic expansion valve controller 636 can be configured to generate control signals for indoor electronic expansion valve 642. In various embodiments, indoor electronic expansion valve 642 may be the same type of valve as outdoor electronic expansion valve 618. In this regard, indoor electronic expansion valve controller 636 can be configured to generate a step control signal (e.g., a PWM wave) for controlling the stepper motor of the indoor electronic expansion valve 642. In this regard, indoor electronic expansion valve controller 636 can be configured to fully open, fully close, or partially close the indoor electronic expansion valve 642 based on the step signal.

Indoor unit controller 604 can be configured to control indoor fan 638. The indoor fan 238 can be configured to blow air over indoor coil 640. In this regard, the indoor unit controller 604 can control the amount of air blowing over the indoor coil 640 by generating control signals to control the speed and/or torque of the indoor fan 638. In some embodiments, the control signals are pulse wave modulated signals (PWM), analog voltage signals (i.e., varying the amplitude of a DC or AC signal), and/or any other type of signal. In one embodiment, the indoor unit controller 604 may receive a signal from the outdoor unit controller indicating one or more operating values, such as speed for the indoor fan 638. In one embodiment, the operating value associated with the indoor fan 638 is an airflow, such as cubic feet per minute (CFM). In one embodiment, the outdoor unit controller 606 may determine the operating value of the indoor fan based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The indoor unit controller 604 may be electrically connected (e.g., wired connection, wireless connection, etc.) to pressure sensor 644 and/or temperature sensor 646. In this regard, the indoor unit controller 604 can take pressure and/or temperature sensing measurements via pressure sensor 644 and/or temperature sensor 646. In one embodiment, pressure sensor 644 and temperature sensor 646 are located on the suction line (i.e., a predefined distance from indoor coil 640). In other embodiments, the pressure sensor 644 and/or the temperature sensor 646 may be located on the liquid line (i.e., a predefined distance from indoor coil 640).

Thermostat User Interfaces And Control Functionality

Figure 8B:
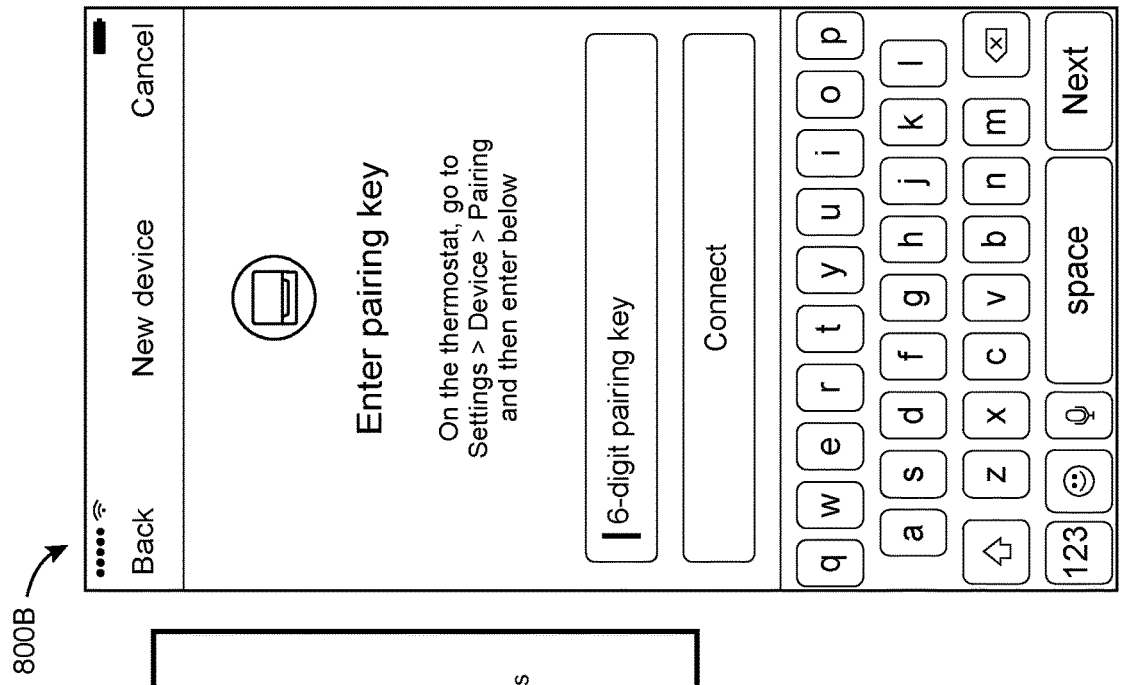
FIG. 8B is a user interface for pairing the user device of FIG. 4 with the thermostat of FIG. 4 that can generated by the user device of FIG. 4 and displayed on a display of the user device of FIG. 4, according to an exemplary embodiment.
Figure 8A:
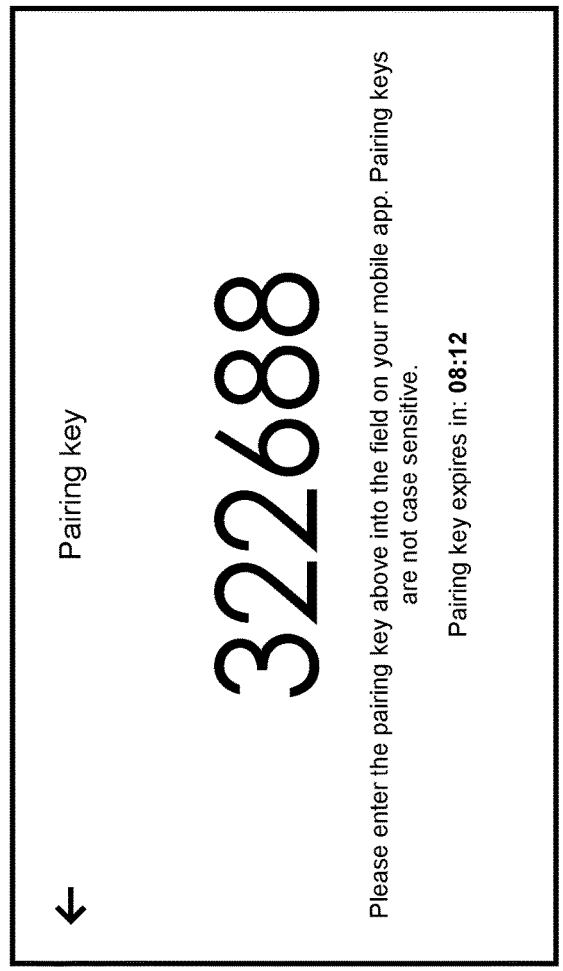
FIG. 8A is a user interface for pairing the user device of FIG. 4 with the thermostat of FIG. 4 that can be generated by the thermostat of FIG. 4 and displayed on the display of the thermostat of FIG. 4, according to an exemplary embodiment.

Referring generally to FIGS. 8A-151, user interfaces are shown for various thermostat control functionalities and user interactions, according to various exemplary embodiments. The user interfaces of FIGS. 8A-151 can be displayed on various devices and/or user interfaces. For example, a thermostat, a mobile device, a laptop computer, a desktop computer and/or any other type of computing device with a display screen and/or user input device (e.g., touch screen input, keyboard, mouse, buttons, etc.) that can be configured to generate and display the user interfaces of FIGS. 8A-151 and/or receive input from a user. The interfaces of FIGS. 8A-151 provide an interactive user experience to an end user for operating a thermostat, reviewing thermostat information, and/or configuring the thermostat. The interfaces can be interfaces displayed by a thermostat to perform scheduling functionality, energy savings functionality, air quality functionality, user role management, equipment installation, and/or various other functionalities as described further elsewhere herein.

Figure 7:
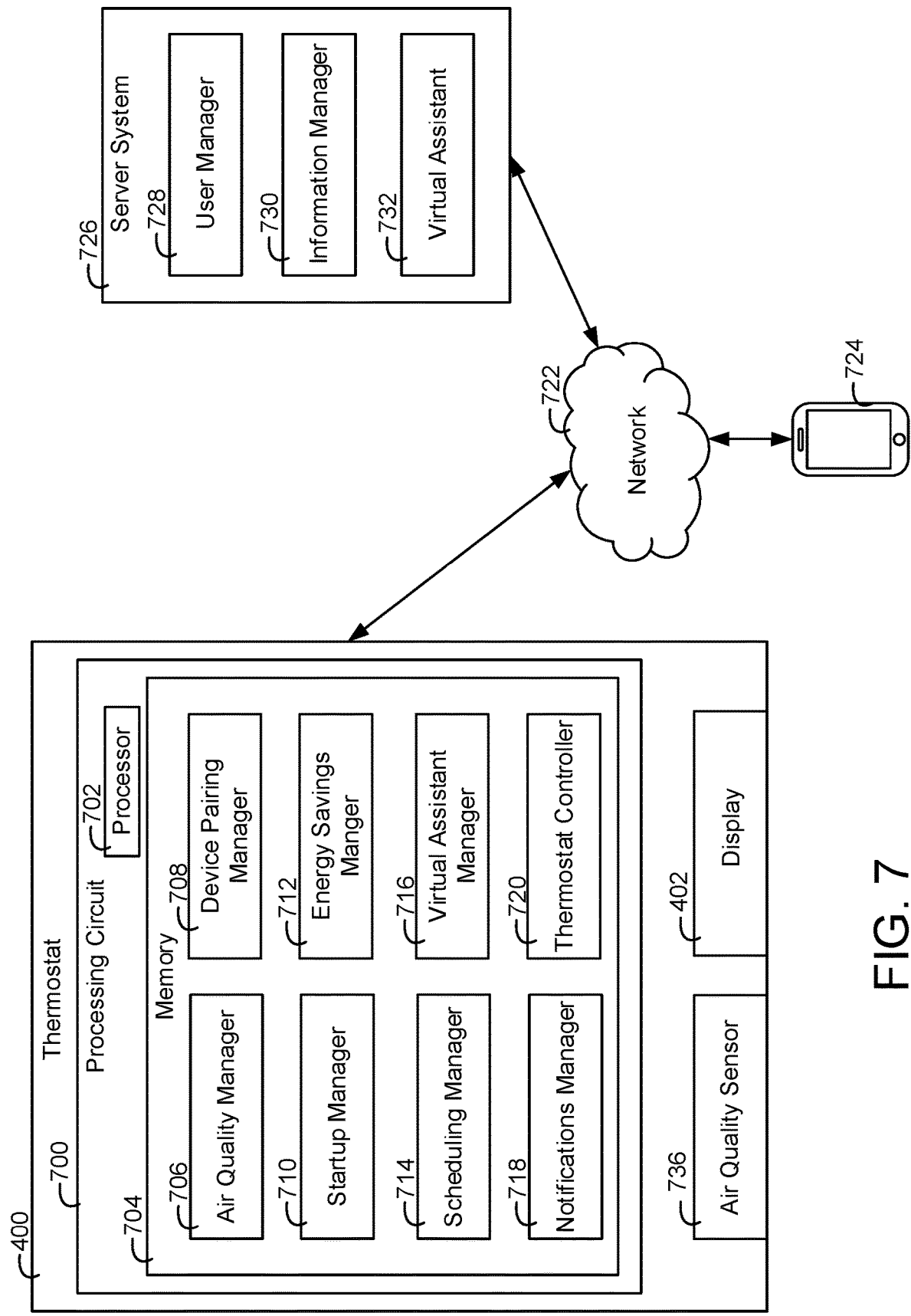
FIG. 7 is a block diagram of the thermostat of FIG. 4 shown in greater detail to communicate with a user device, according to an exemplary embodiment.

Referring now to FIG. 7, the thermostat 400 of FIG. 4 is shown in greater detail, according to an exemplary embodiment. Furthermore, a server system 726 and a user device 724 are shown in FIG. 7 communicating with the thermostat 400 via a network 722. Each of the thermostat 400, the server system 726, and/or the user device 724 can be configured to communicate (e.g., send and/or receive data) among each other via the network 722. The user device 724 can be a smartphone, a tablet, a laptop computer, a desktop computer, and/or any other user device for reviewing interfaces and receiving user input. In some embodiments, the network 722 is at least one of and/or a combination of a Wi-Fi network, a wired Ethernet network, a Zigbee network, a Bluetooth network, and/or any other wireless and/or wired network. The network 722 may be a local area network and/or a wide area network (e.g., the Internet, a building WAN, etc.) and may use a variety of communications protocols (e.g., BACnet, IP, LON, etc.). The network 804 may include routers, modems, and/or network switches. The network 722 may be a combination of wired and wireless networks.

The thermostat 400 is shown to include a processing circuit 700 including a processor 702, and a memory 704. The processor 702 can be implemented as a general purpose processor, an application specific integrated circuit (ASIC), one or more field programmable gate arrays (FPGAs), a group of processing components, or other suitable electronic processing components. The memory 704 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory 704 can be or include volatile memory or non-volatile memory. The memory 704 can include object code components, script components, or any other type of information structure for supporting the various activities and information structures described in the present application. According to some embodiments, the memory 704 is communicably connected to the processor 702 via the processing circuit 700 and can include computer code for executing (e.g., by the processing circuit 700 and/or the processor 702) one or more processes and/or functionalities described herein.

The memory 704 is shown to include an air quality manager 706. The air quality manager 706 can be configured to communicate with an air quality sensor 736 of the thermostat 400 to receive indoor air quality data. The indoor air quality data can include humidity, relative humidity, volatile organic compounds (VOCs), carbon dioxide ($CO_2$), an air quality index (AQI), and/or any other data shown or described herein that is associated with a building that the thermostat 400 is located within.

Furthermore, the air quality manager 706 can be configured to receive outdoor air quality data from a web server, e.g., the server system 726. The air quality manger 706 can be configured to receive air quality data for particular regions (e.g., cities, states, countries, etc.). The air quality manger 706 can be configured to communicate a geographic region, e.g., a zip code, a state name, a city name, etc. to the web server and receive air quality data for said area from the web server. In some embodiments, the air quality manager 706 can receive outdoor air quality data from an outdoor air quality sensor communicably coupled to the thermostat 400 via the network 722. In this regard, a user can install an outdoor air quality sensor outside their home. The outdoor air quality sensor may be a wireless air quality sensor that can communicate to the thermostat 400 and provide the thermostat 400 with outdoor air quality data.

Based on the indoor air quality data and the outdoor air quality data, the air quality manager 706 can be configured to generate interfaces and display the generated user interfaces on the display 402 for communicating air quality conditions to a user. Examples of air quality interfaces that the air quality manager 706 can generate are shown in FIGS. 53-72.

The startup manager 710 is shown to be included in the memory 704. The startup manager 710 can be configured to facilitate an initial installation of the thermostat 400 with building equipment, e.g., the building equipment discussed with reference to FIGS. 1-3 and 5-6 and gathering information for operating the thermostat (e.g., logon to networks, receive a user schedule, etc.). The startup manager 710 can be configured to detect wiring inputs at various wiring terminals via a wiring detection circuit. An example of a thermostat with wiring terminals that can be configured to provide interacting thermostat installation features is shown in U.S. patent application Ser. No. 15/473,142 filed Mar. 29, 2017, the entirety of which is incorporated by reference herein. The startup manager 710 can be configured to generate and display the interfaces of FIGS. 75-108 and/or the interfaces of FIGS. 22A-33M and/or receive user input for the installation via the display 402.

The scheduling manger 714 can be configured to generate operational schedules for the thermostat 400 that can allow the thermostat 400 to heat and/or cool a building based on the generated schedules. The scheduling manger 714 can be configured to generate questions which prompt the user to enter scheduling data. The scheduling manager 714 can be configured to generate a primary schedule, a first schedule, which can serve as a basis for heating and/or cooling operation of the thermostat 400. Furthermore, the scheduling manger 714 can receive secondary scheduling data. The secondary scheduling data may be various occupied and/or non-occupied defined periods in a day. Based on the first and second schedules, the scheduling manager 714 can be configured to operate building equipment. The scheduling manager 714 can be configured to generate the interfaces of FIGS. 75-109 and/or the interfaces of FIGS. 135-146 and cause the display 402 to display the user interfaces. Furthermore, the scheduling manager 714 can be configured to receive scheduling input data from the display 402.

The notifications manager 718 can be configured to generate notifications for the thermostat 400. The notifications may indicate that the thermostat 400 and/or equipment attached to the thermostat require user attention. A notification may indicate that indoor and/or outdoor air quality is poor, equipment is not properly functioning, a filter needs to be replaced, etc. The notifications manager 718 can be configured to generate the interfaces 34-45 and cause the display 402 to display the generated user interfaces. Furthermore, the notifications manager 718 can be configured to receive notification input data from the user via the display 402.

The memory 704 is shown to include the device pairing manger 708. The device pairing manager 708 can be configured to generate (e.g., pseudo-randomly generate) a device pairing key and cause the display 402 to display the device pairing key. The device pairing manager 708 can be configured to facilitate a network connection with the user device 724 based on the user entering the displayed device pairing key into the user device 724. The device pairing manager 708 can be configured to generate the interface of FIG. 8A while the user device 724 can be configured to generate the interface of FIG. 8B. The device pairing manager 708 can be configured to cause the display 402 to display the interface of FIG. 8A and receive any pairing data from the interface of FIG. 8B. The user device 724 can be configured to generate and/or display the interface of FIG. 8B on an interface (e.g., an interface similar to the display 402) and receive pairing data (e.g., the device key displayed on the thermostat 400) from the user.

The energy savings manager 712 is shown to be included by the memory 704. The energy savings manager 712 can be configured to determine an amount of energy savings, generate a user interfaces for the energy savings, and the display 402 to display the indications of energy savings. The energy savings manager 712 can be configured to record an actual equipment runtime of the thermostat 400 based on how long the thermostat 400 causes heating and/or cooling equipment to operate.

The energy savings manager 712 can generate and train predictive models of the thermostat 400, the building that the thermostat 400 is located within, and/or the equipment which the thermostat 400 controls. The energy savings manager 712 can be configured to determine a predicted runtime that would occur if the thermostat 400 did not utilize various energy savings operational and/or scheduling features.

Based on the actual runtime and the predicted ("baseline") runtime, the energy savings manager 712 can be configured to generate the energy savings interfaces. The energy savings manager 712 can determine energy savings the same as, and/or similar to, the thermostat of discussed in U.S. Provisional Patent Application No. 62/595,757 filed Dec. 7, 2017 and U.S. patent application Ser. No. 16/146,659 filed Sep. 28, 2018, the entirety of both of which are incorporated by reference herein. The energy savings manager 717 can be configured to generate the energy savings interfaces shown and described in U.S. Provisional Patent Application No. 62/595,757 filed Dec. 7, 2017 and U.S. patent application Ser. No. 16/146,659 filed Sep. 28, 2018. The energy savings manager 712 can be configured to generate the interfaces shown in FIGS. 9-10. The energy savings manager 712 can be configured to cause the display 402 to display the generated interfaces.

The energy savings manager 712 can be configured to generate an energy savings metric and cause the display 402 to display the energy savings metric. In some embodiments, the energy savings metric is a number of "savings hours." The number of savings hours for a predefined period of time (e.g., a day, a week, a month, etc.) may be defined by the following equation, $$\text{Energy Savings Hours} = \text{Predicted Runtime} - \text{Actual Runtime} \qquad \text{(Equation 1)}$$

where the Energy Savings Hours is the energy savings metric, the Predicted Runtime is the predicted runtime determined if the thermostat 400 were to not utilize energy savings features (e.g., scheduling features, occupancy detection features, etc.), and the Actual Runtime is the actual amount of time the thermostat 400 controlled building equipment. In some embodiments, the metric is a percentage, $$\text{Savings Percentage} = 100\% \left(1 - \frac{\text{Actual Runtime}}{\text{Predicted Runtime}}\right) \qquad \text{(Equation 2)}$$

Another example of a metric may be, $$\text{Savings Percentage} = \frac{\text{Predicted Runtime} - \text{Actual Runtime}}{\text{Predicted Runtime}} \quad \text{(Equation 3)}$$

The memory 704 is shown to include a virtual assistant manager 716. The virtual assistant manager 716 can be configured to integrate the thermostat 400 with a virtual assistant via the server system 726. A virtual assistant, e.g., the virtual assistant 732 of the server system 726, can be a bot configured to integrate natural language processing with the thermostat 400. The virtual assistant 732 can be a virtual assistant e.g., CORTANA and/or SIRI. The virtual assistant manager 716 can be configured to receive typed or spoken data (e.g., via the display 402 and/or a microphone), and provide the data to the virtual assistant 732 via the network 722. The virtual assistant manager 716 can receive information from the server system 726 based on the transmitted data to the server system 726. For example, a user may speak "What is the weather forecast for my city?" to the thermostat 400. This spoken data, and/or data indicative of the spoken data (e.g., a text translation of the spoken data) to the virtual assistant 732. The virtual assistant 732 can be configured to determine the weather forecast for the city and cause the thermostat 400 to display the weather forecast. In some embodiments, the virtual assistant 732 identifies a web page or web page excerpt and causes the display 402 of the thermostat 400 to display the web page or excerpts from the web page.

The memory is shown to include a thermostat controller 720. The thermostat controller 720 can be configured to control building equipment connected to the thermostat 400. In some embodiments, the thermostat controller 720 can be configured to cause an audio device (e.g., an audio device of the thermostat 400 or an audio device connected to the thermostat 4090) to play music. Furthermore, the thermostat controller 720 can be configured to perform various temperature control commands. The thermostat controller 720 can be configured to receive setpoint hold commands. A hold command may be a command to hold a particular setpoint for a predefined amount of time before reverting to a schedule. For example, a user could adjust a setpoint temperature from a schedule setpoint to a manual setpoint and press a two hour hold command. The thermostat controller 720 can be configured to operate the equipment connected to the thermostat 400 based on the manual setpoint for the two hour period after which, the thermostat controller 720 can be configured to revert to the schedule setpoint. The thermostat controller 720 can be configured to generate the interfaces of FIGS. 20-21, 46-52, and/or FIGS. 147-151. The thermostat controller 720 can be configured to cause the display 402 to display the generated interfaces and can be configured to receive user input from the display 402.

FIG. 7 is shown to include the server system 726. The server system 726 can include one or multiple processing circuits configured to perform the functional operations for the server system 726. The server system 726 can include a user manager 728, an information manager 730, and a virtual assistant 732. The server system 726 can be configured to work with the user device 724 to display interfaces to a user. In some embodiments, the server system 726 can be configured to cause a web browser of the user device 724 to display an interface. In some embodiments, the server system 726 can cause a mobile application running on the user device 724 to display certain information provided to the user device 724 by the server system.

The user manager 728 can be configured to manage various user accounts and the access levels which each account is associated with. In some embodiments, the user manager 728 generates a master account for a master user and allows master account to add other user accounts and give those user accounts the ability to control the thermostat 400. In some embodiments, the user manager 728 (or the user device 724) can be configured to generate and display the interfaces shown in FIGS. 16-19.

The information manager 730 can be configured to provide installation information and/or specification information for the thermostat 400 to an end user. The information manager 730 can be configured to generate the interfaces shown in FIGS. 11-15 and/or cause the user device 724 to generate and/or display the interfaces of FIGS. 11-15. In some embodiments, the thermostat 400 is associated with a Quick Response (QR) Code. For example, the QR code may be an adhesive QR code located on an enclosure of the thermostat 400, a printed QR code on the enclosure of the thermostat 400, and/or located on a box of the thermostat 400. In some embodiments, the thermostat 400 can cause the display 402 to display the QR code.

If the user scans the QR code with a scanner (e.g., a camera) of the user device 724, the user device 724 may be configured to navigate to a link to download an application and/or display a particular web page. The application and/or web page may display various specification information for the thermostat 400. Examples of such interfaces are the interfaces of FIGS. 11-15.

Referring now to FIGS. 8A and 8B, interfaces 800A and 800B are shown displaying pairing information, according to various exemplary embodiments. The interface 800A illustrates an interface displayed by the display 402 including a pairing key. The pairing key may be available for a predefined time, i.e., pairing the user device 724 with the thermostat 400 before the time period expires. The predefined time may be displayed on the interface 800A along with a countdown timer indicating the remaining time. In the interface 800B, an input box is shown where a user can input the pairing key shown in the interface 800A. The interface 800B may be displayed on the user device 724. Once the user inputs the pairing key, the user device 724 can pair with the thermostat 400 providing that the user has entered the correct pairing key and the expiration time has not yet expired.

Figure 9:
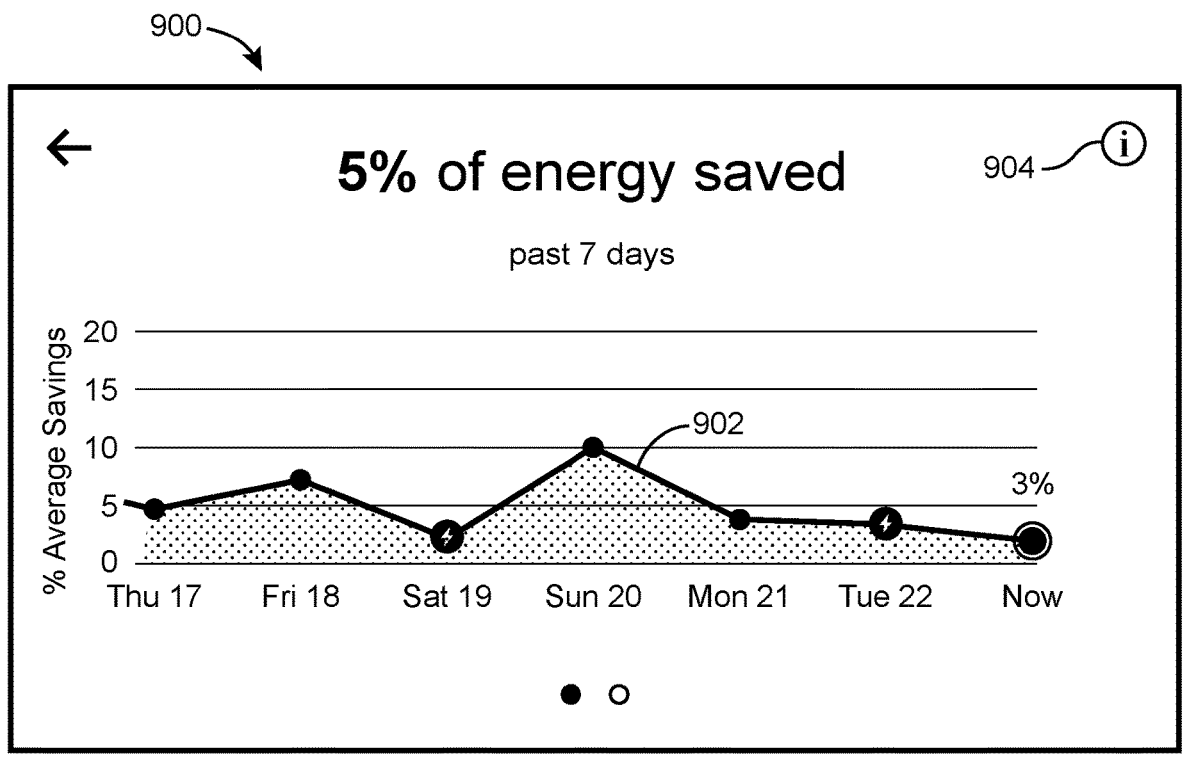
FIG. 9 is a user interface displayed by the thermostat of FIG. 4 for presenting energy savings information to a user in the form of a percentage of energy saved, according to an exemplary embodiment.
Figure 10:
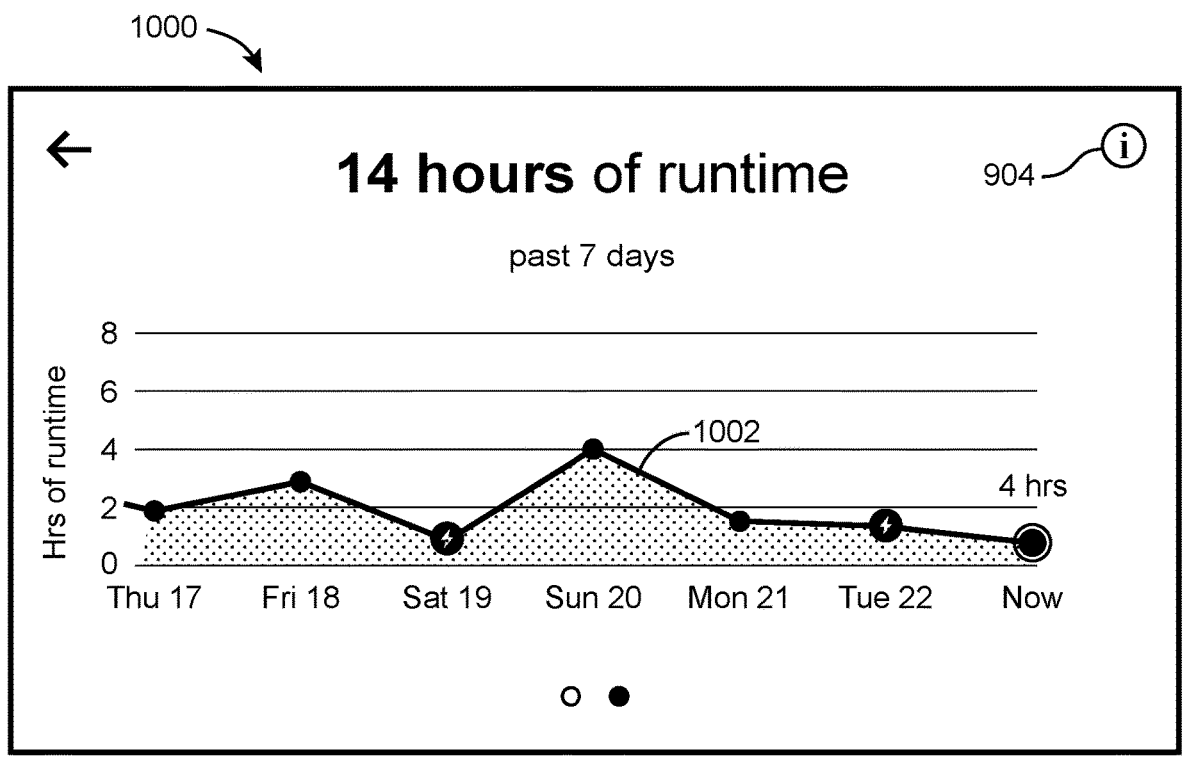
FIG. 10 is a user interfaces displayed by the thermostat of FIG. 4 for presenting energy savings information to a user in the form of hours of equipment runtime, according to an exemplary embodiment.

Referring now to FIGS. 9-10, user interfaces are shown illustrating energy usage of a building system that can be displayed by the thermostat 400, according to various exemplary embodiments. The energy savings manager 712 can be configured to generate and display the interfaces 900 and 1000 on the display 402. The metric trend 902 indicates the energy savings metric (e.g., the metric determined by the Equation 3) over previous days and the current day. If the user swipes to the right in the interfaces 900, the energy savings manager 712 can cause the display 402 to display the interface 1000. The user interface 1000 illustrates a trend 1002 of the hours of runtime recorded by the energy savings manager 712. The information button 904 is shown to be included in the interfaces 900 and 1000. If the user interacts with the information button 904, the user may be presented with information indicating how the energy metrics are generated for the thermostat 400. For example, the display 402 may provide an indication of (or the actual) equation used to determine the energy savings metrics (e.g., Equation 3).

Figure 12:
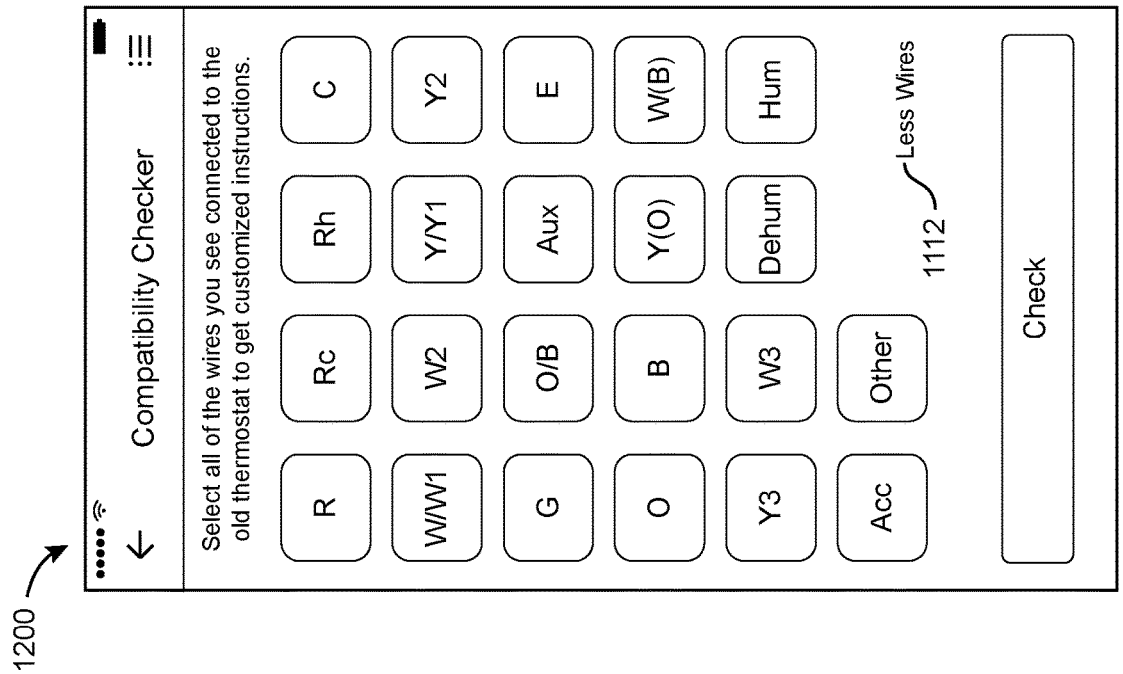
FIG. 12 is a user interface including additional wire selection inputs for detecting whether the thermostat of FIG. 4 is compatible with building equipment of a user, according to an exemplary embodiment.
Figure 11:
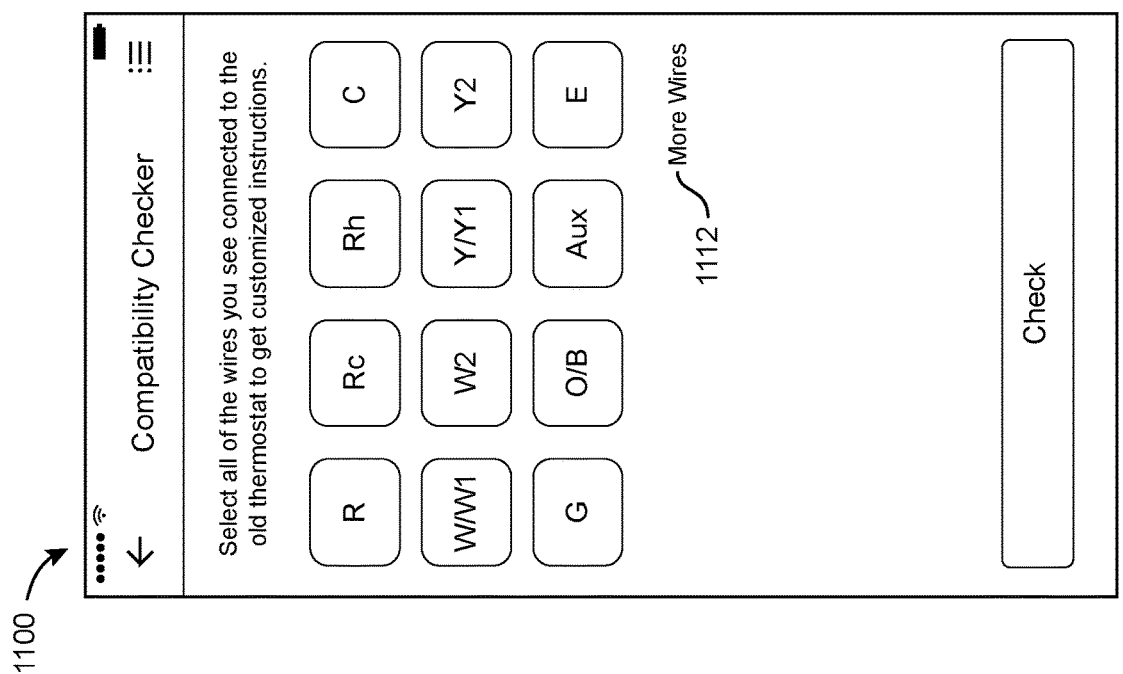
FIG. 11 is a user interface including wire selection inputs for detecting whether the thermostat of FIG. 4 is compatible with building equipment of a user, according to an exemplary embodiment.
Figure 17:
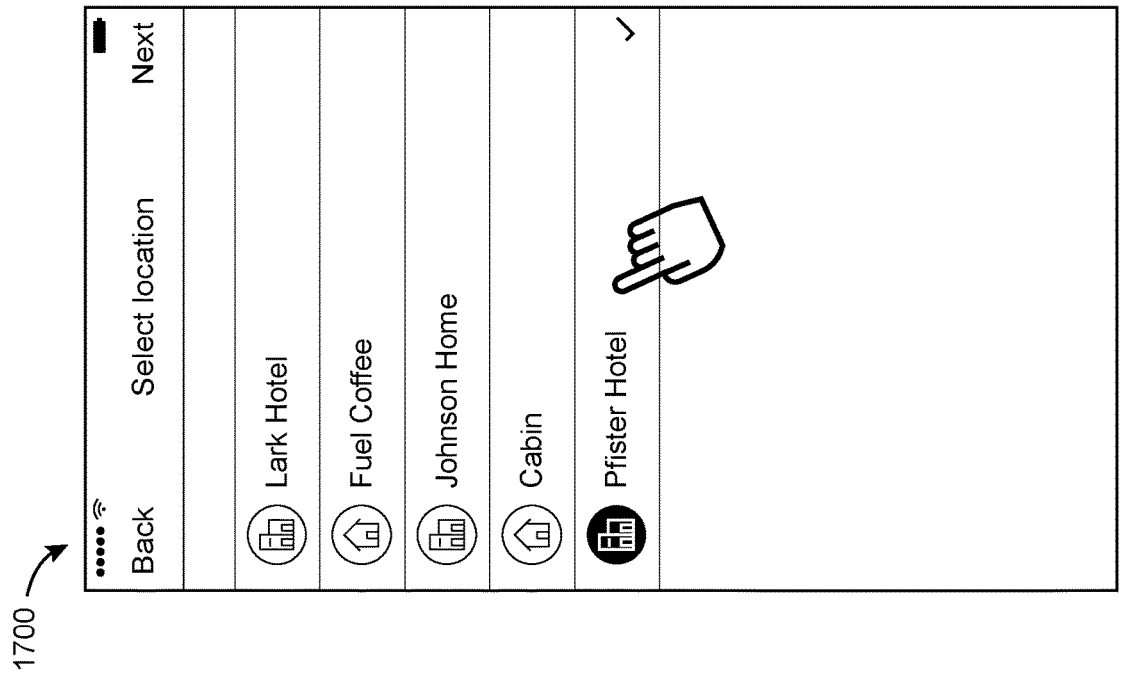
FIG. 17 is a user interface for selecting a location associated with the user searched in FIG. 16, according to an exemplary embodiment.
Figure 16:
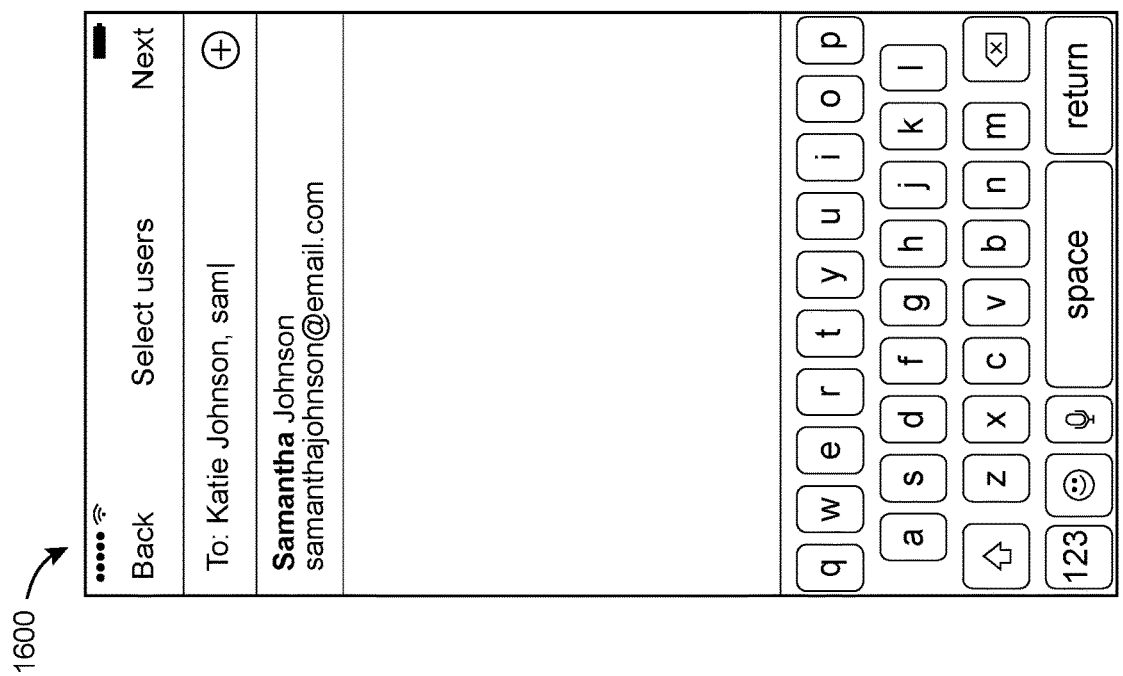
FIG. 16 is a user interface for searching a user in order to manage user accounts associated with the thermostat of FIG. 4, according to an exemplary embodiment.
Figure 19:
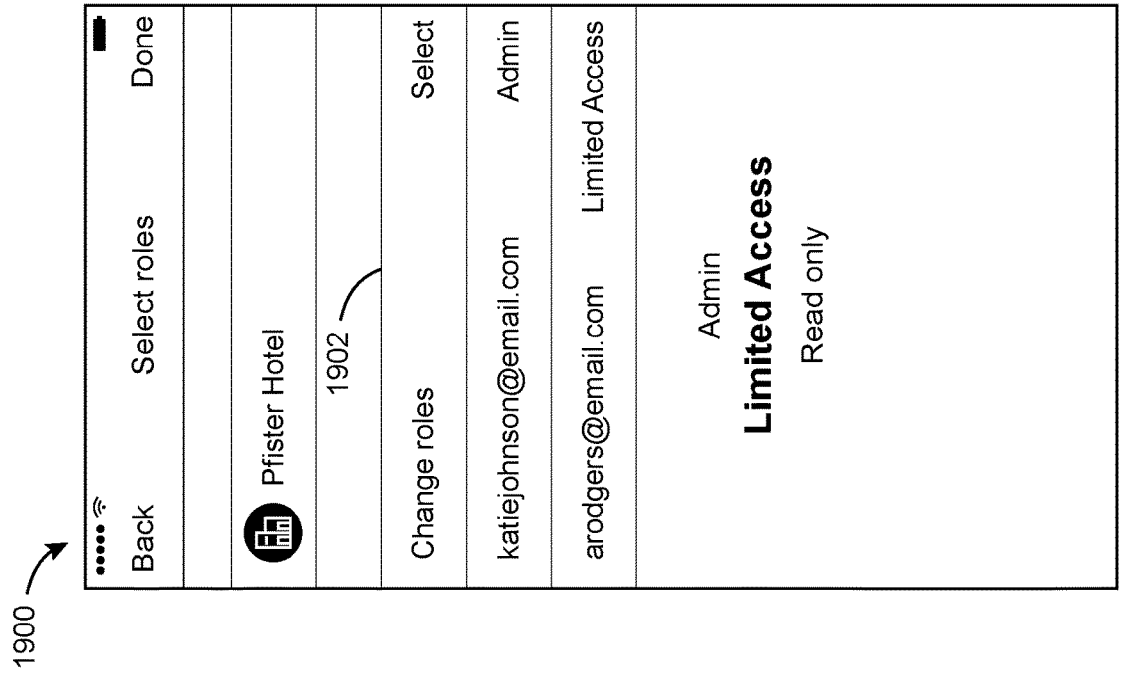
FIG. 19 is a user interface allowing a user to change roles of users for the selected location of FIG. 17, according to an exemplary embodiment.
Figure 18:
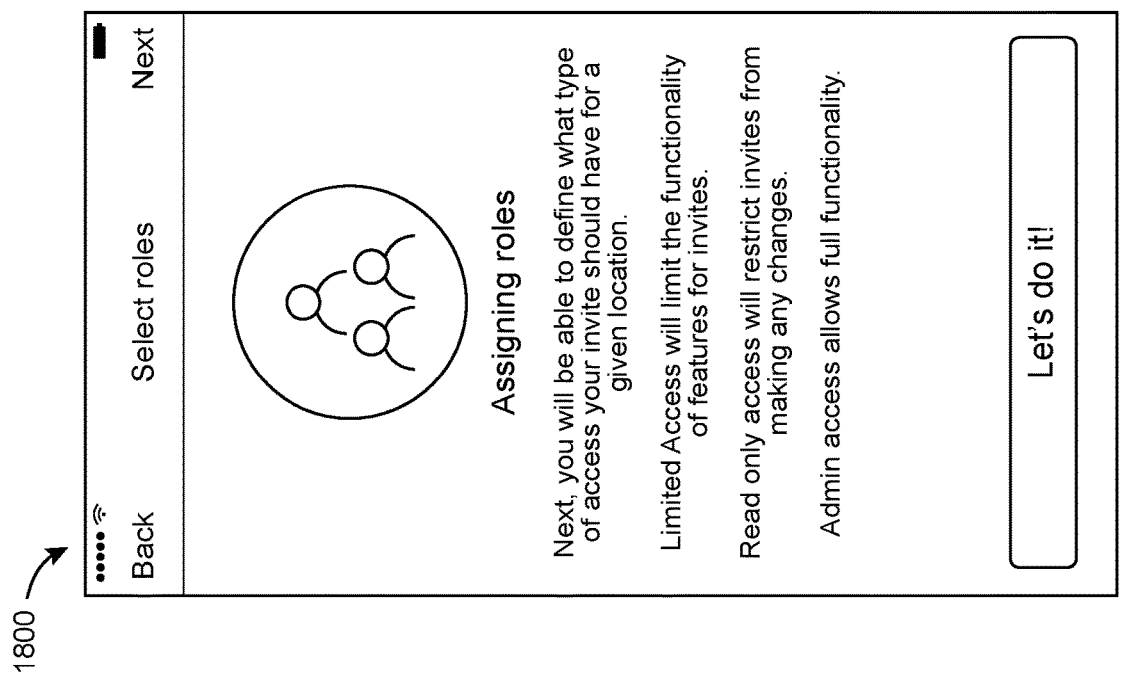
FIG. 18 is a user interface providing a user with information on assigning different roles to a user, according to an exemplary embodiment.

Referring now to FIGS. 11-12, interfaces 1100-1200 are shown for determining whether the thermostat 400 is compatible with an existing HVAC configuration of a user, according to various exemplary embodiments. The user interfaces 1100-1200 may be displayed in response to a user scanning a QR code of the thermostat 400 located on a packaging box of the thermostat 400. In this regard, a user can determine whether their existing HVAC system is compatible with the thermostat 400 before the user opens the box and/or purchases the thermostat 400. The interface 1100 includes multiple power connections (e.g., R, Rc, Rh, and C) various heating and cooling stage connections (e.g., W/W1, W2, Y/Y2, Y2), a fan connection (G), a reversing valve control connection (O/B), an auxiliary connection (AUX), and an emergency heat relay control connection for a heat pump (E).

A user can select the connections shown in FIG. 11. The user device 724 and/or the server system 726 can be configured to compare selected connections to a set of allowed connections to determine whether the thermostat 400 is compatible with a current HVAC system of the user. In the interface 1200, additional connections are displayed in response to the user interacting with the "More Wires" interface element 1112. The additional connections may be an energize to cool connection (O), an energize to heat connection (B), a cooling contractor connection (Y(O)), a heat relay or value connection (W(B)), a third stage cooling connection (Y3), a third stage heating connection (W3), a dehumidifier connection (Dehum), a humidifier connection (Hum), an accessory connection (Acc), and/or any other connection.

Referring now to FIGS. 13-15, interfaces indicating whether a current HVAC system of a user is compatible with the thermostat 400 is shown, according to various exemplary embodiments. The user device 724 and/or the server system 726 can be configured to display the interfaces 1300, 1400, and/or 1500 based on the input entered by the user via the interfaces 1100-1200. The interface 1300 may indicate that the current HVAC system is compatible with the thermostat 400 while the interface 1500 may indicate that the current HVAC system is not compatible with the thermostat 400. If the selected inputs indicate an unrecognizable system, the interface 1400 can be displayed indicating that additional information (e.g., a photo) is necessary for determining whether the thermostat 400 is compatible. This screen shot can be emailed to a technical support member.

The interface 1300 is shown to include a "Download wiring diagram" user interface element 1302. When a user interacts with this element, a wiring diagram can be generated and/or retrieved based on the thermostat 400 and/or the wiring inputs indicated via the interfaces 1100-1200. Interfaces 1400 and 1500 are shown to include "Call GLAS support team" interface elements 1402. Interacting with the element 1402 can cause the user device 724 to place a call to the support team. Interacting with the "Email GLAS support team" element 1404 may open an email client of the user device 724 and cause an email to be prepared directed to a predefined email address of the support team.

Referring now to FIGS. 16-19, interfaces 1600-1900 are shown for assigning various user roles for the thermostat 400, according to an exemplary embodiment. The user device 724 and/or the server system 726 can be configured to generate and/or display the interfaces 1600-1900 of FIGS. 16-19. The interfaces 1600-1900 may be user interfaces displayed to a master user who has installed the thermostat 400 and generated a master account for the thermostat 400. The interface 1600 is shown to include a search interface for indicating various user contacts (e.g., one or multiple contacts) (e.g., emails, phone numbers, etc.) that the master user can select. Once the users are selected in the interface 1600, the interface 1700 may be displayed. Via the interface 1700, the master user can select one or multiple locations that the master user would like the selected users of interface 1600 to have access to. The titles may indicate buildings, hotels, schools, or other locations where the thermostat 400 or a similar thermostat associated with the master user is installed. Once the master user has selected the thermostats, the user can select what role each of the user receives. For example, each selected user can, for a particular building, have an "Admin" account, a "Limited Access" account, or a "Read Only" account. Via the "Change roles" element 1902, the user can perform a bulk edit of multiple user roles or of multiple buildings simultaneously.

Figure 20:
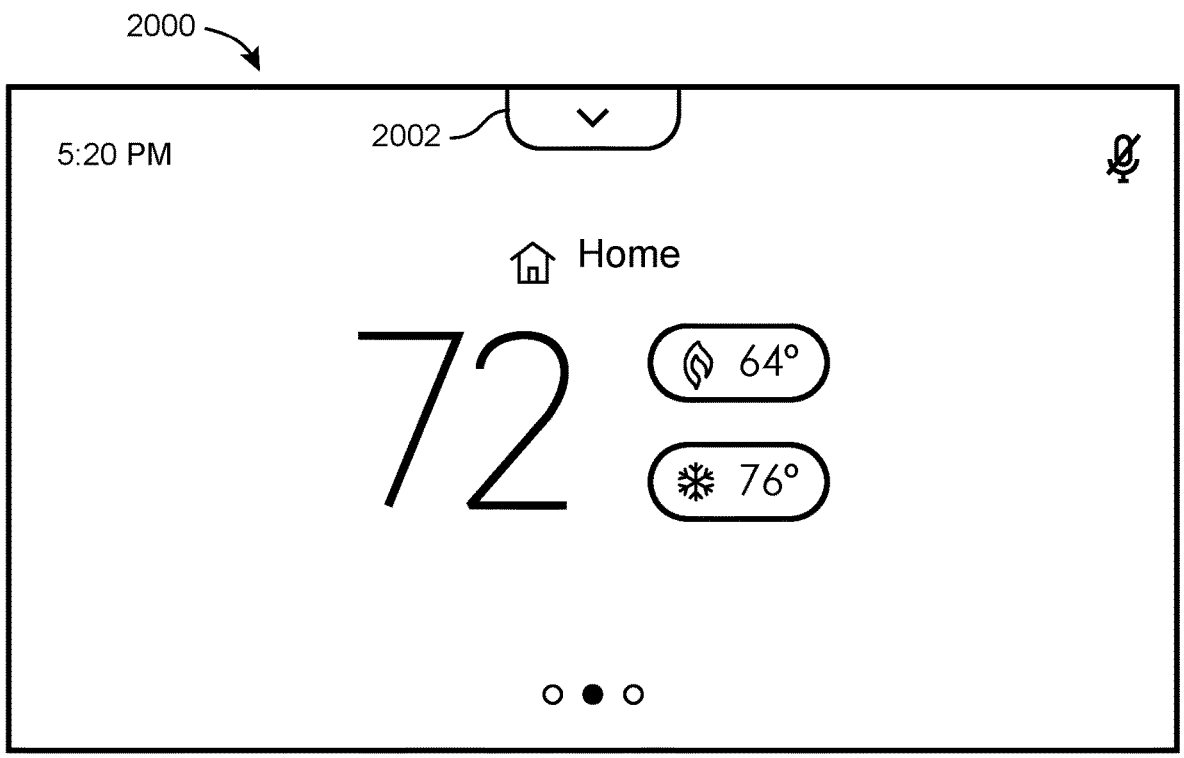
FIG. 20 is a user interfaces displayed by the thermostat of FIG. 4 including an interface element for accessing a media control panel, according to an exemplary embodiment.
Figure 21:
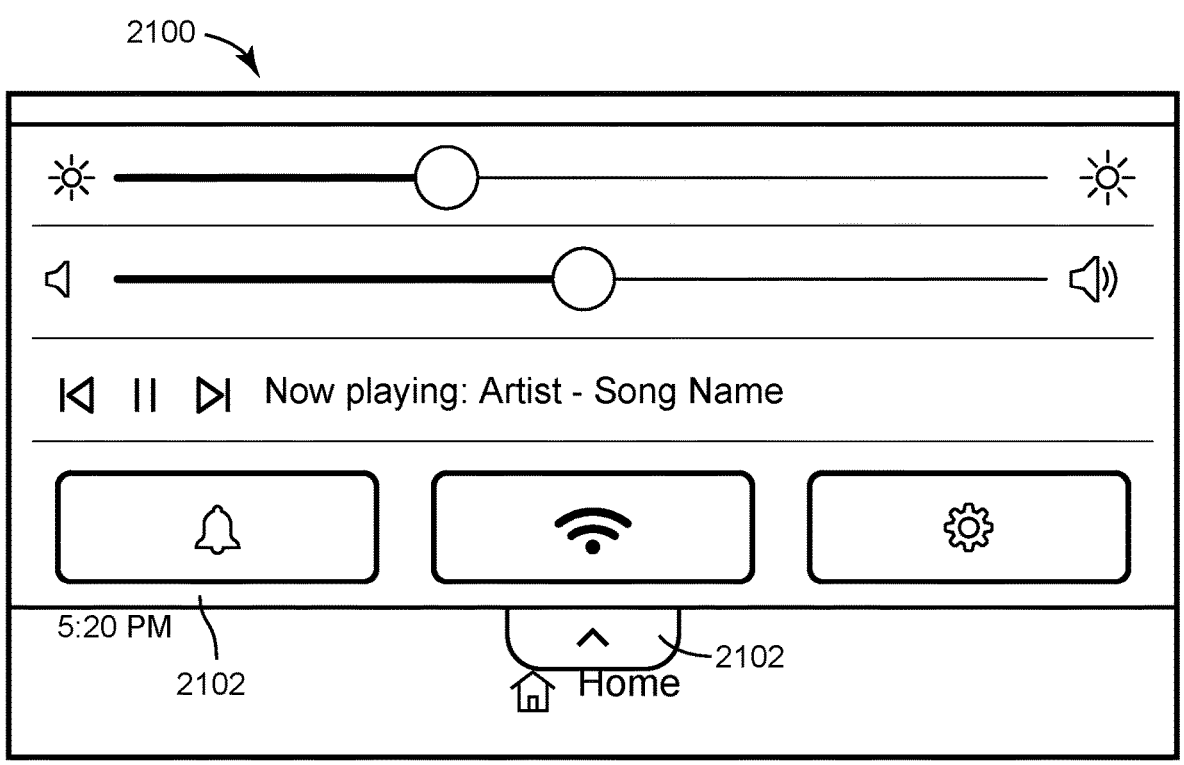
FIG. 21 is a user interfaces displayed by the thermostat of FIG. 4 including the media control panel accessed via the interface element of FIG. 20, according to an exemplary embodiment.

Referring now to FIGS. 20-21, interfaces 2000 and 2100 including a media tray are shown according to an exemplary embodiment. The thermostat controller 720 can be configured to generate the interfaces 2000 and 2100 and cause the display 402 to display the interfaces 2000 and 2100. The interface 2000 may be a home screen interface displaying a temperature, a heating setpoint, and a cooling setpoint. If a user interacts with (e.g., swipes down), down element 2002, a media tray 2102 may be displayed (e.g., as shown in FIG. 21). The interface 2100 is shown to display information for controlling and/or adjusting the thermostat 400. For example, the thermostat controller 720 can be configured to play a song via a speaker of the thermostat 400. The title of the song and/or a song artist can be displayed on the interface 2100 in addition to controls (e.g., a pause play button, a forward track button, a backward track button, etc.). The interface 2100 may also include a volume slider for adjusting the volume of the thermostat 400. The interface 2100 is also shown to include a brightness slider for adjusting the brightness of the user interface 402.

Figure 22A:
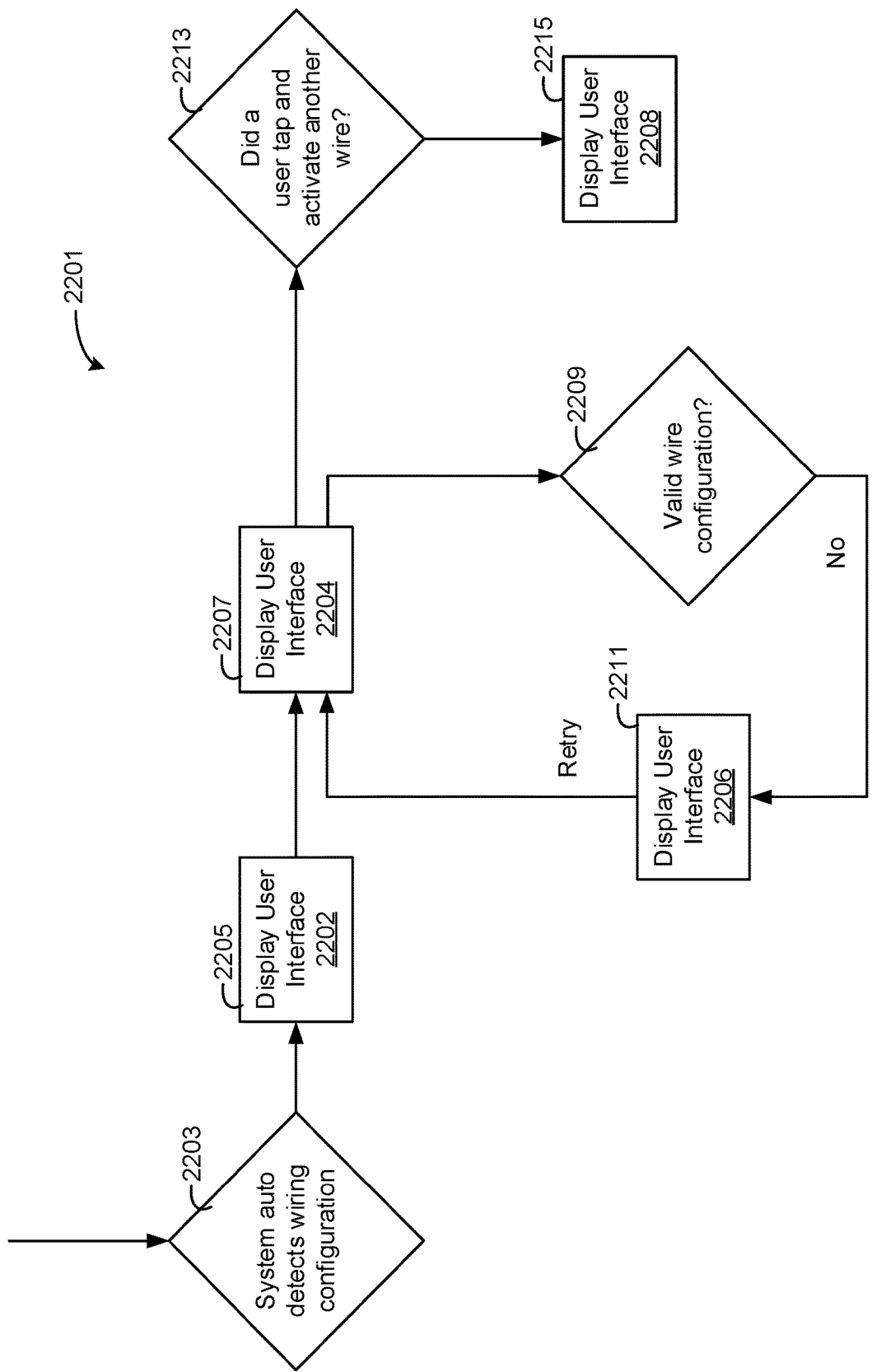
FIG. 22A is a process for displaying installation user interfaces and installing the thermostat of FIG. 4 by detecting and confirming a wiring configuration, according to an exemplary embodiment.
Figure 22B:
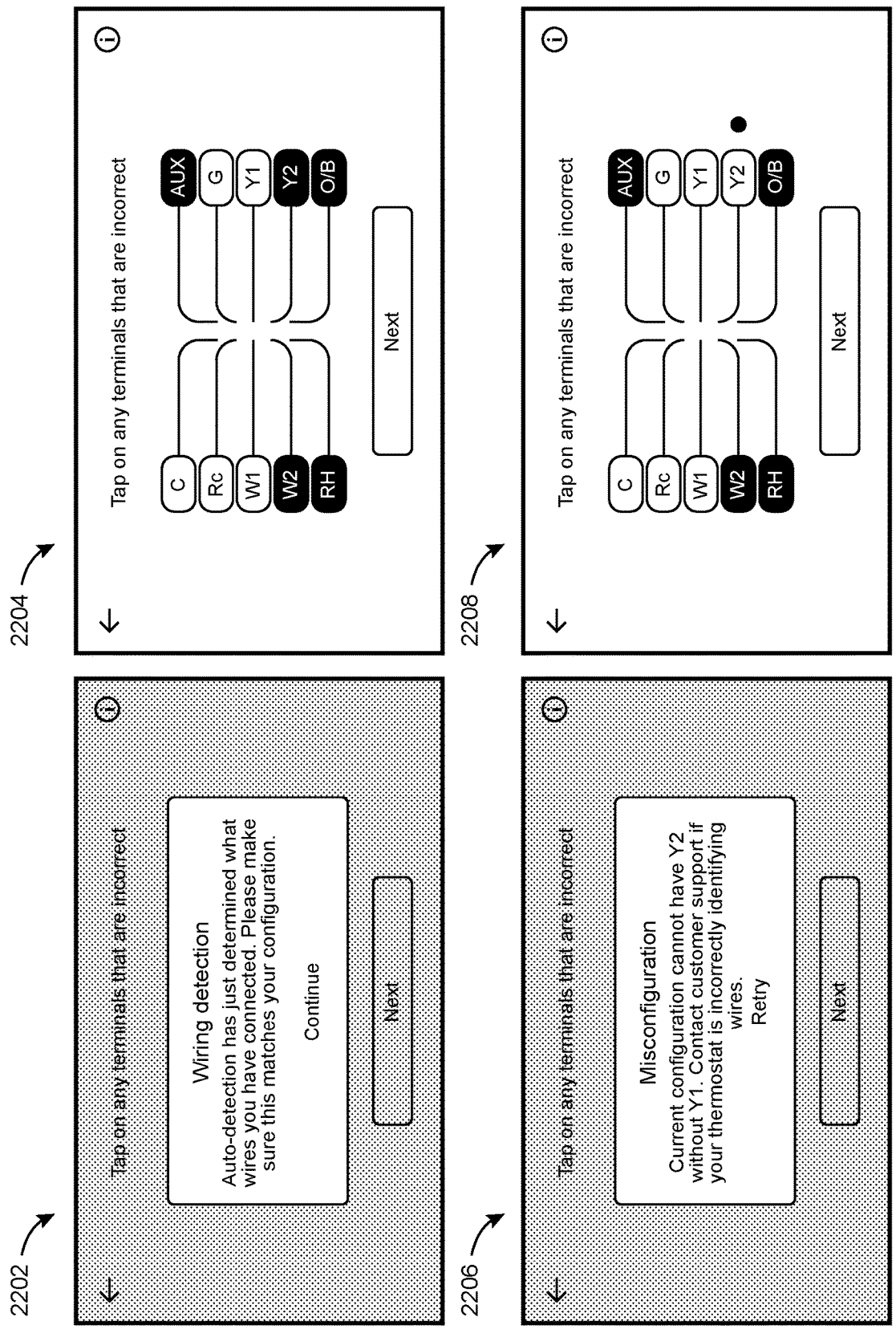
FIG. 22B are user interfaces displayed in the process of FIG. 22A providing a user with feedback and a detected wiring configuration, according to an exemplary embodiment.

Referring now to FIGS. 22A-22B, a process 2201 for generating the interfaces 2202-2206 is shown for helping a user install the thermostat 400, according to an exemplary embodiment. Startup manager 710 can detect whether wires have been inserted into wiring terminals of the thermostat 400 (step 2203). In response to detecting the wires, the startup manager 710 can generate and/or display an interface 2202 shown in greater detail in FIG. 22B (step 2205). The interface 2202 can inform a user that the thermostat 400 has just detected wires connected with the thermostat 400. The startup manager 710 can then display the interface 2204 (step 2207). The interface 2204 indicates highlighted terminals that have been detected. The user can tap on the terminals to select or deselect the wiring terminals to correct for any errors that the thermostat 400 may have made in the detection of the wiring.

The startup manager 710 can determine whether the currently selected wiring configuration is valid (step 2209). If the configuration is not valid, the startup manager 710 can display the interface 2206 indicating that the wiring configuration is incorrect (step 2211). The interface can further provide the user with a reason for the incorrect configuration. As shown in the interface 2206, a notification is shown indicating to a user that for a dual stage system, there must exist two connections. The user can then update the connections via the user interface 2204 (step 2213). As shown in FIG. 2208, if the user taps a connection of the interface 2204 to add a wire not already detected, the interface 2208 will add a dot next to the wire connection to indicate that the user has added the connection (step 2215). A dot can also be added next to a connection that a user has deselected. The dot can help a user keep track of which connections were automatically detected by the thermostat 400 and which connections were manually defined by the user.

Figure 23:
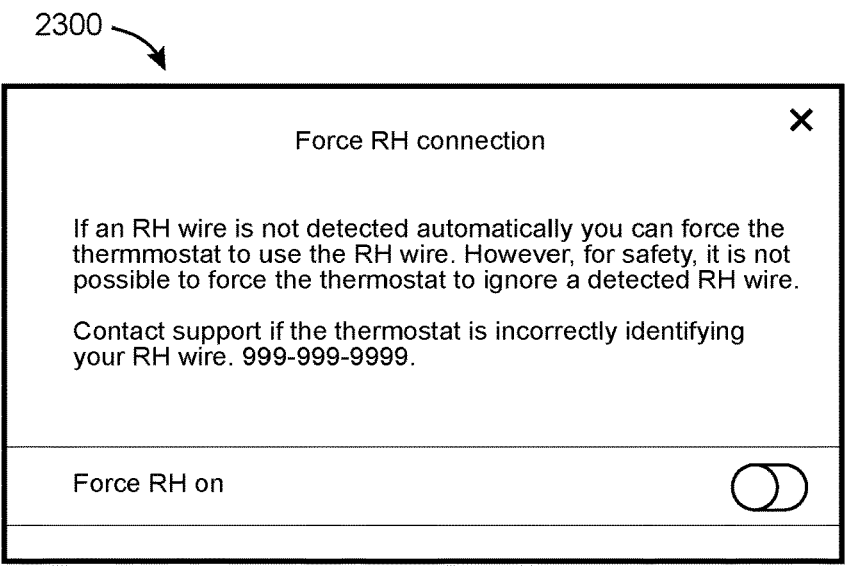
FIG. 23 is a user interface for forcing a hot wire heating (RH) power connection if the thermostat of FIG. 4 did not sense a connection to an RH terminal, according to an exemplary embodiment.
Figure 24:
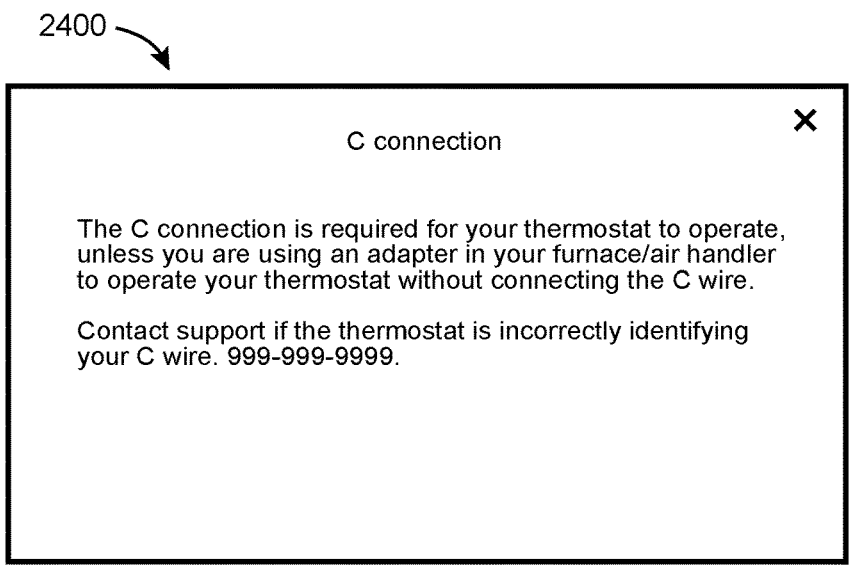
FIG. 24 is a user interface for forcing an common wire connection if the thermostat of FIG. 4 did not sense a connection to an common terminal, according to an exemplary embodiment.
Figure 25:
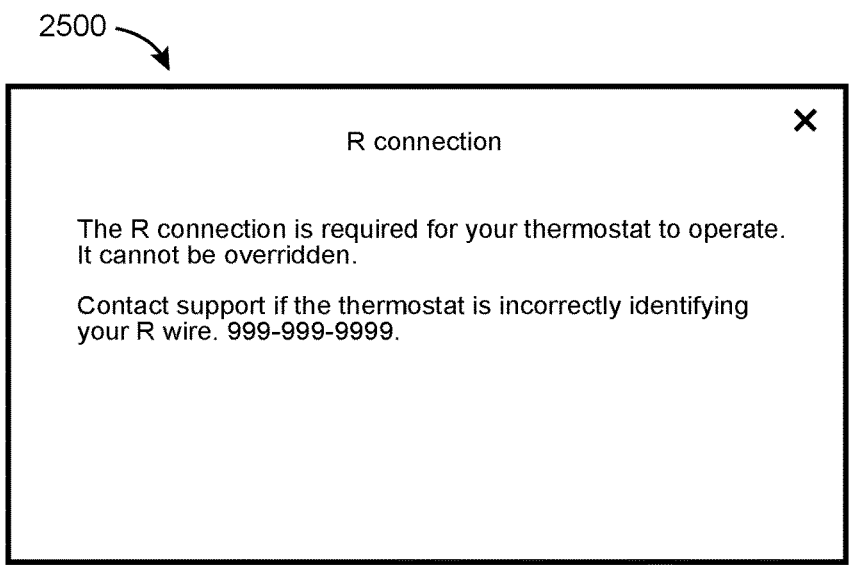
FIG. 25 is a user interface for forcing an hot wire (R) connection if the thermostat of FIG. 4 did not sense a connection to an R terminal, according to an exemplary embodiment.
Figure 28:
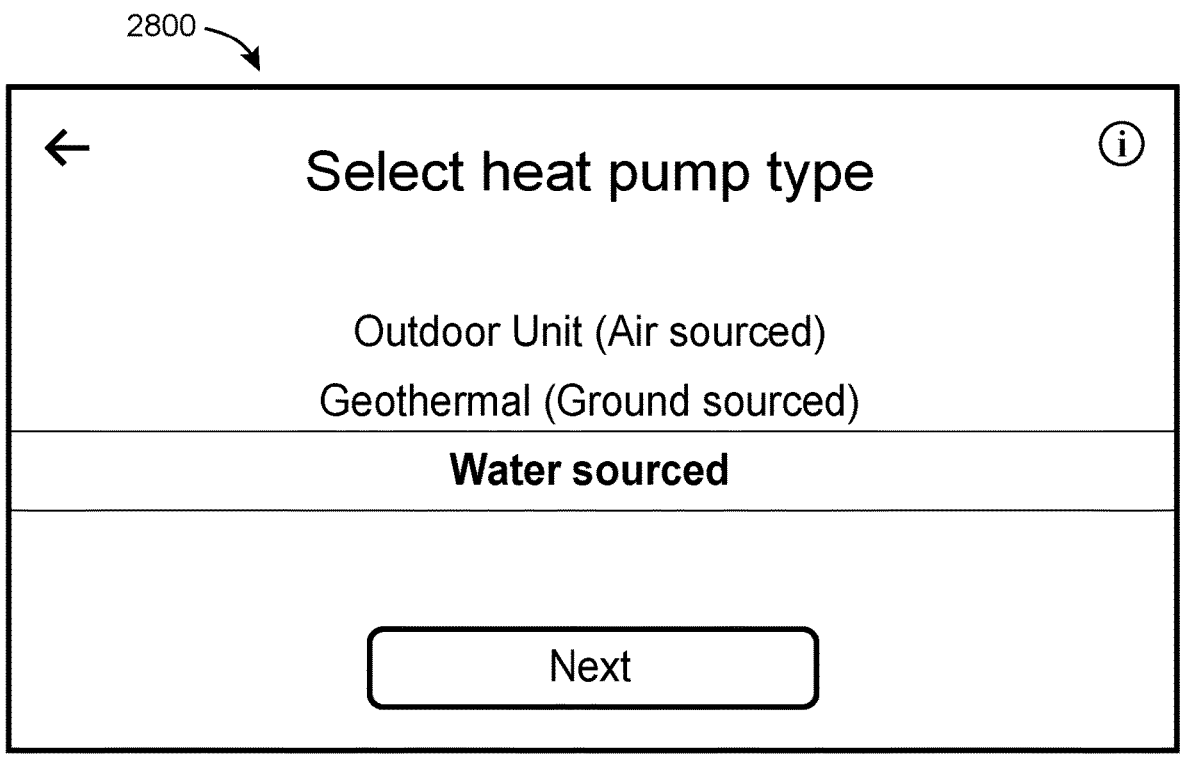
FIG. 28 is a user interface for identifying a heat pump type for a heat pump connected to the thermostat of FIG. 4, according to an exemplary embodiment.
Figure 29A:
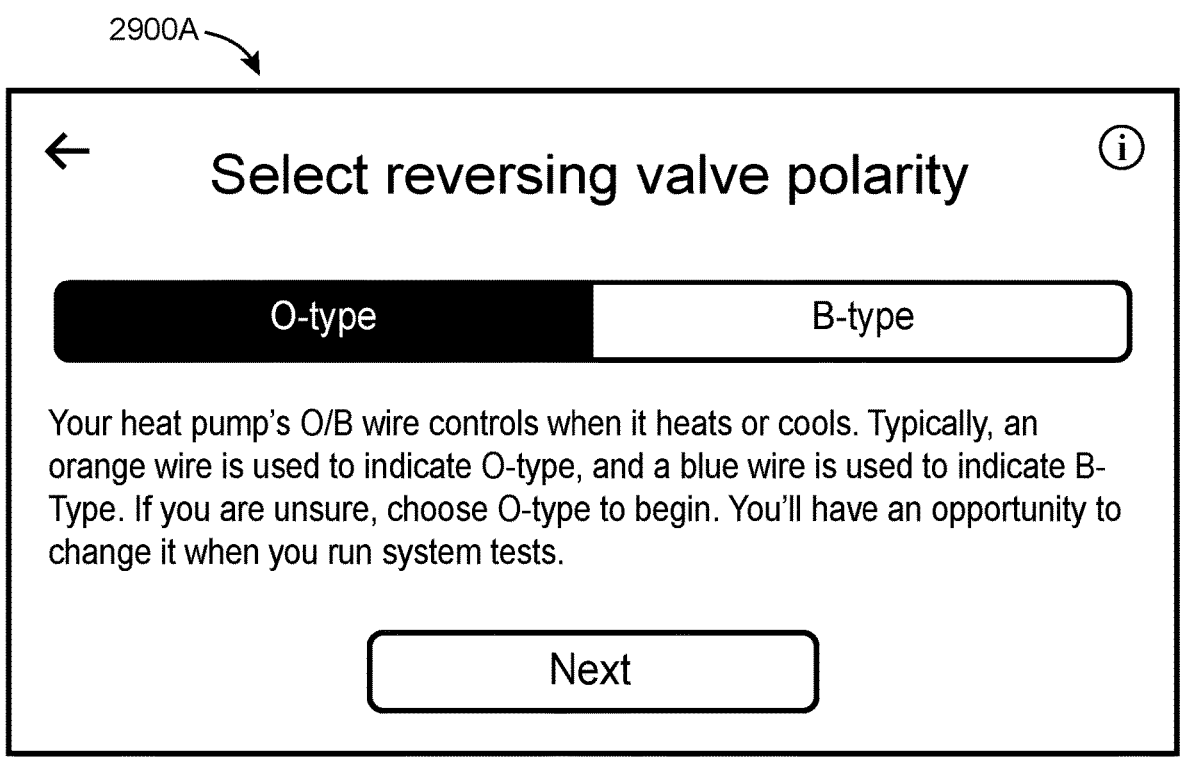
FIG. 29A is a user interface for identifying a reversing valve polarity of the heat pump connected to the thermostat of FIG. 4, according to an exemplary embodiment.
Figure 29B:
FIG. 29B is a user interface for identifying auxiliary equipment connected to the thermostat of FIG. 4, according to an exemplary embodiment.
Figure 29C:
FIG. 29C is a user interface for identifying a thermostat operating mode for the thermostat of FIG. 4 to perform a test to verify proper connections to equipment connected to the thermostat of FIG. 4, according to an exemplary embodiment.

Referring now to FIGS. 23-25, interfaces 2300, 2400, and 2500 are shown for indicating to an end user specific connection information for wiring connections to the thermostat 400. If the user taps on an RH wire of the interface 2204, the interface 2300 may be displayed giving a user additional information regarding the purpose of the RH wire. If the user taps on the C wire of the interface 2204, the interface 2400 may be displayed indicating the purpose of the C wire. If the thermostat 400 is connected to HVAC equipment via a wire adapter box, the C wire may not be lit up. If the wire taps on the R wire, the interface 2500 may be displayed. The R wire may be required for operation of the thermostat 400 and thus override of this connection may not be available to the user.

Referring now to FIGS. 26-29C, question interfaces 2600-2900C are shown for receiving equipment information from a user, according to various exemplary embodiments. If the user selected the W1 and/or W2 connections of the interface 2204, they may be presented with the selection interface 2600 prompting the user to select a heating type. If there is no connection type, the interface 2600 will not include an "(aux)" request. If the user has selected W1, W2, and Fan in the interface 2204, the user may be displayed with a heating method request, the interface 2700 to identify the type of heating system of the user. If the user has selected the Y1 and/or Y2 connections of the interface 2204, the interface 2800 can be displayed to a user to select a type of heat pump to be controlled by the thermostat 400. Furthermore, if the user has indicated, based on the connection of the interface 2204, that a heat pump is present, the interface 2900A can be presented to a user to prompt the user to select a type of reversing valve. If the AUX wire of the thermostat 400 is connected in the interface 2204, the interface 2900B can be presented to a user to select the type of equipment that is to be controlled by the AUX connection. Finally, the user may be presented with a test start interface 2900C where a user can select to start a system test in one of multiple modes (e.g., auto, cooling, heating, etc.).

Figure 30:
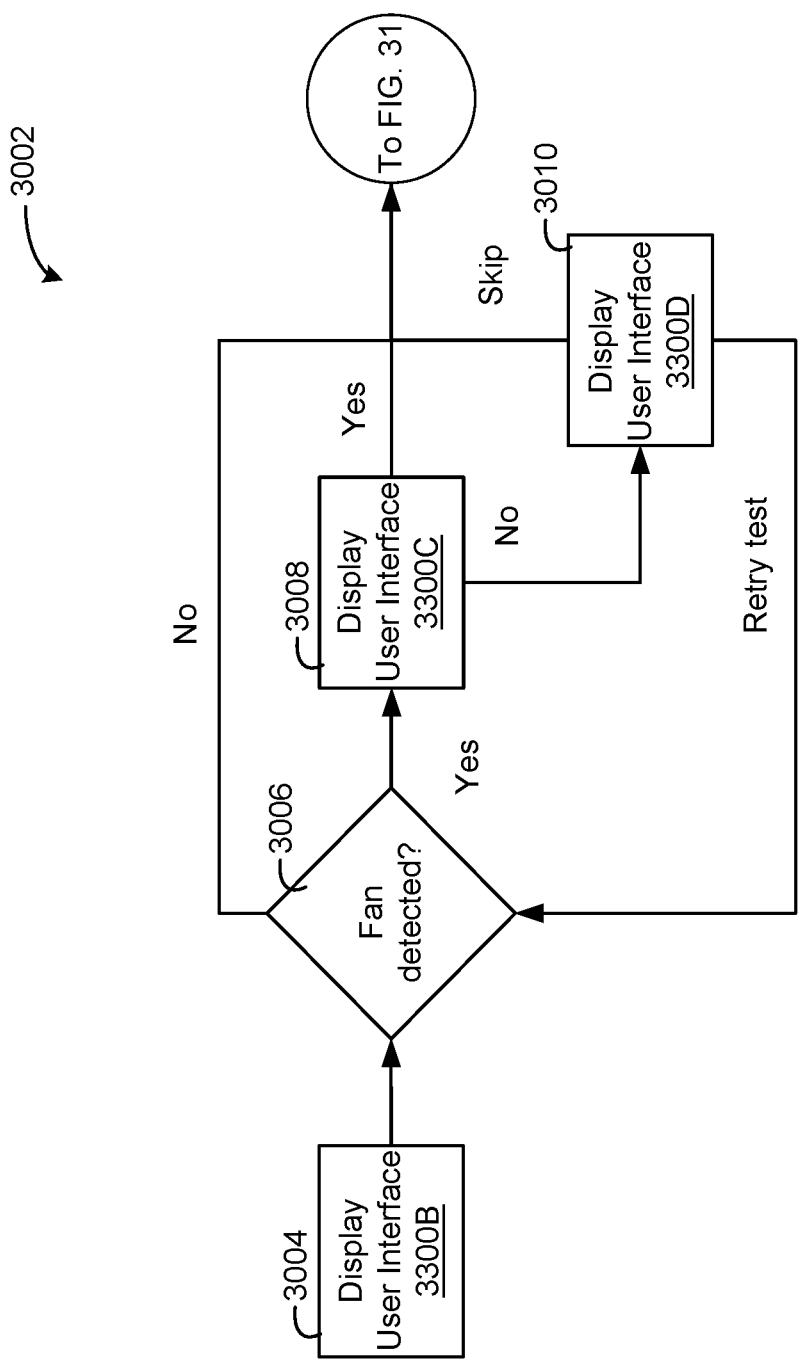
FIG. 30 is a process for displaying user interfaces and verifying whether a fan connected to the thermostat of FIG. 4 is operating properly, according to an exemplary embodiment.
Figure 31:
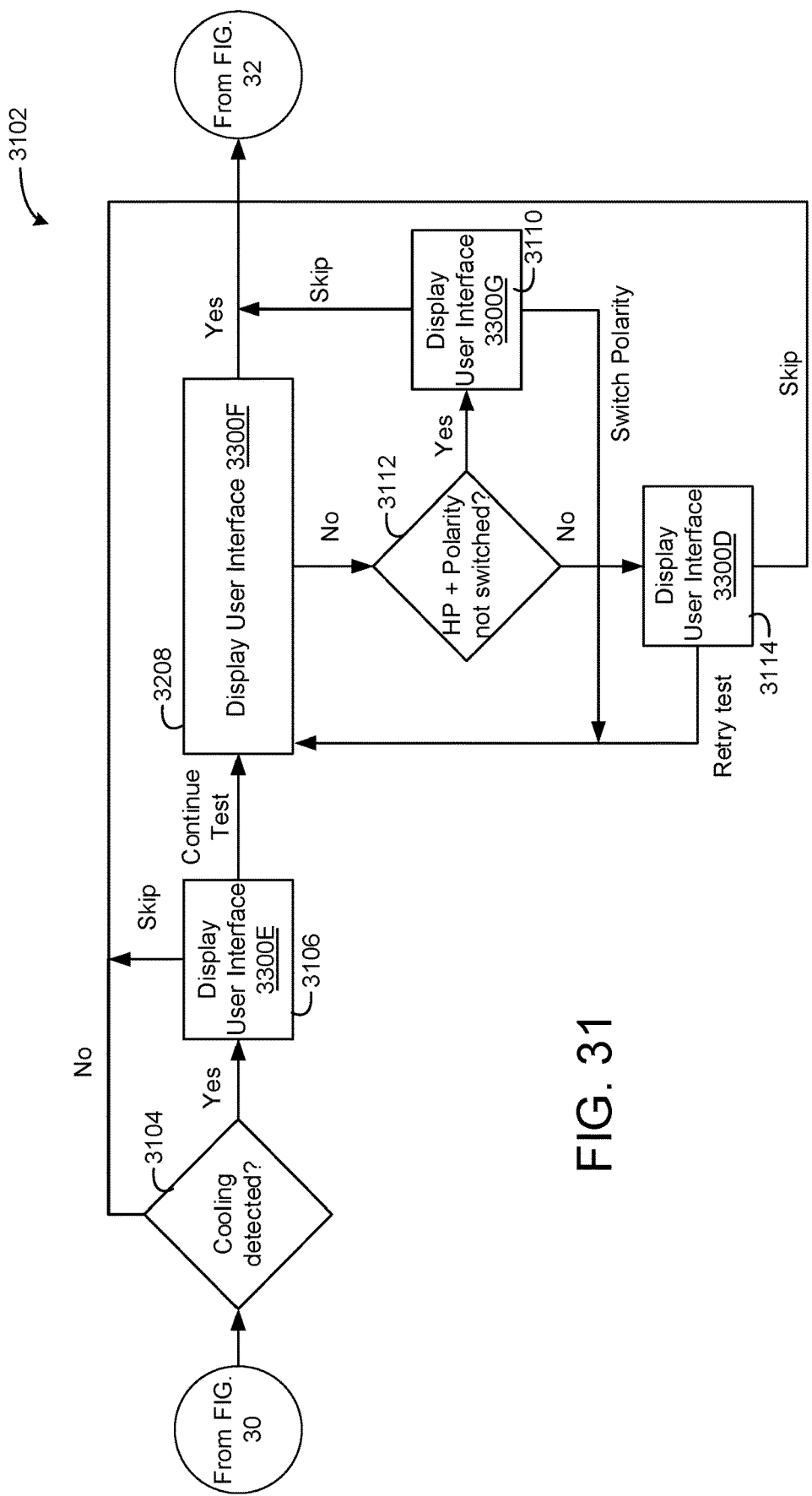
FIG. 31 is a process for displaying user interfaces and verifying whether cooling equipment connected to the thermostat of FIG. 4 is operating properly, according to an exemplary embodiment.
Figure 32:
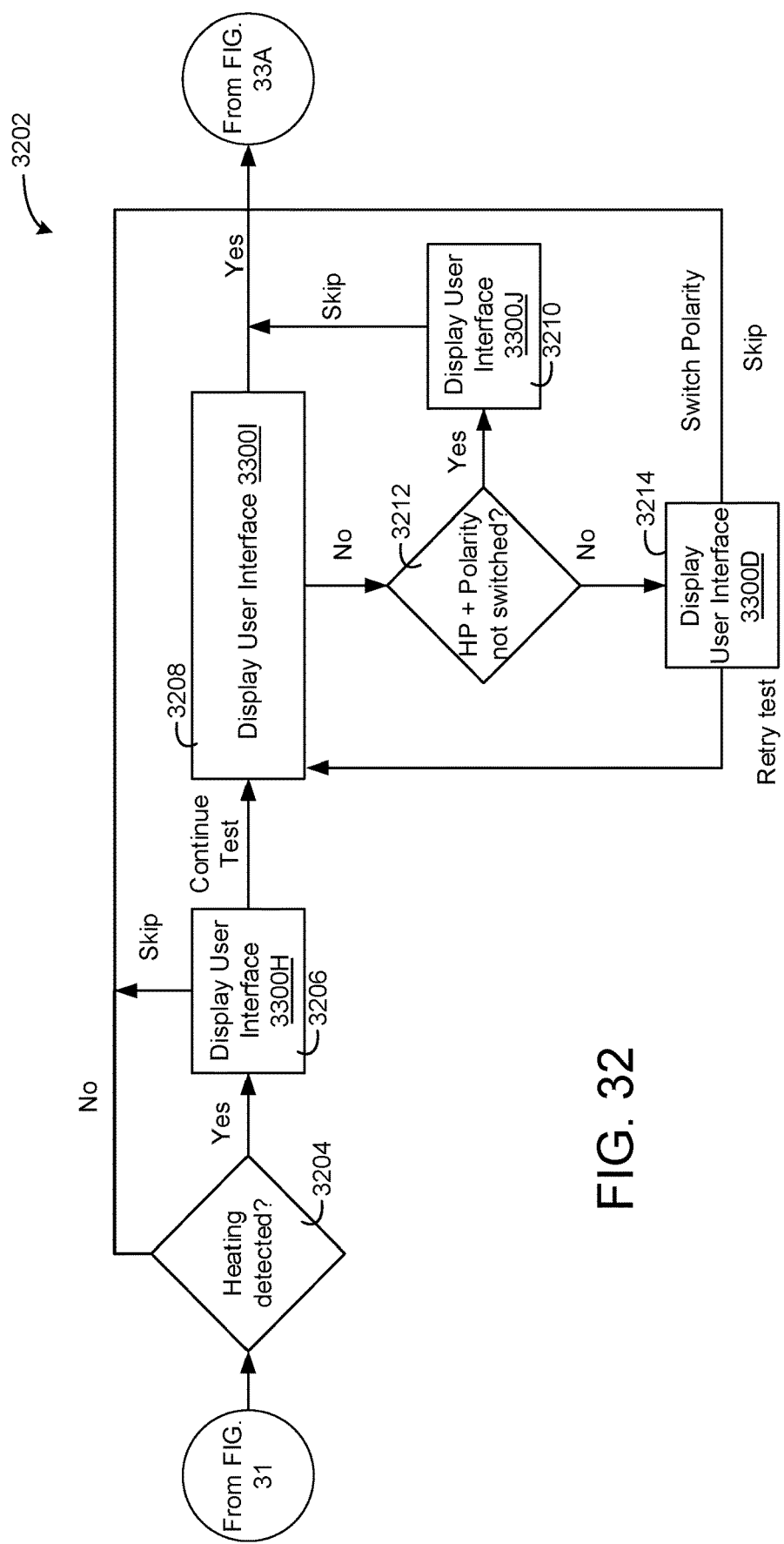
FIG. 32 is a process for displaying user interfaces and verifying whether heating equipment connected to the thermostat of FIG. 4 is operating properly, according to an exemplary embodiment.
Figure 33A:
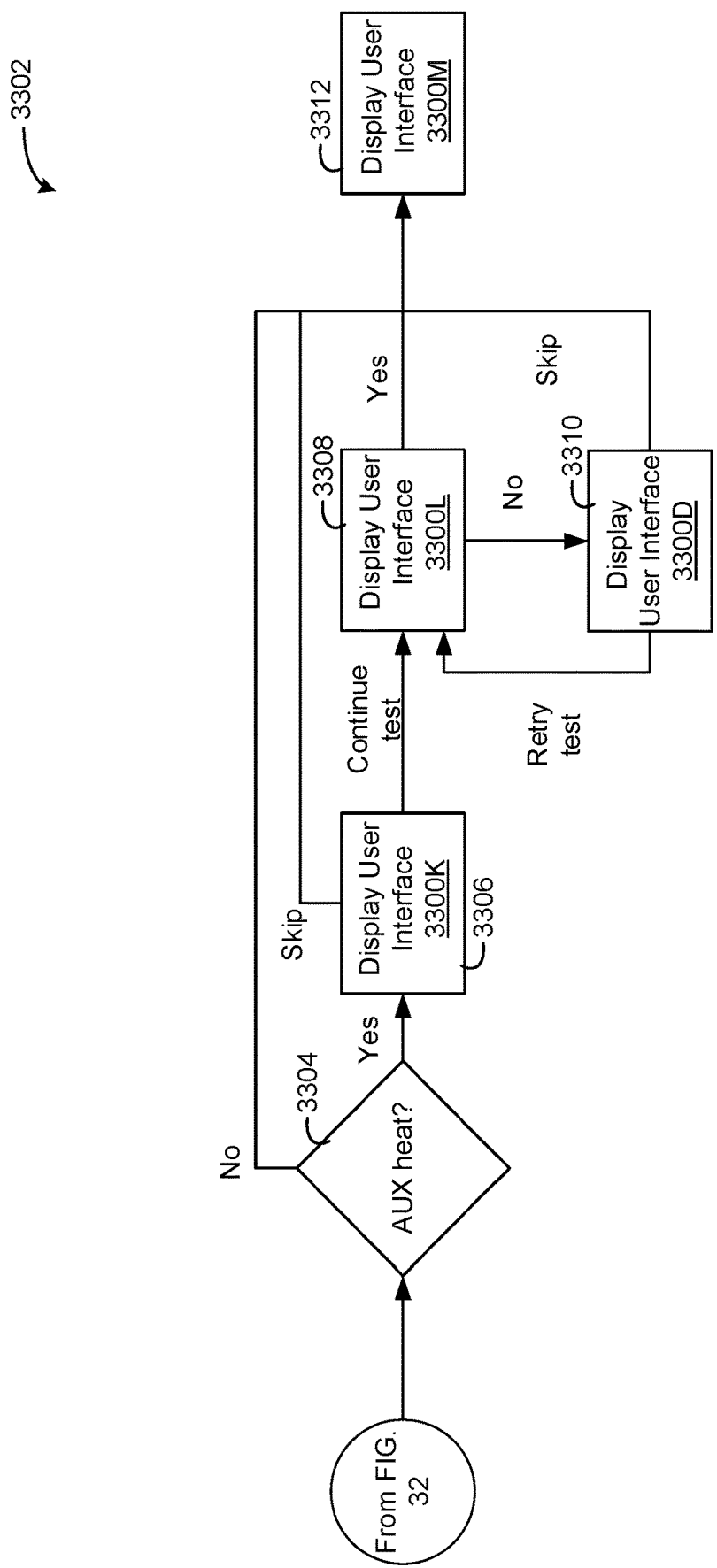
FIG. 33A is a process for displaying user interfaces and verifying whether auxiliary heating equipment connected to the thermostat of FIG. 4 is operating properly, according to an exemplary embodiment.
Figure 33B:
FIG. 33B is a user interface that can be displayed in the process of FIG. 30 prompting a user to begin a system test for the thermostat of FIG. 4, according to an exemplary embodiment.
Figure 33C:
FIG. 33C is a user interface that can be displayed in the process of FIG. 30 prompting a user to verify whether a fan connected to the thermostat of FIG. 4 is operating properly, according to an exemplary embodiment.
Figure 33D:
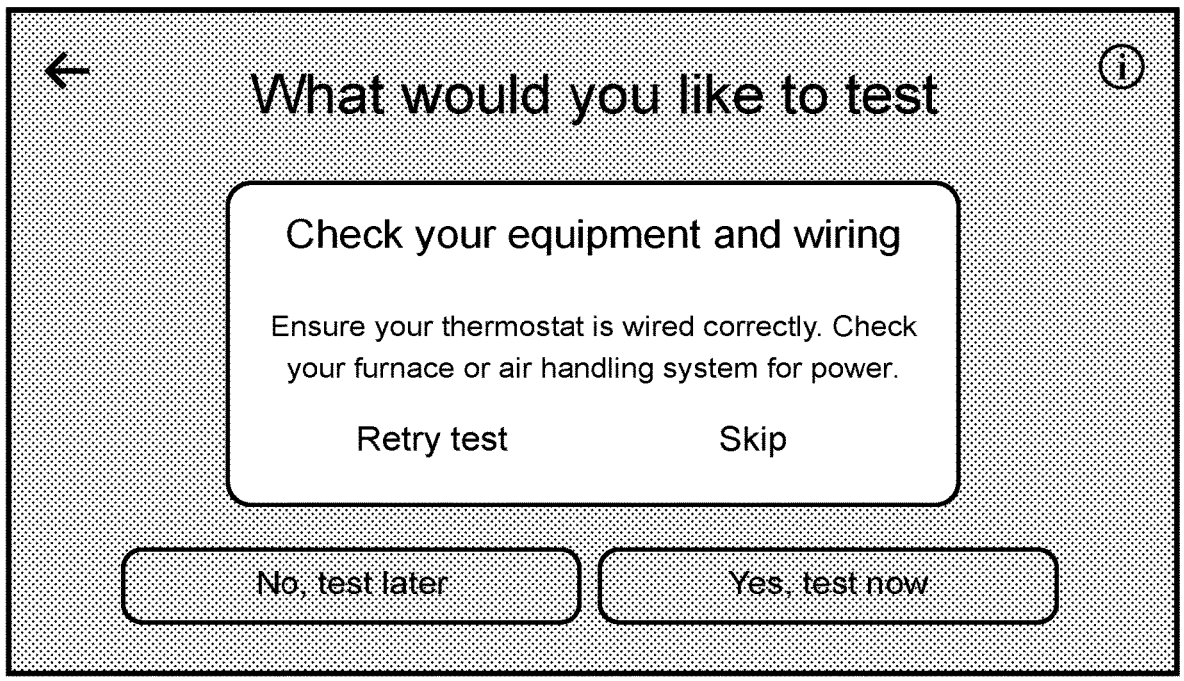
FIG. 33D is a user interface that can be displayed in the process of FIG. 30 prompting a user to review connections of equipment connected to the thermostat of FIG. 4 in response to detecting that the fan is not operating properly based on user input received via the user interface of FIG. 33C, according to an exemplary embodiment.
Figure 33E:
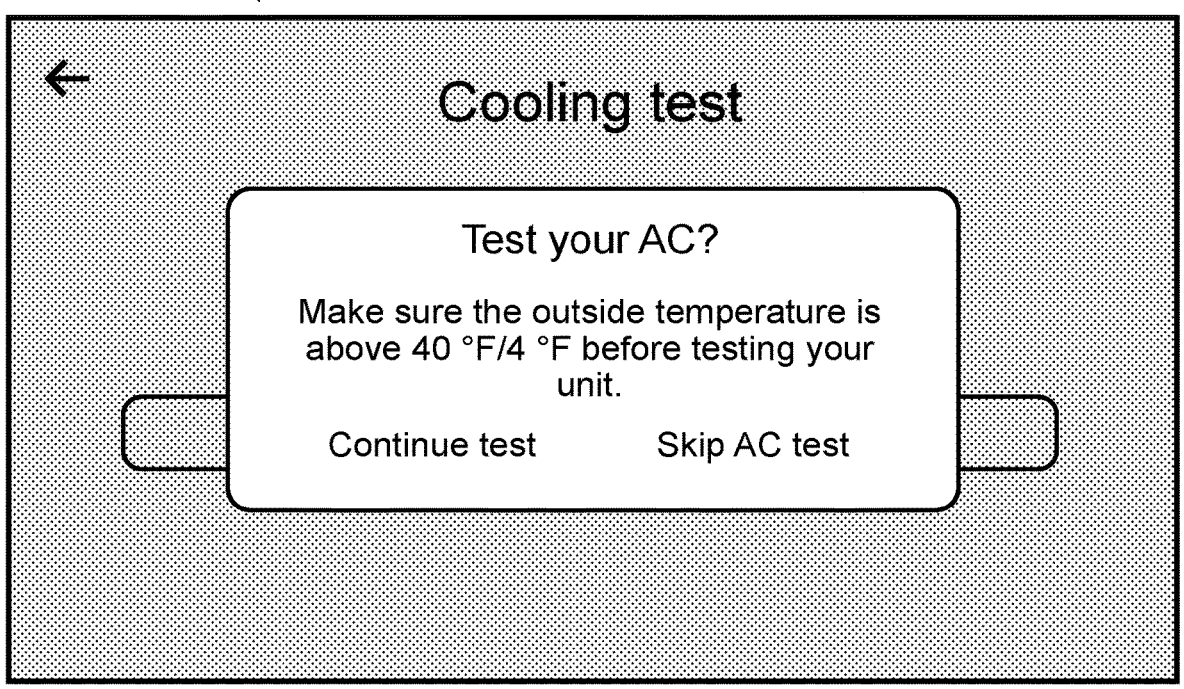
FIG. 33E is a user interface that can be displayed in the process of FIG. 31 prompting a user to begin a system test of cooling equipment connected to the thermostat of FIG. 4, according to an exemplary embodiment.
Figure 33F:
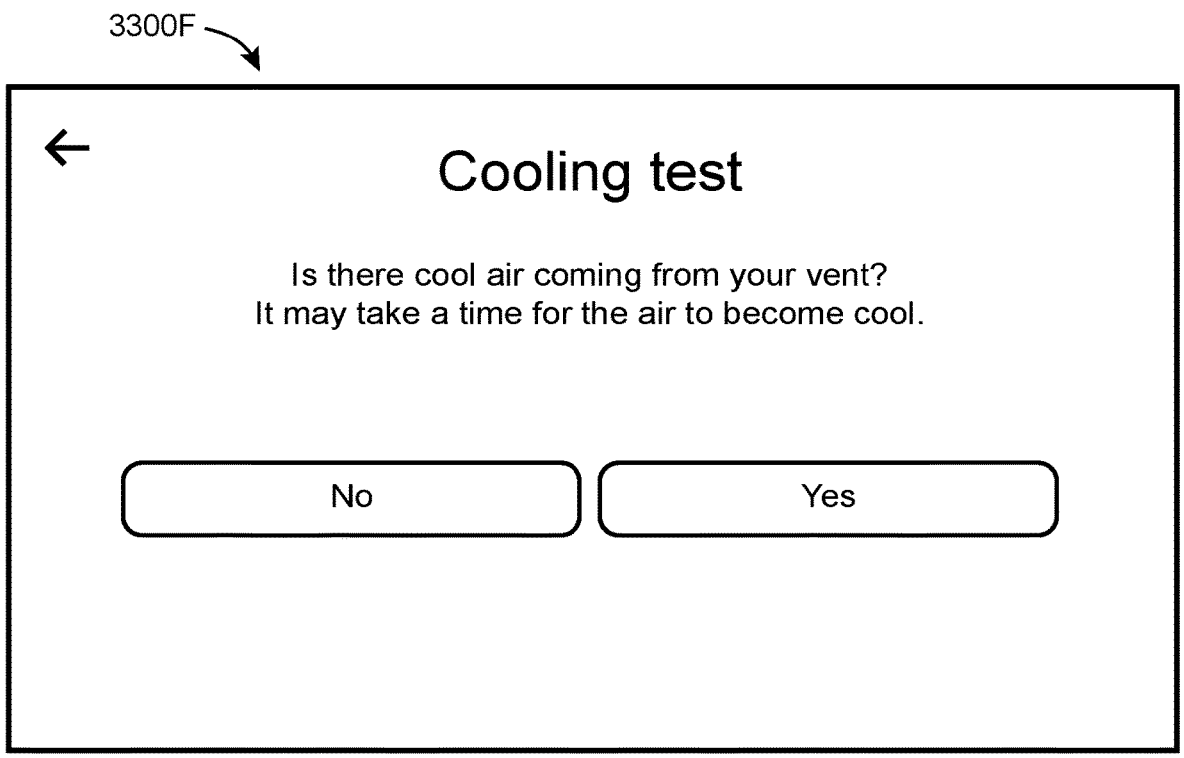
FIG. 33F is a user interface that can be displayed in the process of FIG. 31 prompting a user to verify whether the cooling equipment connected to the thermostat of FIG. 4 is operating properly, according to an exemplary embodiment.
Figure 33G:
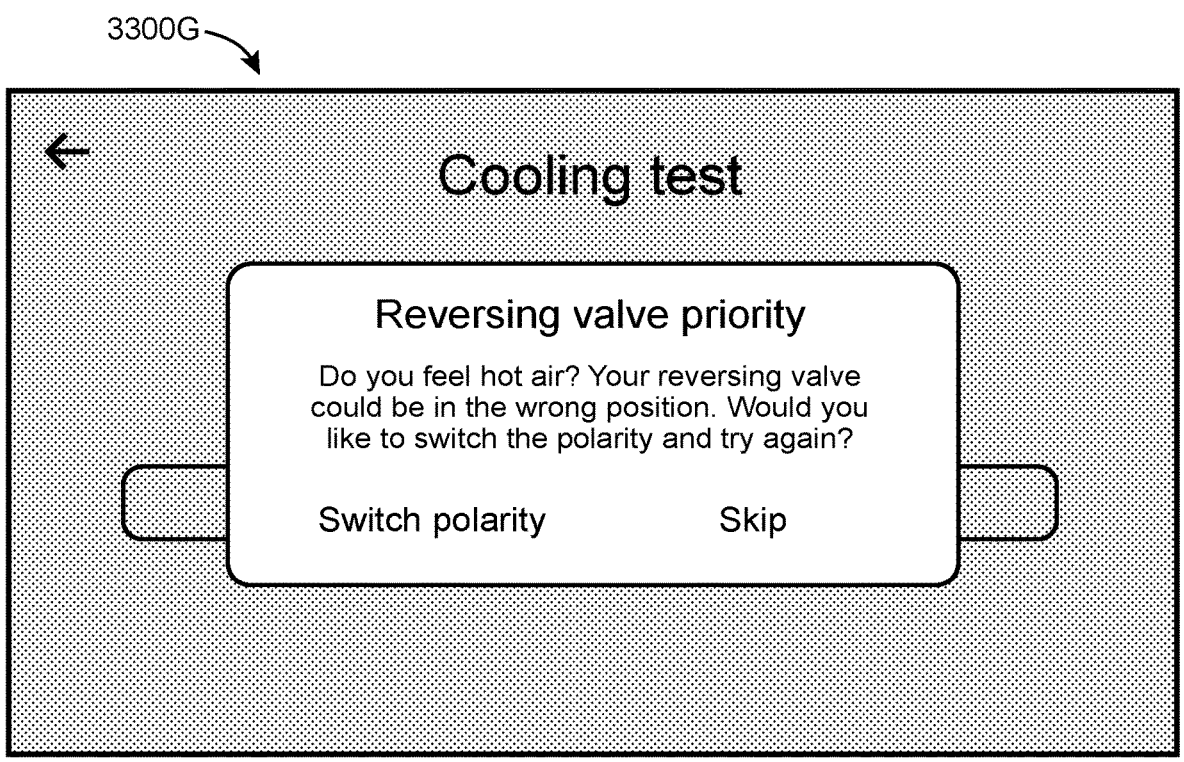
FIG. 33G is a user interface that can be displayed in the process of FIG. 31 prompting a user to verify whether the polarity of a reversing value has been properly configured, according to an exemplary embodiment.
Figure 33H:
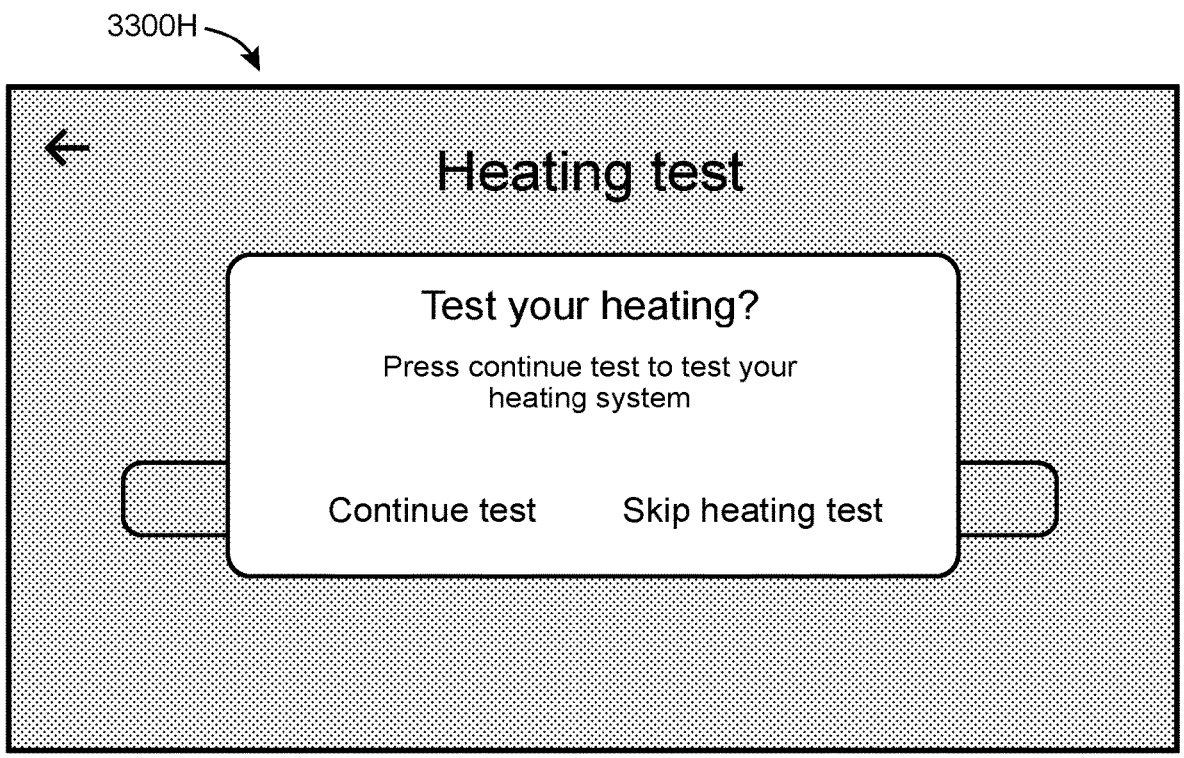
FIG. 33H is a user interface that can be displayed in the process of FIG. 32 prompting a user to begin a system test of heating equipment connected to the thermostat of FIG. 4, according to an exemplary embodiment.
Figure 33I:
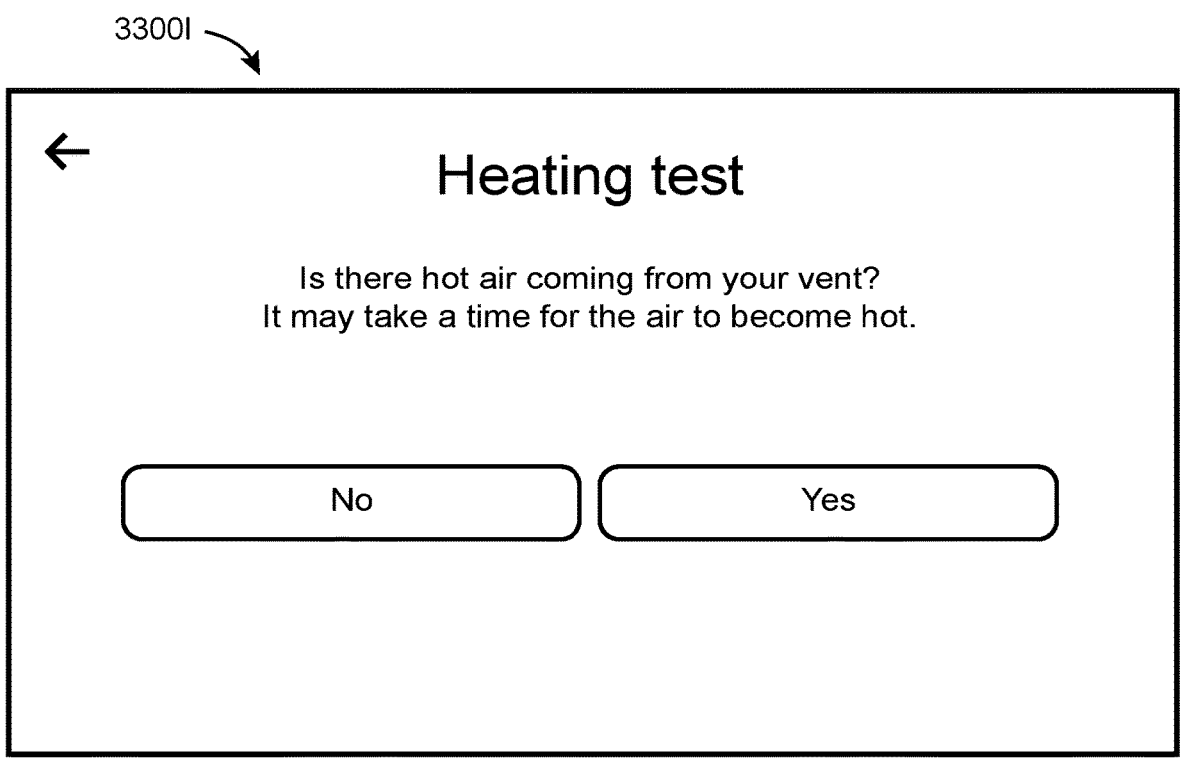
FIG. 33I is a user interface that can be displayed in the process of FIG. 32 prompting a user to verify whether the heating equipment connected to the thermostat of FIG. 4 is operating properly, according to an exemplary embodiment.
Figure 33J:
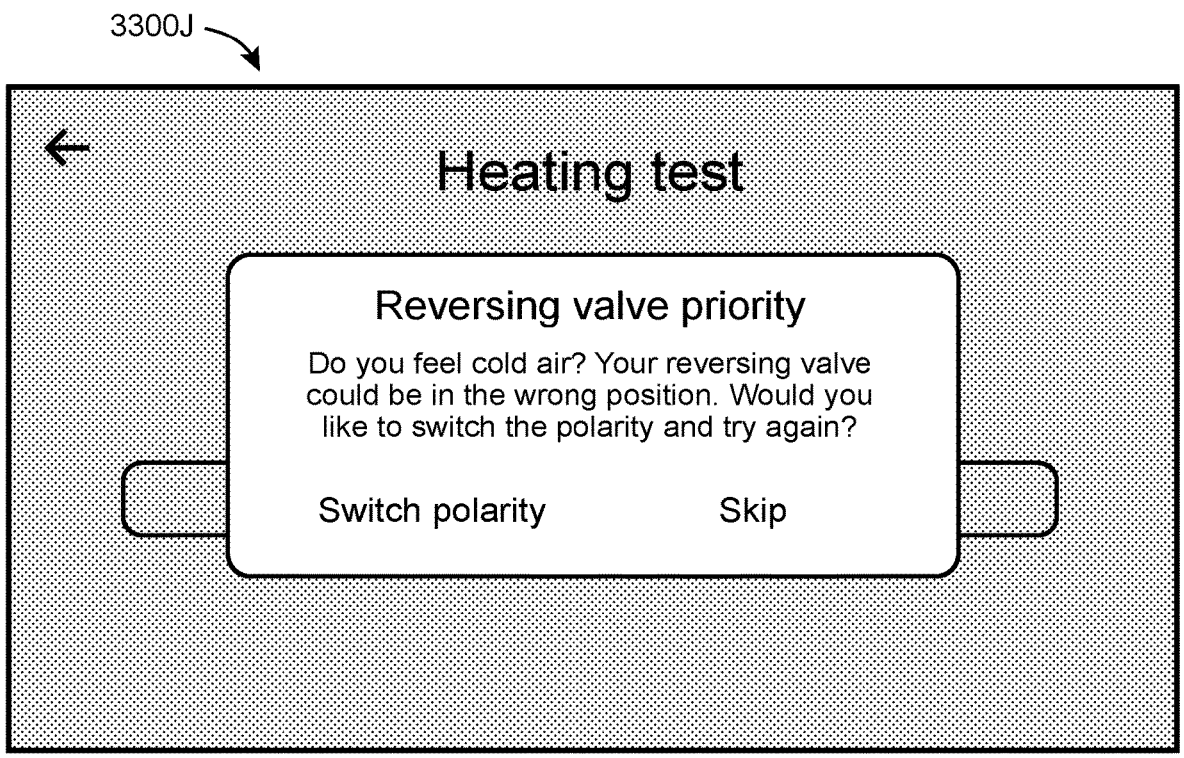
FIG. 33J is a user interface that can be displayed in the process of FIG. 32 prompting a user to verify whether the polarity of a reversing value has been properly configured, according to an exemplary embodiment.
Figure 33K:
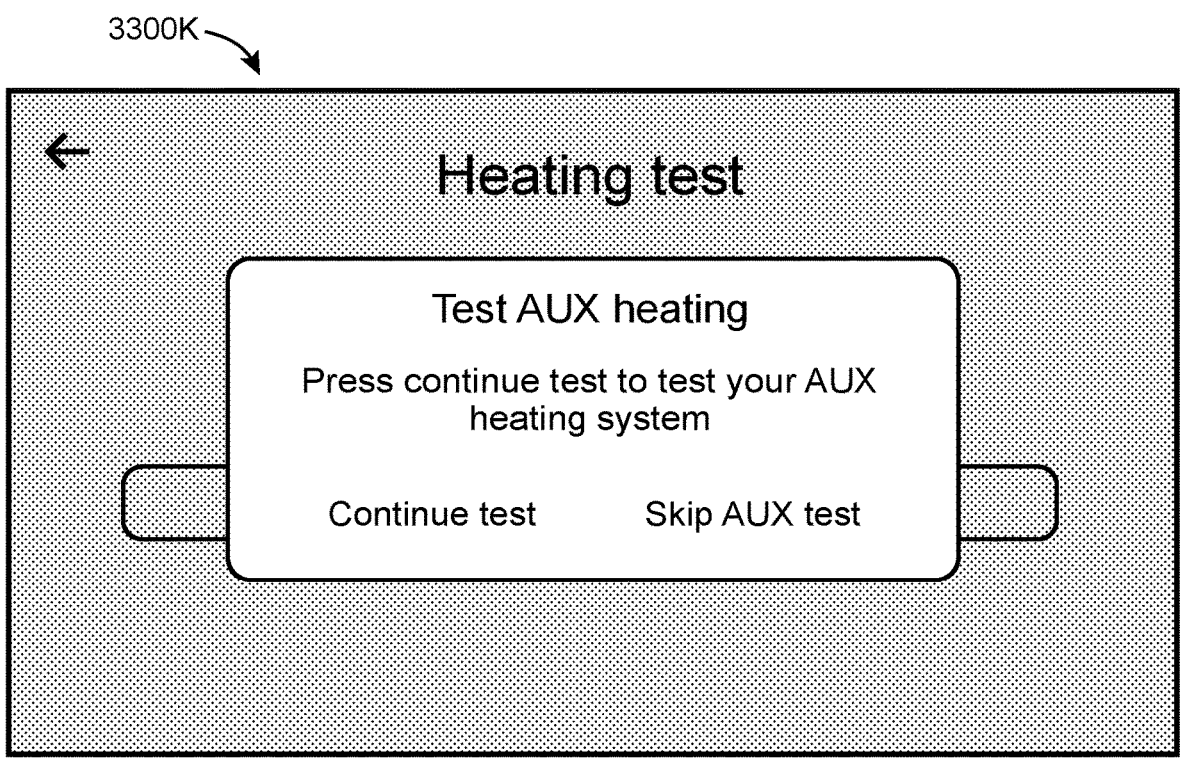
FIG. 33K is a user interface that can be displayed in the process of FIG. 33A prompting a user to begin a system test of auxiliary heating equipment connected to the thermostat of FIG. 4, according to an exemplary embodiment.

Referring now to FIGS. 30-33M various interfaces and processes are shown for testing an installation of the thermostat 400, according to various exemplary embodiments. In FIG. 30, the startup manager 710 can be configured to display the interface 3300B (step 3004) prompting the user to test the thermostat 400 in a process 3002. The startup manager 710 can determine whether a fan connection is connected to the thermostat 400 (or has been manually defined by a user) (step 3006). If the fan is connected, the startup manager 710 can cause the fan to be operated and can cause an interface 3300C to be display prompting the user to determine whether the fan is circulating air (step 3008). If so, the user can indicate that the fan is circulating air and the startup manager 710 can proceed to the next step. If not, the startup manager 710 can cause the interface 3300D to be displayed prompting the user to check their wiring and then retry the test of the thermostat 400 installation (step 3010).

In process 3102, the startup manager 710 can be configured to determine whether cooling connections have been made to the thermostat 400 (step 3104). If cooling connections have been made, the startup manager 710 can cause the interface 3300E to be displayed prompting the user to begin the cooling test (step 3106). The thermostat 400 can cause the cooling connections to cause the connected system to cool the building. The startup manager 710 can cause the interface 3300F to be displayed where the user can confirm whether cool air is coming from a vent of the building (step 3108). If cool air has not been detected, a heat pump connection has been detected, and a polarity switch flag has been set, the startup manager 710 can cause the interface 3300G to be displayed prompting the user to switch the polarity of the reversing valve and perform the test again (step 3110). If cool air has not been detected and no a heat pump connection has been detected (step 3112), the startup manager 710 can cause the interface 3300D to be displayed prompting the user to check the wiring of the thermostat 400 (step 3114).

In process 3202, the startup manager 710 determine whether heating connections have been made to the thermostat 400 (step 3204). If heating connections have been made, the startup manager 710 can cause the interface 3300H to be displayed prompting the user to begin the heating test (step 3206). The thermostat 400 can cause the heating connections to cause the connected system to heat the building. The startup manager 710 can cause the interface 3300I to be displayed where the user can confirm whether hot air is coming from a vent of the building (step 3208). If hot air has not been detected, a heat pump connection has been detected, and a polarity switch flag has been set, the startup manager 710 can cause the interface 3300J to be displayed prompting the user to switch the polarity of the reversing valve and perform the test again (step 3210). If hot air has not been detected and no a heat pump connection has been detected and/or polarity of the reversing valve has not been switched (step 3212), the startup manager 710 can cause the interface 3300D to be displayed prompting the user to check the wiring of the thermostat 400 (3214).

In process 3302, if the thermostat 400 determines that an auxiliary heating connection is present for the thermostat 400 (step 3304), the startup manager 710 can cause the interface 3300K to be displayed prompting the user to perform an auxiliary heating test (step 3306). The startup manager 710 cause the auxiliary heating equipment to heat the building and can prompt the user to confirm whether hot air is coming from a vent of the building in the interface 3300L (step 3308). If no hot air is present, the startup manager 710 can prompt the user to review the wiring connections of the thermostat 400 via the interface 3300D (step 3310).

At the end of the test, the startup manager 710 can display the interface 3300M where the results of the test are shown (step 3312). If a user has skipped a test, the test will be shown as "SKIPPED." For a test, if the user indicated they felt the warm and/or cool air, a "PASSED" indication can be displayed indicating that the thermostat 400 passed the test. For a failed test, the startup manager 710 can display a customer service number to call. If during the test, the user indicated that the polarity of the reversing valve should be reversed, the thermostat 400 may indicate a manual polarity reversal in various setting and/or information interfaces (e.g., an indicator on an interface such as interface 2204).

Referring now to FIGS. 34-37, notifications are shown for the thermostat 400, according to an exemplary embodiment. The notifications manager 718 can be configured to monitor the status of the thermostat 400. For example, if a software update has failed, the air quality is poor, a current date indicates that seasonal maintenance is required, a timer indicates that a filter needs to be replaced, or that a temperature has exceeded or dropped below a safety level, the notifications manager 718 can record the information and generate one of corresponding interfaces 3400-3700.

In the interface 3400, a homescreen of the thermostat 400 is shown allowing a user to set heating and/or cooling setpoints as well as view a currently sensed temperature. When new notifications are determined by the thermostat 400, the thermostat 400 can cause an indication of the new notifications to be displayed in the interface 3400. In some embodiments, the indication includes the number of new notifications.

Figure 38:
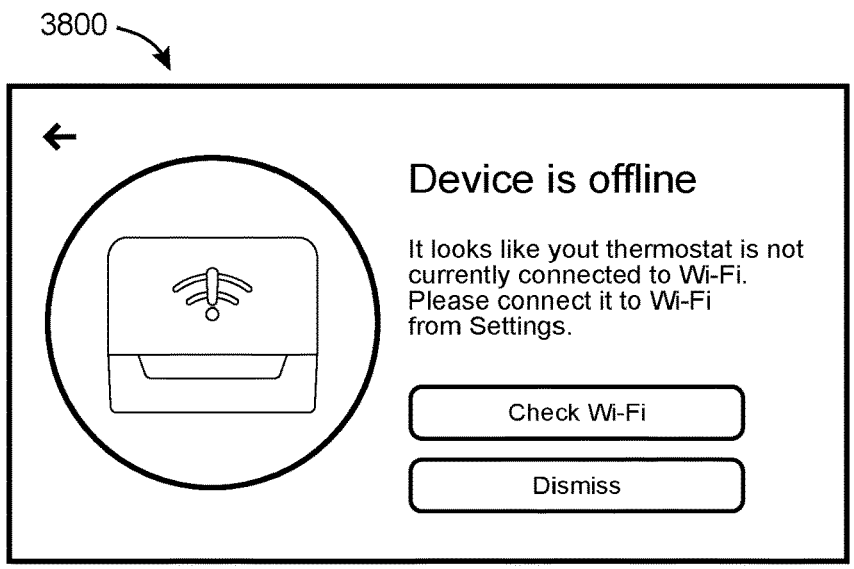
FIG. 38 is a user interface displayed by the thermostat of FIG. 4 indicating that the thermostat of FIG. 4 is not connected to a wireless network, according to an exemplary embodiment.
Figure 39:
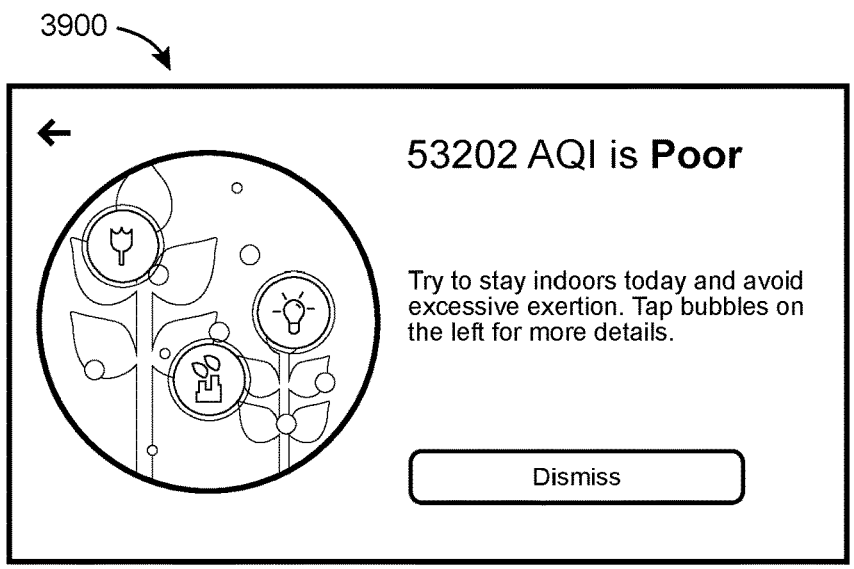
FIG. 39 is a user interface displayed by the thermostat of FIG. 4 indicating that outdoor air quality is at a poor level, according to an exemplary embodiment.
Figure 40:
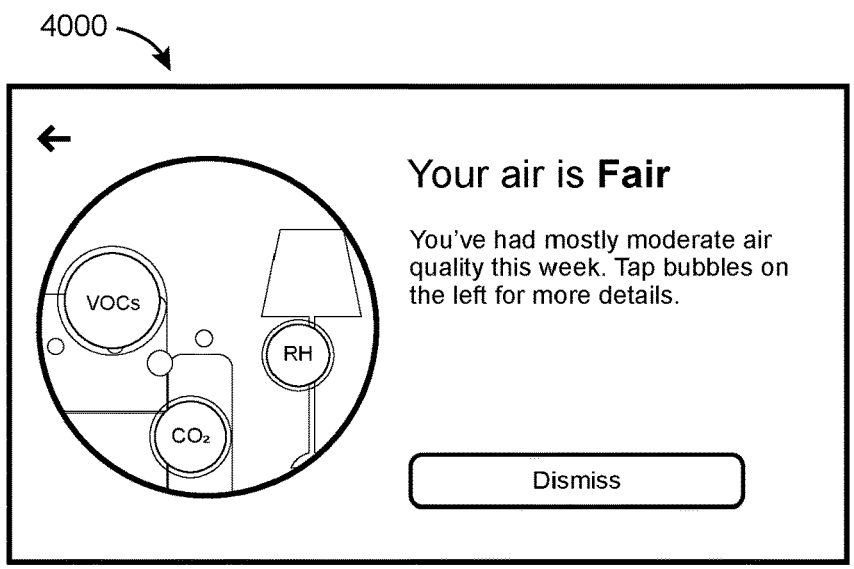
FIG. 40 is a user interface displayed by the thermostat of FIG. 4 indicating that indoor air quality is at a fair level, according to an exemplary embodiment.
Figure 41:
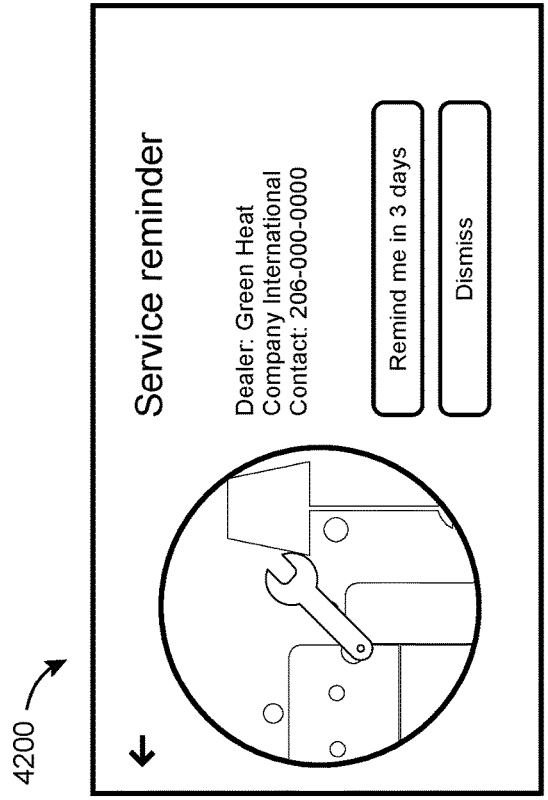
FIG. 41 is a user interface displayed by the thermostat of FIG. 4 indicating that equipment connected to the thermostat of FIG. 4 requires service, according to an exemplary embodiment.
Figure 42:
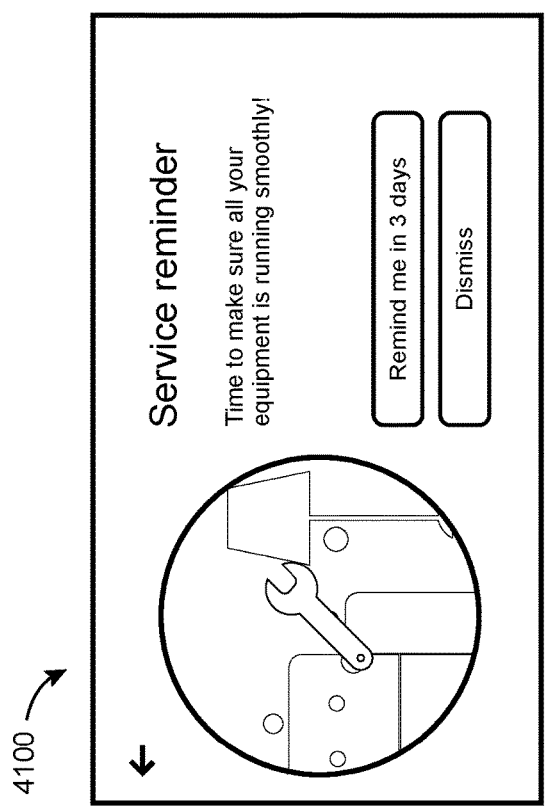
FIG. 42 is a user interface displayed by the thermostat of FIG. 4 indicating that equipment connected to the thermostat of FIG. 4 requires service, the interface including an indication of a dealer for performing the service, according to an exemplary embodiment.
Figure 43:
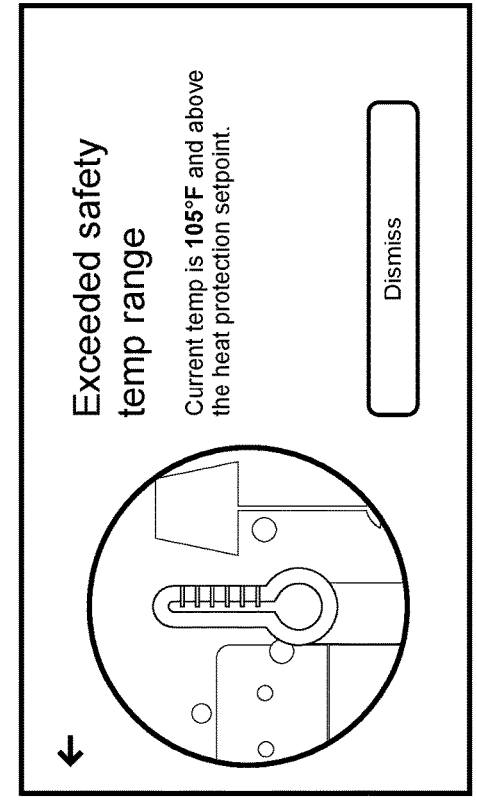
FIG. 43 is a user interface displayed by the thermostat of FIG. 4 indicating that a filter of equipment connected to the thermostat of FIG. 4 should be replaced, according to an exemplary embodiment.
Figure 44:
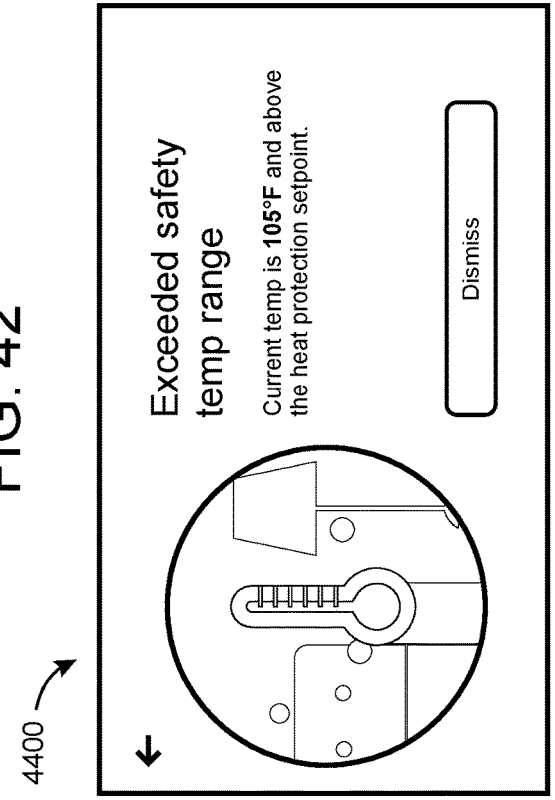
FIG. 44 is a user interface displayed by the thermostat of FIG. 4 indicating that a temperature sensed by the thermostat of FIG. 4 has exceeded a first safety threshold of a safety temperature range, according to an exemplary embodiment.
Figure 45:
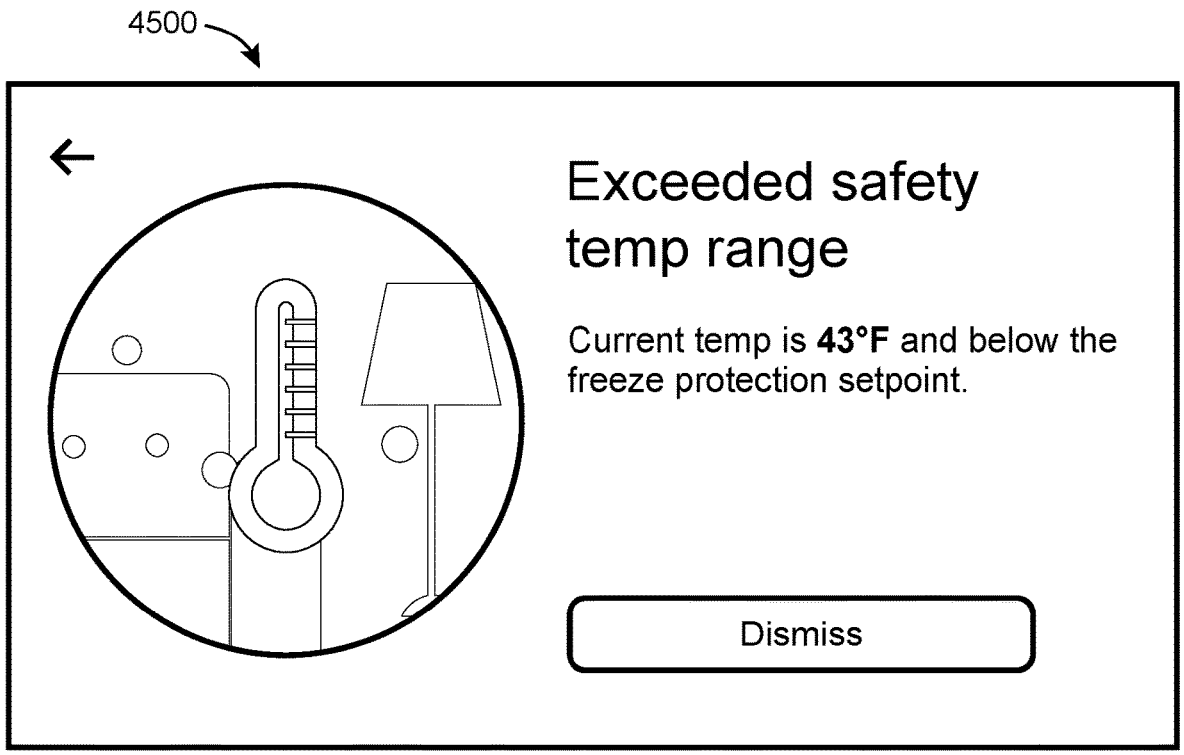
FIG. 45 is a user interface displayed by the thermostat of FIG. 4 indicating that a temperature sensed by the thermostat of FIG. 4 has fallen below a second safety threshold of the safety temperature range, according to an exemplary embodiment.

In the interface 3500, a list of notifications can be displayed. The list may be in order of oldest notification to newest notification. The thermostat 400 can be configured to cause the interface 3500 to be displayed by the display 402 in response to a user interacting with the new notifications indication of the interface 3400. In the interface 3600, a seasonal maintenance reminder is shown. The thermostat 400 can be configured to periodically display a maintenance reminder based on a current date. For example, when a current date becomes a particular date, the thermostat 400 can be configured to generate the maintenance reminder. The interface 3700 provides an indication of a notifications page when no notifications are determined Referring now to FIGS. 38-40, interfaces 3800-4000 are shown illustrating particular notifications, according to various exemplary embodiments. If a user were to interact with one of the notification icons of the notifications list shown in interface 3500, one of the interfaces 3800-4000 can be displayed. Referring now to FIGS. 41-45, interfaces 4100-4500 are shown illustrating service reminder notifications, filter reminder notifications, and temperature safety notifications, according to various exemplary embodiments. The interface 4100 illustrates a service reminder. The service reminder may be a monthly, annual, seasonal and/or any other notification that is displayed at a particular interval reminding a user to perform maintenance on the thermostat 400. As shown in interface 4200, the service reminder may indicate contact information for a particular dealer. A filter reminder interface 4300 illustrates a filter reminder notification indicating that a user should replace their filter. This notification can be generated at a particular time period (e.g., every three months, every six months, etc.). If an ambient temperature becomes greater than or less than a particular threshold, the thermostat 400 can generate and/or display the interfaces 4400 and/or 4500.

Figure 46:
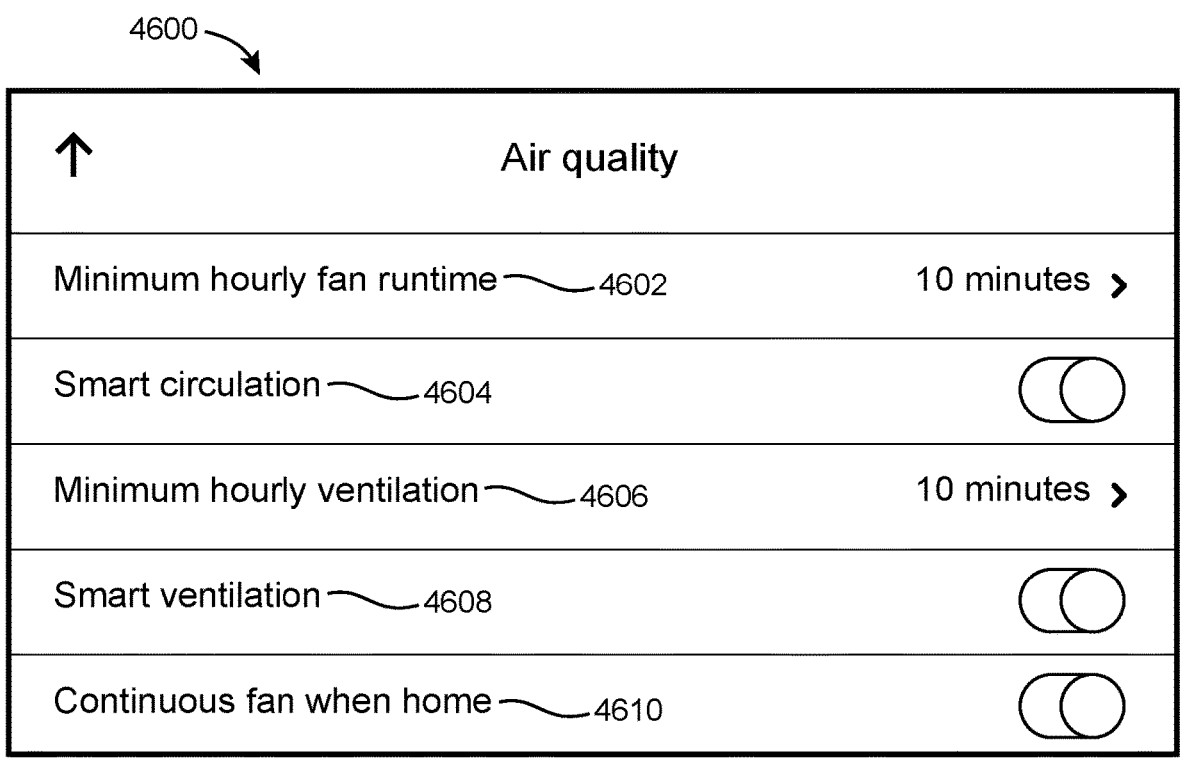
FIG. 46 is a user interface displayed by the thermostat of FIG. 4 for setting fan and ventilation parameters for controlling air circulation, according to an exemplary embodiment.
Figure 47:
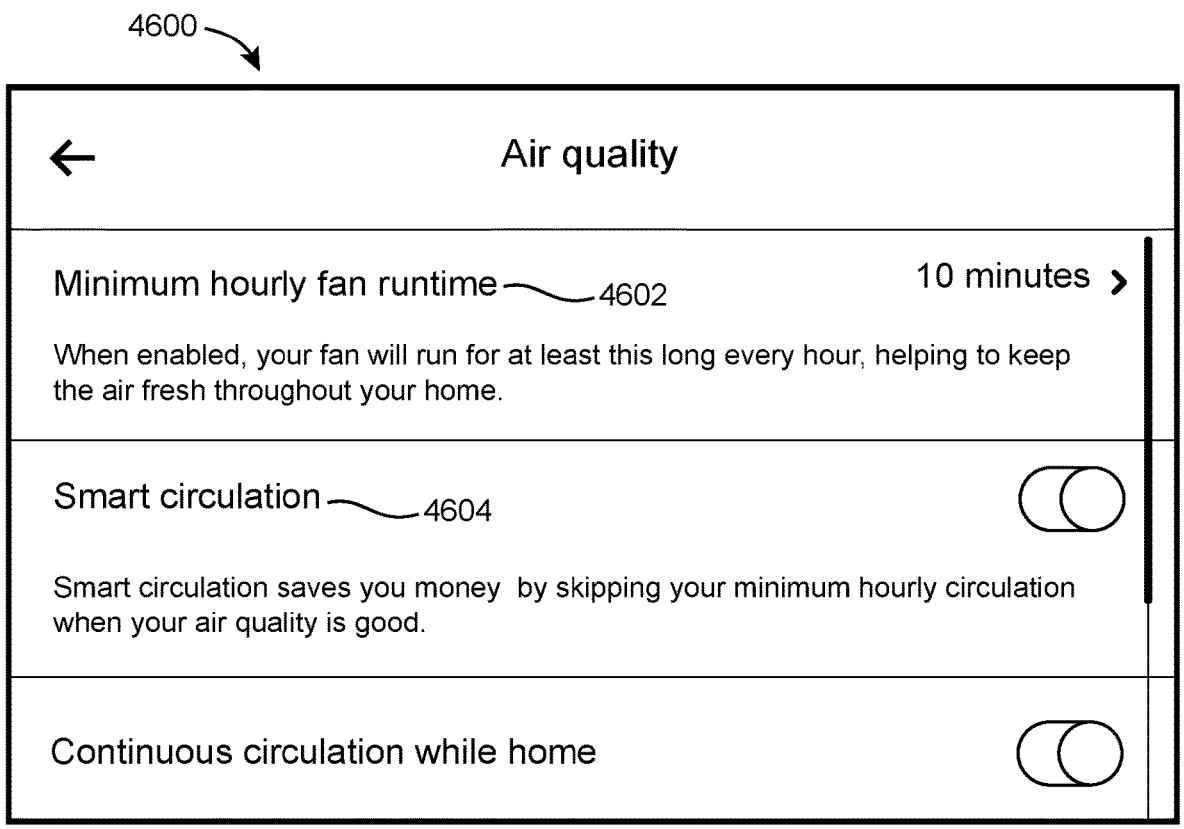
FIG. 47 is a user interface displayed by the thermostat of FIG. 4 for setting additional fan and ventilation parameters for controlling air circulation, according to an exemplary embodiment.
Figure 48:
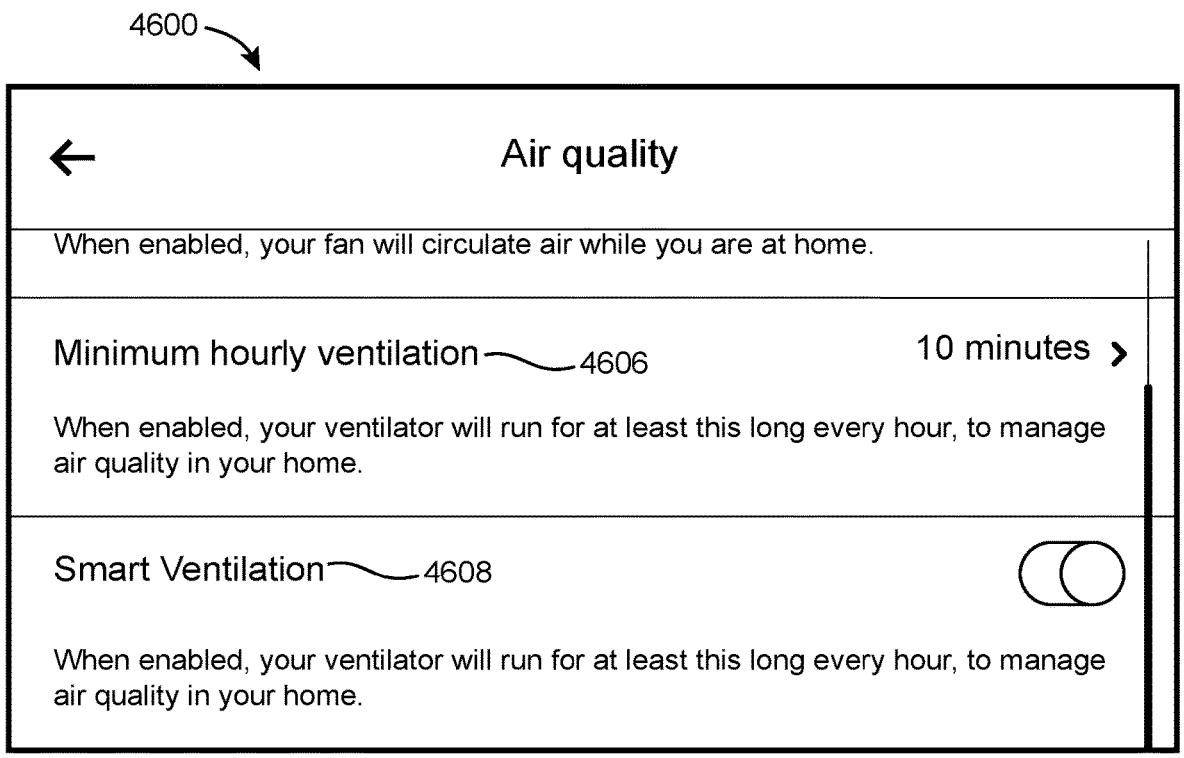
FIG. 48 is a user interface displayed by the thermostat of FIG. 4 for setting additional fan and ventilation parameters for controlling air circulation, according to an exemplary embodiment.
Figure 53:
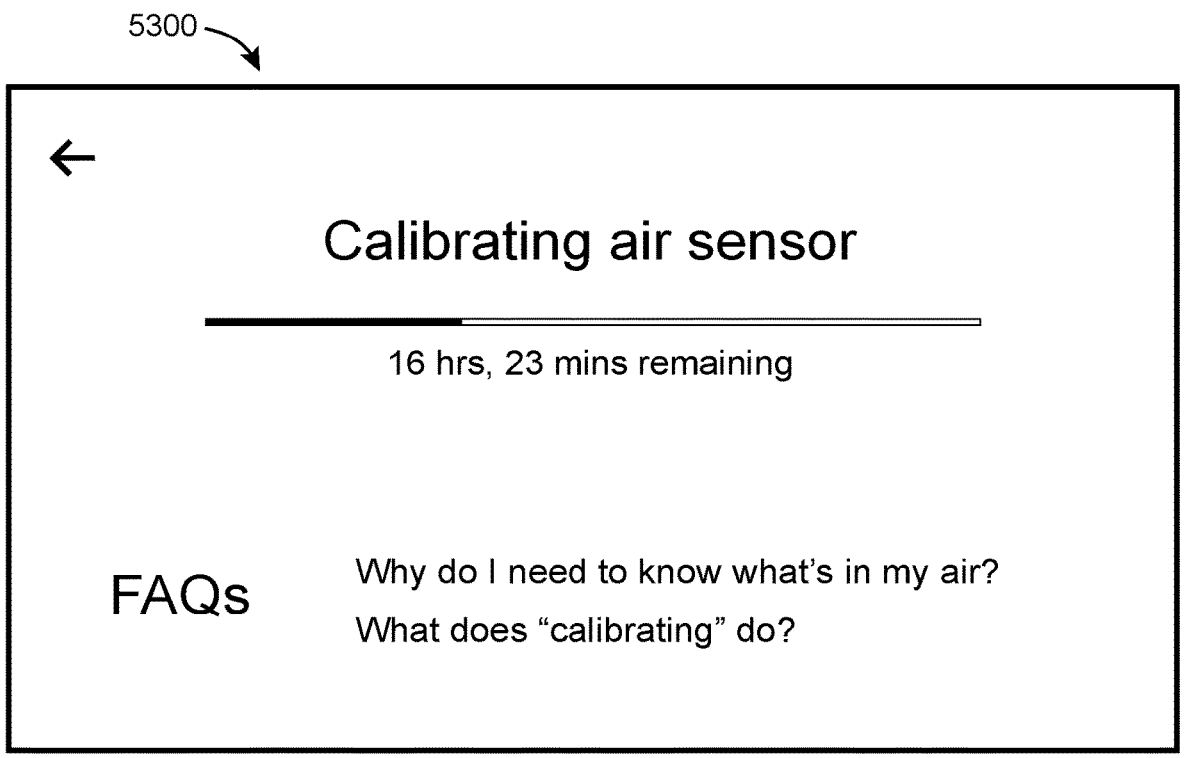
FIG. 53 is a user interface displayed by the thermostat of FIG. 4 for calibrating an air quality sensor of the thermostat of FIG. 4, according to an exemplary embodiment.
Figure 54:
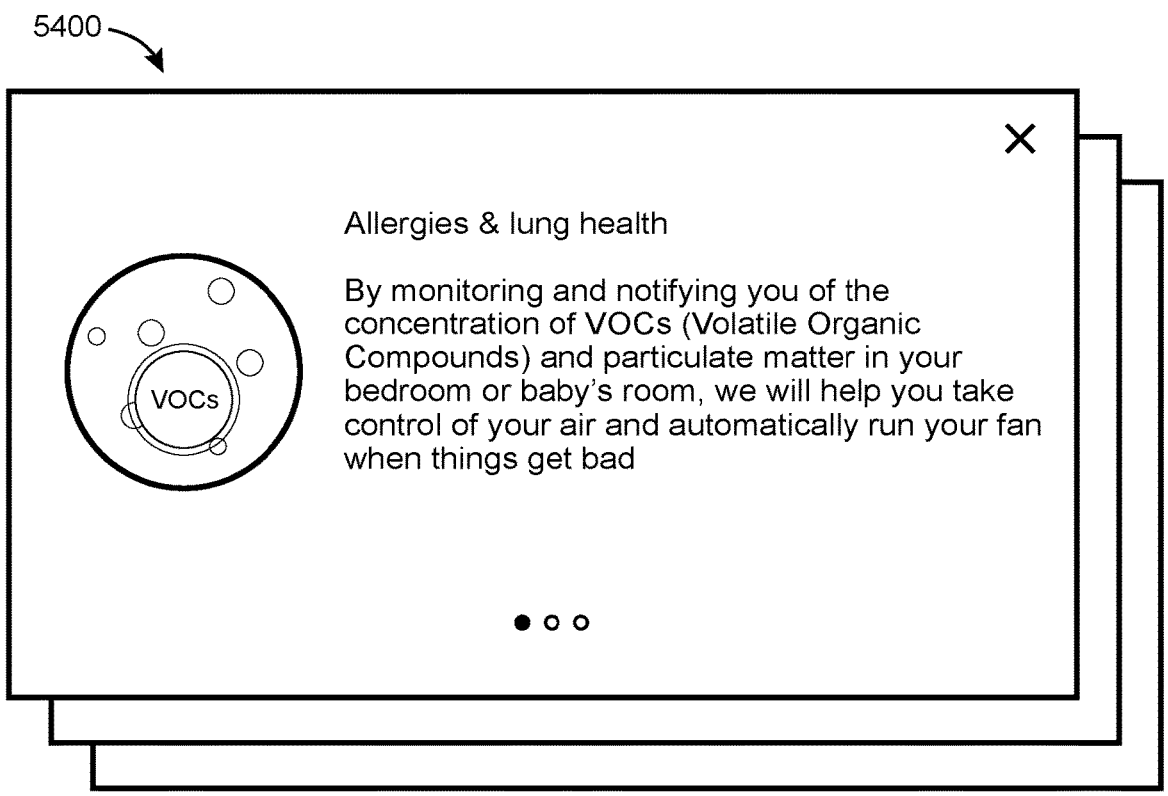
FIG. 54 is a user interface displayed by the thermostat of FIG. 4 providing a user with information on air quality, according to an exemplary embodiment.

Referring now to FIGS. 46-48, settings interface 4600 is shown for managing control of a fan controlled by the thermostat 400, according to various exemplary embodiments. The interface 4600 is shown to include a minimum hourly fan runtime 4602. The minimum hourly fan runtime 4602 may be a set time period that the user of the thermostat 400 can set so that the fan, whether due to heating or cooling or based on the fan running outside of a heating or cooling cycle, must run every hour. A user can input various time periods, e.g., 10 minutes, 15 minutes, 20 minutes, etc. for the defined runtime.

The smart circulation setting 4604 can be an on or off setting which causes the thermostat controller 720 to skip the minimum hour fan runtime of setting 4602 based on air quality. The fan may be a furnace fan. When the setting 4604 is turned on, the thermostat controller 720 can be configured to record air quality data (e.g., the air quality data of the air quality sensor 736), and determine, based on the air quality data, whether running the fan for the minimum hourly runtime is necessary. For example, if the air quality indicates that the air quality is good (e.g., various data points are less than a predefined amount), the thermostat controller 720 can be configured to ignore the minimum hourly runtime.

The minimum hourly ventilation setting 4606 may be a setting for causing the thermostat controller 720 to run a ventilator for a predefined user set time every hour. If the user turns on the smart ventilation setting 4608, the thermostat controller 720 can be configured to run the minimum hourly ventilation every hour. Furthermore, the smart ventilation setting 4608 may cause the thermostat controller 720 can be configured to cause the ventilator to skip running at the minimum hourly ventilation time if the air quality is determined to be good (e.g., the air quality data of the air quality sensor 736 indicates that the air quality is good, e.g., an air quality data point is less than a predefined value). Furthermore, the interface 4600 is shown to include a continuous fan run when home option 4610. If the option is turned on, whenever an occupant is home, the thermostat 400 can run a fan. For example, based on a schedule, detected occupancy, etc. the thermostat 400 can determine that the user is at home and can run the fan continuously when the thermostat 400 determines that the user is at home.

Referring now to FIGS. 49-52, interfaces 4900-5200 are shown for running a fan based on a timer, according to an exemplary embodiment. In the interface 4900, if a user interacts with the fan on setting, the thermostat controller 720 can cause the thermostat 400 to display the interface 5000. The interface 4900 may be a control interface for setting the thermostat 400 in a home or away mode, a heating on or off mode, a cooling on or off mode, and/or a fan auto or on mode. The interface 5000 can include a tumbler which the user can set to predefined values (e.g., 15 minutes, 30 minutes, 1 hour, 2 hours) or to a constant run for constantly running the fan. Once the user selects the start option of the interface 5000, the thermostat controller 720 can cause the interface 5100 to be displayed. The interface 5100 may be the same as and/or similar to the interface 4900. The interface 5100 can replace the "on" setting of the interface 4900 with a countdown timer that actively counts down from the selected runtime of the interface 500. The fan icon of the interface 5100 can be animated to spin. If the user interacts with the fan countdown timer element, the user may be presented with the interface 5200 which displays the countdown timer. The user can stop the fan and/or the countdown timer by pressing the stop button of the interface 5200.

Referring now to FIGS. 53-72, interfaces for setting up air quality features of the thermostat 400 and interfaces for providing a user with air quality information is shown, according to various exemplary embodiments. When a user sets up the air quality features of the thermostat 400, the air quality manager 706 can perform a calibration of the air quality sensor 736. If the user interfaces with the "Why do I need to know what's in my air?" element of the interface 5300, the user may be presented with the interface 5400 detailing that the thermostat 400 can be configured to control fans and/or ventilation based on air quality. If the user interacts with the "What does 'calibrating' do?" element, the user may be presented with an interface detailing what function of calibrating the air quality sensor 736.

Figure 55:
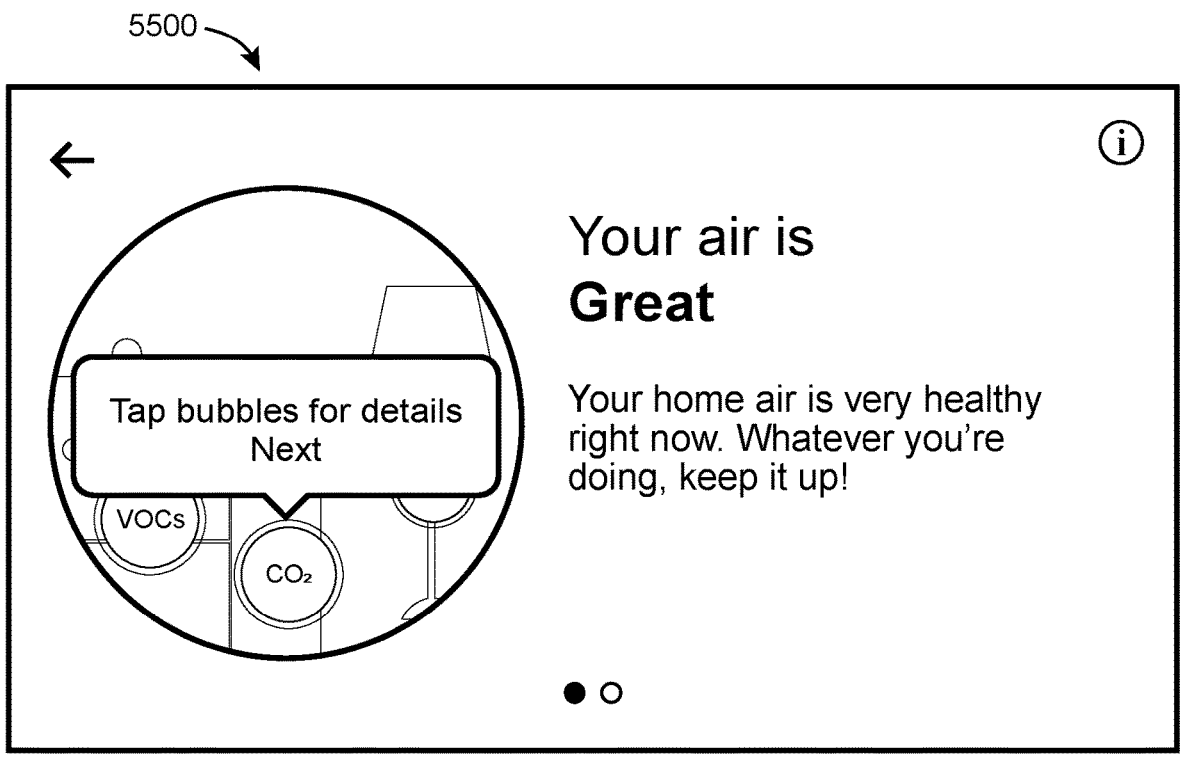
FIG. 55 is a user interface displayed by the thermostat of FIG. 4 indicating that indoor air quality is at a first level and notifying a user of interactions to acquire additional information on the indoor air quality, according to an exemplary embodiment.
Figure 56:
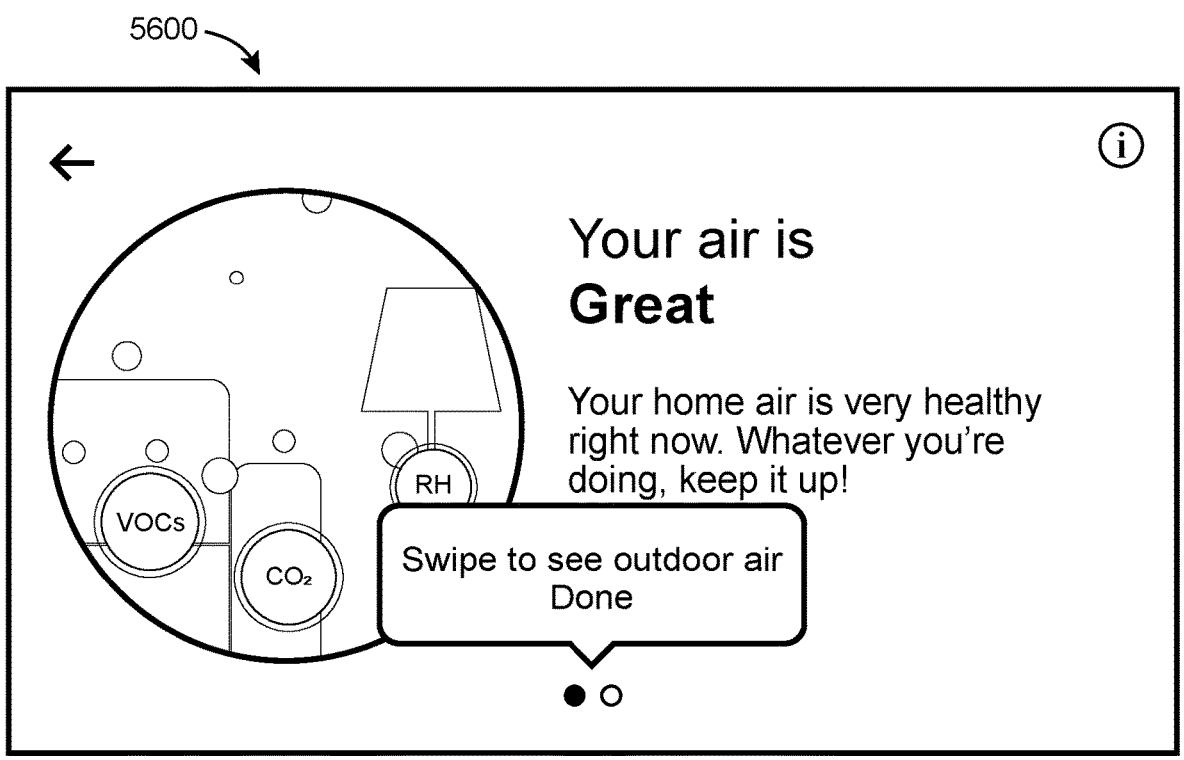
FIG. 56 is a user interface displayed by the thermostat of FIG. 4 indicating that indoor air quality is at the first level and notifying a user of interactions to navigate to outdoor air quality, according to an exemplary embodiment.

The first time the user interacts with the thermostat 400 to view air quality data, the user may be presented with air quality coachmarks shown in FIGS. 55 and 56. The interface 5500 can inform a user that if the user taps on the VOCs, CO2, or RH bubbles, they will be presented with specific information regarding the air quality data. Interface 5600 informs the user that if they swipe to the left, they will be presented with outdoor air quality information.

Figure 57:
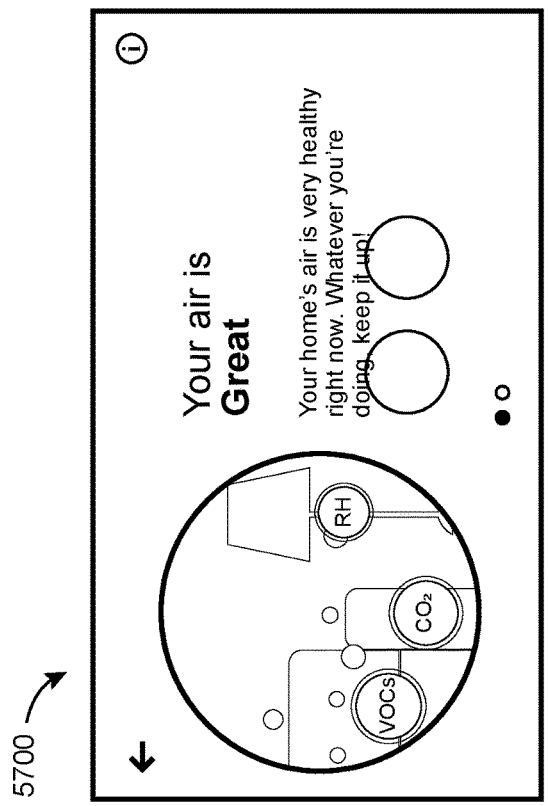
FIG. 57 is a user interface displayed by the thermostat of FIG. 4 indicating that indoor air quality is at the first level where a user is providing an input to the user interface to navigate to outdoor air quality, according to an exemplary embodiment.
Figure 59:
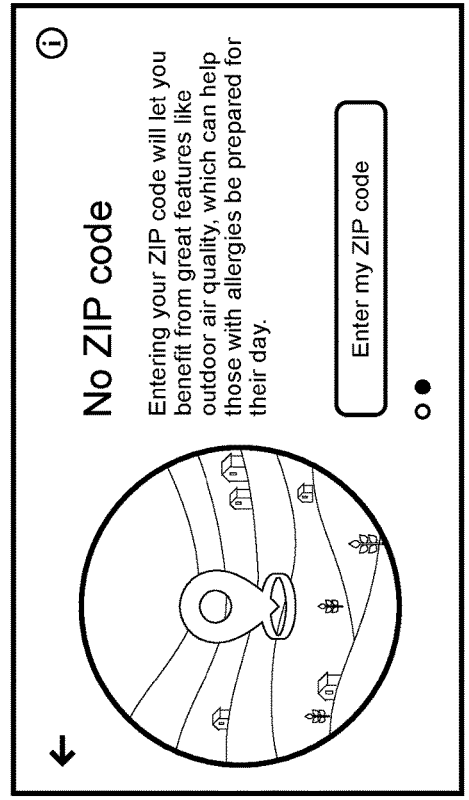
FIG. 59 is a user interface displayed by the thermostat of FIG. 4 in response to the input received by the user interface of FIG. 57 indicating that outdoor air quality cannot be displayed since the thermostat of FIG. 4 does not store a zip code for which to retrieve air quality data, according to an exemplary embodiment.
Figure 58:
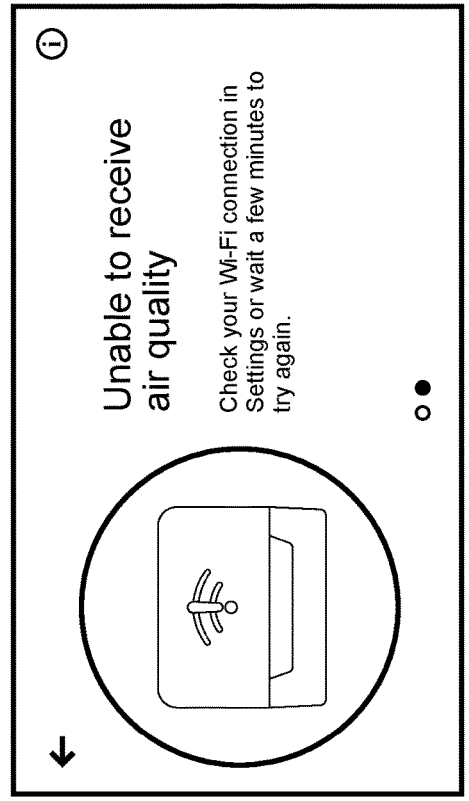
FIG. 58 is a user interface displayed by the thermostat of FIG. 4 in response to the input received by the user interface of FIG. 57 indicating that outdoor air quality cannot be displayed in view of a network connection issue of the thermostat of FIG. 4, according to an exemplary embodiment.
Figure 60:
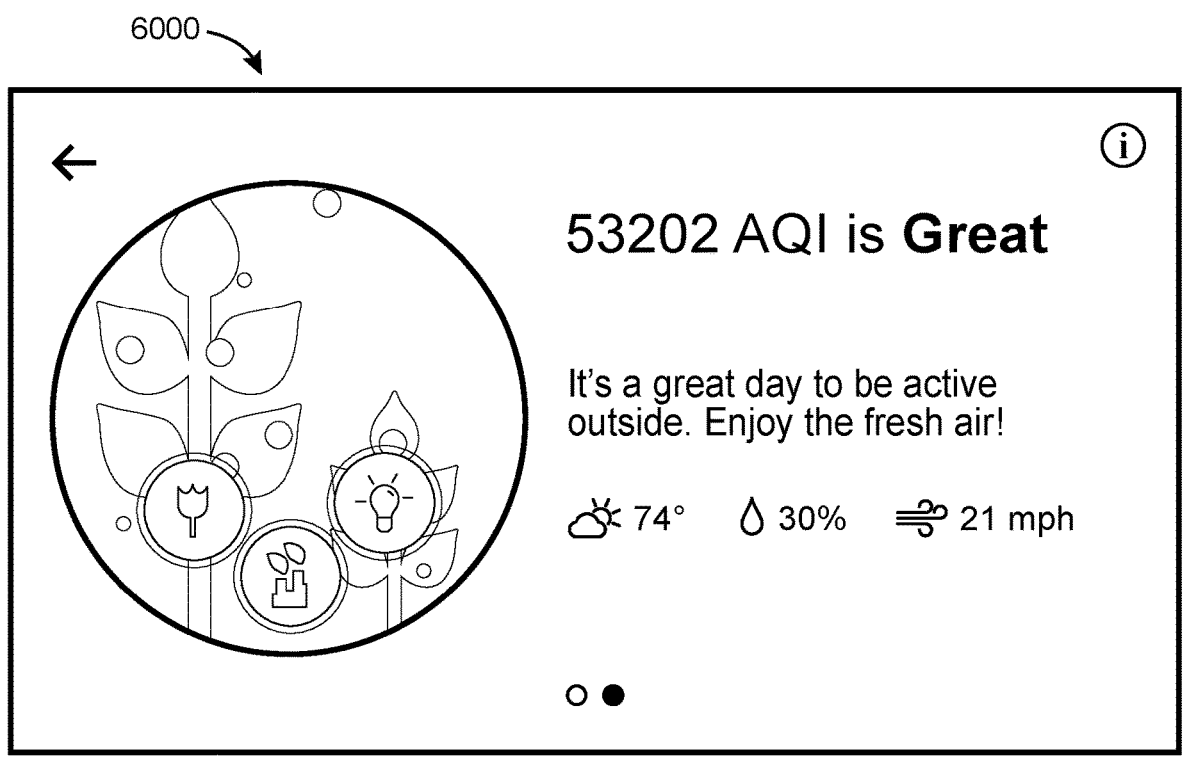
FIG. 60 is a user interface displayed by the thermostat of FIG. 4 in response to the input received by the user interface of FIG. 57 indicating the outdoor air quality, according to an exemplary embodiment.

In FIGS. 57-59, interfaces 5700-5900 are shown for displaying air quality information to a user, according to an exemplary embodiment. In the interface 5700, the indoor air quality is shown. The indoor air quality interface 5700 can be generated based on VOC values, CO2 values, an RH values measured by one or more sensors, e.g., the air quality sensor 736. The bubbles displaying each air quality value may move up and down based on the value of the air quality value which the bubble represents. If the thermostat 400 is not connected to the network 722, the thermostat 400 can display the interface 5800.

The interface 5800 may inform the user that the thermostat 400 cannot retrieve and display outdoor air quality. If the thermostat 400 can connect to the network 722 but does not store a location of the thermostat 400, the thermostat 400 can display the interface 5900 indicating that a zip code is required to retrieve the outdoor air quality data. If the thermostat 400 can connected to the network 722 and stores a zip code for the location of the thermostat 400 which it uses to retrieve air quality data, the thermostat 400 can display the interface 6000 of FIG. 60 which displays the current outdoor air quality. The outdoor air quality data may be pollen, pollution, and ultraviolet (UV) levels retrieved from a web server via the network 722. This information can be displayed by the bubble shown in the interface 6000. Furthermore, the interface 6000 displays outdoor temperature, humidity, and wind speed retrieved via the network 722.

Figure 61:
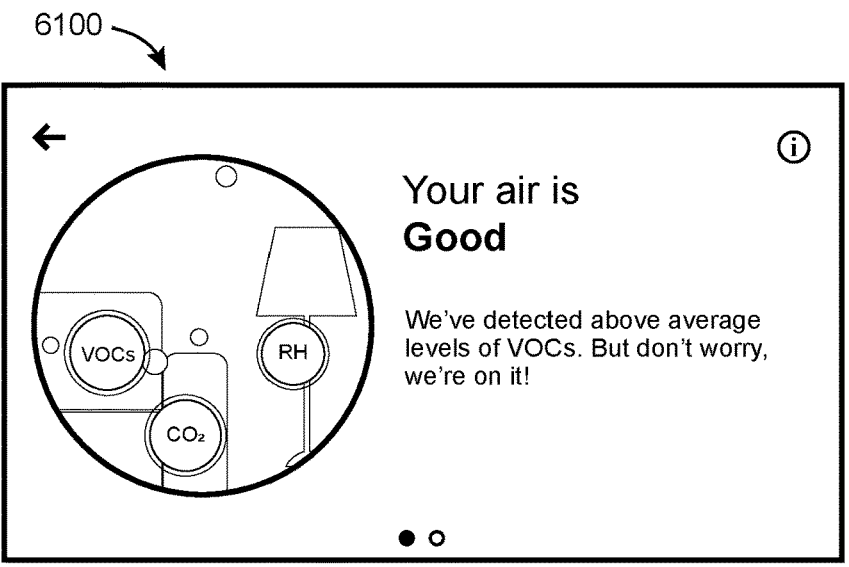
FIG. 61 is a user interface displayed by the thermostat of FIG. 4 indicating that indoor air quality is at a first level, according to an exemplary embodiment.
Figure 62:
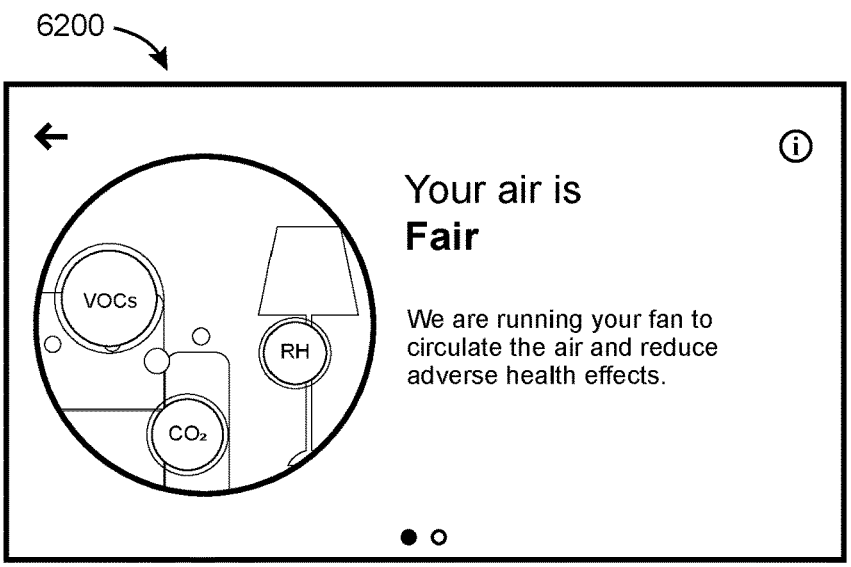
FIG. 62 is a user interface displayed by the thermostat of FIG. 4 indicating that indoor air quality is at a second level, according to an exemplary embodiment.
Figure 63:
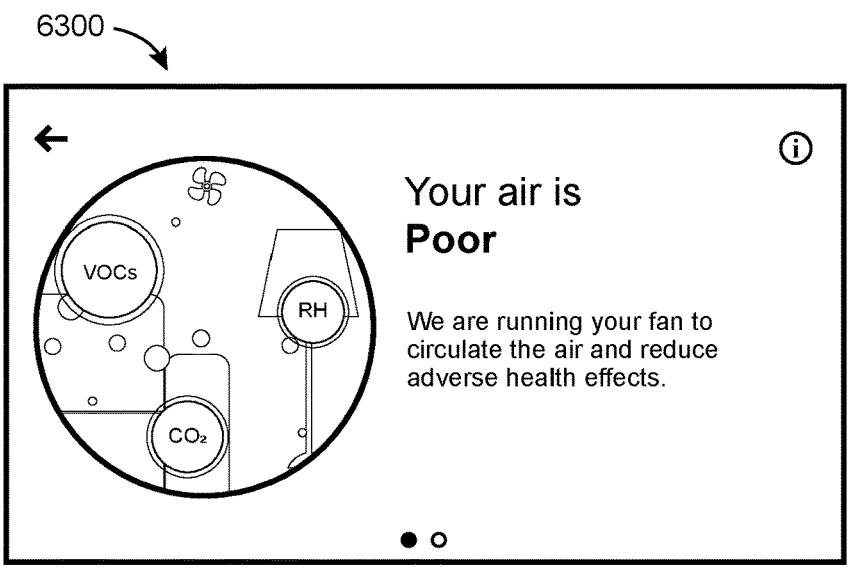
FIG. 63 is a user interface displayed by the thermostat of FIG. 4 indicating that indoor air quality is at a third level, according to an exemplary embodiment.

FIGS. 61-63 provide examples of interfaces displaying indoor air quality. Interface 6100 is an example of an interface that can be displayed by the thermostat 400 when the indoor air quality is good. None of the air quality data, displayed by the bubbles, is above a first predefined amount and therefore the green interface with the "Good" indicator is shown. In FIG. 62, the VOCs levels are above the first predefined amount but below a second predefined amount. In this regard, the VOC bubble is displayed in interface 6200 with an increased size, the yellow/orange interface is shown with the "Fair" indicator. Finally, in the interface 6300, the VOCs value is above the second predefined amount and is illustrated with a large bubble. The indicator "Poor" is shown and the interface is shown in red. In the interface 6300, a fan indicator is shown. The fan indicator indicates that smart fan settings have been enabled and/or that the fan is running to improve the air quality, e.g., the smart fan settings as discussed with reference to FIG. 46-48.

Figure 64:
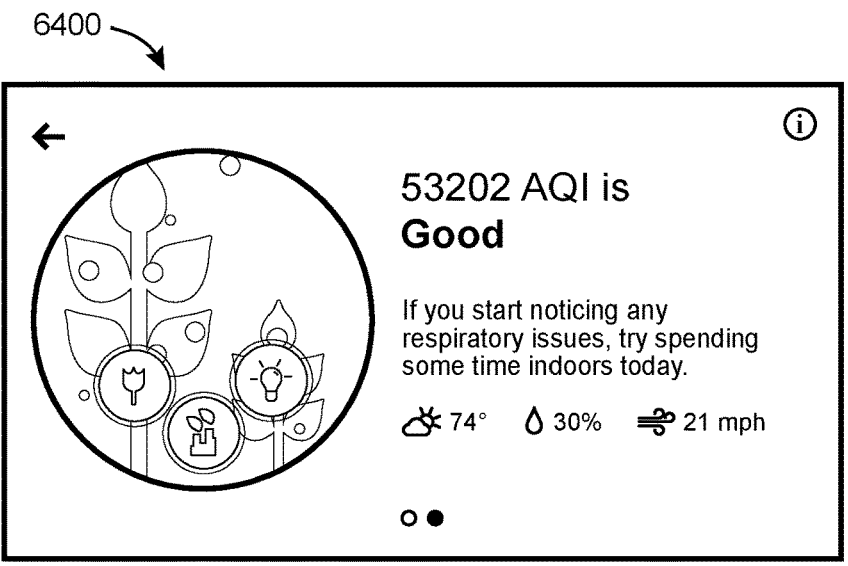
FIG. 64 is a user interface displayed by the thermostat of FIG. 4 indicating that outdoor air quality is at a first level, according to an exemplary embodiment.
Figure 65:
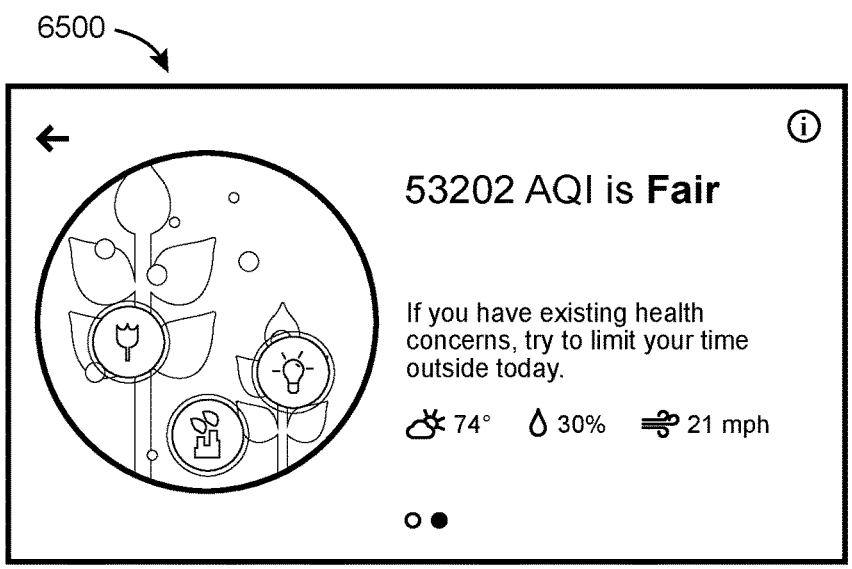
FIG. 65 is a user interface displayed by the thermostat of FIG. 4 indicating that outdoor air quality is at a second level, according to an exemplary embodiment.
Figure 66:
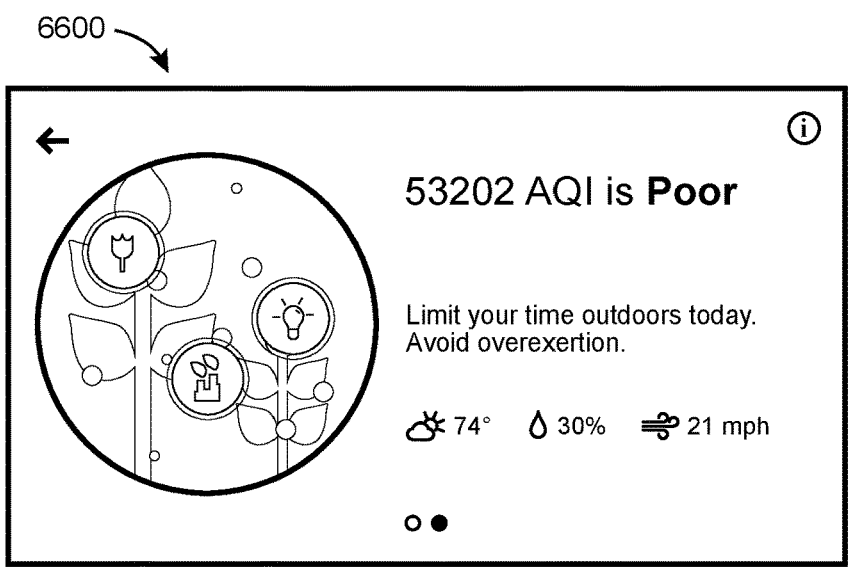
FIG. 66 is a user interface displayed by the thermostat of FIG. 4 indicating that outdoor air quality is at a third level, according to an exemplary embodiment.
Figure 67:
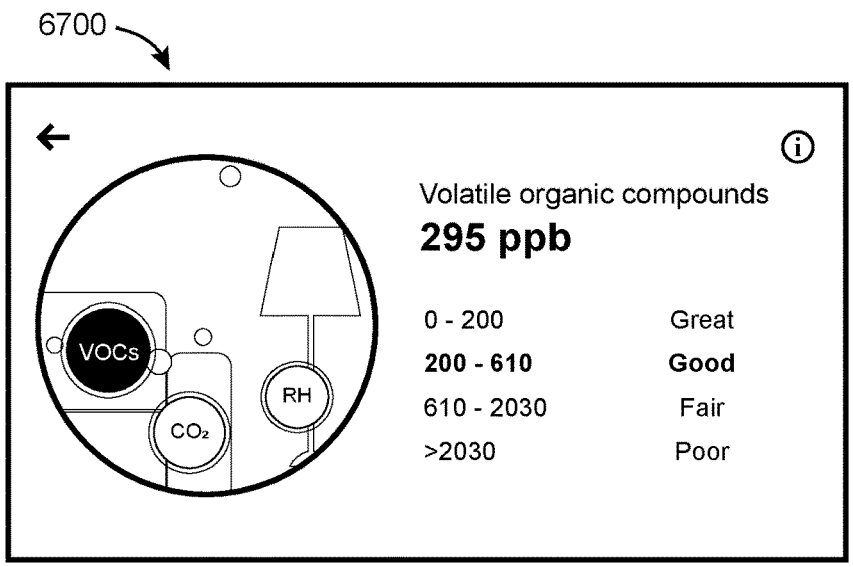
FIG. 67 is a user interface displayed by the thermostat of FIG. 4 indicating volatile organic compound (VOC) levels of indoor air quality, according to an exemplary embodiment.
Figure 68:
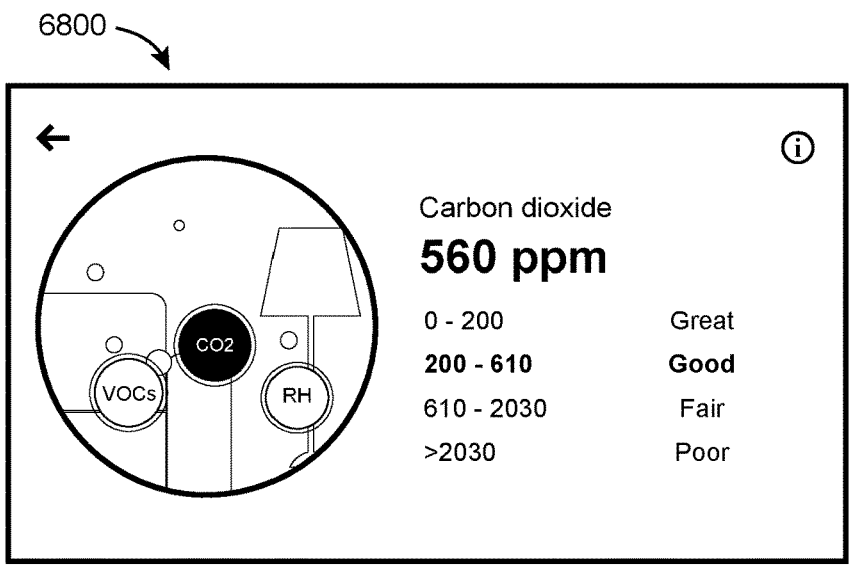
FIG. 68 is a user interface displayed by the thermostat of FIG. 4 indicating carbon dioxide (CO2) levels of indoor air quality, according to an exemplary embodiment.
Figure 69:
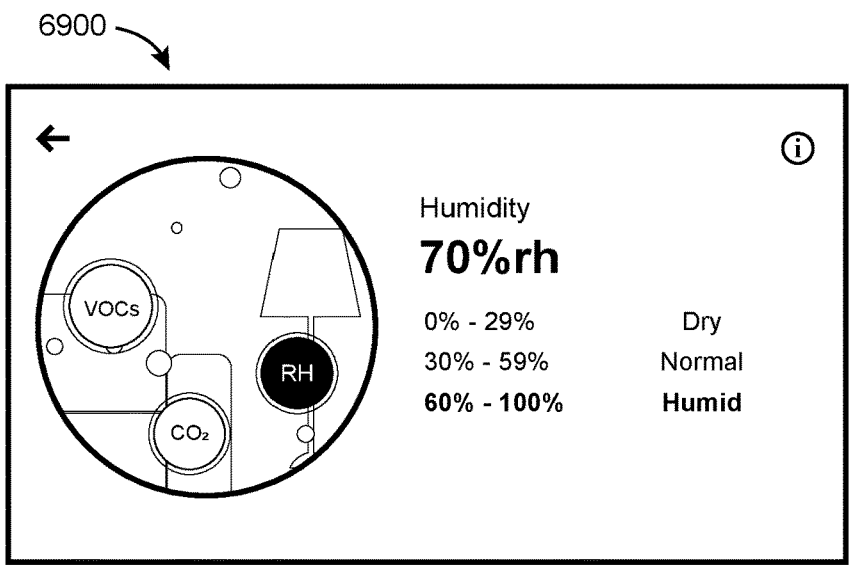
FIG. 69 is a user interface displayed by the thermostat of FIG. 4 indicating relative humidity (RH) levels of indoor air quality, according to an exemplary embodiment.
Figure 70:
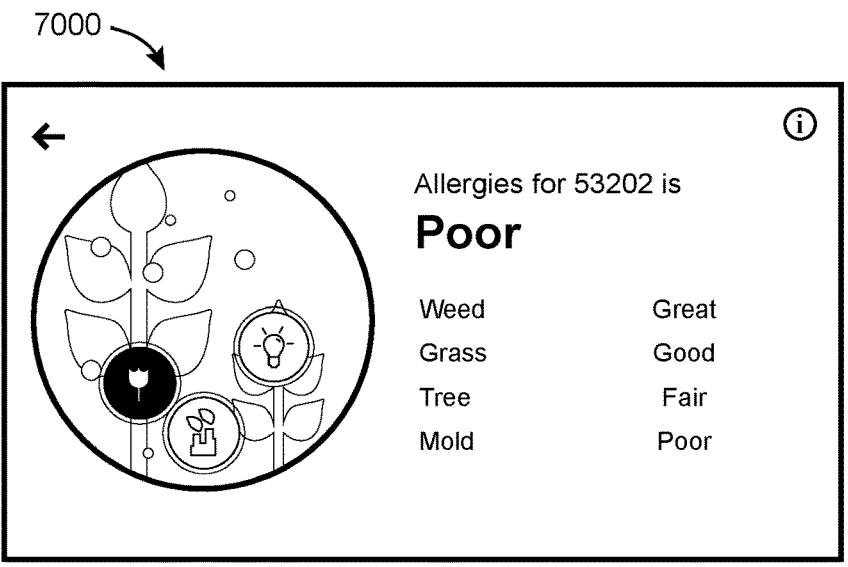
FIG. 70 is a user interface displayed by the thermostat of FIG. 4 indicating allergen levels of outdoor air quality, according to an exemplary embodiment.
Figure 71:
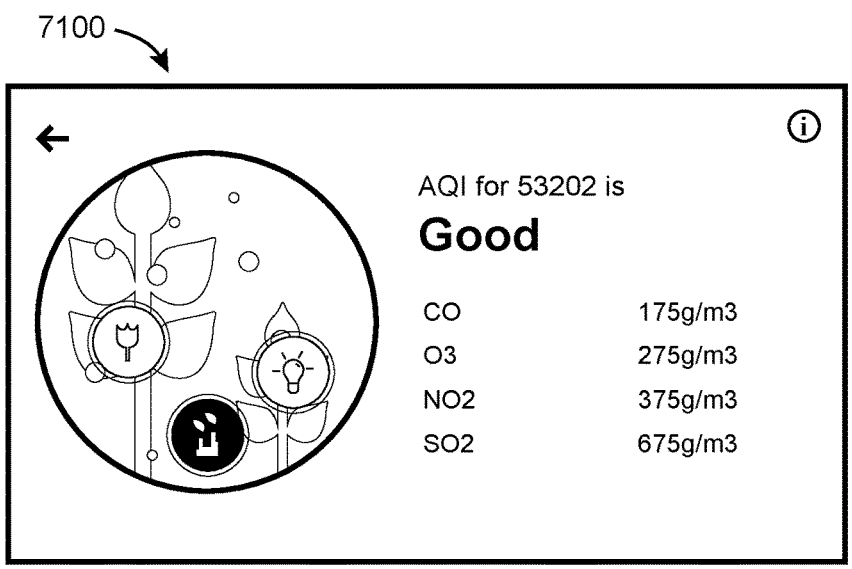
FIG. 71 is a user interface displayed by the thermostat of FIG. 4 indicating air quality index (AQI) levels of outdoor air quality, according to an exemplary embodiment.
Figure 72:
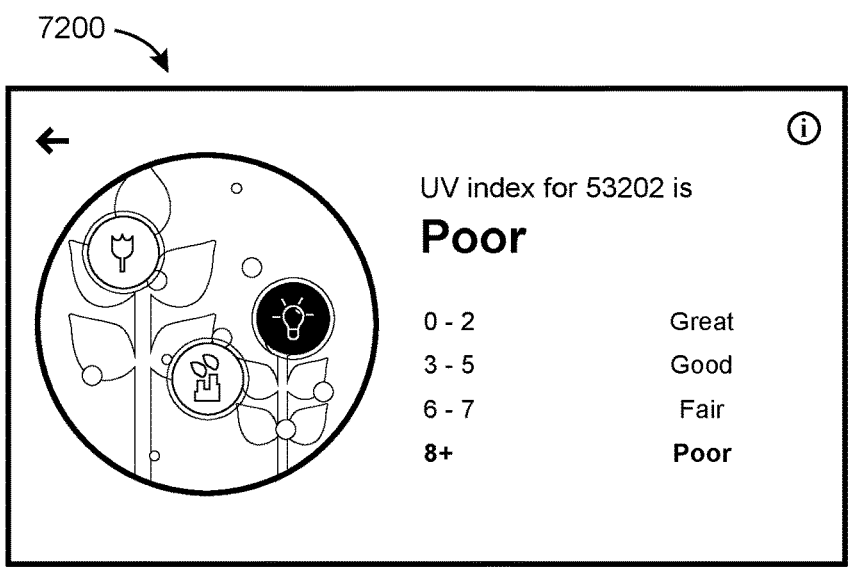
FIG. 72 is a user interface displayed by the thermostat of FIG. 4 ultraviolet (UV) index levels of outdoor air quality, according to an exemplary embodiment.

In FIGS. 64-66, interfaces 6400, 6500, and 6600 are shown illustrating outdoor air quality levels. The interface 6400 indicates that the pollen, pollution, and UV levels are at a good level, i.e., they are all below a first predefined amount. In the interface 6500, the air quality is fair, i.e., one or more of the pollen, pollution, or UV levels are above the first predefined amount. Finally, the interface 6600 illustrates poor air quality. In FIG. 66, one or more of the pollen, pollution, and UV levels are above the second predefined level.

In the interfaces 6100-6300, if a user taps on one of the bubbles, they may be presented with detailed information for the air quality value. For example, if the user taps on the VOC bubble, they may be presented with interface 6700 where a value of the VOC is displayed (e.g., displayed in units of parts per billion (ppb)). Furthermore, the windows indicating VOC ranges for great, good, fair, and/or poor VOC ranges. The corresponding window for the value of the current VOC level may be highlighted in the interface 6900. Interfaces 6800 and 6900 may be similar to the interface 6700 but may be generated and displayed by the thermostat 400 when the user interfaces with the CO2 bubble or the RH bubble.

Interfaces 7000-7200 can display information for pollen, pollution, and UV levels. If the user interacts with one of the bubbles of the interfaces 6400-6600, one of the interfaces 7000-7200 can be displayed by the thermostat 4000. The interface 7000 displays information for pollen in a region (e.g., neighborhood, city, state) where the thermostat 400 is located. The pollen data may indicate the levels of weed pollen, grass pollen, tree pollen, and mold pollen. In the interface 7100, pollution (i.e., an air quality index (AQI)) illustrates carbon monoxide values (CO), ozone (O3) values, nitrogen dioxide (NO2) values, and sulfur dioxide (SO2) values in units of gram per cubic meter (g/m3).

Figure 73:
FIG. 73 is a table indicating VOC, CO2, and pollen levels that are used to display air quality information to a user via the thermostat of FIG. 4, according to an exemplary embodiment.
Figure 74:
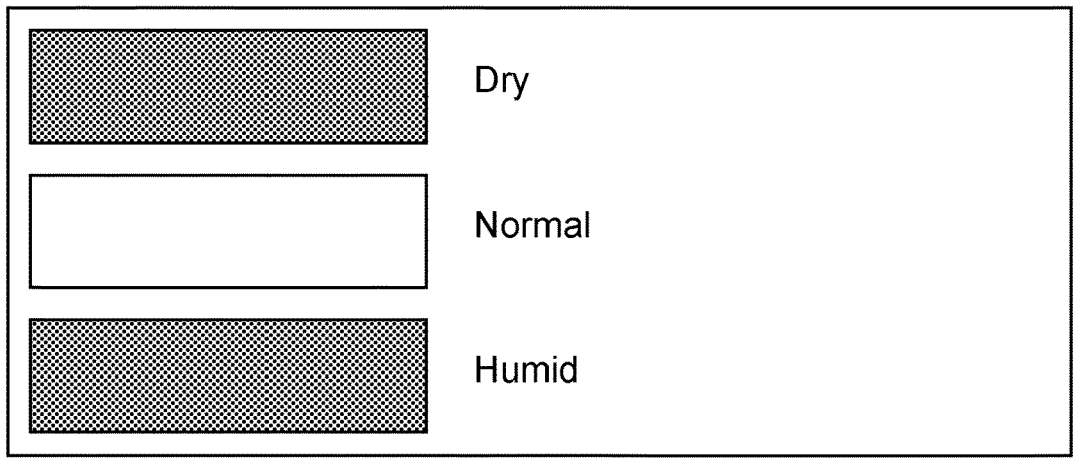
FIG. 74 is a table indicating humidity levels that are used to display air quality information to a user via the thermostat of FIG. 4, according to an exemplary embodiment.
Figure 76:
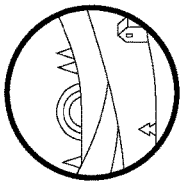
FIG. 76 is a user interface displayed by the thermostat of FIG. 4 prompting a user to enter a time at which the user wakes up, according to an exemplary embodiment.
Figure 78:
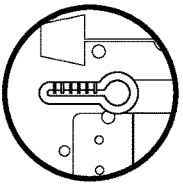
FIG. 78 is a user interface displayed by the thermostat of FIG. 4 prompting the user to enter a temperature range for when the user is within a building controlled by the thermostat of FIG. 4, according to an exemplary embodiment.
Figure 75:
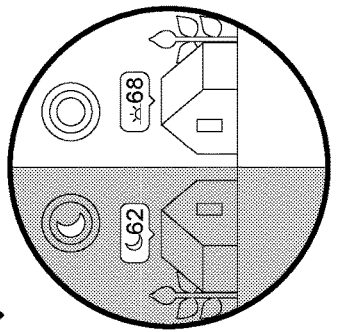
FIG. 75 is a user interface displayed by the thermostat of FIG. 4 prompting a user to start a smart scheduling process to generate a schedule for the thermostat of FIG. 4 to operate with, according to an exemplary embodiment.
Figure 77:
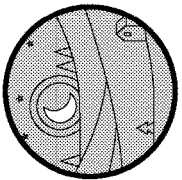
FIG. 77 is a user interface displayed by the thermostat of FIG. 4 prompting the user to enter a time at which the user goes to sleep, according to an exemplary embodiment.
Figure 79:
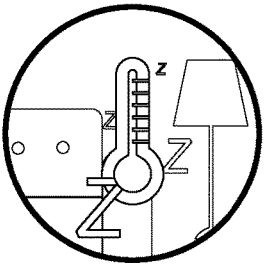
FIG. 79 is a user interface displayed by the thermostat of FIG. 4 prompting the user to enter a temperature range for when the user is asleep within the building controlled by the thermostat of FIG. 4, according to an exemplary embodiment.
Figure 80:
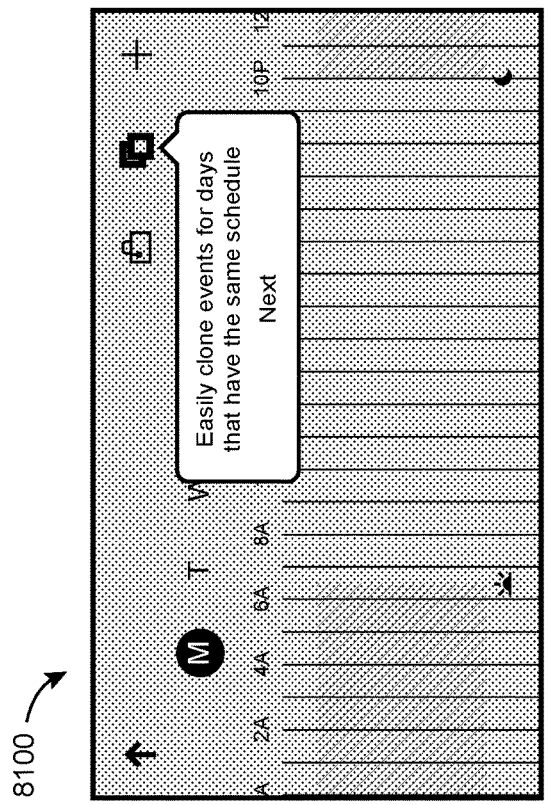
FIG. 80 is a user interface displayed by the thermostat of FIG. 4 including an interface element for adding an energy savings item to a schedule of the thermostat of FIG. 4, according to an exemplary embodiment.
Figure 81:
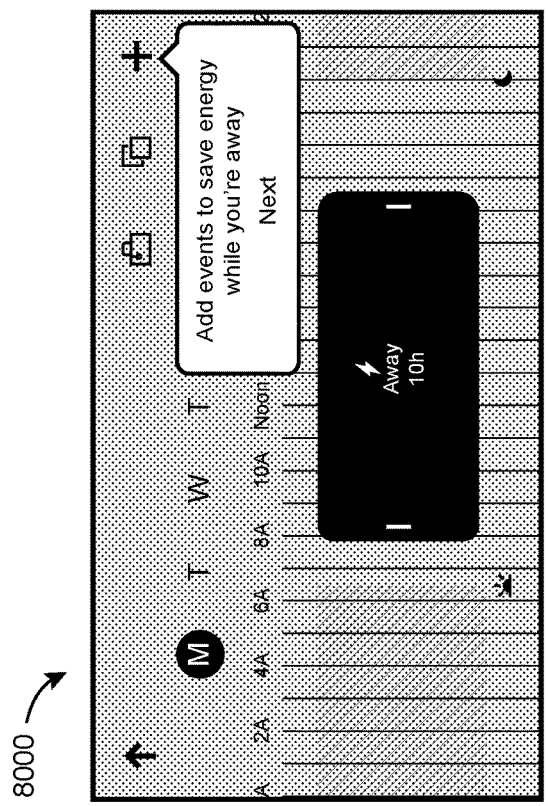
FIG. 81 is a user interface displayed by the thermostat of FIG. 4 including an interface element for cloning events of one day of a schedule to another day of the schedule, according to an exemplary embodiment.
Figure 82:
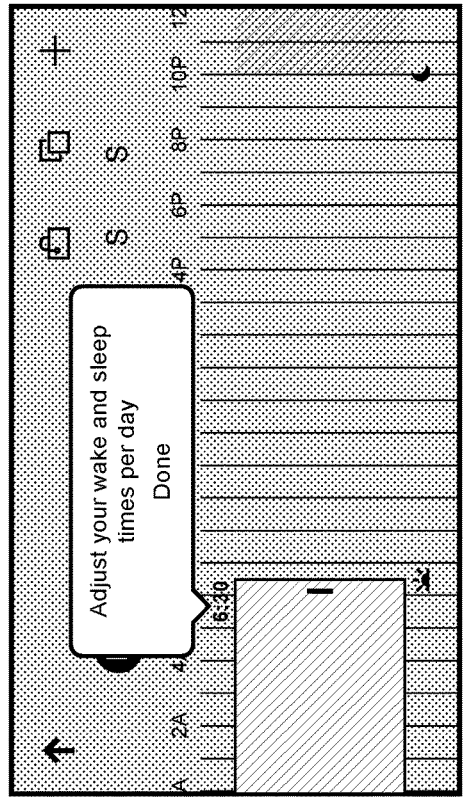
FIG. 82 is a user interface displayed by the thermostat of FIG. 4 including an interface element for adding a vacation period to a schedule of the thermostat of FIG. 4, according to an exemplary embodiment.
Figure 83:
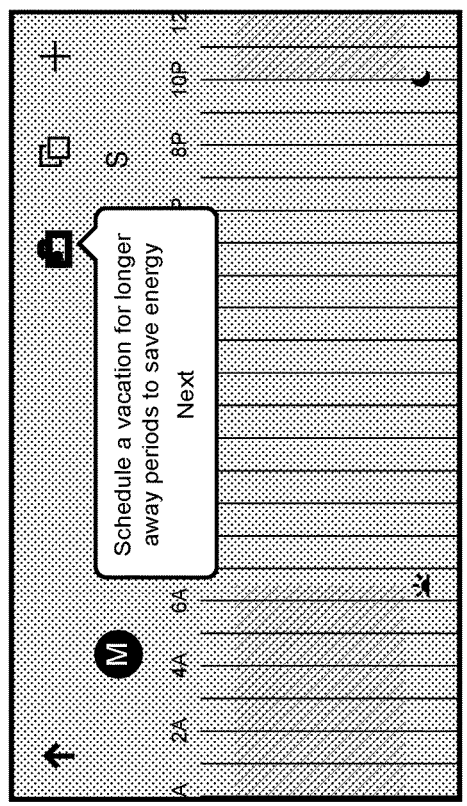
FIG. 83 is a user interface displayed by the thermostat of FIG. 4 allowing a user to adjust wake up and sleep times of a schedule of the thermostat of FIG. 4, according to an exemplary embodiment.

In FIGS. 73 and 74, charts 7300 and 7400 illustrate the levels determined based on the indoor and/or outdoor air quality data. For VOCs, CO2, and pollen, various ranges may define whether the air quality is great, good, fair, and/or poor, as shown in chart 7300. Various level ranges may define the determination of the air quality, for example, a first range may correspond to great, a second range may correspond to good, a third range may correspond to fair, while a third range may correspond to poor. For humidity, the levels may be dry, normal and humid. The levels may correspond to ranges of humidity, for example, a first range may correspond to dry, a second range may correspond to normal, while a third range may correspond to humid.

Referring now to FIGS. 75-109, interfaces for generating an operating schedule for the thermostat 400 are shown, according to various exemplary embodiments. The interface 7500 may provide an overview of the scheduling process that the scheduling manager 714 can be configured to perform. Once the user starts the scheduling process, the thermostat 400 can display the interface 7600 which prompts the user to enter a wakeup time. The user can interact with a tumbler of the interface 7600 to select their wakeup time. In the interface 7700, the user can be prompted to select, via a tumbler, a time that the user usually goes to sleep. Next, the thermostat 400 can provide the user with an interface prompting the user to identify a temperature range which they prefer when they are at home. A tumbler may be included in the interface 7800. The tumbler may be a tumbler of predefined temperature ranges. The ranges may be in increments of four degrees in some embodiments. In a similar manner, in the interface 7900, the user can select, via a tumbler, a preferred sleeping temperature.

Once the user has defined their waking and sleeping times and their preferred temperature settings for when the user is at home and when the user is asleep, the thermostat 400 can present the user with a series of coachmarks interfaces 8000-8300. The coachmarks interfaces may walk a user through various scheduling settings and functions. In interface 8000, the interface 8000 can provide an indication of the button with which to add energy savings away periods where the thermostat 400 can operate the equipment connected to the thermostat 400 at a reduced demand to lower energy usage. The interface 8100 may indicate a clone button which can be used to clone schedules for one day to another or multiple other days. In the interface 8200, the interface 8200 may indicate to a user the button to interact with to set up a vacation schedule for setting away periods to be longer than a regularly scheduled away period. Furthermore, the interface 8300 can instruct a user how to adjust their waking and sleeping times for a day or days. The waking and sleeping times may be the waking and sleeping times defined in the interfaces 7600-7900 by the user.

Figure 84:
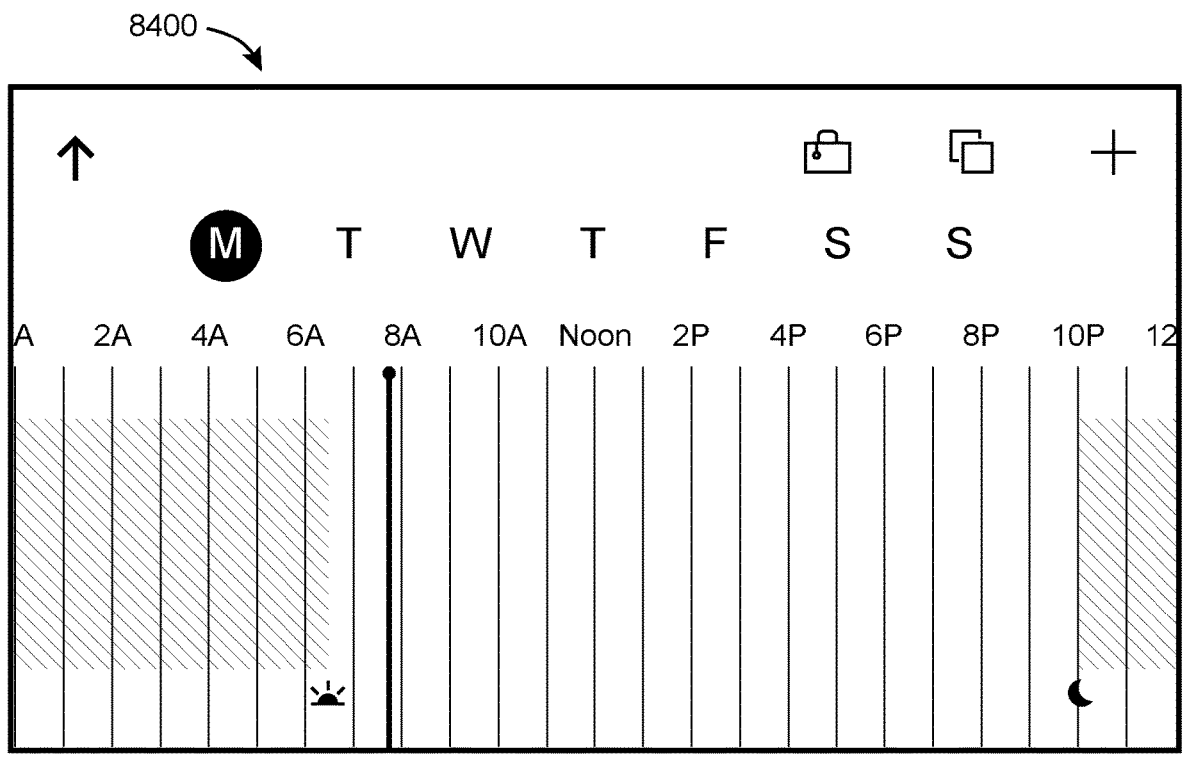
FIG. 84 is a user interface displayed by the thermostat of FIG. 4 including a schedule with no events, according to an exemplary embodiment.
Figure 85:
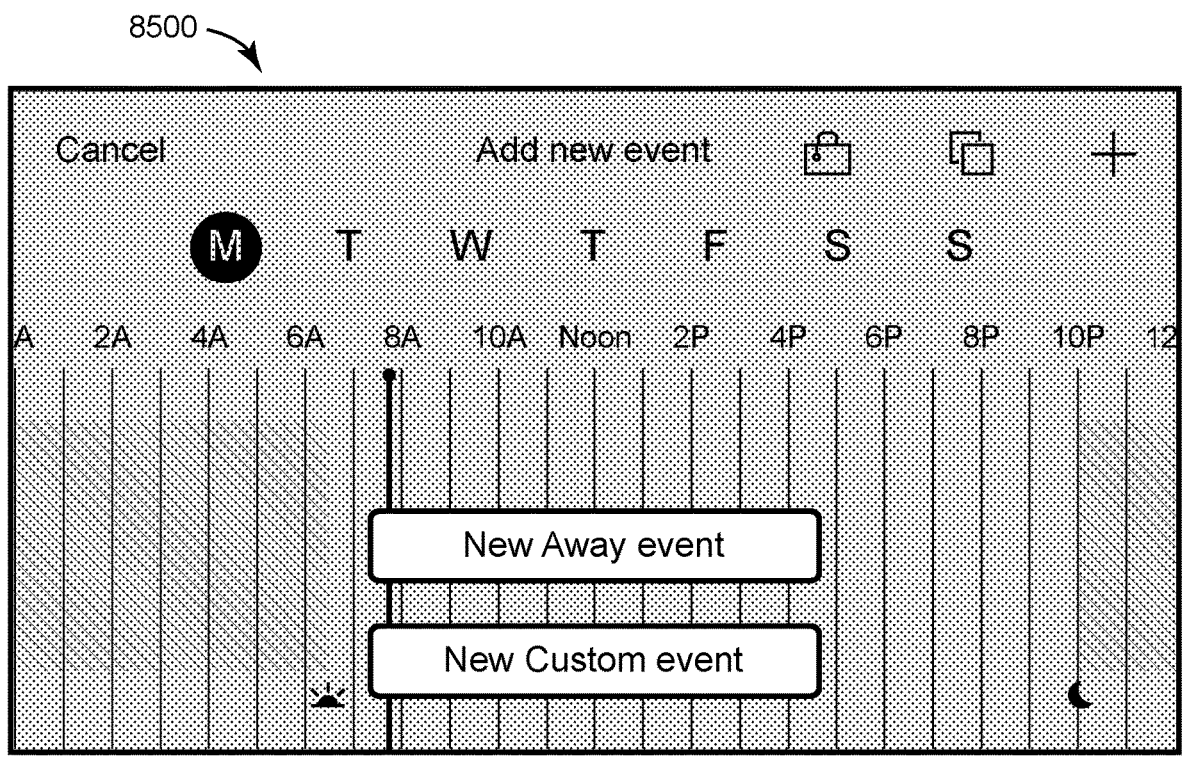
FIG. 85 is a user interface displayed by the thermostat of FIG. 4 including interface elements for adding events to a schedule of the thermostat of FIG. 4, according to an exemplary embodiment.
Figures 86, 87:
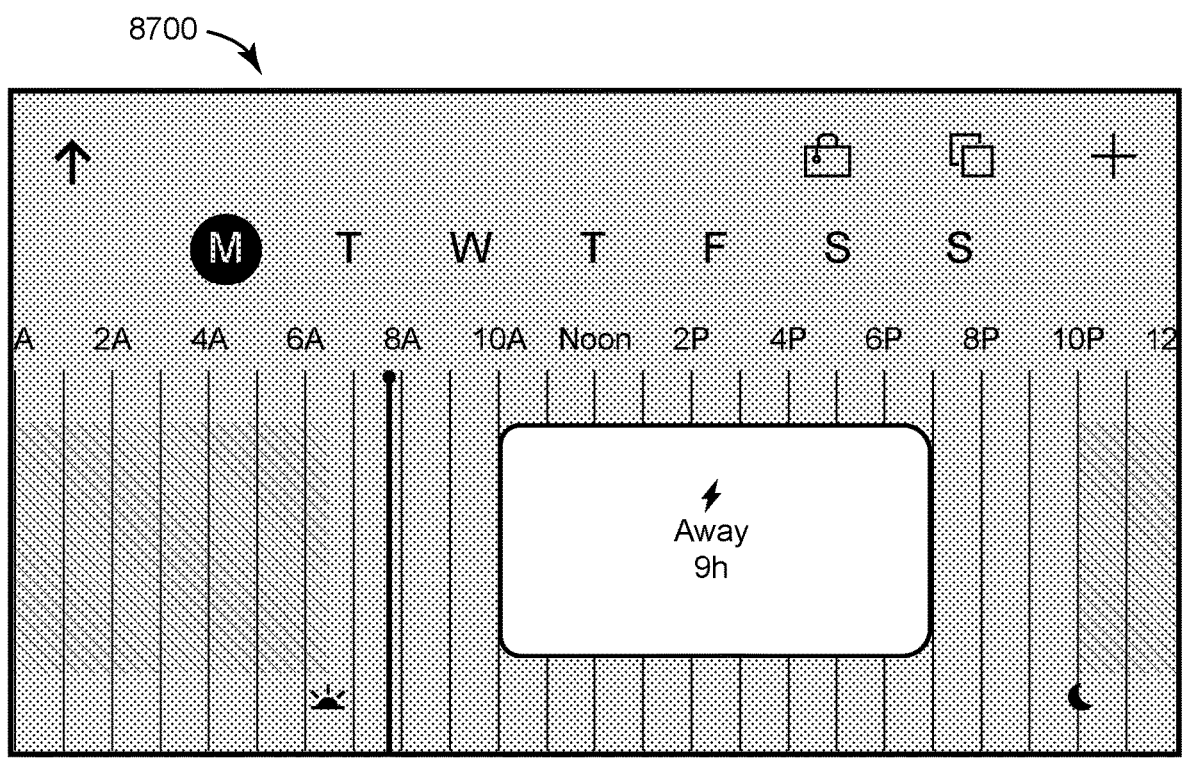
FIG. 86 is a user interface displayed by the thermostat of FIG. 4 including interface elements for defining a start time and an end time of an event of a schedule of the thermostat of FIG. 4, according to an exemplary embodiment.
FIG. 87 is a user interface displayed by the thermostat of FIG. 4 including a schedule with an event, according to an exemplary embodiment.
Figure 88:
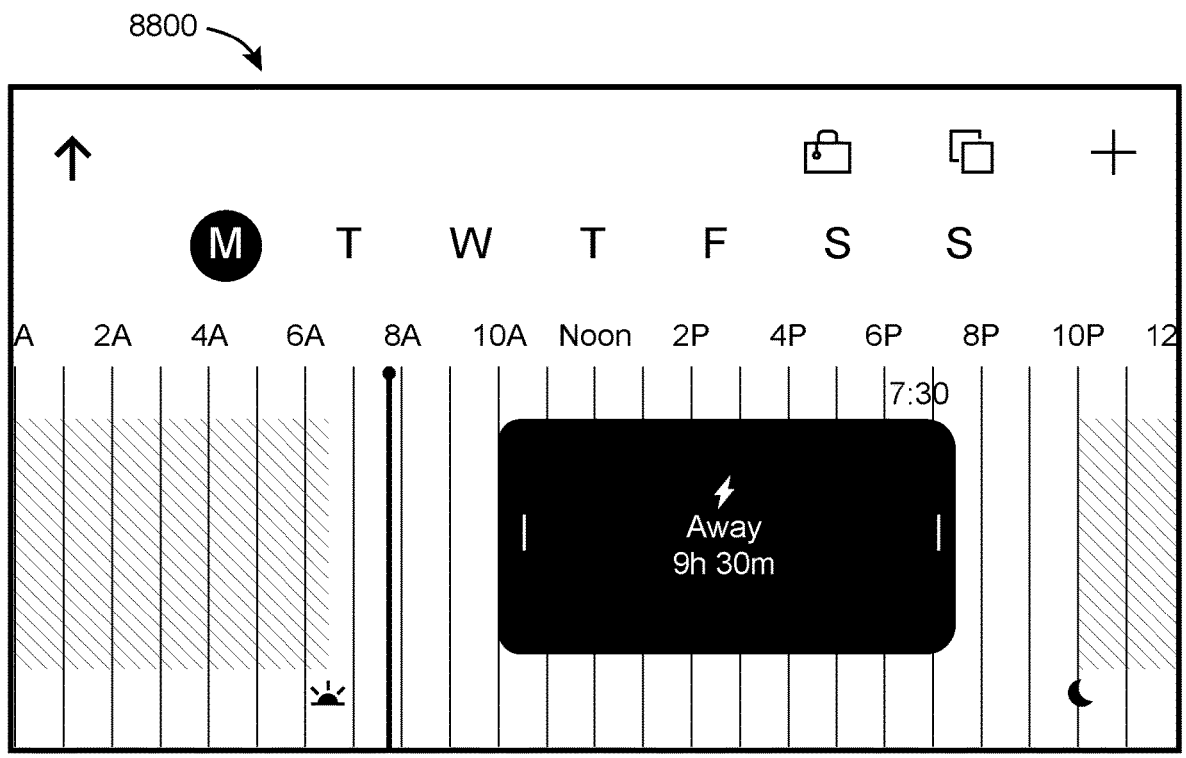
FIG. 88 is a user interface displayed by the thermostat of FIG. 4 including a schedule with an event that has been selected by a user, according to an exemplary embodiment.
Figure 89:
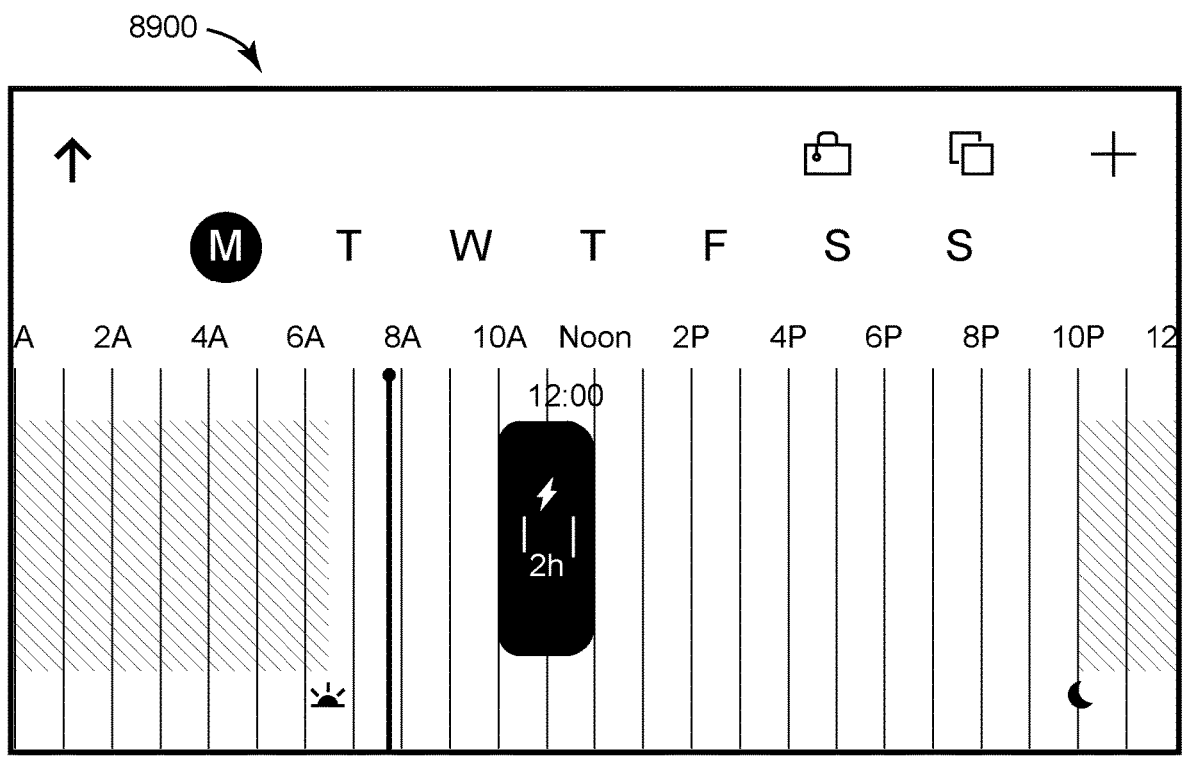
FIG. 89 is a user interface displayed by the thermostat of FIG. 4 including a schedule with an event that has been selected by a user and has been updated to a new duration, according to an exemplary embodiment.
Figure 91:
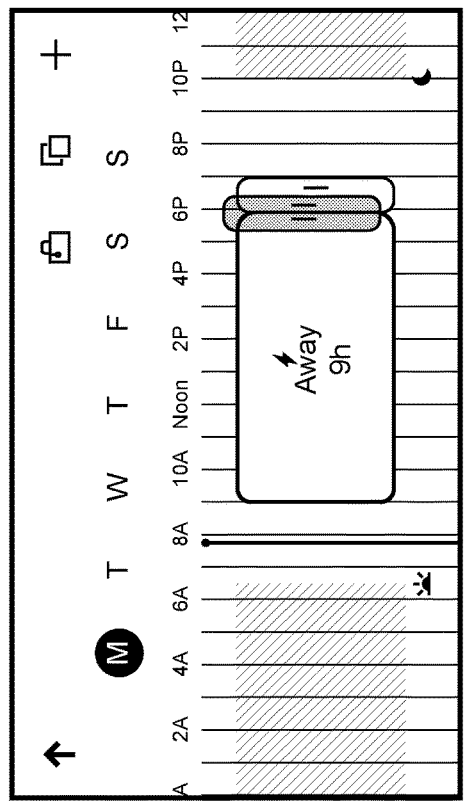
FIG. 91 is a user interface displayed by the thermostat of FIG. 4 including a schedule with a first event and a second event that a user is updating to overlap with the first event, according to an exemplary embodiment.
Figure 90:
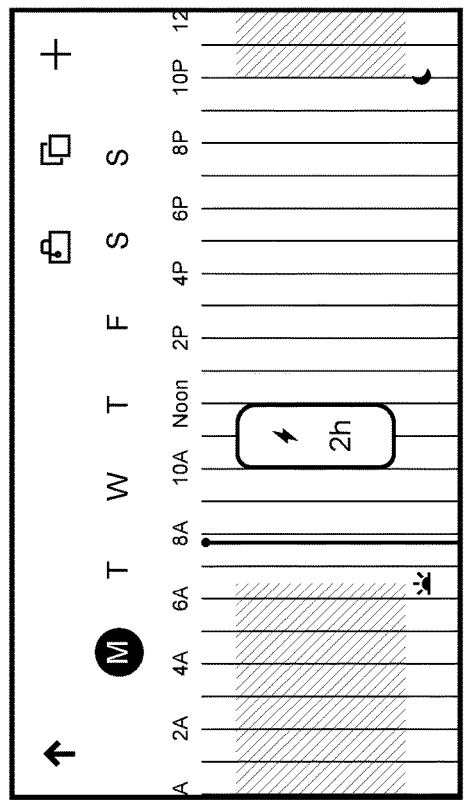
FIG. 90 is a user interface displayed by the thermostat of FIG. 4 including a schedule with an event that is not selected by a user, according to an exemplary embodiment.
Figure 92:
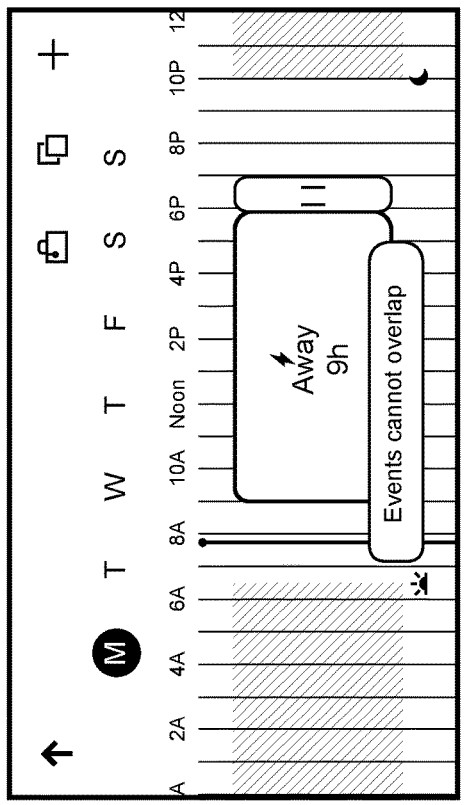
FIG. 92 is a user interface displayed by the thermostat of FIG. 4 including a schedule with a first event and a second event and a reminder that the first event and the second event cannot overlap, according to an exemplary embodiment.
Figures 93, 94:
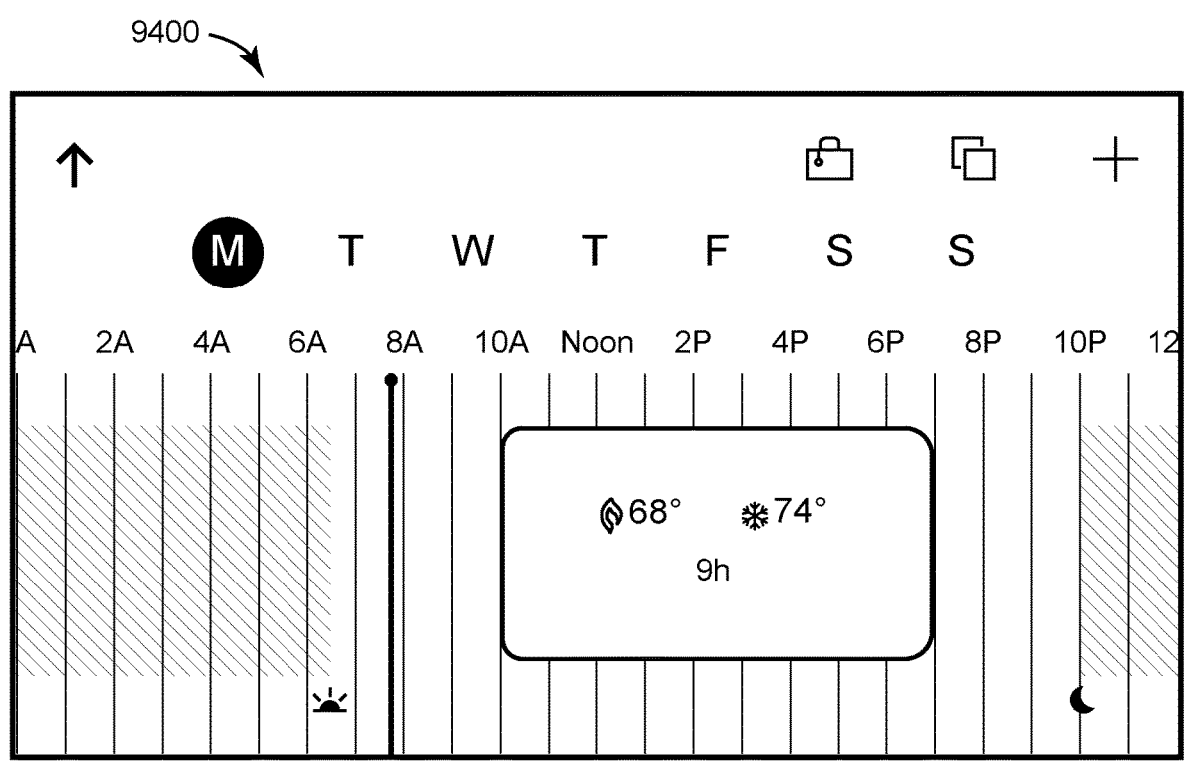
FIG. 93 is a user interface displayed by the thermostat of FIG. 4 including interface elements for adding custom events to a schedule of the thermostat of FIG. 4, according to an exemplary embodiment.
FIG. 94 is a user interface displayed by the thermostat of FIG. 4 including a schedule with a custom event, according to an exemplary embodiment.
Figure 96:
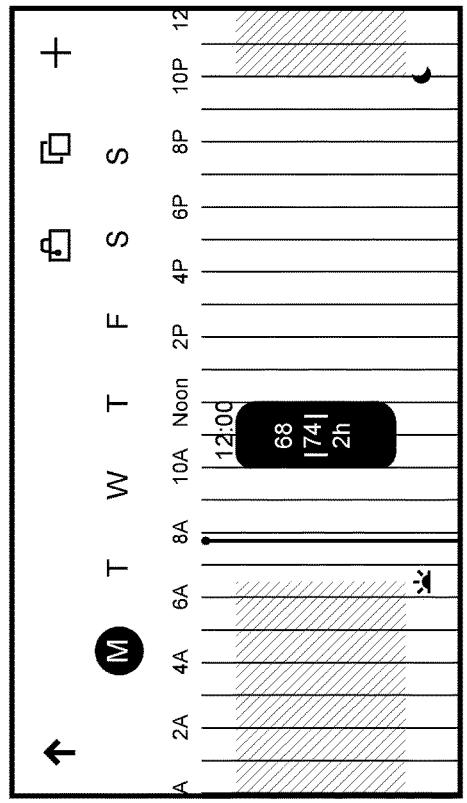
FIG. 96 is a user interface displayed by the thermostat of FIG. 4 including a schedule with a custom event that has been selected by a user, according to an exemplary embodiment.
Figure 97:
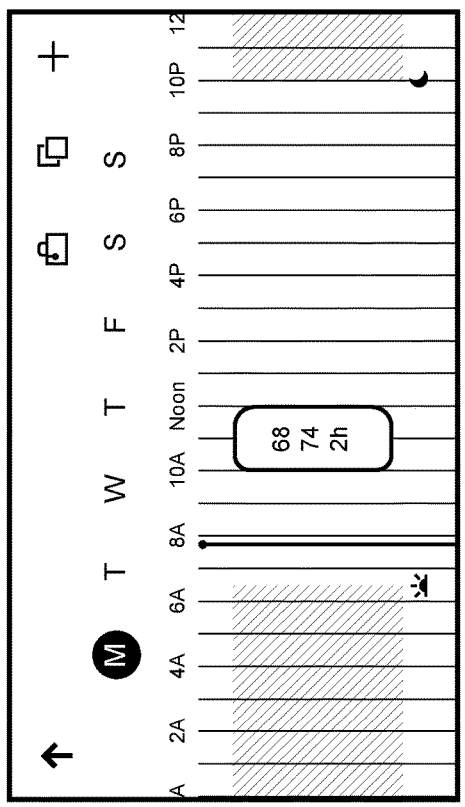
FIG. 97 is a user interface displayed by the thermostat of FIG. 4 including a schedule with a custom event that has been selected by a user and has been updated to a new duration, according to an exemplary embodiment.
Figure 98:
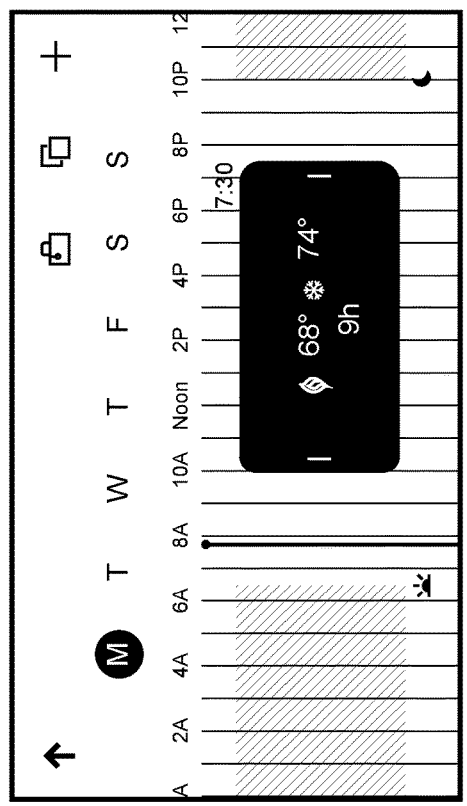
FIG. 98 is a user interface displayed by the thermostat of FIG. 4 including a schedule with a custom event that has not been selected by a user, according to an exemplary embodiment.
Figure 99:
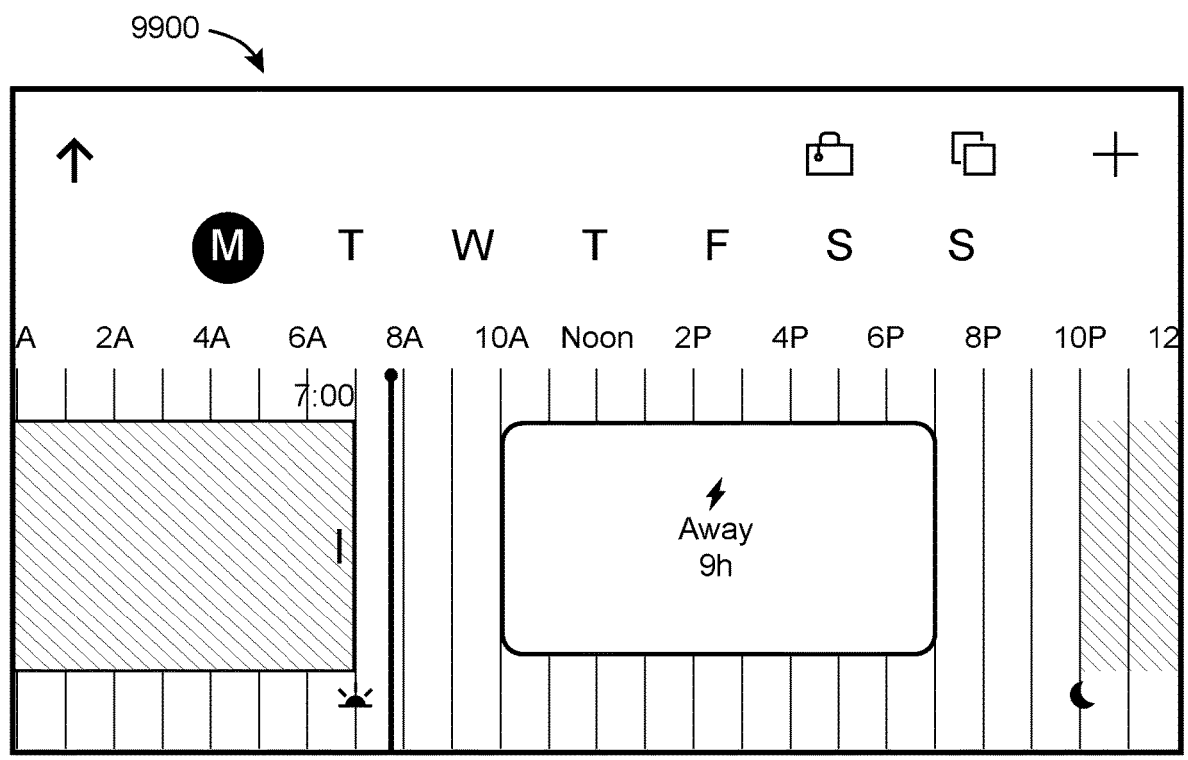
FIG. 99 is a user interface displayed by the thermostat of FIG. 4 including a schedule with a sleeping time period and an event, according to an exemplary embodiment.
Figure 100:
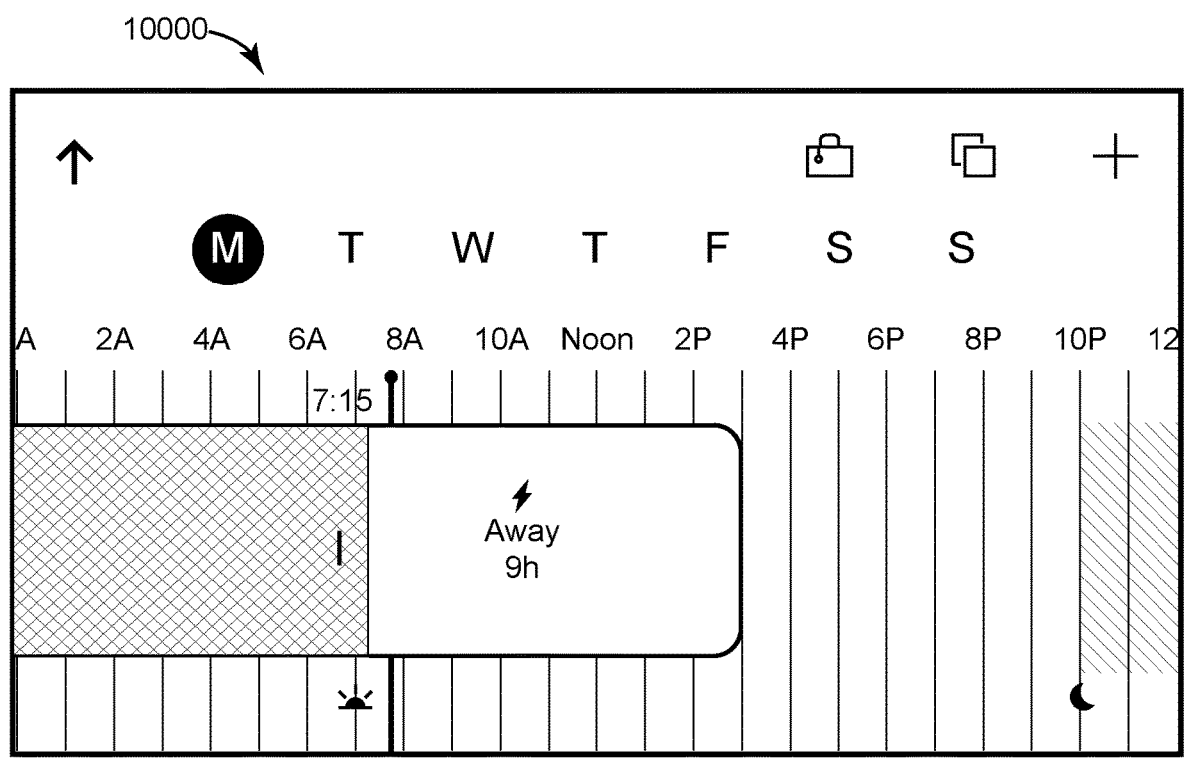
FIG. 100 is a user interface displayed by the thermostat of FIG. 4 including a schedule with a sleeping time period overlapping with an event, according to an exemplary embodiment.
Figure 105:
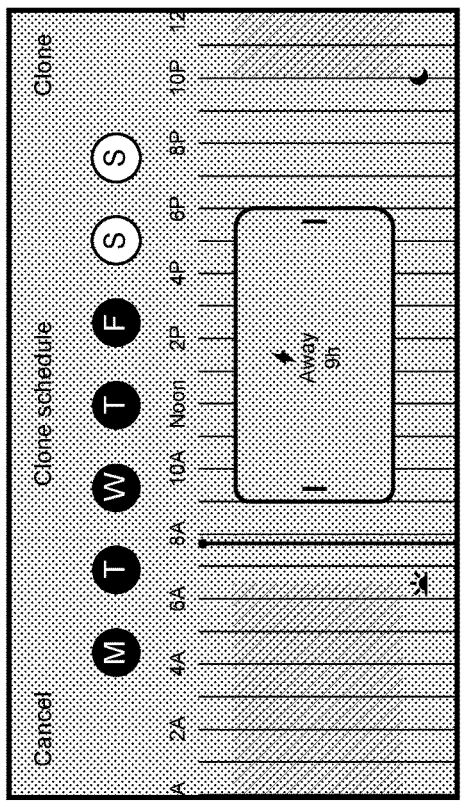
Figure 106:
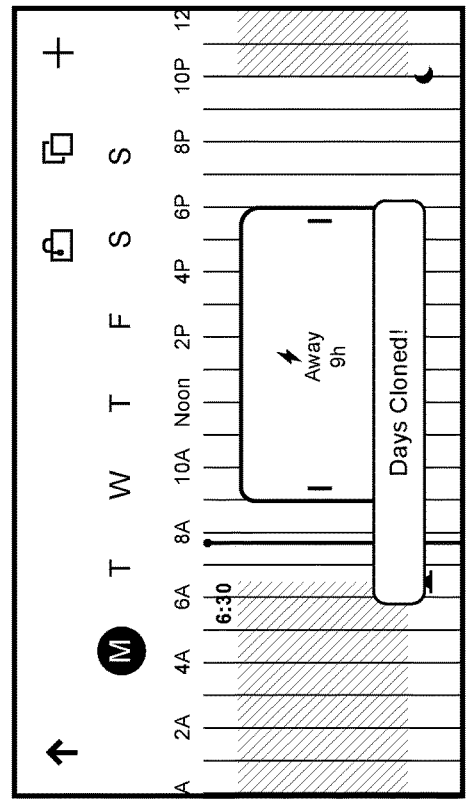
Figure 107:
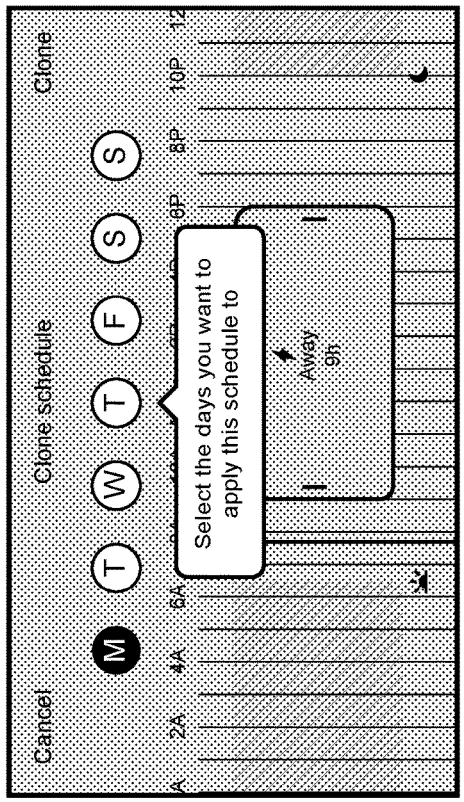
Figure 108:
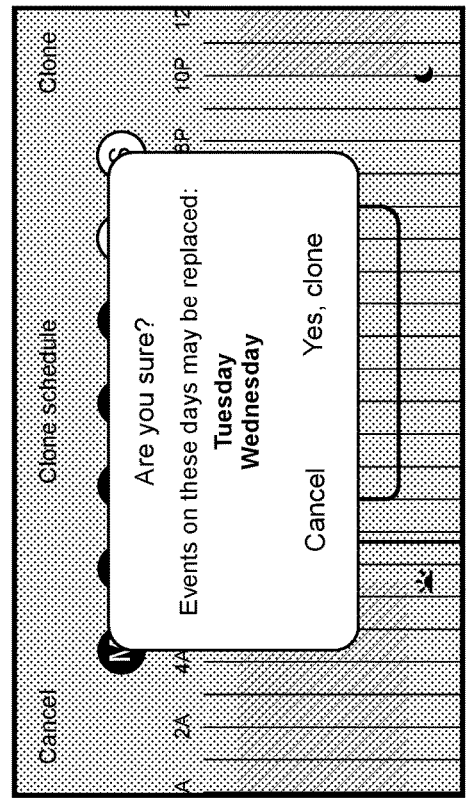

In FIGS. 84 and 85, interfaces 8400 and 8500 are shown for reviewing a current schedule and adding new events. The interface 8400 presents a user with an interface that displays a waking and sleeping schedule and day events that occur between the wake up time and the sleep time defined by the sunrise and moon symbols. A user can view the schedules for multiple different days by tapping on the day or by swiping on the current schedule timeline. If the user interacts with the plus button in the interface 8400, the thermostat 400 can display the interface 8500 which prompts the user to add new away events to the current schedule or new custom events. If the user selects to add new away events, the user may be guided through interfaces 8600-9200.

In the interface 8600, the user may be presented with an interface to define a start time and an end time for the away event. If the user interacts with the start time or the end time, the user may be presented with interface 9500 where a tumbler may be present to select the start time or the end time. Once the user has selected the start and end times via the interface 8600 and selected the add button, the user may be returned to the main scheduling interface with the added away event present, as shown in the interface 8700 of FIG. 87. The start time and the end time may be any time so long as the start time and the end time do not overlap with another event on the schedule timeline. If a user taps on the away event of interface 8700, an editing mode may be enabled as shown in the interface 8800. The away event may indicate, with vertical lines at the ends of the away event, that a user can adjust the away event by dragging the ends of the away event. The away event may be adjusted in increments of fifteen minutes or any other interval as the user drags the ends of the away event. A minimum time may be allowed for an away event (e.g., one hour). As a user decreases the time of the away event, less information may be shown in the away event block, e.g., interface 8900 of FIG. 89. If the user taps anywhere on the screen, they may exit the editing mode and return to a view mode as shown in interface 9000.

While in the editing mode, the user can drag an entire away event and move it to a new position on the schedule time-line. As the user drags the event, the current location of the event may be ghosted. If the dragged event overlaps with another existing event, a red indicator may be displayed. Furthermore, if the user releases the grabbed event while overlapping with another event, the event may move back to the ghosted position. This functionality is illustrated in interfaces 9000, 9100, and 9200.

In response to selecting the new custom event element of the interface 8500, the user may be presented with the interface 9300 for adding a custom schedule event. The user can define a starting time, and ending time, a heating setpoint, and/or a cooling setpoint via the interface 9300. If the user selects one of the customer event parameters, the user may be presented with a tumbler to adjust the value of the selected parameter e.g., as shown in the interface 9500. Once the user selects the custom event, they may view the schedule time-line with the new event as shown in the interface 9400. Interfaces 9600-9800 illustrate adjusting and editing the custom event as defined by the user via the interface 9300.

As shown in interfaces 9900 and 10000, a user can be configured to adjust the day and night schedule for a particular day in a similar manner as adjusting the away and/or customer scheduled events. A user can select the sleeping period and drag the sleeping period to adjust the wakeup or go to sleep times of the sleeping period. If the adjusted time of the sleep period falls on a current event of the schedule, the sleeping period may turn red indicating the schedule conflict. If the user lets go of the sleep schedule while there is a conflict, the sleep schedule may return to its original location.

If a user taps on an existing away or custom event, the user may be presented with the interface 10100 for editing the event. The user can also delete the event as shown in interface 10300. If the user adjusts the start or end times of the selected event and changes the start or end times to a time which conflicts with another existing time of the current schedule, the time may be highlighted in red and a pop up notification can be displayed indicating that the user needs to adjust their start or end time to an acceptable time as shown in interface 10200. If the user taps on the sleep schedule, the user may be presented with the interface 10400 where the user can adjust the wake up time or the sleep time for the sleep schedule.

In interfaces 10500, 10600, 10700, and 10800, interfaces are shown for cloning schedules from one day to another day. Cloning schedules allows a user to quickly copy a desired scheduled defined for a first day to a second day. If the user interacts with the clone button shown in the interface 10500, the user may be prompted to select multiple days other than the current day. These days may be the days to clone the schedule of the first day. In the interface 10600, the first day is shown by a dark blue circle while the days to receive the schedule of the first day are shown in a lighter blue. When the user confirms the cloning of the schedule from the first day to the second days, the scheduling manager 714 can be configured to determine whether the schedule of the first day conflicts (e.g., where any scheduled events of the days overlap). If there is an overlap, the thermostat 400 can indicate, e.g., as shown in the interface 10700, which days selected in interfaces 10500 and 10600 have conflicts. If the user determines to proceed with the cloning, the events (or the conflicting events) of the conflicting days may be deleted so that the day can accept the cloned schedule. Once the cloning is completed the user may be displayed a pop up notification indicating that the days have been successfully cloned, as illustrated in the interface 10800.

Figure 109:
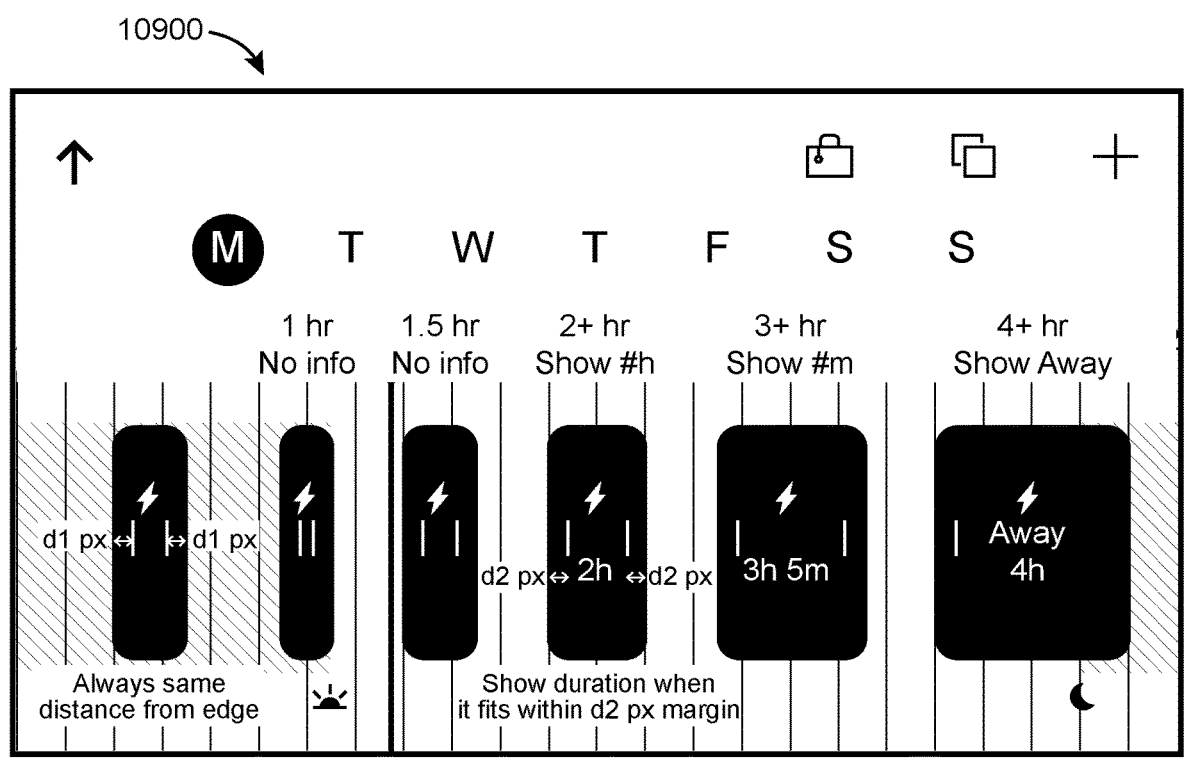

Interface 10900 of FIG. 109 illustrates the various event sizes that the thermostat 400 may display. The thermostat 400 display events in a one hour form, a one and a half hour hour form, a two hour form, a three hour form, and a four hour form. As the sizes change of the events, more or less information may be displayed in the event. For example, the one hour and one and a half hour block may display no event information. However, for the two hour form, only the time in hours may be displayed. For example, if the event period is two hours and ten minutes, the information of the event may only display two hours. For an event period over three hours but less than four hours, the event may display both the time in hours and the time in minutes of the event. For an event over four hours, the event may display the time in hours and/or the time in minutes and further include the type of the event, e.g., a custom event or an away event.

Referring now to FIGS. 110-134, installation instruction interfaces for installing the thermostat 400 that can be displayed on the user device 724 are shown, according to an exemplary embodiment. The installation instructions can be generated and displayed by the user device 724 via a mobile application. Likewise, the installation instruction interfaces can be generated by the server system 726 or the server system 726 can cause the user device 724 to generate the installation instruction interfaces. When a user first installs the thermostat 400 (e.g., when the user first logins to an interface via the server system 726 or first opens the mobile application), a splash screen 11000 may be displayed followed by information interfaces detailing scheduling of the thermostat 400 (e.g., the interface 11300), and/or an interface detailing the air quality features (e.g., the interface 11100) and the energy savings features of the thermostat 400 (e.g., the interface 11200). The information may also include details on smart scheduling features that the thermostat 400 can be configured to perform (e.g., the interface 11300).

Once the user has logged into their account (or created a new account) via the interfaces 11400 and 11500, the user may be provided with an task overview interface 11600 of the required steps for installing the thermostat 400. In interface 11400, if a user interacts with the "check your wiring compatibility?" element, the user may be directed to the interfaces 1100-1500 of FIGS. 11-15 to determine whether the current installed system of the user is compatible with the thermostat 400.

The interfaces 11700-13400 may guide a user through the steps of installing the thermostat 400 and completing the list of tasks shown in interface 11600. While the user is installing the thermostat 400 via the interfaces 11700-13400, the user may be presented with the interface 11600 where a check mark may be displayed for each task completed. Via the interface 11600, the user can select various steps and jump between steps causing the user device 724 to display the instruction screen for a selected step.

In interface 11700, the user may be presented with a link to download an digital copy of an instruction manual as well as support contact information. Once the user swipes to the left, the user may be presented with the interface 11800. The interface 11800 can display the components that come with the thermostat 400. In the interface 11900, a user is presented with a brief overview of the equipment that the thermostat 400 can be configured to control. In the interface 12000, the user may be presented with terminal information describing the functionality of each terminal of the thermostat 400. In interfaces 12100 and 12200, the user can be presented with various warnings for safely and properly installing the thermostat 400.

In the interface 12300, the user can be instructed to turn off system power so that the equipment that will be connected to the thermostat 400 is powered off during the installation period. In the interface 12400, the user can be presented with a "take picture" element which, when interacted with, causes a camera interface 12500 to be displayed so that a user can take a picture of the current wiring of their existing thermostat. In interface 12600, the user may be asked whether they have a c-wire, a "common wire." If the user indicates that they do not have a c-wire, the user may be presented with the interface 12700 indicating to the user how to install an adapter unit which may be required for operating the thermostat 400 when the thermostat 400 will not be connected to a c-wire. In the interfaces 12800-13000 the user can be presented with instructions for removing their existing thermostat and installing the thermostat 400. In the interface 13100, the user may be instructed to wire the existing thermostat to the equipment to be controlled by the thermostat. The interface 13100 may include an element which, when interacted with, can present the picture of the previous wiring of the previous thermostat captured via the interface 12500. The user can view the final setup steps of interface 13200-13300 and presented with a completion interface 13400 once the last step is completed.

Referring now to FIGS. 135-146, scheduling interfaces 13500-14600 are shown for generating a schedule for a commercial building, according to various exemplary embodiments. The interfaces 135000-14600 can be generated by the scheduling manager 714 when the thermostat 400 is installed in a commercial building, e.g., an office building. The interfaces 13500-14600 and functionality described with reference to the interfaces 13500-14600 is similar to the functionality and the interfaces as described with reference to FIGS. 75-109.

In the interface 13500, a tumbler may be present prompting a user to indicate a time at which tenants or employees typically arrive at a building. Similarly, the interface 13600 prompts the user to enter a time at which the tenants or employees leave the building. In the interfaces 13700-13800, the user is prompted with tumbler interfaces prompting the user to selected a temperature range that is desired during an occupied time period and an unoccupied time period. The temperature for the occupied time period may be the time between when the employees arrive to when the employees leave. The unoccupied temperature range may be used to heat or cool the building between when the employees leave and when the employees arrive.

In the interfaces 13900-14100, a coachmarks process is shown for informing the user of the schedule interface for adjusting a schedule. In the interface 13900, the interface 13900 indicates unoccupied times of the building. The unoccupied times may be the time period determined via the interfaces 13500-13600. The occupied time shown in interface 14000 indicates a time period determined based on the input of the user via the interfaces 13500-13600. This occupied time period indicates when building employees are present in the building.

If the thermostat 400 is integrated with a building automation system (BAS), the BAS system may provide the thermostat 400 with exception time periods as shown in interface 14100. The exception time periods may be times where the BAS has determined that a particular heating and/or cooling schedule should be operated. The thermostat 400 can be configured to receive the exception times from the BAS and add the exception times to the schedule operates by the thermostat 400. Interface 14100 and 14300 indicate examples of schedules with an occupied time, an unoccupied time, a custom event, and an exception time. Interface 14200 illustrates an interface with an occupied time and a custom event.

Interface 14400 can be displayed by the thermostat 400 after a user interacts with a plus button on the interface 14400. The interface 14400 can display elements which can add occupied events or custom events. If the user interacts with the new occupied event element of the interface 14400, the user may be provided with the interface 14500 for selecting a starting time and an ending time for an occupied event. If the user selects the new custom event element of the interface 14400, the user may be provided with the interface 14600 where the user can set a time period for a custom event, a heating setpoint, and/or a cooling setpoint.

Referring now to FIGS. 147-151, interfaces 14700-15100 are shown for performing a setpoint hold for the thermostat 400, according to an exemplary embodiment. The thermostat controller 720 can be configured to generate the interface 14700-15100 and operate the equipment connected to the thermostat 400 configured to heat and/or cool the building that the thermostat 400 is located in based on user input received from the thermostat 400. If the user is on a home screen of the thermostat 400, e.g., the interface 14700 and the user taps the setpoint up or setpoint down buttons, the thermostat 400 can cause the interface 14800 to display setpoint hold settings 14802. The hold settings 14802 may be one or more options for holding a currently displayed setpoint temperature.

For example, if a user selected the two hour hold time as shown in interfaces 14700-14900, the thermostat controller 720 can be configured to operate the thermostat 400 to condition a space to the held setpoint regardless of any scheduling or occupancy based determinations. One option may be a "Hold" option instead of a time option as shown in the interface 15000. This option may cause the thermostat 400 to hold the displayed setpoint indefinitely until a user presses the hold element again causing thermostat 400 to revert to a schedule or occupancy based determinations for setpoint temperature. If user may be presented with a cancel button once they have selected a hold option. When a user interacts with the cancel button, the hold period can be cancelled and the thermostat 400 can return to its normal operational mode. In interface 15100, a coachmark interface is shown indicating to a user the function of the hold settings 14702. The coachmark interface 15100 can be displayed by the thermostat 400 when the user first installs and turns the thermostat 400 on or when the user first adjusts a temperature setpoint for the thermostat 400.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for controlling an environmental condition of a building, the controller comprising:
    a user interface configured to present information to a user and receive input from the user; and
    a processing circuit configured to:
        operate a plurality of system components to perform a plurality of system tests to determine whether the controller is installed correctly;
        receive, via the user interface, a plurality of indications of proper installation or improper installation from the user, wherein each of the plurality of system tests is associated with one of the plurality of indications;
        generate a system test summary page based on each of the plurality of indications; and
        cause the user interface to display the system test summary page.

2. The controller of claim 1, wherein the controller further comprises a plurality of wiring terminals and one or more detection circuits for the plurality of wiring terminals configured to determine whether a wire is connected to each of the plurality of wiring terminals;
    wherein the processing circuit is communicably coupled to the one or more detection circuits;
    wherein the processing circuit is configured to:
        receive an indication of whether the wire is connected to each of the plurality of wiring terminals from the one or more detection circuits;
        generate a wiring user interface based on the indication of whether the wire is connected to each of the plurality of wiring terminals, wherein the wiring user interface comprises an indication of each of the plurality of wiring terminals and an indication of which of the plurality of wiring terminals the wire is connected to; and
        cause the user interface to display the wiring user interface.

3. The controller of claim 2, wherein the processing circuit is configured to:
    receive, via the user interface, a first terminal override command in response to the user taping a first indication of a first wiring terminal of the wiring user interface;
    update a wiring interface to display an indication that the wire is connected to the first wiring terminal based on the first terminal override command and in response to determining that the wire is not connected to the first wiring terminal;
    update the wiring interface to include an override indication indicating that the first wiring terminal has been overridden; and cause the user interface to display an updated wiring interface.

4. The controller of claim 2, wherein the processing circuit is configured to:
receive, via the user interface, a first terminal override command in response to the user taping a first indication of a first wiring terminal of the wiring user interface;
update a wiring interface to not display the indication that the wire is connected to the first wiring terminal based on the first terminal override command and in response to determining that the wire is connected to the first wiring terminal;
update the wiring interface to comprise an override indication indicating that the first wiring terminal has been overridden; and
cause the user interface to display an updated wiring interface.

5. The controller of claim 2, wherein the processing circuit is configured to operate the plurality of system components to perform the plurality of system tests to determine whether the controller is installed correctly by causing a fan to run in response to determining that the wire is connected to a fan terminal;
wherein the processing circuit is configured to generate a fan operation interface comprising a question regarding whether the fan is circulating air and cause the user interface to display the fan operation interface; and
wherein receiving, via the user interface, the plurality of indications of proper installation or improper installation from the user comprises receiving, via the fan operation interface, an indication regarding whether the fan is circulating air.

6. The controller of claim 2, wherein the plurality of system tests comprises a heating test, wherein the processing circuit is configured to perform the heating test by:
causing a heat pump to heat the building in response to determining that wires for the heat pump are connected to the plurality of wiring terminals;
generating a heating test question interface comprising a question regarding whether hot air is exiting a vent of the building and causing the user interface to display the heating test question interface;
receiving, via the user interface, an indication regarding whether the hot air is exiting the vent of the building;
generating a reversing valve polarity question in response to receiving the indication indicating the hot air is not exiting the vent of the building, wherein the reversing valve polarity question asks the user whether cold air is exiting the vent of the building and causing the user interface to display the reversing valve polarity question;
switching a polarity of a reversing valve command in response to receiving, via the user interface, an indication that cold is exiting the vent of the building; and
performing the heating test a second time with the reversing valve command.

7. The controller of claim 2, wherein the plurality of system tests comprises a cooling test, wherein the processing circuit is configured to perform the cooling test by:
causing an air conditioner to cool the building in response to determining that wires for the air conditioner are connected to the plurality of wiring terminals;
generating a cooling test question interface comprising a question regarding whether cold air is exiting a vent of the building and causing the user interface to display the cooling test question interface;
receiving, via the user interface, an indication regarding whether the cold air is exiting the vent of the building;
generating a reversing valve polarity question in response to receiving the indication indicating that the cold air is not exiting the vent of the building, wherein the reversing valve polarity question asks the user whether hot air is exiting the vent of the building and causing the user interface to display the reversing valve polarity question;
switching a polarity of a reversing valve command in response to receiving, via the user interface, an indication that hot is exiting the vent of the building; and
performing the cooling test a second time with the reversing valve command.

* * * * *